US009124650B2

(12) United States Patent
Maharajh et al.

(10) Patent No.: US 9,124,650 B2
(45) Date of Patent: Sep. 1, 2015

(54) DIGITAL RIGHTS MANAGEMENT IN A MOBILE ENVIRONMENT

(75) Inventors: Kavi Maharajh, Oakville (CA); Torin Walker, Oakville (CA); Igor Sandler, Thornhill (CA); Eloi Minka, Toronto (CA); Balayogan Sachithananthan, Scarborough (CA); Nick Dingle, Burlington (CA); Hui Gang Zhang, Markham (CA); Bart MacNeil, Toronto (CA)

(73) Assignee: QUICKPLAY MEDIA INC., Toronto (CA)

( * ) Notice: Subject to any disclaimer, the term of this patent is extended or adjusted under 35 U.S.C. 154(b) by 880 days.

(21) Appl. No.: 12/903,125

(22) Filed: Oct. 12, 2010

(65) Prior Publication Data

US 2011/0225417 A1 Sep. 15, 2011

Related U.S. Application Data

(63) Continuation-in-part of application No. 11/956,138, filed on Dec. 13, 2007, now Pat. No. 8,671,021, and a continuation-in-part of application No. 11/956,162, filed on Dec. 13, 2007, now Pat. No. 8,219,134, and a (Continued)

(51) Int. Cl.
*G06Q 20/00* (2012.01)
*H04L 29/08* (2006.01)

(Continued)

(52) U.S. Cl.
CPC .............. *H04L 67/30* (2013.01); *G06F 21/10* (2013.01); *G06Q 10/06* (2013.01); *G06Q 10/10* (2013.01);

(Continued)

(58) Field of Classification Search
USPC .......................................... 705/56
See application file for complete search history.

(56) References Cited

U.S. PATENT DOCUMENTS 4,999,806 A * 3/1991 Chernow et al. ............. 717/177
5,999,937 A 12/1999 Ellard (Continued)

FOREIGN PATENT DOCUMENTS

EP 1617588 A1 1/2006
EP 2486742 A1 8/2012

(Continued)

OTHER PUBLICATIONS

"European Application Serial No. 07872056.2, Extended European Search Report mailed Sep. 19, 2012", 14 pages.

(Continued)

*Primary Examiner* — John Hayes
*Assistant Examiner* — John M Winter
(74) *Attorney, Agent, or Firm* — GTC Law Group LLP & Affiliates

(57) ABSTRACT

Embodiments provide a method that causes a plurality of virtual machine instructions to be interpreted for indications of a mobile device's hardware identification information, thus forming a plurality of hardware instruction interpretations. The embodiment also combines each of the plurality of hardware instruction interpretations and hashes the combination to form a quasi-hardware device identifier. An encryption process is based on the quasi-hardware encryption device identifier and the media is then encrypted using the encryption process. The encrypted media is transferred to the mobile device wherein the mobile device decrypts the media based at least in part on the mobile device's internal knowledge of the quasi-hardware device identification.

6 Claims, 83 Drawing Sheets

Related U.S. Application Data continuation-in-part of application No. 11/956,171, filed on Dec. 13, 2007, and a continuation-in-part of application No. 11/956,184, filed on Dec. 13, 2007, now abandoned, and a continuation-in-part of application No. 11/956,186, filed on Dec. 13, 2007, now Pat. No. 8,995,815, and a continuation-in-part of application No. 11/956,194, filed on Dec. 13, 2007, and a continuation-in-part of application No. 12/418,576, filed on Apr. 4, 2009, now Pat. No. 8,892,761.

(60) Provisional application No. 61/250,254, filed on Oct. 9, 2009, provisional application No. 61/042,634, filed on Apr. 4, 2008.

(51) Int. Cl.
*G06F 21/10* (2013.01)
*G06Q 10/06* (2012.01)
*G06Q 10/10* (2012.01)
*G06Q 50/32* (2012.01)
*H04L 29/06* (2006.01)

(52) U.S. Cl.
CPC ............ *G06Q 50/32* (2013.01); *H04L 63/0428* (2013.01); *H04L 65/4076* (2013.01); *H04L 65/4084* (2013.01); *H04L 65/602* (2013.01); *H04L 65/605* (2013.01); *H04L 65/80* (2013.01); *H04L 65/1059* (2013.01); *H04L 2463/101* (2013.01)

(56) References Cited

U.S. PATENT DOCUMENTS

| | | | |
|---|---|---|---|
| 6,704,576 | B1 | 3/2004 | Brachman et al. |
| 6,765,868 | B1 | 7/2004 | Dunn et al. |
| 7,124,166 | B2 | 10/2006 | Brown |
| 7,187,690 | B2 | 3/2007 | Taylor |
| 7,222,297 | B2 | 5/2007 | Goodwin et al. |
| 7,280,975 | B1 | 10/2007 | Donner |
| 7,503,072 | B2 * | 3/2009 | Hughes et al. .................. 726/26 |
| 7,581,166 | B2 | 8/2009 | Renger et al. |
| 7,805,338 | B2 | 9/2010 | Kolls |
| 7,831,199 | B2 | 11/2010 | Hodge et al. |
| 7,921,157 | B2 | 4/2011 | Brown |
| 8,219,134 | B2 | 7/2012 | Maharajh et al. |
| 2002/0069243 | A1 | 6/2002 | Raverdy et al. |
| 2002/0124258 | A1 | 9/2002 | Fritsch |
| 2003/0014483 | A1 | 1/2003 | Stevenson et al. |
| 2003/0217007 | A1 | 11/2003 | Fukushima et al. |
| 2004/0019509 | A1 | 1/2004 | Bekkers |
| 2004/0166834 | A1 | 8/2004 | Omar et al. |
| 2004/0193648 | A1 | 9/2004 | Lai et al. |
| 2005/0113066 | A1 | 5/2005 | Hamberg |
| 2005/0128995 | A1 | 6/2005 | Ott et al. |
| 2005/0152449 | A1 | 7/2005 | Nemiroff et al. |
| 2005/0153650 | A1 | 7/2005 | Hikomoto |
| 2005/0172154 | A1 | 8/2005 | Short et al. |
| 2005/0210498 | A1 | 9/2005 | Scott, III et al. |
| 2005/0233693 | A1 | 10/2005 | Karaoguz et al. |
| 2005/0246193 | A1 | 11/2005 | Roever et al. |
| 2006/0031551 | A1 | 2/2006 | Agresta et al. |
| 2006/0146854 | A1 | 7/2006 | Park |
| 2006/0218611 | A1 | 9/2006 | Son et al. |
| 2007/0002858 | A1 | 1/2007 | Bichot et al. |
| 2007/0060129 | A1 | 3/2007 | Ramer et al. |
| 2007/0061245 | A1 | 3/2007 | Ramer et al. |
| 2007/0081586 | A1 | 4/2007 | Raveendran et al. |
| 2007/0089151 | A1 | 4/2007 | Moore et al. |
| 2007/0124818 | A1 * | 5/2007 | Bumiller et al. .................. 726/26 |
| 2007/0157248 | A1 | 7/2007 | Ellis |
| 2007/0254619 | A1 | 11/2007 | Salomone et al. |
| 2007/0268164 | A1 | 11/2007 | Lai et al. |
| 2008/0083003 | A1 | 4/2008 | Biniak et al. |
| 2008/0088735 | A1 | 4/2008 | Biniak et al. |
| 2008/0155635 | A1 | 6/2008 | Johnson et al. |
| 2008/0195664 | A1 | 8/2008 | Maharajh et al. |
| 2008/0200153 | A1 | 8/2008 | Fitzpatrick et al. |
| 2008/0200154 | A1 | 8/2008 | Maharajh et al. |
| 2008/0201225 | A1 | 8/2008 | Maharajh et al. |
| 2008/0201386 | A1 | 8/2008 | Maharajh et al. |
| 2008/0207137 | A1 | 8/2008 | Maharajh et al. |
| 2008/0207182 | A1 | 8/2008 | Maharajh et al. |
| 2008/0288771 | A1 | 11/2008 | Kulakowski et al. |
| 2009/0049097 | A1 | 2/2009 | Nocifera et al. |
| 2012/0208512 | A1 | 8/2012 | Maharajh et al. |

FOREIGN PATENT DOCUMENTS

| | | |
|---|---|---|
| JP | 2004297628 | 10/2004 |
| WO | WO-2006110322 A2 | 10/2006 |
| WO | WO-2006113975 A1 | 11/2006 |
| WO | WO-2008072093 A2 | 6/2008 |
| WO | WO-2011041916 A1 | 4/2011 |
| WO | WO-2008072093 A3 | 11/2011 |

OTHER PUBLICATIONS

"U.S. Appl. No. 11/956,138, Non Final Office Action mailed Jan. 19, 2011", 30 pages.

"U.S. Appl. No. 11/956,162, Non Final Office Action mailed Jan. 6, 2011", 13 pages.

"U.S. Appl. No. 11/956,171, Non Final Office Action mailed Nov. 14, 2011", 21 pages.

"U.S. Appl. No. 11/956,184, Non Final Office Action mailed Oct. 4, 2010", 19 pages.

"USPTO, Office Action for related U.S. Appl. No. 11/956,184, entitled "Automated Content Tag Processing for Mobile Media", Office Action mailed Mar. 18, 2010.", 17 pages.

"USPTO, Office Action for related U.S. Appl. No. 11/956,194, entitled "Mediation and Settlement for Mobile Media", Office Action mailed Nov. 10, 2010", 18 pages.

"USPTO, Office Action for related U.S. Appl. No. 12/418,576, entitled "Progressive Download Playback", Office Action mailed Dec. 22, 2010.", 15 pages.

Einarsson, et al."Multiple aggregated control URIs for RTSP", http://tools.ietf.org/id/draft-einarsson-mmusic-rtsp-macuri-00.txt, Network Working Group, Internet-Draft, <draft-einarsson-mmusic-rtsp-macuri-OO> Retrieved from the Internet on Jun. 18, 2008, Jun. 19, 2006, 12 pages.

PCT/CA2010/001636, "International Application Serial No. PCT/CA2010/001636, International Preliminary Report on Patentability, mailed Apr. 19, 2012", 7 pages.

PCT/CA2010/001636, "International Application Serial No. PCT/CA2010/001636, International Search Report and Written Opinion mailed Feb. 8, 2011", 8 pages.

PCT/IB2007/004401, "International Application Serial No. PCT/IB2007/004401, International Search Report mailed Aug. 18, 2008", 7 pages.

Steck, Chris "Delivering Total Mobile TV", URL :http://docs . real.com/docs/ industries/DeliveringTotalMobileTV.pdf, XP002482031, retrieved on May 20, 2008, pp. 5-10, Apr. 2006, 1-12.

Baek, Joonsang et al., "Efficient Multi-receiver Identity-Based Encryption and Its Application to Broadcast Encryption", Public Key Cryptography—PKC 2005: 8th International Workshop on Theory and Practice in Public Key Cryptography, Les Diablerets, Switzerland, Lecture Notes in Computer Science (LNCS), vol. 3386, pp. 380-397, Springer, Berlin, Jan. 23-26, 2005, 18 pages.

* cited by examiner

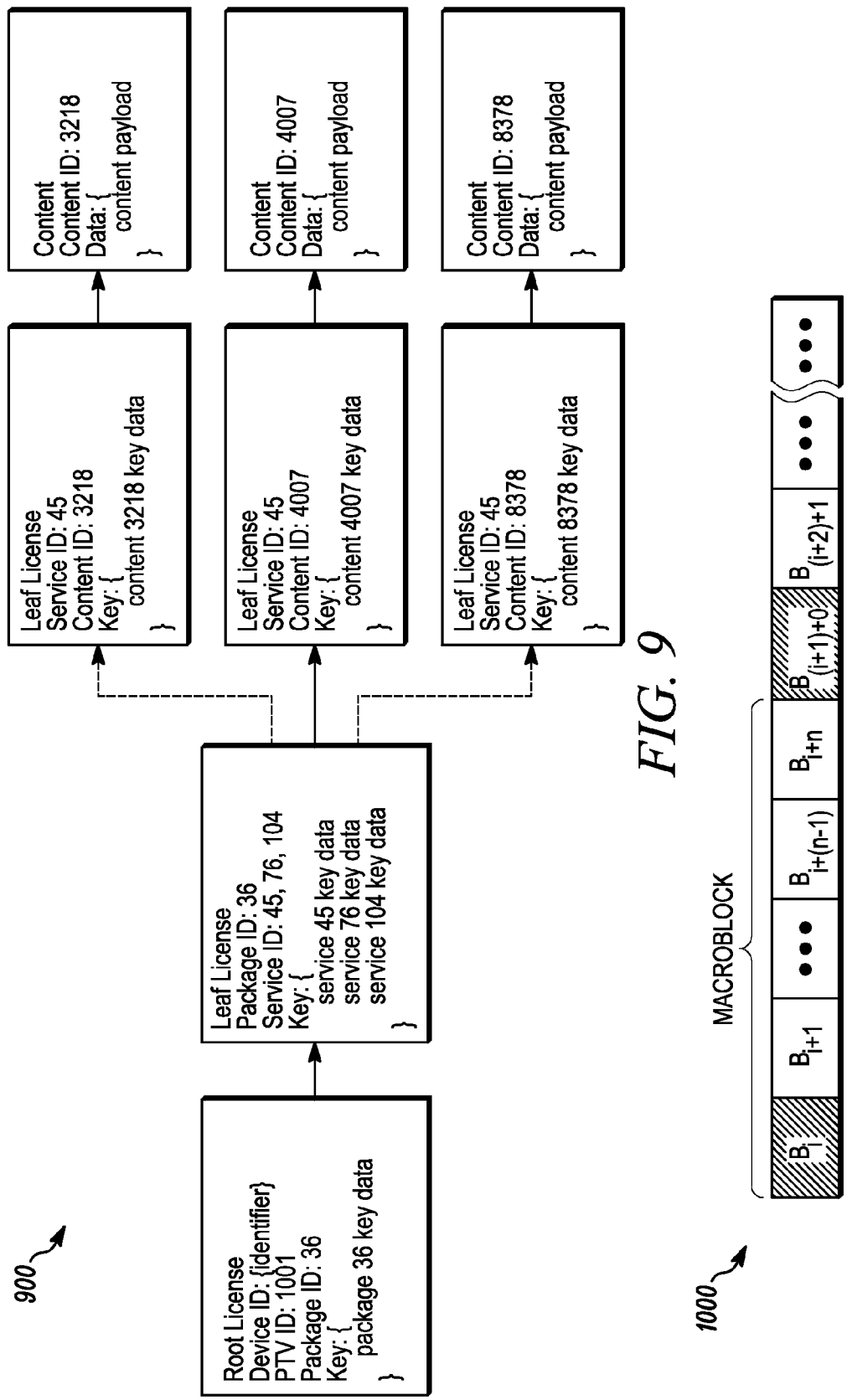

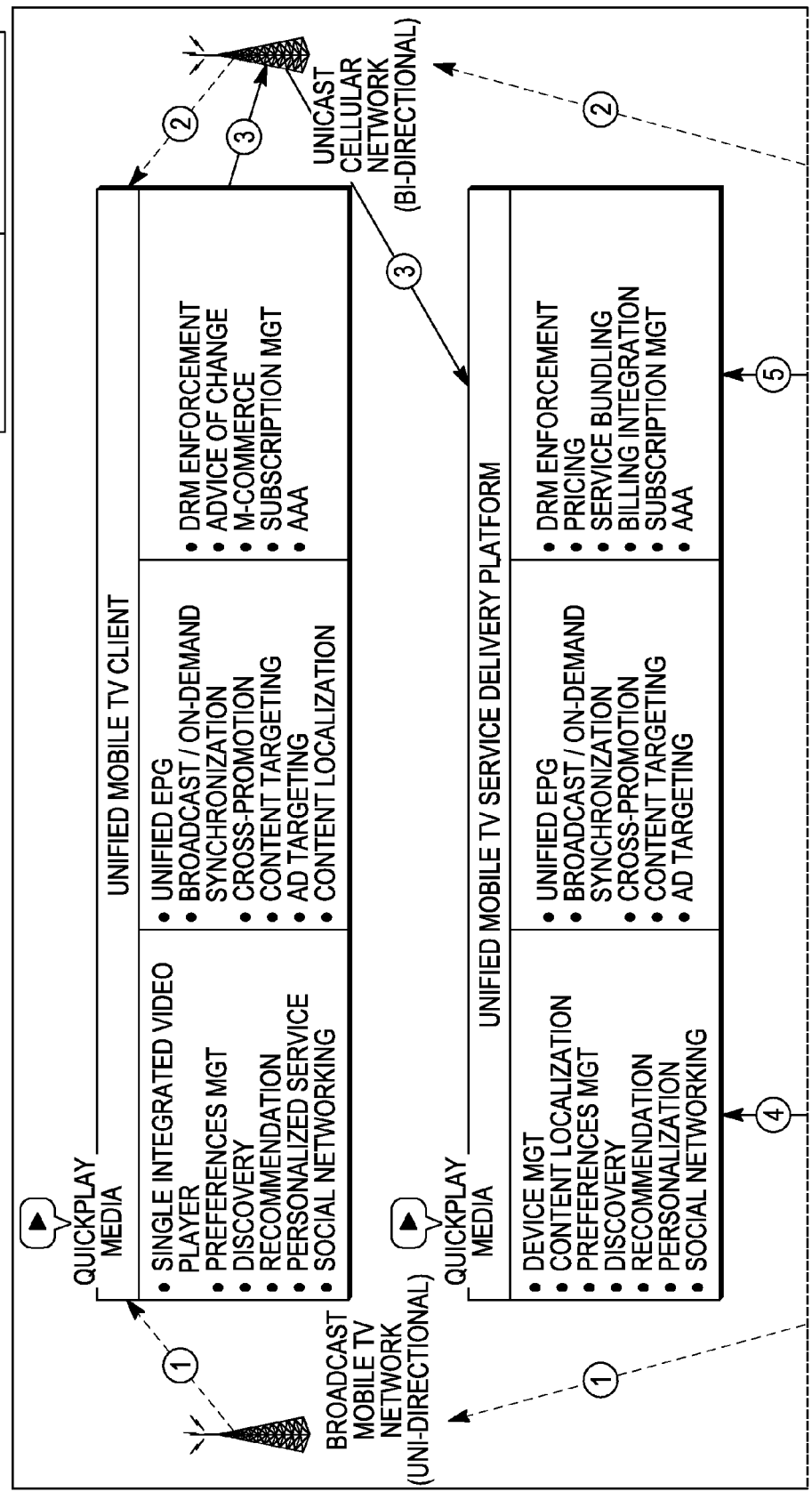

A. CLIENT RTSP REQUEST HANDLER
B. SERVER SIDE RTSP IO HANDLER
C. SESSION TRACKER/MONITOR MAINTAINS
D. RTP PACKET MONITOR
E. EMBEDDED DERBY

| QUICKPLAY MEDIA ▲ | | | | | | | LOGOUT |
|---|---|---|---|---|---|---|---|
| OPENVIDEO ADMINISTRATION | | | | | | | |
| INGESTION | DASHBOARD | PROVIDERS | CONTENT | REPORTS | | | |

CONTENT-VIEW CATEGORY          RETURN TO CONTENT HOME

```
⊟ USERCANENTERANYTHING
  ├ LAB_TRIAL
  ⊟ CNN
     ├ CNN_BUSINESS
     ├ CNN_ENTERTAINMENT
     ├ CNN_NOWINTHENEWS
     ├ CNN_US
     ├ CNN_POLITICS
     ├ CNN_WORLD
     └ CNN_OTHER
```

CATEGORY DETAILS

RE-ORDER CONTENT

PATH: SPRINT_LAB/CNN/CNN_BUSINESS

| ☐ | TITLE ⇅ | CONTENT PROVIDER ⇅ | META ID ⇅ | EXPIRY DATE ⇅ | PUBLISH DATE ⇅ | TYPE ⇅ | STATUS ⇅ | |
|---|---|---|---|---|---|---|---|---|
| ☐ | VOLATILE WORLD MARKE... | CNN | 91 | 12-07-'07 21:00 | 12-05-'07 21:57 | 🎬 | ACTIVE | SELECT FILTER |
| ☐ | THE PRICE OF PASTA | CNN | 96 | 12-07-'07 23:15 | 12-06-'07 00:00 | 🎬 | ACTIVE | CLEAR FILTER |
| ☐ | U.S. MORTGAGE CRISIS... | CNN | 103 | 12-08-'07 02:30 | 12-06-'07 03:20 | 🎬 | ACTIVE | |
| ☐ | BUSINESS BULLETIN... | CNN | 115 | 12-08-'07 16:15 | 12-06-'07 17:06 | 🎬 | ACTIVE | CONTENT ACTIONS |
| ☐ | PREACHING 'GREEN"... | CNN | 127 | 12-08-'07 16:15 | 12-06-'07 17:09 | 🎬 | ACTIVE | |
| ☐ | EASING THE CREDIT CR... | CNN | 131 | 12-08-'07 19:45 | 12-06-'07 20:41 | 🎬 | ACTIVE | CHANGE DATES |
| ☐ | HELPING THE OVEREXTE... | CNN | 133 | 12-08-'07 21:45 | 12-06-'07 22:35 | 🎬 | ACTIVE | |
| ☐ | BEER PRICES COULD DO... | CNN | 134 | 12-08-'07 23:15 | 12-07-'07 00:00 | 🎬 | ACTIVE | MOVE OR COPY |
| ☐ | BANK OF ENGLAND CUTS... | CNN | 143 | 12-09-'07 04:45 | 12-07-'07 05:41 | 🎬 | ACTIVE | |
| ☐ | INSIDE A MORTGAGE FR... | CNN | 150 | 12-09-'07 07:00 | 12-07-'07 07:50 | 🎬 | ACTIVE | REMOVE |

20 ITEMS FOUND, DISPLAYING 1 TO 10. [FIRST/PREV] 1, 2 [NEXT/LAST]

*FIG. 45*

QUICKPLAY MEDIA

OPENVIDEO ADMINISTRATION

| INGESTION | DASHBOARD | PROVIDERS | CONTENT | REPORTS |
| SCHEDULER | JOB QUEUE | LISTENERS | COMPONENTS | PROFILES |

LOGOUT

COMPONENTS

| COMPONENT NAME | DESCRIPTION | MODULE | PROFILE |
| --- | --- | --- | --- |
| LABTRIAL_COLLECTOR | RSS COLLECTOR-COLLECTS FILES FROM RSS FEEDS | RSSCOLLECTOR | LABTRIAL RSS COLLECTOR |
| LABTRIAL_ENCODETOAVI | ENCODE CONTENT TO AVI FORMAT | GENERICMENCODER | LABTRIAL ENCODETOAVIPROFILE |
| LABTRIAL_AVITOR128 | ENCODE AVI TO MP4 | GENERIC3GPENCODER | LABTRIAL AVITOMP4PROFILE |
| LABTRIAL_PUBLISHER | PUBLISH CONTENT | SIMPLEPUBLISHERMODULE | LABTRIAL PUBLISHERPROFILE |
| CNN_RSSCOLLECTOR | CNN RSSCOLLECTOR | RSSCOLLECTOR | CNN RSSCOLLECTORPROFILE |
| CNN_AVITOHSDPA144 | CNN_AVITOHSDPA144 | GENERIC3GPENCODER | CNNAVITOHSDPA |
| CNN_MP4TOAVI | CNN_MP4TOAVI | GENERICMENCODER | CNN MP4TOAVI |
| CNNPUBLISHER | CNNPUBLISHER | SIMPLEPUBLISHERMODULE | CNNPUBLISHER |

CREATE NEW COMPONENT

*FIG. 48*

QUICKPLAY MEDIA — OPENVIDEO ADMIN PORTAL

HELLO, PETER COOPER
VIEW YOUR ACCOUNT

[DASHBOARD] [PROVIDERS] [CONTENT] [INGESTION] [ACCOUNTS] [REPORTING] [LOGOUT]

INGESTION

ENCODING
[ADD ENCODING PROFILE]
[MANAGE ENCODING PROFILES]

FEEDS
[MANAGE FEEDS]

SCHEDULE
[MANAGE INGESTION SCHEDULE]

*FIG. 49*

```
┌─────────────────────────────────────────────────────────────────────┐
│ ▲ OPENVIDEO ADMIN PORTAL                    HELLO, PETER COOPER     │
│ QUICKPLAY                                     VIEW YOUR ACCOUNT     │
│ MEDIA   [DASHBOARD][PROVIDERS][CONTENT][INGESTION][ACCOUNTS][LOGOUT]│
│                                                                     │
│  INGESTION-MANAGE FEEDS              RETURN TO INGESTION HOME       │
│ ┌─────────────────────────────────────────────────────────────────┐ │
│ │ STEP 1 OF 7: FEED BASICS                                        │ │
│ │                                                                 │ │
│ │              FEED PROVIDER:  YOUTUBE                            │ │
│ │                *FEED TYPE:  [RSS ▽]                             │ │
│ │                *FEED NAME:  [MAIN FEED]                         │ │
│ │                                                                 │ │
│ │                                                                 │ │
│ │ ● FEED BASICS                                                   │ │
│ │   CATEGORY LABELS                                               │ │
│ │   PUBLICATION RULES                                             │ │
│ │   INGESTION SCHEDULE                                            │ │
│ │   COLLECTION & ENCODING                                         │ │
│ │   CUSTOMIZE ENCODINGS                                           │ │
│ │   FEED SUMMARY                                                  │ │
│ │                                                                 │ │
│ │                       [<-BACK] [NEXT->] [FINISH]     [CANCEL]   │ │
│ └─────────────────────────────────────────────────────────────────┘ │
└─────────────────────────────────────────────────────────────────────┘
```

▲ OPENVIDEO ADMIN PORTAL

QUICKPLAY MEDIA

HELLO, PETER COOPER
VIEW YOUR ACCOUNT

| DASHBOARD | PROVIDERS | CONTENT | INGESTION | ACCOUNTS | LOGOUT |

RETURN TO INGESTION HOME

INGESTION-MANAGE FEEDS

- FEED BASICS
- CATEGORY LABELS
- PUBLICATION RULES
- INGESTION SCHEDULE
- COLLECTION & ENCODING
- CUSTOMIZE ENCODINGS
- FEED SUMMARY

STEP 4 OF 7: INGESTION SCHEDULE

INGEST:
- ○ NEVER
- ○ ONCE, ON: [12 ▽] [31 ▽] [2007 ▽]
- ● EVERY: [0 ▽] DAY(S), [30 ▽] HOUR(S), [0 ▽] MIN(S)
- ○ EVERY: ☐ MON ☐ TUE ☐ WED ☐ THU ☐ FRI ☐ SAT ☐ SUN

STARTING: [23 ▽] [45 ▽] (HH:MM)

[<-BACK] [NEXT->] [FINISH] [CANCEL]

*FIG. 55*

▼ OPENVIDEO ADMIN PORTAL

QUICKPLAY MEDIA

HELLO, PETER COOPER
VIEW YOUR ACCOUNT

[ DASHBOARD ] [ PROVIDERS ] [ CONTENT ] [ INGESTION ] [ ACCOUNTS ] [ LOGOUT ]

INGESTION-MANAGE FEEDS          RETURN TO INGESTION HOME

- FEED BASICS
- CATEGORY LABELS
- PUBLICATION RULES
- INGESTION SCHEDULE
- COLLECTION & ENCODING
- CUSTOMIZE ENCODINGS
- FEED SUMMARY

STEP 5 OF 7: COLLECTION & ENCODING

COLLECT FROM (URL/PATH): [ HTTP:// RSS.FOOBAR.COM/BOOBAR.XML ]

SECURE?: [ ]      *USERNAME: [ QUICKPLAY ]

*PASSWORD: [ 123ABC ]

PERFORM ENCODING? [✓]

FIRST ENCODING PASS: [ FLV TO AVI ▽ ]

[<-BACK]  [NEXT->]  [FINISH]  [CANCEL]

QUICKPLAY MEDIA — OPENVIDEO ADMIN PORTAL

HELLO, PETER COOPER
VIEW YOUR ACCOUNT

[DASHBOARD] [PROVIDERS] [CONTENT] [INGESTION] [ACCOUNTS] [LOGOUT]

INGESTION-MANAGE FEEDS     RETURN TO INGESTION HOME

STEP 7 OF 7: SUMMARY

- FEED BASICS
- CATEGORY LABELS
- PUBLICATION RULES
- INGESTION SCHEDULE
- COLLECTION & ENCODING
- CUSTOMIZE ENCODINGS
- FEED SUMMARY

NAME: MAIN DAILY FEED
CATEGORY LABELS: ENTERTAINMENT, MUSIC, SPORTS
URL: HTTP://FOO.CHUMTV.COM/BAR/WAR
PUBLICATION METHOD: SIMPLE
DEFAULT LABEL: ENTERTAINMENT
SCHEDULE: EVERY MONDAY, WEDNESDAY, FRIDAY STARTING AT 13:45
ENCODINGS: FLV TO AVI, AVI TO EDGE, AVI TO HSDPA

[<-BACK] [NEXT->] [FINISH] [CANCEL]

*FIG. 58*

◣ OPENVIDEO ADMIN PORTAL

QUICKPLAY MEDIA

HELLO, PETER COOPER
VIEW YOUR ACCOUNT

| DASHBOARD | PROVIDERS | CONTENT | INGESTION | ACCOUNTS | LOGOUT |

INGESTION SCHEDULE

RETURN TO INGESTION HOME

| NAME | SCHEDULE | LAST EXECUTION | NEXT EXECUTION | PASS? |
|---|---|---|---|---|
| ☐ YOUTUBE->MAIN FEED | EVERY 2 DAYS, AT 14:23 | 12/24/07 - 23:45:01 | CURRENTLY RUNNING | YES |
| ☐ CHUM->SECOND FEED | EVERY MON, WED, FRI, AT 14:23 | 12/24/07 - 23:45:01 | 12/16/07 - 23:45:01 | YES |
| ☐ YOUTUBE->OTHER | EVERY MON, WED, FRI, AT 14:23 | - | 12/19/07 - 23:45:01 | YES |
| ☐ CHUM->SECOND FEED | EVERY 20 MINUTES | 12/24/07 - 23:45:01 | 12/18/07 - 23:45:01 | NO |
| ☐ YOUTUBE->OTHER | EVERY 60 MINUTES | 12/24/07 - 23:45:01 | 12/19/07 - 23:45:01 | YES |
| ☐ CHUM->SECOND FEED | EVERY MON, WED, FRI, AT 14:23 | - | 12/20/07 - 23:45:01 | YES |
| ☐ YOUTUBE->OTHER | EVERY 20 MINUTES | 12/24/07 - 23:45:01 | 12/21/07 - 23:45:01 | NO |
| ☐ CHUM->SECOND FEED | EVERY 60 MINUTES | 12/24/07 - 23:45:01 | 12/28/07 - 23:45:01 | YES |
| ☐ YOUTUBE->OTHER | EVERY MON, WED, FRI, AT 14:23 | 12/24/07 - 23:45:01 | 12/29/07 - 23:45:01 | YES |
| ☐ CHUM->SECOND FEED | EVERY 20 MINUTES | - | 12/30/07 - 23:45:01 | YES |
| ☐ YOUTUBE->OTHER | EVERY 20 MINUTES | 12/24/07 - 23:45:01 | 12/31/07 - 23:45:01 | YES |
| ☐ CHUM->SECOND FEED | EVERY MON, WED, FRI, AT 14:23 | 12/24/07 - 23:45:01 | PAUSED | YES |
| ☐ YOUTUBE->OTHER | EVERY 60 MINUTES | 12/24/07 - 23:45:01 | PAUSED | YES |

<<-PREV  1 2 3 4 5  NEXT->>

CHOOSE ACTION ▽ GO

*FIG. 60*

QUICKPLAY MEDIA · OPENVIDEO ADMIN PORTAL

HELLO, PETER COOPER
VIEW YOUR ACCOUNT

DASHBOARD | PROVIDERS | CONTENT | INGESTION | ACCOUNTS | REPORTING | LOGOUT

INGESTION-ADD ENCODING PROFILE

RETURN TO INGESTION HOME

*NAME: FLV TO AVI

*CONFIGURATION:
```
<entry key="MEncoderPass1GlobalParameters">-ofps 30 - noencodedups - nobps -
nosound -vf pp=al/lb, scale=352:288</entry>
<entry key="MEncoderPass1SpecificParameters">-ovc lavc -lavopts
vcodec=mpeg4:vpass=1:turbo:vqscale=2</entry>
<entry key="MEncoderPass1GlobalParameters">-ofps 30 - noencodedups - nobps -
nosound -vf pp=al/lb,scale=352:288</entry>
<entry key="MEncoderPass1SpecificParameters">-ovc lavc - lavopts
vcodec=mpeg4:vpass=1:turbo:vqscale=2</entry>
```

SAVE   CANCEL

*FIG. 61*

QUICKPLAY MEDIA — OPENVIDEO ADMIN PORTAL

HELLO, PETER COOPER
VIEW YOUR ACCOUNT

[DASHBOARD] [PROVIDERS] [CONTENT] [INGESTION] [ACCOUNTS] [REPORTING] [LOGOUT]

RETURN TO INGESTION HOME

INGESTION-MANAGE FEEDS

SELECT ENCODING PROFILE ▽

CHANGES TO <PROFILE> HAVE BEEN SAVED.

*NAME: HSDPA

*CONFIGURATION:
```
<entry key="MEncoderPass1GlobalParameters">-ofps 30 -
noencodedups -nobps -nosound -vf pp=al/lb,scale=352:288</
entry>
<entry key="MEncoderPass1SpecificParameters">-ovc lavc -
lavcopts vcodec=mpeg4:vpass=1:turbo:vqscale=2</entry>
<entry key="MEncoderPass1GlobalParameters">-ofps 30 -
noencodedups -nobps -nosound -vf pp=al/lb,scale=352:288</
entry>
<entry key="MEncoderPass1SpecificParameters">-ovc lavc -
lavcopts vcodec=mpeg4:vpass=1:turbo:vqscale=2</entry>
```

[SAVE]

*FIG. 64*

DIGITAL RIGHTS MANAGEMENT IN A MOBILE ENVIRONMENT

CROSS-REFERENCE TO RELATED APPLICATIONS

The application claims the benefit of the following provisional application which is hereby incorporated by reference in its entirety:

Ser. No. 61/250,254, entitled DIGITAL RIGHTS MANAGEMENT FOR A MOBILE MEDIA PLATFORM, filed Oct. 9, 2009.

This application is a continuation-in-part of U.S. application Ser. No. 11/956,138 entitled CONSUMPTION PROFILE FOR MOBILE MEDIA, filed Dec. 13, 2007 which is hereby incorporated herein by reference in its entirety.

This application is a continuation-in-part of U.S. application Ser. No. 11/956,162 entitled SEAMLESSLY SWITCHING AMONG UNICAST, MULTICAST, AND BROADCAST MOBILE MEDIA CONTENT, filed Dec. 13, 2007 which is hereby incorporated herein by reference in its entirety.

This application is a continuation-in-part of U.S. application Ser. No. 11/956,184 entitled AUTOMATED CONTENT TAG PROCESSING FOR MOBILE MEDIA, filed Dec. 13, 2007 which is hereby incorporated herein by reference in its entirety.

This application is a continuation-in-part of U.S. application Ser. No. 11/956,186 entitled MOBILE MEDIA PAUSE AND RESUME, filed Dec. 13, 2007 which is hereby incorporated herein by reference in its entirety.

This application is a continuation-in-part of U.S. application Ser. No. 11/956,171 entitled ENCODING AND TRANSCODING FOR MOBILE MEDIA, filed Dec. 13, 2007 which is hereby incorporated herein by reference in its entirety.

This application is a continuation-in-part of U.S. application Ser. No. 11/956,194 entitled MEDIATION AND SETTLEMENT FOR MOBILE MEDIA, filed Dec. 13, 2007 which is hereby incorporated herein by reference in its entirety.

This application is a continuation-in-part of U.S. application Ser. No. 12/418,576 entitled PROGRESSIVE DOWNLOAD PLAYBACK, filed Apr. 4, 2009 which claims priority to U.S. provisional application Ser. No. 61/042,634 entitled PROGRESSIVE DOWNLOAD PLAYBACK filed Apr. 4, 2008 each of which are hereby incorporated herein by reference in their entirety.

BACKGROUND

1. Field:

The methods and systems disclosed herein relate to digital rights and digital mobile media delivery, and more particularly to digital rights management on mobile and other devices.

2. Description of the Related Art:

The proliferation of mobile devices worldwide, coupled with the launch of next-generation networks by mobile operators, has led to a dramatic increase in mobile rich media consumption. With millions of multimedia enabled mobile devices being released to market, the ability for consumers to quickly access various forms of content is changing the role of the mobile device. As users and devices have become more sophisticated, greater use has resulted in the on-demand video, allowing users to watch a movie or a favorite television program anywhere. Content is downloaded to the cell phone or other personal media device and the user then views the content. This is a significant change from a user procuring a video disc or video tape cassette, loading it into a player, and viewing the content. The download takes place over the user's phone of data connection, and no physical media delivers the content. Because no physical medium delivers the content, the content must be securely transmitted to the user's device to prevent unauthorized access to the content. This security is known as digital rights management.

SUMMARY

The invention may incorporate a multi-tenant platform which may support various types of content and multiple content providers, mobile operators and other parties within a single hosted environment. The invention may include methods and systems for optimization of content delivery, facilitating access to content on a mobile device, ingesting content, storing content and metadata in a file format optimized for use on a mobile platform, integrating multiple billing systems, enabling commerce, creating a community and the like. In this application, the term phone includes any mobile device, such as a personal digital assistant, portable gaming device, laptop computer, MP3 player, video player, GPS unit, wireless email device, pager, and the like.

In an embodiment the present invention provides a method for causing a plurality of virtual machine instructions to be interpreted for indications of a mobile device's hardware identification information. This forms a plurality of hardware instruction interpretations. This plurality of hardware instruction interpretations is combined and hashed to form a quasi-hardware device identifier. An encryption process is then based on the quasi-hardware device identifier and media is encrypted using the encryption process. The encrypted media is then transferred to the mobile device, where the mobile device decrypts the media based at least in part on the mobile device's internal knowledge of the quasi-hardware device identifier.

A further embodiment provides a method for causing a plurality of virtual-machine instructions to be interpreted for indications of a mobile device's hardware identification information, thus forming a plurality of hardware instruction interpretations. The plurality of hardware instruction interpretations is combined and hashed to form a quasi-hardware device identifier. The quasi-hardware device identifier is used in a unique encryption process that is based on at least two factors: the quasi-hardware device identifier, and an understanding of what prior encryption process was used in a previous media delivery to the mobile device such that the unique encryption process is different than the prior encryption process. The media is then encrypted and transferred to the mobile device, causing the mobile device to decrypt the media based at least in part on the mobile device's internal knowledge of the quasi-hardware device identifier.

A still further embodiment provides a method comprising the steps of: causing a plurality of virtual-machine instructions to be interpreted for indications of a mobile device's hardware identification information, forming a plurality of hardware instruction interpretations; combining each of the plurality of hardware instruction interpretations and then hashing the combination to form a quasi-hardware device identifier; basing an encryption process on the quasi-hardware device identifier; dividing media into a plurality of blocks; encrypting at least one of the plurality of blocks using the encryption process; scrambling at least one of the remaining blocks from the plurality of blocks based on the quasi-hardware device identifier; transferring each of the plurality of blocks to the mobile device; and causing the mobile device to decrypt and unscramble the media based at least in part, on the mobile device's internal knowledge of the quasi-hardware device identifier.

A yet further embodiment provides a method comprising the steps of: enabling a user to register a plurality of devices, each of the plurality of devices adapted to present media to the user, at least one of the plurality of devices being a mobile phone; adapting a media delivery platform to deliver encrypted media to each of the plurality of devices based on a knowledge of which of the plurality of devices the encrypted media delivery platform is send the encrypted media, such that the encrypted media delivery is based on a device specific encryption process; and further adapting the media delivery platform to deliver encrypted media to the mobile phone based on a quasi-hardware device identifier, wherein the quasi-hardware mobile device is based on a virtual machine instruction interpretation process on the mobile phone.

An additional embodiment provides a method executed in response to a media delivery request from a television set top box. In the method, encrypted media is delivered to the television set top box based on a set top box encryption process. The method also allows a pause media request to be sent from the television set top box. In response to the request, the media is paused. In addition, the method provides for a resume media response request from a mobile phone, where the media is delivered to the mobile phone based on a quasi-hardware device identifier relating to the mobile phone.

An embodiment of the present invention provides a method of dynamic encryption. The method provides that in response to receiving a video request from a mobile communication device or facility, then generating a unique algorithm, wherein the unique algorithm is unique with respect to encryption algorithms used to encrypt video files previously presented to the mobile communication facility or device. The method then encrypts a new video file, relating to the request, with the unique encryption algorithm; and then transmitting the new video file to the mobile communication facility or device.

A further embodiment of the present invention provides a method of bandwidth-enhanced encryption. The method includes the steps of: encrypting a first block of code from a divided video file in response to receiving a video request from a mobile communication facility; scrambling each of a remaining number of code blocks from the divided video file, wherein the scrambling is at least in part based on a parameter derived from the encryption algorithm used for the encryption of the first block; and then transmitting each of the first code block and the remaining code blocks to the mobile communication facility such that the mobile communication facility can decrypt, descramble, and view the divided video file.

A further embodiment of the invention provides a method of dynamic bandwidth-enhanced encryption. The method includes the steps of: in response to receiving a video request from a mobile communication facility, generating a unique encryption algorithm and encrypting a first code block from a divided video file with the unique encryption algorithm; scrambling each of a remaining number of code blocks from the divided video file, wherein the scrambling is at least in part based on a parameter derived from the unique encryption algorithm; and transmitting each of the first code block and the remaining code blocks to the mobile decryption facility such that the mobile communication facility can decrypt, descramble, and view the divided video file, wherein the step of transmitting involves streaming the code blocks to the mobile communication facility, and wherein the step of transmitting involves downloading the code blocks to the mobile communication facility.

A still further embodiment of the invention provides a mobile device specific rights object. The steps of the method include: in response to receiving a subscription request from a mobile communication facility, interrogating the mobile communication facility to obtain a device specific identifier; generating an encrypted rights management object including rules related access of a video, wherein the encryption is based at least in part on the device specific identifier; and causing the mobile communication facility to decrypt the rights management object based on the device specific identifier and follow the rules before any access to the video is permitted, and wherein the rights management object is retrievable from the mobile communication facility, and wherein the rights management object on the mobile communication facility is replaceable.

A still further embodiment provides a unique mobile device rights specific object. The method provides the steps of: in response to each new video request from a mobile communication facility, generating a new encrypted rights management object to regulate access rights of a corresponding video that is delivered to the mobile communication facility: each new encrypted rights management object is encrypted based at least in part on a unique device identifier that is retrieved from the mobile communication facility and based at least in part on a dynamic encryption algorithm that changes for each new video request. The unique identifier may also be retrieved from a wireless provider instead of from the mobile device itself.

A yet further embodiment provides for multi-level rights management of media objects. The method provides a means of controlling access to a video from a mobile communication facility using a multi-level rights platform. The multi-level rights platform has access control over the mobile communication facility's access to particular videos, applications that have the ability to play the particular videos, as well as a subscription service for accessing the particular videos.

An additional embodiment provides means for location based rights management through resident knowledge. The method first delivers a rights management object to a mobile communication facility to control the access rights of the mobile communication facility with respect to a corresponding video. The rights management object includes an access rule based on the location of the mobile communication facility, wherein the location of the mobile communication facility is stored locally in the mobile communication facility. The location of the mobile communication facility may also be determined by: cell tower connection location, cell tower triangulation, GPS, or the IP address used by the mobile communication facility.

A still further embodiment provides for location based rights management through central knowledge. The method delivers a rights management object to a mobile communication facility to control the access rights of the mobile communication facility with respect to a corresponding delivered video. In addition, the rights management object includes an access rule based on location of the mobile communication facility, wherein the location of the mobile communication facility is stored in a central system off of the mobile communication system.

An additional embodiment provides location based rights management updates. The method includes the steps of receiving a request from a mobile communication facility to access a video following a denial of access based on a location of the mobile communication facility and delivering a new rights management object to the mobile communication facility to permit access to the video based on the request, wherein the delivery is contingent on a fee for accessing the video in the location.

Yet a further embodiment provides for time based management latching with local control. The method causes a time of day representing a then current time of day when a video is first played on a mobile communication facility to be stored within the mobile communication facility, forming a first play time. Then, in response to a subsequent video play request from the mobile communication facility relating to the video, causing a time of day representing the then current time of day to be determined, forming a second play time. The method then compares the first and second play times to assess a likelihood of whether a clock on the mobile communication facility has been manipulated in such a way as to permit the playing of the video when a rights management rule would otherwise not have permitted the playing of the video. The method further comprises causing a remedial action to be implemented in response to a positive indication of improper manipulation.

An embodiment of the present invention provides time based rights management latching with central control. The method causes a time of day representing the then current time of day when a video is first played on a mobile communication facility to be stored centrally, forming a first play time. In response to a subsequent video play request from the mobile communication facility relating to the video, causing a time of day representing the then current time of day to be determined, forming a second play time, and then comparing at a central location off of the mobile communication facility, the first and second play times to assess a likelihood of whether a clock on the mobile communication facility has been manipulated in such a way as to permit the playing of the video when a rights management rule would otherwise have not permitted the playing of the video. The method further comprises causing a remedial action to be implemented in response to a positive indication of improper manipulation.

A further embodiment of the present invention provides a method of time based rights management latching with local control and central verification. The method causes a time of day representing the then current time of day when a video is first played on a mobile communication facility to be stored locally, forming a first play time. Then, in response to a subsequent video play request from the mobile communication facility relating to the video, causing a time of day representing the then current time of day to be determined, forming a second play time. Then a local comparison of the first and second play times is made to assess a likelihood of whether a clock on the mobile communication facility has been manipulated in a way to permit the playing of the video when a rights management rule would otherwise not permit playing the video. The next step provides that at a time when the mobile communication facility has a network connection, sending the first and second play times to a central system for further manipulation analysis. The method further comprises sending other times relating to other video play times to the central system for further manipulation analysis.

An additional embodiment provides for application authentication through feature time performance. The method begins when a software application profile is stored. The profile includes an estimated time that it takes a software application to perform at least one function. The method then causes the software application to perform the at least one function such that a performance time can be measured. The next step is to compare the estimated time with the performance time to assess the likelihood that the software application is authentic, The at least one function may be a function in the software intended to produce a timing signal, The at least one function may also be altered to produce a new estimated time to obfuscate the ability of a third party to predict the estimated time. Alteration of the function may also be done after the software application has been installed on a system. The software application may also be a video playing software application, or a mobile communication application.

A further application provides application authentication through various feature performances. The method includes the steps of: storing a software application profile, wherein the profile is based at least in part on estimated times that it takes a software application to perform various functions: causing the software application to perform the various functions such that the software application performance can be measured; comparing the software application profile with information derived from the software application performance testing to assess the likelihood that the software application is authentic. The profile may also include a time for each of the various functions and may be produced by using times for each of the functions as inputs to an algorithm to produce a verification factor. Finally the estimated times may include statistically based acceptable variations.

A yet further embodiment provides for application authentication through feature performance and verification. The method evaluates the authenticity of a software application based on how long the software application takes to perform a function, when an estimated acceptable time of performance was previously established. The method also further comprises: remotely polling the software application to cause the evaluation; provides periodic updates on function performance such that the authenticity can be periodically evaluated; software application function is evaluated each time the software application is used; measuring locally how long it takes the software application to perform; and measuring how long it takes the software application to perform the function from a central location.

An embodiment provides for device authentication through token exchange with a host to provide a rights object. The method evaluates the authenticity of a token that is sent from a device to a host to ensure that a set of authentication credentials to facilitate access to protected content are usable by a single device.

In embodiments, the present invention provides a consumption profile for a mobile media platform comprising a device profile, a user profile, a network profile, an encoding profile, and a content profile.

In embodiments, the consumption profile may be updated in realtime. Further, in embodiments, the consumption profile may be updated at set intervals. The consumption profile may function as a comprehensive adapter mechanism. In embodiments, the device profile may include the technical specifications of the device.

In embodiments, the user profile may include user preferences and historical user information.

In embodiments, the network profile may include technical specifications of the network, available bandwidth and usage rules.

In embodiments, the encoding profile may include information regarding the technical specifications of encoding.

In embodiments, the content profile may include information regarding the type and source of content. The content may be web content. The channel of origination of the content may be recorded. Further, the source of a request in connection with the content may be recorded.

In embodiments, the consumption profile may specify ingestion parameters and attributes. Furthermore, the consumption profile may capture ingestion parameters and attributes. In embodiments, at least one element of the consumption profile may be contained as metadata in the same file as the corresponding content. In embodiments, metadata may be included in the same file as corresponding content may be actionable based on the consumption profile.

In embodiments, the consumption profile may impact a user interface. The user interface may be a user interface of a mobile media platform. The user interface may be a user interface of a mobile device. The consumption profile may impact the look and feel of a user interface. The consumption profile may be managed through a user interface. The user interface may be an administrative user interface. The user interface may be a user interface of a mobile media platform. Further, the user interface may be a user interface of a mobile device.

In embodiments, the consumption profile may impact content discovery. The consumption profile may impact searching. Furthermore, in embodiments, the consumption profile may impact at least one of the ranking, filtering and clustering of search results.

In embodiments, the consumption profile may impact recommendations. The consumption profile may include at least one of location information and location intelligence. At least one of location information and location intelligence may be used to target content. The content may be an advertisement.

In embodiments, the consumption profile may facilitate personalization of user experience. The mobile media platform may include a personal entertainment server and the consumption profile impacts the content presented through the server. The mobile media platform includes an interactive programming guide and the consumption profile impacts the content presented through the interactive programming guide.

In embodiments, the consumption profile may impact e-commerce, e-billing, digital rights management, or some other type impact.

In embodiments, the consumption profile may include information relating to user preferences regarding digital rights management, from reports generated by the mobile media platform, or some other type of information.

In embodiments, a consumption profile may enable integration with another system. Furthermore, in embodiments, other systems include at least one of carrier systems, content provider systems, systems of mobile devices, ad servers, Internet-based systems, web-based systems, billing systems, content delivery systems, encoding and transcoding systems, storage systems, social networking systems, hosting systems, ingestion systems, security systems, search engines, mobile search engine or some other type of systems. Further, integration may be accomplished using at least one of hard coding, loose coupling, networking, application programming interfaces, interfaces, or some other type of integration.

In embodiments, a consumption profile may facilitate integration with other systems.

In embodiments, the consumption profile may include information relating to the architecture of the mobile media platform. The information may be at least one of information relating to the application layer, business module layer, system layer, thin client, rich client, device registry, component layer, or some other type of consumption profile.

In embodiments, the consumption profile may be associated with various users of the mobile media platform. The users may be selected from the group consisting of end users, consumers, advertisers, marketers, content providers, content owners, networks, broadcasters, media companies, mobile carriers, record companies, movie studios, regulators, mobile device designers, mobile device manufacturers, mobile device offerors, mobile service consolidators, affiliates, or some other type of users. Each user of the platform may have its own consumption profile. The consumption profile may contain information relating to various users of the platform.

In embodiments, the consumption profile may be associated with various business models of the mobile media platform. The business models may be selected from the group consisting of short code and bar code campaigns, white label, private label, subscription, per-use, pre-paid, post-paid, free trial, gifting, begging, distribution initiated on deck, distribution initiated off-deck, distribution initiated via short code, viral distribution, ad-supported models (such as bulk, per view, click-through, search keyword auction, ad media, banner ads, audio/video bumpers, splash screens, interstitials, and location based), revenue share management, content provider, mobile operator, or some other type of business model.

In embodiments, a consumption profile may be pluralized. Mobile media platform may contain many pre-configured consumption profiles. The consumption profile may take the form of a number of combinations of rules that together form the presentment and best quality of service delivery to the user.

In embodiments, a consumption profile may be selected for use through awareness of the environment. Further, the consumption profile may impact seamless switching among at least two of unicast, multicast and broadcast content.

In embodiments, the consumption profile may impact seamless switching between networks.

Furthermore, in embodiments, the consumption profile may impact advanced encoding and transcoding. The parameters and attributes of advanced encoding and transcoding may be determined by a consumption profile. The network profile may influence the parameters and attributes of advanced encoding and transcoding. The device profile may influence the parameters and attributes of advanced encoding and transcoding. Further, the user profile may influence the parameters and attributes of advanced encoding and transcoding. Furthermore, the content profile may influence the parameters and attributes of advanced encoding and transcoding. Still further, the encoding profile may influence the parameters and attributes of advanced encoding and transcoding.

In embodiments, the consumption profile may be affected by advanced encoding and transcoding. The consumption profile may be affected by automated content tagging. The tags may be maintained as part of the consumption profile.

In embodiments, the consumption profile may facilitate automated content tagging. The consumption profile may be affected by pausing and resuming playback. The pause markers may be maintained as part of the consumption profile.

In embodiments, the consumption profile may facilitate mediation and settlement. The information contained in the consumption profile may be used to accomplish mediation and settlement.

In embodiments, the present invention provides a method of delivery of content on a mobile media platform, providing a consumption profile, and delivering content to a mobile device, wherein content delivery may be based at least in part on the consumption profile.

In embodiments, the consumption profile may impact the type of content delivered. Further, the consumption profile may impact the source of content delivered. Furthermore, the consumption profile may impact the method by which content is delivered.

In embodiments, the consumption profile may impact when content is delivered. The content may be an advertisement and the consumption profile enables targeted delivery of the content.

In embodiments, the present invention provides a method of optimizing delivery of content on a mobile media platform, optimizing ingestion of content based on a consumption profile, optimizing encoding of content based on a consumption profile, optimizing hosting of content based on a consumption profile, and optimizing delivery of content based on a consumption profile. Furthermore, in embodiments, the encoding may be transcoding.

In embodiments, the present invention provides a method of providing a consumption profile and mediating interaction in a social networking environment based on the consumption profile.

In embodiments, the social networking environment may include at least one of content referral, content rating, gifting, forums, gifting, buddy list management, peer-to-peer management, communities of interest, profile page, dMail, points, message boards, newsletter, shop, home, advertising, notifications, sharing content on mobile devices, or some other type of social networking environment.

In embodiments, the consumption profile may contain information regarding opting in to certain aspects of the social networking environment. Further, the consumption profile may contain information regarding opting out of certain aspects of the social networking environment.

In embodiments, the present invention provides a method of targeting advertising content on a mobile media platform providing at least one consumption profile and providing an ad fulfillment engine which targets advertising content based on the at least one consumption profile.

In embodiments, advertising content may be targeted. Further, objectives for the ad fulfillment engine may be specified. The ad fulfillment engine may determine the method of delivery of the content based on the consumption profile. Furthermore, the ad fulfillment engine may determine the timing of delivery of the content based on the consumption profile.

In embodiments, the present invention provides a method and system for switching between broadcast and unicast content on a mobile device. The method and system involves making unicast content available to the mobile device, making broadcast content available to the mobile device; and providing an application on the mobile device which allows for switching between the unicast and broadcast content.

In embodiments, unicast content may be made available to the mobile device using a mobile media platform. In addition, the unicast content may be a multicast content and may be selected from the group consisting of on-demand content, video content, long-tail content, audio content, recorded content, data and clips or some other type of content. Moreover, the unicast content may be side loaded onto the mobile device. Moreover, the unicast content is pre-encoded, encoded on demand and access to the unicast content may be paused and later resumed.

In embodiments, broadcast content may be made available to the mobile device using the mobile media platform and may be selected from the group consisting of linear programming, television, short-head content, radio, live content, data and loops of clips or some other type of media content. Moreover, the broadcast content may be encoded in a live linear manner taking into consideration at least one of the network, device, delivery method and available bandwidth.

In embodiments, the application may enable content search, content discovery, content protection, mobile commerce. In addition, application may include a user interface. The user interface may vary with the broadcast and unicast nature of the content. In addition, while providing broadcast content, the user interface may presents recommendations for unicast content and may permit the access of broadcast and unicast content simultaneously. Moreover, the user interface may present recommendations for broadcast content and may display broadcast and unicast content simultaneously. In addition, the user interface may include administrative user interface.

In embodiments, the user of the mobile device may be presented with content recommendations and may be presented with targeted ads. In addition the user may be at least one of end users, consumers, advertisers, marketers, content providers, content owners, networks, broadcasters, media companies, mobile carriers, record companies, movie studios, regulators, mobile device designers, mobile device manufacturers, mobile device offerors, mobile service consolidators, affiliates or some other type of user. Further, the content may be available to the user through at least one of a distribution channel, wholesale channel, retail channel, mobile operator, web 2.0 website, web 2.0 business, device manufacturer, content provider retailer or some other type of medium. In embodiments, content may be made available to the mobile device in part depending on at least one of location information and location intelligence based on information inputted via the Internet. Moreover, the content may be a web content, web content transcoded in an on-demand manner. In addition, the content may be streamed, ingested or tagged as broadcast content as part of the ingestion process.

In embodiments, provision of may be for selecting at least one of unicast and broadcast content. In addition, the settlement may be among at least two of content providers, dealers, affiliates, distributors and advertisers.

In embodiments, the media records may be generated for at least one of unicast and broadcast content. The media records may be aggregated or normalized.

In embodiments, the present invention provides a method and system for switching between broadcast and unicast content on a mobile device. The invention characterizes making unicast content available to the mobile device, making broadcast content available to the mobile device, hosting at least one of the unicast and broadcast content on the mobile media platform, and providing an application on the mobile device which allows for switching between the unicast and broadcast content.

In embodiments, unicast content may be multicast content, and may be associated with tags. In addition, the broadcast content may be associated with tags indicating that it is broadcast content and may be delivered to the mobile device as the broadcast content. Moreover, the unicast content, when indicated, may be delivered to the mobile device as unicast content. In addition, the content may be associated with a feed from a content catalog and may be delivered to the mobile device according to information contained in the content catalog feed.

In embodiments, the present invention provides a method and system for optimizing switching between broadcast and unicast content on a mobile device. The method and system may include ingesting content, performing at least one of encoding and transcoding the content, hosting at least one of the unicast and broadcast content on the mobile media platform, delivering unicast content to the mobile device, delivering broadcast content to the mobile device and providing an application on the mobile device which allows for switching between the unicast and broadcast content.

In embodiments, the unicast content may be multicast content. Further, ingestion may be optimized accounting for at least one factor selected from the group consisting of: device profiles, available network bandwidth, device playback capabilities, content delivery mechanisms, content digital rights management regime, content characteristics or some other characteristics.

In embodiments, encoding may be optimized accounting for at least one factor selected from the group consisting of: device profiles, available network bandwidth, device playback capabilities, content delivery mechanisms, content digital rights management regime, content characteristics or some other characteristics.

In embodiments, transcoding may be optimized accounting for at least one factor selected from the group consisting of: device profiles, available network bandwidth, device playback capabilities, content delivery mechanisms, content digital rights management regime, content characteristics or some other characteristics.

In embodiments, hosting may be optimized accounting for at least one factor selected from the group consisting of: device profiles, available network bandwidth, device playback capabilities, content delivery mechanisms, content digital rights management regime, content characteristics or some other characteristics.

In embodiments, delivery may be optimized accounting for at least one factor selected from the group consisting of: device profiles, available network bandwidth, device playback capabilities, content delivery mechanisms, content digital rights management regime, content characteristics or some other characteristics.

In embodiments, the present invention provides a method and system for switching between broadcast and unicast content on a mobile device. The method and system including storing metadata regarding at least one of the broadcast and unicast content in the same file as the content, making unicast content available to the mobile device, making broadcast content available to the mobile device and providing an application on the mobile device which allows for switching between the unicast and broadcast content.

In embodiments, the unicast content may be multicast content. Further, the file may be in a proprietary format. Furthermore, the file may be an archive file. Moreover, the information may include a URL associated with the schedules for such broadcast content.

In embodiments, the metadata may relate to information regarding the content of the file including a description of the content and technical aspects regarding the content. Further, the metadata may be descriptors defined in XML. Furthermore, the metadata for a unicast content file may include information about broadcast content to be associated with the unicast content.

In embodiments, the present invention provides a method and system for switching between broadcast and unicast content on a mobile device. The method and system may include making unicast content available to the mobile device, making broadcast content available to the mobile device, providing an application on the mobile device which allows for switching between the unicast and broadcast content.

In embodiments, the unicast content may be multicast content. Further, the notification engine may be a component of a mobile media platform.

In embodiments, while providing access to broadcast content the notification engine may provide notifications regarding at least one of the broadcast content and associated unicast/multicast content. Further, while providing access to unicast content the notification engine may provide notifications regarding at least one of the unicast/multicast content and associated broadcast content.

In embodiments, a notification may include a link to related content, information regarding charges about to be incurred and/or information regarding charges incurred. Further, the notification may be an advertisement for at least one of goods and services. Furthermore, the notification may be provided as at least one of an email, text message, instant message or some other type of message.

In embodiments, the application may include a user interface and the notification is provided using the user interface.

In embodiments, the present invention provides a method and system of switching between broadcast and unicast content on a mobile device. The method and system may include making unicast content available to the mobile device, making broadcast content available to the mobile device, providing an application on the mobile device which allows for switching between the unicast and broadcast content and providing searching using a search engine.

In embodiments, the unicast content may be a multicast content. Further, the search engine may enable searching of at least one of broadcast and unicast content. The searching may be based on at least one of content, data, metadata, tags and content catalog feed or some other type of data. The search results for associated broadcast and unicast content may be clustered together.

In embodiments, the present invention provides a method and system of switching between broadcast and unicast content on a mobile device. The method and system may include making unicast content available to the mobile device, making broadcast content available to the mobile device, providing an application on the mobile device which allows for switching between the unicast and broadcast content and providing a recommendation using a recommendation engine.

In embodiments, the unicast content may be multicast content.

In embodiments, while providing access to broadcast content the recommendation may be in connection with associated unicast content. Further, while providing access to unicast content the recommendation may be in connection with associated broadcast content.

In embodiments, the recommendation may be based on a consumption profile, a content catalog feed, content ratings or some other parameter.

In embodiments, the present invention provides a method and system of switching between broadcast and unicast content on a mobile device. The method and system may include making unicast content available to the mobile device based on at least one of location information and location intelligence, making broadcast content available to the mobile device based on at least one of location information and location intelligence and providing an application on the mobile device which allows for switching between the unicast and broadcast content.

In embodiments, the unicast content may be a multicast content. Further, the technology for delivery of content may be selected based on at least one of location information location intelligence or some other parameter.

In embodiments, at least one of location information and location intelligence may be used to provide recommendations and/or administer black out rule. Further, at least one of location information and location intelligence may be used in connection with information regarding broadcast content to deliver advertisements. Furthermore, at least one of location information and location intelligence may be used in connection with information regarding unicast content to deliver advertisements.

In embodiments, the present invention provides a method and system of switching between broadcast and unicast content on a mobile device. The method and system including providing an application on the mobile device which allows for switching between the unicast and broadcast content, providing an interactive programming guide containing at least one of unicast and broadcast content, making unicast content available to the mobile device and making broadcast content available to the mobile device. The unicast content may be multicast content.

In embodiments, the present invention provides a method and system of switching between broadcast and unicast content on a mobile device. The method and system may include making unicast content available to the mobile device, making broadcast content available to the mobile, providing an application on the mobile device which allows for switching between the unicast and broadcast content and providing a social networking application in connection with the content. The unicast content may be multicast content.

In embodiments, the social networking application may be a forum. The forum may be provided in connection with broadcast content and enables users to discuss the broadcast content as it is being broadcast. Further, the forum may be provided in connection with broadcast content and enables users to share unicast content related to the broadcast content as it is being broadcast.

In embodiments, the broadcast content may be multicast content. Further, the social networking application may be a forum. The forum may be provided in connection with multicast content and enables users to discuss the multicast content as it is being multicast. Further, the forum may be provided in connection with the multicast content and enables users to share unicast content related to the multicast content as it is being multicast.

In embodiments, the present invention provides a method and system of switching between broadcast and unicast content on a mobile device. The invention involves making unicast content available to the mobile device, making broadcast content available to the mobile, providing an application on the mobile device which allows for switching between the unicast and broadcast content, and providing a social networking application in connection with the content.

In embodiments, the unicast content may be a multicast content. Moreover, the report may be selected from a group consisting of transaction log, event log, royalty report and recommendation report and may be accessed from a web interface.

In embodiments, the present invention provides a method and system of switching between broadcast and unicast content on a mobile device. The invention involves making unicast content available to the mobile device, making broadcast content available to the mobile device, providing an application on the mobile device which allows for switching between the unicast and broadcast content and providing advertising content to the mobile device.

In embodiments, the present invention provides a method and system for switching between broadcast and unicast content on a mobile device. The invention involves making unicast content available to the mobile device, making broadcast content available to the mobile device, providing an application on the mobile device which allows for switching between the unicast and broadcast content, and providing advertising content to the mobile device.

In embodiments, the advertising content may be selected from the group consisting of an interstitial advertisement, banner ad, in stream ad, ad placed in the content itself, ad framing the content, an ad appearing before or after other content or some other type of advertisement. In addition, the advertisement may be interactive and may be provided as part of broadcast content containing a link to unicast content or provided as part of unicast content containing a link to broadcast content. Moreover, the advertising content may be provided based on one of consumption profile, at least one of data about the user and user preferences, at least one of location information and location intelligence. Moreover, the advertisement may be provided by an ad fulfillment engine.

In embodiments, the present invention provides a method and system for switching between broadcast and unicast content on a mobile device. The invention involves making unicast content available to the mobile device, making broadcast content available to the mobile device, providing an application on the mobile device which allows for switching between the unicast and broadcast content, and integrating the provision of the content with other systems.

In embodiments, the other system may be selected from the group consisting of carrier systems, content provider systems, systems of mobile devices, ad servers, Internet-based systems, web-based systems, billing systems, content delivery systems, encoding and transcoding systems, storage systems, social networking systems, hosting systems, ingestion systems, security systems, search engines, mobile search engines or from some other type of system. In addition, the billing system may administer at least one of the collection, pricing, billing, mediation, settlement, reporting or some other type of process. In addition, the access to broadcast content or unicast content may be provided on at least one of a pay per duration and subscription model.

In embodiments, the present invention provides a method and system for encoding content for mobile media distribution, determining an encoding format based on one or more of a consumption profile, a content profile, an ingestion profile, a network profile, a mobile device profile, a delivery profile, and a user profile, encoding content to provide encoded content consistent with the determined encoding format, and providing the encoded content to one or more of a content host, a content cache, a distribution portal, a mobile carrier, and a mobile device.

In embodiments, the encoding content may be performed on-demand. The encoding content may provide pre-encoded content. Further, the encoding content may provide live linear feed content. Furthermore, the encoding content may be automatic. The encoding content may be based on an event. The event may be one or more of content ingestion, content discovery, content delivery request, and availability of an advanced encoding or transcoding facility or some other type of event.

In embodiments, the encoding content may be based on the content. This content may include tags that affect encoding. Further, in embodiments, the method of encoding content for mobile media distribution may be performed as a web service.

In embodiments, the encoding may be based on an encoding profile. The encoding profile may include one or more of device characteristics, network characteristics, operator characteristics, content characteristics, and delivery method. Furthermore, in embodiments, the content is web content.

In embodiments, the present invention provides a mobile media platform comprising an advanced encoding or transcoding facility for encoding mobile content. The encoding or transcoding facility performs on-demand encoding. The encoding is demanded by one or more of a user, mobile device, distribution portal, content manager, ingestion facility, content host, and network carrier or some other type of user.

In embodiments, the present invention provides a mobile media encoding or transcoding facility comprising one or more content input ports for receiving content to be encoded, an encoding engine for providing content that has been received encoded in an alternate encoding format, a distribution port for supplying the encoded content, and a control port for receiving encoding information to control the encoding engine.

In embodiments, the encoding engine may be a distributed encoding engine. The encoding engine may comprise pipelined encoders. The encoding engine may normalize content. Further, the encoding engine may perform transcoding. Furthermore, the encoding engine may perform recoding.

In embodiments, the alternate encoding format may be different from an encoding format of the received content.

In embodiments, the alternate encoding format may be same as an encoding format of the received content. Further, the alternate encoding format may be one of higher resolution and lower resolution than an encoding format of the received content.

In embodiments, the present invention provides a method and system for pre-encoding mobile content, selecting an encoding format, determining a first encoding action to be performed, performing the first encoding action, providing intermediately encoded content, determining a second encoding action to be performed, wherein the second encoding action is associated with the selected encoding format, performing the second encoding action on the intermediately encoded content, resulting in pre-encoded content, and storing the pre-encoded content for access by a mobile media platform.

In embodiments, at least one of the first and second encoding actions may be based on pre-encoded format popularity. The first encoding action may perform on-demand encoding.

In embodiments, the present invention provides a method and system for encoding content from a plurality of sources, receiving creative content for encoding, receiving sponsored content for distributing in line with the creative content, determining an insertion point for inserting the sponsored content into the creative content, and encoding the creative content and the sponsored content so that the creative content and the sponsored content are output as continuously encoded mobile media that can be played with a seamless transition between the creative content and the sponsored content.

In embodiments, the sponsored content may be an advertisement. The sponsored content and the creative content may be predetermined. Further, the creative content may be pre-determined and the sponsor content may be determined while the creative content is being encoded.

In embodiments, the determination of an insertion point may be based on tags associated with the creative content. Further, in embodiments, the determination of an insertion point may be based on an algorithm. The algorithm may determine a threshold of time since a previous insertion point. Furthermore, the algorithm may include information describing an encoding format being used to encode the content.

In embodiments, the present invention provides a method and system for advertisement inserting in mobile media, receiving advertising content to seamlessly insert in line with creative content, determining an insertion point for inserting the advertising content into the creative content, and encoding the creative content and the advertising content so that the creative content and the advertisement are output as continuously encoded mobile media that can be played with a seamless transition between the creative content and the advertisement.

In embodiments, the advertisement may be pre-encoded. The advertising content may be determined while the creative content is being encoded.

In embodiments, the determination of an insertion point may be based on tags associated with the creative content. Further, the determination of an insertion point may be based on an algorithm.

In embodiments, the algorithm may determine a threshold of time since a previous insertion point. Furthermore, in embodiments, the algorithm may include information describing an encoding format being used to encode the content.

In embodiments, the present invention provides an advanced encoding or transcoding facility for mobile media comprising an encoding controller for assessing encoding demand and delegating encoding actions, a plurality of encoding processors for performing the delegated encoding actions, an encoding processor utilization algorithm for determining to which encoding processor to delegate an encoding action, a content receive port for receiving content to be encoded by the plurality of encoding processors, and an encode content destination port for providing encoded content.

In embodiments, the advanced encoding or transcoding facility may be included in a mobile media platform. The mobile media platform further may include an ingestion facility, a content management facility, and an encoded content distribution facility.

In embodiments, the present invention provides a method and system for distributed encoding for mobile media, receiving content to be encoded, determining encoding actions required to encode the received content, delegating the encoding actions to one or more of a plurality of distributed encoding processors, providing the received content to the one or more encoding processors, and encoding, at the delegated encoding processor, the provided content to form encoded mobile media for distribution to mobile devices.

In embodiments, the determination of the encoding actions may be based on a consumption profile. Further, in embodiments, delegation of the encoding actions may comprise delegating a first portion of the encoding actions to a first encoding processor and delegating a second portion of the encoding actions to a second encoding processor, and providing the received content to both the first and the second encoding processors.

In embodiments, the content provided to the second encoding processor may be the output from the first encoding processor.

In embodiments, the present invention provides a method and system for mobile media encoding, providing tagged content, detecting encoding related tags, determining an impact on encoding based on information associated with the encoding related tags, adjusting encoding of the content according to a set of encoding rules to satisfy the impact, and providing content tag determined encoded mobile media for distribution to one or more of a distribution portal and a mobile device.

In embodiments, the tags may be included in the content. The tags may be included in metadata associated with the content. Further, the tags may be metadata data in the content. Furthermore, in embodiments, the tags may be video tags represented in the content.

In embodiments, the method of mobile media encoding may be an automatic method. The automatic execution of the method of mobile media encoding may be based on availability of tagged content.

In embodiments, the encoding related tags may include tags that represent content type.

In embodiments, the present invention provides a method and system for managing playback of content delivered to a mobile device with a pause and resume functionality. The method and system including receiving delivered content on a mobile device, initiating playback of the delivered content, pausing playback of the content being delivered to the mobile device in response to an action and resuming delivery of the content upon a request.

In embodiments, pausing playback may pause delivery of the content. Further, the action may be a user action. The user action may be pressing a key of a mobile device, a voice command or some other user action. Furthermore, the action may be associated with a location based factor. The location based factor may be location relative to a blackout zone, a secure zone, or some other device.

In embodiments, the action may be a network related pause. The network related pause may be due to at least one of network bandwidth limitations, duration of a session, signal quality. Further, the action may be a device related pause. The device related pause may be due to at least one of battery power being low, a unit turning off due to battery power, a loss of signal, a timeout, a dropped connection, a pause timeout exceeding a device determined threshold, or some other reason.

In embodiments, the action may be algorithm based. The algorithm may be based on at least one aspect of the session, the user, the provider, the advertiser, the carrier, the content, a user profile, a carrier preference, a content provider preference, an advertisement placement demand associated with the creative content, or some other basis. Further, the algorithm may determine duration of play time between advertisements. Furthermore, the algorithm may be associated with a content review and analysis functionality. Moreover, the algorithm may identify a change of scene in the content using image analysis methods as an opportunity for pausing the content to present an advertisement.

In embodiments, the action may be a streaming error, automatically detecting an incoming phone call or other intervention, closing a mobile device clamshell, viewing an advertisement, taking a survey, providing demographic information, or some other type of action.

In embodiments, the action may be related to e-commerce. The action related to e-commerce may be paying for content. The paying may be through a payment facility.

In embodiments, pausing may be pausing a video playback from a WAP site or pausing a video in an in-car device via WIMAX and resuming may be resuming on a PC or IPTV at home. Further, pausing may be associated with an aspect of social networking. The aspect of social networking may be at least one of rating content, receiving friends' ratings, visiting a forum associated with the content, receiving a message from a friend, sharing the content with a peer, or some other type of aspect.

In embodiments, the method and system may include configuring the pause and resume functionality with a user configuration facility. Further, the method and system may include requesting an action from the user in order to resume streaming.

In embodiments, the content may be web content. Further, the content may be at least one of streaming content, short form content, long form content, live content, on-line games, video, audio, e-books, multimedia content, paid content, free content, audio, video, text, images, photos, applications, games, data, ring tones, wall paper, fonts, hyperlinks, tables, tabular formatted text, user generated content, media, content primitives, composite content, sponsored content, packaged content, repackaged content, ingested content, repackaged ingested content, stored content, marketing type content, or some other type of content.

In embodiments, resuming delivery may be server assisted and/or device independent. Further, resumption may be from the same source, server stored, pre-encoded, from a different source, or some other type of source. Furthermore, resuming may be at a 'time from start' offset and/or may be available for a limited time from pausing. Moreover, resuming may include a forced pre-roll advertising insertion.

In embodiments, resuming delivery may be from the point at which delivery paused or from a different point than the point at which delivery paused. Further, resuming may be from a point at which streaming was previously stopped.

In embodiments, the functionality may not require client side dependency. Further, pausing delivery may not affect ingestion.

In embodiments, the method and system may include pausing ingestion, buffering the content during a short pause, or archiving the content for an indefinite pause.

In embodiments, the present invention provides a method and system for remotely controlling a streaming media server with a pause and resume functionality. The method and system including transmitting content as RTP data packets to a destination, recording the number of bytes transferred per session, receiving a pause instruction from the destination, calculating the total number of bytes transferred to the destination before receiving the pause instruction and calculating the position at which the content was paused. The destination may be a mobile device.

In embodiments, the client RTSP handler may keep track of intended start time per request, information about the user, and/or bytes transferred per session. Further, the client RTSP request handler may accept RTSP requests from a client, decode the RTSP into a request that a streaming server may understand, and translate the response from the server.

In embodiments, the method and system may include an RTP packet monitor for logging the number of bytes transferred per stream per session and reporting packet history. Further, the method and system may include a server side RTSP IO handler for handling basic input/output operations relating to the streaming server.

In embodiments, the method and system may include a session tracker/monitor for maintaining an in-memory map of the active client connections the RTSP handler is handling. The session tracker/monitor may be associated with at least one of a consumption profile, user profile, and device profile.

In embodiments, the present invention provides another method and system for managing playback of web content delivered to a mobile device with a pause and resume functionality. The method and system including receiving delivered content on a mobile device, initiating playback of the delivered content, pausing playback of the content being delivered to the mobile device in response to an action and resuming delivery of the content upon a request.

In embodiments, the present invention provides another method and system for managing ingestion of content on a mobile device with a pause and resume functionality. The method and system including receiving content for ingestion on a mobile device, initiating playback of the ingested content, pausing playback of the ingested content to the mobile device in response to an action and resuming ingestion of the content upon a request.

In embodiments, the present invention provides a method and system for optimizing ingestion, encoding, transcoding, hosting and delivery of mobile content with a pause and resume functionality. The method and system including receiving delivered content on a mobile device, initiating playback of the delivered content, recording parameters of initiation, pausing playback of the content being delivered to the mobile device in response to an action, recording parameters of the action, resuming delivery of the content upon a request, recording parameters of the resumption and optimizing ingestion, encoding, transcoding, hosting and delivery of mobile content with at least the aggregate of all of the recorded parameters.

In embodiments, the present invention provides yet another method and system for managing playback of content delivered to a mobile device with a pause and resume functionality of a mobile device user interface. The method and system including receiving delivered content on a mobile device, initiating playback of the delivered content, pausing playback of the content being delivered to the mobile device in response to an action and resuming delivery of the content upon a request.

In embodiments, the present invention provides a method and system for managing notifications, messages, or alerts received during playback of content delivered to a mobile device with a pause and resume functionality. The method and system including receiving delivered content on a mobile device, initiating playback of the delivered content, receiving a notification, message, or alert during playback, pausing playback of the content being delivered to the mobile device in response to an action and resuming delivery of the content upon a request.

In embodiments, the present invention provides a method and system for managing playback of content delivered to a mobile device with a pause and resume functionality. The method and system including receiving delivered content on a mobile device, initiating playback of the delivered content, pausing playback of the content being delivered to the mobile device in response to an action and resuming delivery of the content upon a request. The action may be associated with content discovery.

In embodiments, the present invention provides a method and system for managing playback of content delivered to a mobile device with a pause and resume functionality. The method and system including receiving delivered content on a mobile device, initiating playback of the delivered content, pausing playback of the content being delivered to the mobile device in response to an action, and resuming delivery of the content upon a request. The action may be associated with navigation of a personal entertainment server.

In embodiments, the present invention provides a method and system for managing playback of content delivered to a mobile device with a pause and resume functionality. The method and system including receiving delivered content on a mobile device, initiating playback of the delivered content, pausing playback of the content being delivered to the mobile device in response to an action, and resuming delivery of the content upon a request. The action may be associated with navigation of an interactive programming guide.

In embodiments, the present invention provides a method and system for reporting on playback of content delivered to a mobile device. The method and system including receiving delivered content on a mobile device, initiating playback of the delivered content, pausing playback of the content being delivered to the mobile device in response to an action, resuming delivery of the content upon a request and reporting on an aspect of at least one of initiation, pausing, and resuming.

In embodiments, the present invention provides a method and system for associating advertising with content delivered to a mobile device. The method and system including receiving delivered content on a mobile device, initiating playback of the delivered content, pausing playback of the content being delivered to the mobile device in response to an action and resuming delivery of the content upon completion of playback of the advertisement. The action may be delivery of an advertisement.

In embodiments, the present invention provides another method and system for managing mobile game play on a mobile device with a pause and resume functionality. The method and system including initiating mobile game play on a mobile device, pausing mobile game play in response to an action and resuming mobile game play upon a request.

In embodiments, the present invention provides a method for mobile media event mediation, normalizing mobile media event information from a plurality of sources, wherein at least some of the information is represented differently in each of the plurality of sources, producing a mobile media data record from the normalized information, analyzing the mobile media data record to determine a settlement arrangement, providing at least some of the participants represented in the mobile media record with relevant information from the settlement agreement.

In embodiments, the plurality of sources may include two or more of streaming server logs, distribution logs, advertisers, application logs, creative content providers, pause and resume activity, user payment plans or some other type of sources.

In embodiments, the mobile media data record may include one or more of content information, encoding information, content sourcing, playback duration, mobile playback device information, consumption record, user information, source affiliate information, distribution portal information, content request method, playback start time or some other type of data record.

In embodiments, the mobile media record may be associated with one or more of media data events, transactions, interactions, user activity, automated content selection, and content serving.

In embodiments, the present invention provides a method for monetizing creative content, determining transactional information that characterizes a mobile media event of the creative content, assigning a value to aspects of the transactional information, determining a total value of the mobile media event, settling accounts associated with the transactional information aspects based on the total value of the mobile media event and the assigned value of each aspect, wherein some accounts are debited and other accounts are credited.

In embodiments, an aspect of the transactional information may be one of the creative content owner, the mobile carrier, one or more advertisers who served advertisements associated with the mobile media event, and an operator of a mobile media platform.

In embodiments, the present invention provides a method for monetizing mobile media, providing a mobile media data record for a mobile media event, determining which portion of content associated with the mobile media event was streamed to a user mobile device, determining what advertisements were streamed, assigning a revenue value for the mobile media event based on an amount charged for the streamed advertisements, determining a share of revenue value for each participant of the mobile media event based on the determined content portion streamed and the determined advertisements streamed, and distributing a portion of the revenue to each participant based on each participant's determined share of revenue.

In embodiments, the mobile media event may be a result of a user request for mobile content. Furthermore, in embodiments, it may be determined that which portion of content was streamed is based on pause and resume records associated with the mobile media event. The pause and resume records may indicate a last content packet streamed prior to pausing.

In embodiments, the present invention provides mobile media mediation and settlement facility comprising a mobile content transaction information capture facility for capturing information from a plurality of mobile media event participants, a normalization facility for normalizing the captured information and producing a media data record, a media data record analysis facility for determining a settlement amount for each participant, and a settlement facility for adjusting financial accounts for each of the mobile media participants based on the determined settlement amount.

In embodiments, determining a settlement amount may be based on a plurality of revenue sharing agreements among the media event participants.

In embodiments, the mobile media mediation and settlement facility may be embodied in a mobile media platform.

In embodiments, one of the participants may be an operator of the mediation and settlement facility. The operator may charge a fee for one or more of information capture, normalization, media data record analysis, and adjusting financial accounts.

In embodiments, the settlement facility may be a third party payment processor. Furthermore, in embodiments, the settlement facility may be a financial institution.

In embodiments, the present invention provides a method for managing costs of participating in a mobile media event, analyzing a media data record to determine costs for each participant of a mobile media event that is captured in the media record, analyzing the media data record to determine revenue attributable to each participant in the media record, and adjusting a business process associated with participating in mobile media events based on a comparison of the determined cost with the determined revenue.

In embodiments, an alert may be issued based on the comparison.

In embodiments, the business process may be a workflow associated with a mobile media platform. The workflow may represent one or more of content discovery, ingestion, encoding/transcoding, hosting, distribution, and mediation and settlement.

In embodiments, each participant of a mobile media event may be selected from a list consisting of end users, consumers, advertisers, marketers, content providers, content owners, network operators, distribution affiliates, media companies, mobile carriers, regulators, mobile device designers, mobile device suppliers, content creators, and mobile media affiliates.

In embodiments, the present invention provides a method for determining a share of advertisement revenue for an advertisement served directly to a mobile device, providing content to a mobile device that includes an advertisement insertion tag, sourcing an advertisement from an advertisement server upon detection of the advertisement insertion tag, transmitting a signal from the mobile device to a mediation facility of the mobile media platform that includes information about the served advertisement, and associating the information about the served advertisement with a mobile media data record that is used to capture transaction information about providing the tagged content so that advertisement revenue may be shared.

Content may be processed on a mobile media platform by ingesting content, applying tags to the content and processing the content based on the tags. The content may contain tags before tags are applied to the content. The tags may be included in the same file as the content. The file may be an archive file. The file may have a proprietary structure. The tags may be metadata included in same file as the content. The tags may be viewed through a user interface. The tags may be managed through a user interface. The tags may be modified though a user interface. The tags may affect the look and feel of a user interface. The tags may facilitate personalization of user experience. The tags may relate to digital rights management. The tags may enable administrative aspects of the mobile media platform. The tags may contain information that is actionable by the architecture of the platform. The tags may contain information that is related to the architecture of the mobile media platform. The tags may contain information that may be processed by store fronts. The tags may contain information related to at least one channel. The tags may be created by a user of the platform. The tags may be utilized by a user of the platform. The tags may be associated with various business models of the mobile media platform A method of processing tags for mobile media delivery, may comprise evaluating content tags to determine requirements of preparing content for delivery; configuring a mobile media platform to prepare the content based on the determination; preparing the content for delivery using the configured mobile media platform; and delivering the prepared content so that delivery related requirements that are determined from the content tags are satisfied. A method of populating tags associated with content being distributed over a mobile media platform may comprise determining presence of content tags in content being prepared for distribution and if none is detected, selecting a content tag to be added to the content prior to distribution; and updating the detected or selected content tag with information related to the preparation of the content, wherein the selected content facilitates one or more of hosting, distribution, playback, and redistribution.

A method of tagging mobile content may comprise providing a mobile media platform associated with at least one of collection, encoding, storage, and distribution of the mobile content to users of mobile communications facilities, wherein the content is tagged by the mobile media platform prior to distribution. A method of tagging mobile content may comprise providing a mobile media platform for distribution of mobile content to mobile device users; selecting an advertisement to be delivered in association with the content; and tagging one or more of the mobile content and the advertisement.

A method of tagging mobile content may comprise providing a mobile media platform for tagging mobile content; assigning tags that represent attributes of the content; and distributing the content based on an attributed represented by the tags. A method of processing tagged mobile web content may comprise providing a mobile media platform for processing web content; processing the web content wherein tags that are present in the content are interpreted by the mobile media platform for the purposes of adjusting the processing of the web content; and distributing the processed web content. A method of tagging mobile content may comprise providing a mobile media platform associated with at least one of collection, encoding, storage, and distribution of the mobile content to users of mobile communications facilities, wherein the content is tagged during ingestion by the mobile media platform prior to distribution.

A method of tagging mobile content may comprise providing a mobile media platform wherein content is tagged by the mobile media platform prior to hosting; and providing hosting services associated with the mobile media platform based on information in the tag. A method of tagging mobile content may comprise providing a mobile media platform for delivering encoded mobile content, wherein the content is tagged by the mobile media platform prior to distribution; and distribution is based on information contained in the tag. A method of tagging mobile content may comprise tagging content with content processing information; examining the tags to determine status of content processing; and optimizing one or more of a plurality of mobile media platform processes based on the processing status.

A method of automated content tagging on a mobile media platform may comprise ingesting content; applying tags to the content; performing searches based on the tags. A method of automated content tagging on a mobile media platform may comprise ingesting content; applying tags to the content; providing recommendations based on the tags. A method, may comprise providing a facility for tagging content; providing a facility for processing tagged content; and processing content in a social networking environment based on at least one tag. A method of targeting advertising content on a mobile media platform may comprise providing tagged content; providing an ad fulfillment engine which targets advertising content based on at least one tag.

A system of processing content on a mobile media platform may include an ingestion facility; a tagging facility; and a tag processing facility. A system of tagging mobile content may comprise a mobile media platform for distribution of mobile content to mobile device users; an ad fulfillment facility for selecting an advertisement to be delivered in association with the content; and a tagging facility for tagging one or more of the mobile content and the advertisement. A system of processing tagged mobile web content may comprise a mobile media platform for processing web content; a facility for processing the web content wherein tags that are present in the content are interpreted by the mobile media platform for the purposes of adjusting the processing of the web content; and a facility for distributing the processed web content.

A system of tagging mobile content may comprise a mobile media platform for delivering encoded mobile content, wherein the content is tagged by the mobile media platform prior to distribution; and a distribution facility for distributing content based on information contained in the tag. A system of automated content tagging on a mobile media platform may comprise an ingestion facility; a tagging facility; and a search engine. A system of automated content tagging on a mobile media platform may comprise an ingestion facility; a tagging facility; and a recommendation engine. A system of targeting advertising content on a mobile media platform, may comprise providing tagged content; providing an ad fulfillment engine which targets advertising content based on at least one tag.

The present invention provides methods and systems for enabling content streaming on mobile devices. In embodiments, methods and systems may be provided for enabling content streaming on a mobile device, comprising encoding a content stream; providing the encoded content stream to a splitter embodied in computer executable code, which splits the encoded content stream into at least two channels, with each channel having data of a characteristic chunk size; downloading at least one data chunk into a playback queue, wherein a download algorithm determines the at least one chunk to be downloaded; and providing the at least one downloaded chunk to a media player. In embodiments, the determination by the download algorithm may be based on at least an upper threshold, a lower threshold and a current queue size of the playback queue. In embodiments, the chunk sizes in the at least two channels may be whole number multiples of each other. In embodiments, the characteristic chunk size for each channel may be based on a time interval of the content. In embodiments, the characteristic chunk size for each channel may be based on file size. In embodiments, the mobile device may be a smart phone. In embodiments, the content stream may contain at least one of audio, video and data content. In embodiments, the content stream may contain metadata providing additional information regarding the content. In embodiments, the content stream may contain a live radio stream.

In embodiments, method and systems may be provided for enabling content streaming on a mobile device, comprising accepting a stream of data, wherein the data is encoded for a mobile network; spitting out a series of chunks of data sliced at particular time intervals; and controlling the frequency of downloading of the chunks of data into a playback queue based on thresholds. In embodiments, the frequency of downloading of the chunks of data may be based on based on at least an upper threshold, a lower threshold and a current queue size of the playback queue. In embodiments, the sizes of the chunks may be whole number multiples of each other. In embodiments, the data stream may contain at least one of audio and video content.

In embodiments, methods and systems may be provided for enabling content streaming on a mobile device, comprising an encoder that encodes a content stream to form an encoded content stream; a splitter embodied in computer executable code, which splits the encoded content stream into at least two channels, with each channel having data of a characteristic chunk size; a download algorithm that downloads at least one data chunk into a playback queue; and a media player to which at least one downloaded chunk from the playback queue is provided. In embodiments, the download algorithm may download based on at least an upper threshold, lower threshold and a current queue size of the playback queue. In embodiments, the chunk sizes in the at least two channels may be whole number multiples of each other. In embodiments, the characteristic chunk size for each channel may be based on a time interval of the content. In embodiments, the characteristic chunk size for each channel may be based on file size. In embodiments, the content stream may contain at least one of audio, video and data content. In embodiments, each data chunk may be encrypted.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 9 shows the root and leaf license structure, according to an embodiment of the invention.

FIG. 10 shows a partially encrypted video program, according to an embodiment of the invention.

FIG. 45 depicts an aspect of an administrator user interface.
FIG. 48 depicts an aspect of an administrator user interface.
FIG. 49 depicts an aspect of an administrator user interface.
FIG. 52 depicts an aspect of an administrator user interface.
FIG. 53 depicts an aspect of an administrator user interface.
FIG. 55 depicts an aspect of an administrator user interface.
FIG. 56 depicts an aspect of an administrator user interface.
FIG. 57 depicts an aspect of an administrator user interface.
FIG. 58 depicts an aspect of an administrator user interface.
FIG. 60 depicts an aspect of an administrator user interface.
FIG. 61 depicts an aspect of an administrator user interface.
FIG. 64 depicts an aspect of an administrator user interface.

DETAILED DESCRIPTION

The invention may incorporate a multi-tenant platform which may support multiple content providers, mobile operators and the like within a single hosted environment. The platform may integrate or include integration with multiple billing systems, such as mobile operator billing systems, third party payment processors and the like.

The applications and services of the platform may be hosted in a client server infrastructure which may meet or exceed the standards that all media companies expect for protection of their assets. The platform may deliver various mixtures of entertainment information, video, audio, images, photos, and personalizable, community oriented, social networking content. The platform may include digital rights management (DRM) for mobile delivery.

The platform may facilitate a short time to market for media companies and/or other content providers, enabling them to capitalize on their inventories of content assets as well as fostering new content assets that are specifically created for the mobile environment. The platform may facilitate management of content, storefront and video platform offerings as well as creation of next generation multi-platform services. The platform may operate in a shared risk, shared reward business model. The platform may enable mobile content, commerce and culture. The evolution of mobile services may mirror that of the Internet. A similar pattern is happening with mobile Internet services, but in a much more compressed time frame. The platform may facilitate and assist media companies, carriers and others navigate the mobile internet's transition from content to commerce, and ultimately to culture.

Figure 1:
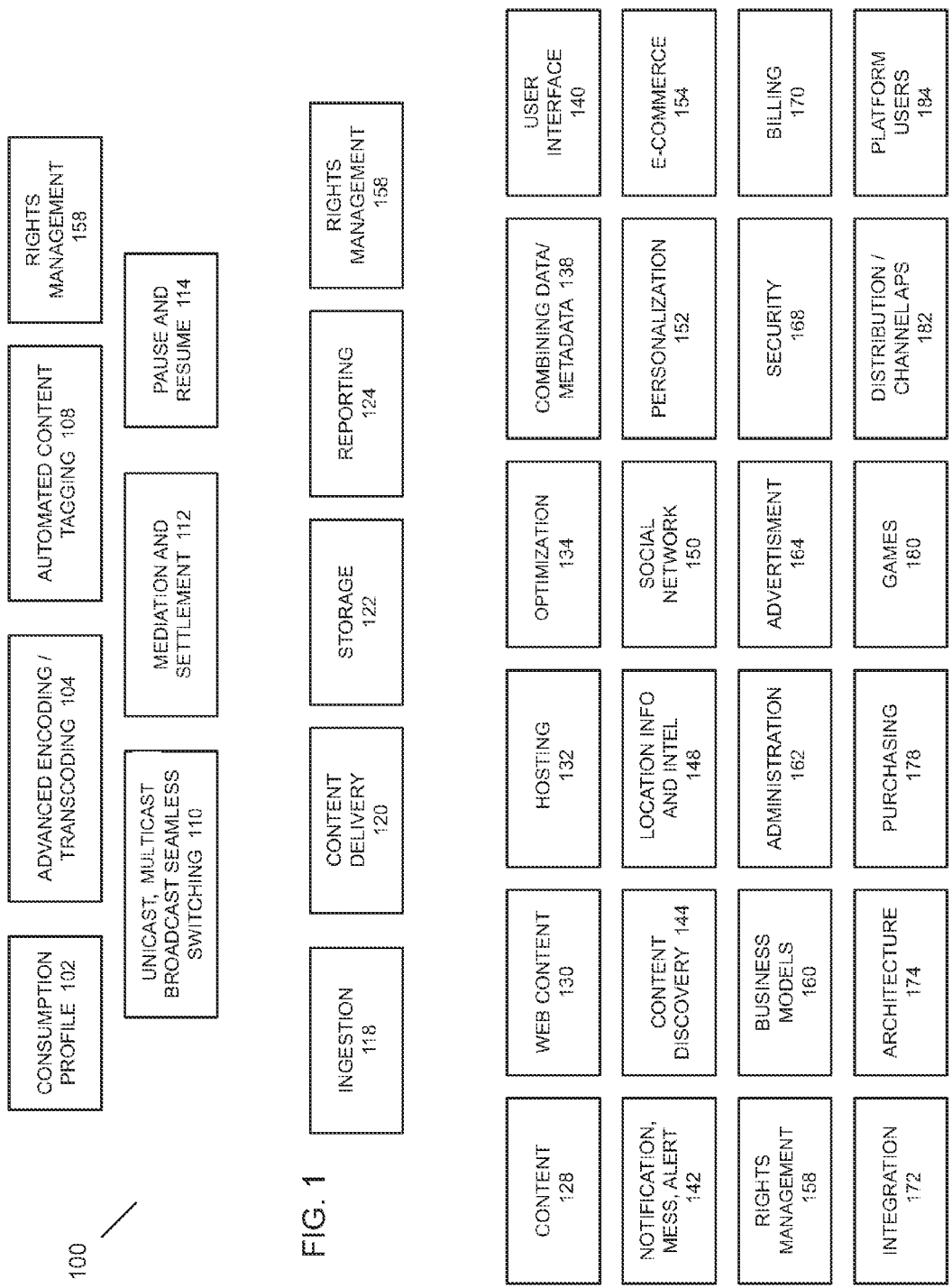
FIG. 1 depicts components that cooperate in a mobile media platform.

Referring to FIG. 1, the mobile media platform 100 may include a plurality of segments, functions, and components. Segments may provide an overarching coverage of inventive concepts, and include consumption profiles 102, advanced encoding and transcoding 104, automated content tagging 108, unicast-multicast-broadcast seamless switching 110, mediation and settlement 112, pause and resume 114, rights management 158, including digital rights management, and the like. Functions may represent some of the major functional groups within the mobile media platform 100, and include ingestion 118, content delivery 120, storage 122, reporting 124, rights management 158, including digital rights management, and the like, where advanced encoding and transcoding 104 also may represent a major functional group within the mobile media platform 100. Components may represent some of the plurality of other functions and services available within the mobile media platform 100, and include content 128, web content 130, hosting 132, optimization 134, combining data and metadata into a single file 138, a user interface 140, notification-message-alert 142, content discovery 144, location information and location intelligence 148, social networking 150, personalization 152, e-commerce 154, rights management 158, including digital rights management, business models 160, administration 162, advertisement 164, security 168, billing 170, integration 172, architecture 174, purchasing 178, games 180, distribution and channel applications 182, platform users 184, and the like.

In an embodiment, there is provided a Mobile Set Top Box (MSTB). In embodiments, throughout the application, a mobile set top box may be a virtual set top box (VSTB). This is similar in function to the familiar cable television set top box that decodes content for viewing. In cable television the program content is encrypted to provide security and to prevent non-subscribers from accessing and viewing programs without a subscription. The set top box was programmed with a unique key that identified the set top box as being identified with a particular subscriber. The set top box used the identifier to decode the selected media content and to track billing information for programs such as pay-per-view and specialty subscriptions. This works well when the user views content on few devices that are largely stationary. As media viewing has increased, the trend has been to move away from physical, hard copies of a program to view or hear, such as a disc or videotape. In addition, many users want to access content while away from their home, such as while traveling or on vacation. Digital rights allow users to download or view program content without a physical copy or a particular location and provide a mechanism to ensure content owners receive royalties, just as would occur if a hard copy were purchased or rented. The MSTB is a subscription-based, direct-to-consumer, premium content download service for mobile devices. The present invention provides a Digital Rights Management ("DRM") solution for the MSTB service. The MSTB service is a hosted client-server solution that utilizes a media management system and a proprietary client written for multiple mobile platforms including Research In Motion (RIM) Blackberry devices, Apple's iPhone, iTouch and iPad devices, GOOGLE Android devices, NOKIA devices, and BREW devices.

The MSTB solution uses software to store prime time television shows and to deliver it to the mobile client. The service is hosted on network facilities, uses a redundant architecture to provide 99.9% uptime and is monitored around the clock by dedicated staff and automated system monitoring tools.

The application is specifically designed for use with mobile phones where "root" access is available, such as devices running GOOGLE's Android platform and the APPLE iPhone. The present invention provides enhanced encryption with tunable performance, key protection, challenge-response client authentication, support for "rootable" devices, and anti-spoofing credentials protection. The present invention may be used on such mobile devices as the Research In Motion Blackberry family, Bold, Javelin, and Storm 2, as well as the iPhone 2G, 3G, and 3Gs, and iTouch 2G and 3G, and other similar devices such as phones operating GOOGLE's Android platform, the NOKIA N97, as well as devices using BREW 3.1.5, BREW MP or similar platforms.

Figure 2:
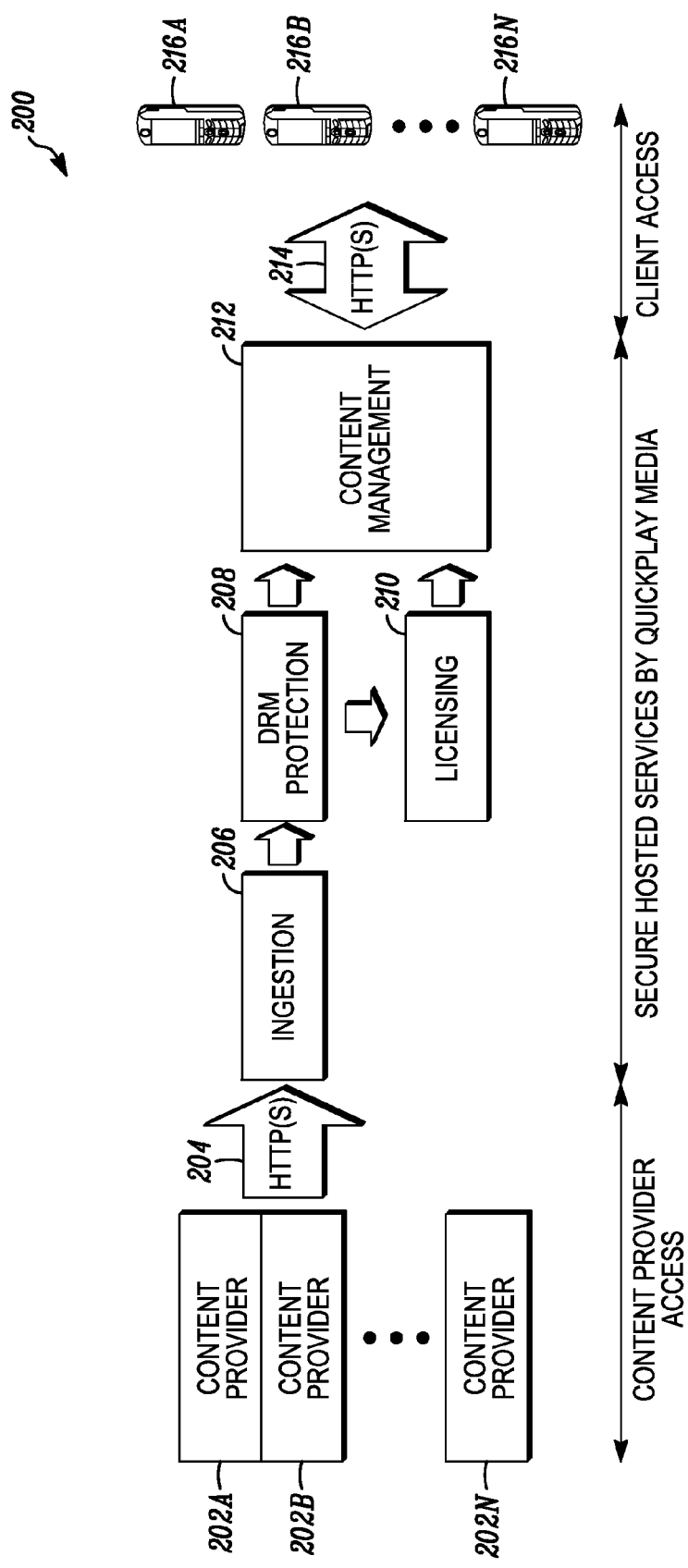
FIG. 2 illustrates the architecture of the system running the application, in accordance with an embodiment of the present invention.

FIG. 2 illustrates the system architecture, 200, which the application of the present invention utilizes to provide secure digital rights management. Content must be protected at every step in the process: at collection from a content provider 202A through 202N, access and transport to an end user. While stored on the server or Content Delivery Network (CDN), programming content and its keys must be protected not only from the outside world, but from inside threats as well. On delivery to an end user, the content must be secured and access to the delivery service strictly authenticated and authorized. Finally, once on the mobile device, the application and keys must be protected, and consumption rules enforced. The application is particularly vulnerable once it is released to the market, so extra defenses must be applied to protect the client and the proprietary mechanisms it uses to enable DRM.

Application demarcation begins at the interface to the Content Providers 202A through 202N. Content providers are entities that create video or other programming content and include television studios and networks, movie studios, podcast creators and others. Content providers are responsible for securing their own services. Content is made available by the provider through an enhanced Really Simply Syndication (RSS) RSS 2.0 feed hosted on a hyper text transfer protocol (HTTP) server, 204, or by secure file transfer protocol (FTP). Content providers may also opt to push content to the application instead.

For hypertext transfer protocol using secure sockets layer (HTTPS) delivery, a MSTB process authenticates against the RSS content server and downloads the feed, or desired program content, and its contents over a secure transport mechanism. In the case of secure file transfer protocol (SFTP), the process authenticates against the SFTP daemon and downloads both metadata and media. In the case of push delivery, the process need only collect the file locally from its own SFTP server repository.

Once obtained, the content is transformed, or ingested 206, encapsulated, encrypted, and stored. The encryption keys are stored in a secure database and content is consigned to a CDN. Content metadata is published to the content management system and made available for perusal by the MSTB mobile application on the user's mobile device. The digital rights management (DRM) protection 208 is subject to licensing limits on distribution 210. Digital rights are separate from media content and both digital rights and content are required to view media content. Content may be downloaded but may not be played if the corresponding digital rights are not present or complied with. Content viewing may be limited by country, location, or time zone. Unless the conditions specified in the digital rights are met, media content cannot be viewed. Therefore, it is necessary to check and validate digital rights along with content delivery. The present invention provides multiple embodiments for accomplishing these tasks.

The MSTB mobile application provides content management 212 that authenticates against the server, browses the content catalog, subscribes (indirectly through payment applications such as PAYPAL), browses TV shows, retrieves media content and corresponding rights objects (a wrapper for encryption keys that also contains rights management data), and plays content. The selected content is then delivered over a HTTP(S) protocol to the end users devices, 216A-N.

The application and the content server work in conjunction to manage the user's rights to retrieve and view content. Content access may be restricted by, location or time, and blackout periods may be enforced. In addition the application and server enforce subscription conditions and remove content from the server when the content expires.

Digital Rights Management, DRM, effectively begins the moment content is acquired from the Content Provider. Content is acquired and transported using standards-based authentication, authorization, and transport technologies to ensure secure delivery.

Figure 3:
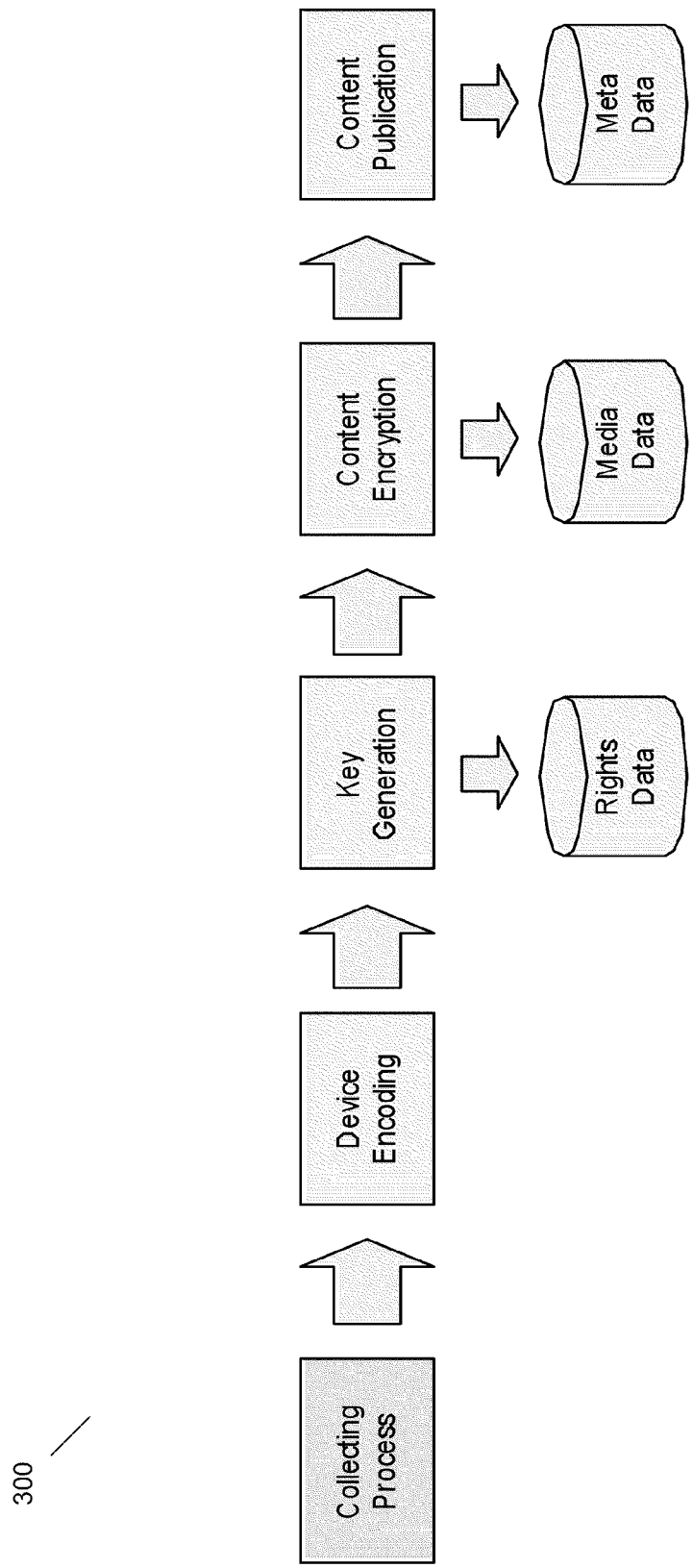
FIG. 3 depicts the stages in the delivery from the content provider, in accordance with an embodiment of the present invention

FIG. 3 gives an overview of the steps involved in the content acquisition process. The content acquisition process beings with device encoding. This is followed by key generation. Key generation generates part of the information known as rights data. Once the key is generated, the content is encrypted, and produces media data. The resulting content is published and the meta data is included in the content publication as a means of tracking and tagging. Digital rights are separate from the media content and are protected separately using a variety of methods discussed further below.

Access to the RSS feed is restricted by an established HTTP server or container-managed security mechanism such that only valid credentials will grant access to the RSS XML feed and its associated content data. The container-managed security mechanism operates in much the same fashion as does a cable television set top box, only in the mobile device arena. The credentials must be known only to the application provider and the content provider, and not shared between the application provider and other distributors of the same content.

SFTP, HTTPS, SCP, or other encrypted transport mechanisms are employed to transfer meta and media data, and the collection process will not begin to collect content unless authentication and transport layer security is enabled. Special care to protect the passwords that grant access to the content provider's demarcation point is essential to the overall protection of the DRM system. Without secure protection at the content provider's demarcation point, content providers will refuse to grant access to their content, rendering the service provided to mobile users with fewer program choices, and likely, less use by mobile subscribers.

Once both meta data and media data have been collected, the ingestion system encodes each media file for each target device, then encrypts the file and encapsulates it in a media object file. Encapsulation permits identification of the media object for use by decryption and rights management systems. Specific encoding is needed for each target device, since the operating platforms used by the mobile devices vary and provide differing levels of access to security features and root operating system parameters.

The interface to acquire content and the accompanying metadata requires an HTTP server or application server authentication and performs data transfer using HTTPS for all interactions, or SFTP. The authentication credentials that authorize access to MSTB content are distinct from those required by other distributors to access the same content.

Depending on which transfer mechanism is used authentication and transport may vary. For example, if using RSS, the RSS XML requires password authentication, and transport over HTTPS. If using FTP, a unique application account is required and the transport must be secured (SFTP). If using other push technology, credentials are always required, and transports must be secured with SSH or equivalent. The collection process fails unless the content provider employs adequate authentication and authorization.

All content is transported using secure transport, and may be HTTPS, SFTP, or other secure transport protocol.

Content is delivered in formats ranging from 176×144, 2 fps, 30 kbps, up to 640×480, 30 fps, 600 kbps, but may be higher depending on device capabilities, network bandwidth, and permissible loss in the event security is breached. This DRM solution imposes no upper restrictions on media.

The media obtained from content providers in its raw, higher resolution form is usually of higher bandwidth and quality and therefore more valuable than the downstream target-specific encodings produced. The files obtained during this process are protected from redistribution by appropriate authentication and authorization mechanisms such as UNIX or WINDOWS credentials and network access (e.g. NFS) file system permission.

The server and client both employ a virtual machine that performs encryption, decryption, and scrambling. The virtual machine is a device resident machine and is used on both the application server and the mobile device application. The virtual machine is initialized with a seeding operation that renders each instance of the machine unique, much like a pseudorandom number generator. This unique initialization is leveraged to inject an element of non-determinism into the encryption mechanism for each media object encrypted. The virtual machine operates on the entire length of the encryption operation to effectively distribute the encryption key over the whole file. The virtual machine may also be used to provide challenge-response authentication, to encrypt rights objects, to uniquely tie digital rights to a particular device, to provide an encrypted store for operating systems that cannot provide one of their own, to scan the system. o validate binary or memory integrity, to monitor the system to determine if a debugging attack is in progress, provide secure storage application program interface (API) for developers that do not wish to develop their own, to encrypt and decrypt data, to encrypt and decrypt rights objects, to obfuscate the content of rights objects, and to validate the subscription of users.

The virtual machine also generates new and unique encryption routines for each media object encrypted by generating a script of preselected and random operations. New instructions can be added without affecting old instructions. This permits renewable security in the event that the old instructions are compromised.

In traditional cable television viewing access is controlled using a set top box. This set top box, as noted above, controls subscription use and media content delivery. In a similar fashion, the virtual machine will encode instructions that enable various operations including AES encryption, one-way modular arithmetic scrambling, and a variety of light to heavyweight operations meant as decoys, to allow mobile users to access content.

The instruction set employs an obfuscation technique that masks opcodes so the codes cannot easily be learned from repetitive key analysis. A pseudorandom number generator with a non-predictable sequence, but a predictable length is used to generate a mapping between obfucsated opcodes and real opcodes encoded by the virtual machine. The encoding process for a given seed generates an obfuscated set of opcodes that appear random in nature. When applied in reverse at the application, the seed regenerates the actual opcodes just before use.

The virtual machine provides several security advantages: it adds an additional layer of complexity to the overall security operation and, it allows for the dynamic generation of encryption schemes that make an attack on one media less likely to yield results for a different video. The virtual machine can be changed during an application upgrade to render previous videos compatibly, while encrypting new videos with a different instruction set, thereby returning a would-be attacker's progress back to the beginning Finally, the virtual machine encryption routines, when combined with other client protection mechanisms, offer a recovery point for downstream corruption in the event the client is tampered with at runtime, or reverse-engineered.

The virtual machine encodes instructions that enable various operations including AES encryption, one-way modular arithmetic scrambling instructions, matrix operation instructions such as multiplication, addition, subtraction, zero, identity, rotate, flip, shift, etc.

Instructions that provide light to heavyweight operations meant as decoys.

Instructions to measure the progression of other operations such that they can be compared to a baseline to determine if an application is being debugged or attacked.

Binary integrity instructions operate by mathematically summing the binary data between function entry point and their end (similar to adding the numeric values of all the letters in this sentence to derive a unique sum such that if any letter changes, it produces a detectable change in the sum) and comparing to known good values. The checksum may be sime (XOR-ing all the bytes, which is more performant but less accurate) to complex (cryptographic checksum such as MD5 or SHA1, which is less performant but more accurate.

In addition, the virtual machine generates a new and unique encryption routine for each media object encrypted by generating a script of random operations comprising various pre-selected and random combinations of encoded instructions.

The application may also make use of a quasi-hardware mobile unique device identifier (hereinafter, UUID) to improve security. The UUID is generated by taking aspects of the device hardware as determined by instructions of the virtual machine instructions and hashing the values. This results in a unique and constant-format identifier, regardless of how many operations were performed to derive the quasi-hardware value or on which platform they execute. This identifier may be made as specific as needed by varying the information taken from the device and used in the hash. If the characteristics of a mobile device have proven to be easy to duplicate and spoof one device using another, then more device specific identifying characteristics may be chosen to subvert such efforts.

The UUID may also be used as a basis for the generation of an encryption algorithm, such that only the mobile device itself can decrypt because it knows its own UUID. These identifiers are built on the fly to prevent static identifiers from being easily overwritten. Signatures of the binary, file system attributes, and others, are also calculated on the fly.

Memory checksums performs in the same manner as described above, but the start and offsets are not delineated by definite markers such as function locations, but rather by arbitrary selections of starting (inclusive) and ending (exclusive) memory locations or starting location and length.

Device identification instructions that determine a variety of device dependent identifiers such as CPU types, alias, stepping, check, clock speed, batch, and mask identifiers.

Device identification instructions that obtain ROM details such as version or variant.

Device identification instructions that determine the operating system version.

Device identification instructions to obtain file i-nodes (such as from a file allocation table, kernel binary, or boot code binary.)

Device identification instructions to determine installed codecs.

Device identification instructions to determine installed hardware such as cellular radio, or IrDA, or USB host and USB client, or Wi-Fi Ethernet or BLUETOOTH) or any combination thereof.

Instructions that determine user credentials and/or passwords and/or pins.

Instructions that sweep the file system and derive a unique fingerprint from various random or strategic file selections using their file name, size, creation date, update date, or checksums.

Instructions to perform file introspection and validation such as file name, size, creation date, update date, or checksums.

Instructions to obtain and compare device clock time.

Instructions to obtain network state such as enabled, number of connections, speed, etc.

Instructions to obtain session identifiers and other session specific variables.

Instructions to determine content dates.

Instructions to determine subscription state.

Instructions to determine media state and position.

Instructions to obtain and compare content meta-data fields.

Figure 4:
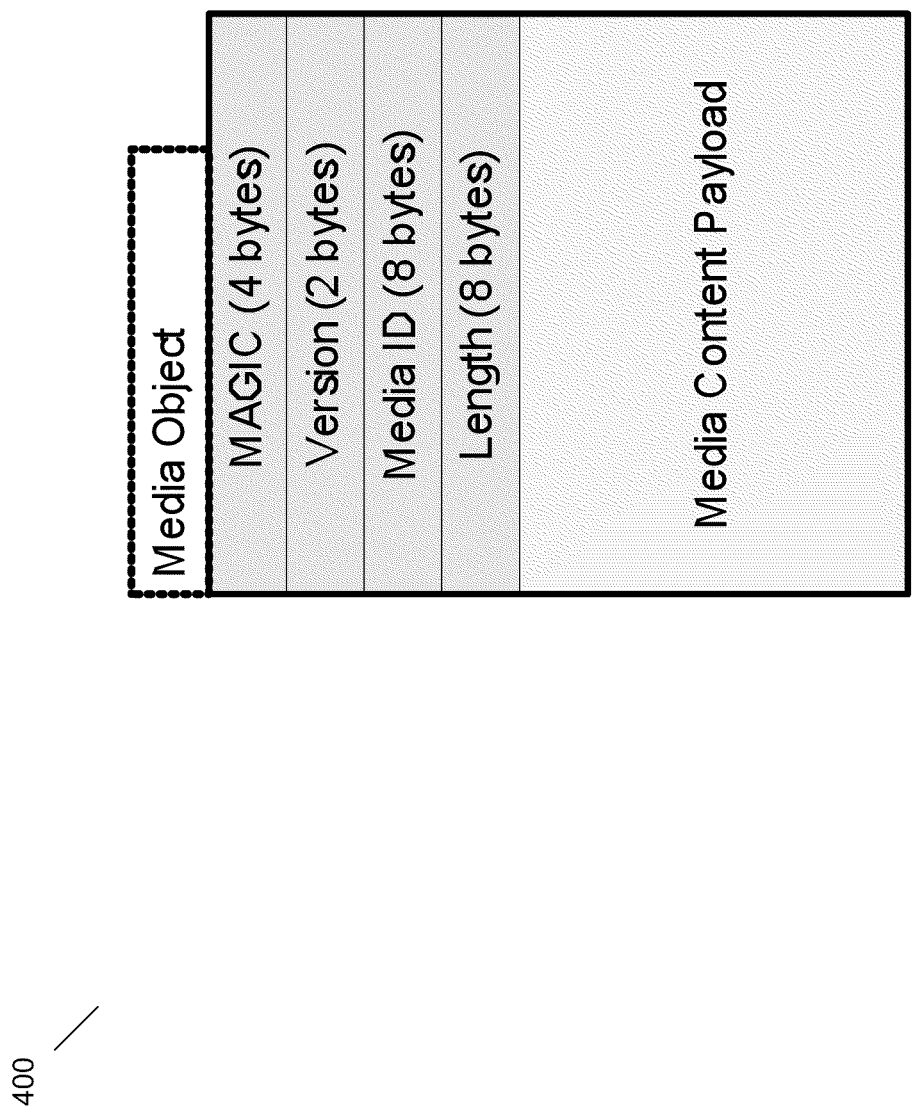
FIG. 4 depicts the structure of an application media object file, according to an embodiment of the present invention.

After content has been transcoded for each target device, it must be encrypted and encapsulated in an application media object container, or .qmo fie. FIG. 4 depicts how the media object file is structured. The application may also include instructions that can glean information from the runtime applications, such as function pointer offsets and lengths/checksums, memory checksums, device identification retrieval, file validation instructions, and other logical or permutative instructions to add complexity to the instructions set and the encryption operation.

In one embodiment of an application media object format, shown below in

Table 1, identifies the file as an application media object container using a magic number. The length of the payload, identifies the version of the application digital rights management, as well as the content object identifier. The application media object format also reserves two bytes for future use. The contents of the application media object file is an encrypted media file which can be any kind of file such as video, audio, ringtone, wallpaper, etc.

TABLE 1

Application Media Object Format

| Field Name | Size (bytes) | Description and {value} |
|---|---|---|
| Magic | 4 bytes | The constant {0xB1, 0x9B 0x00, 0xB5} which identifies this file as a QuickPlay Media Object file. |
| Version | 2 bytes | For DRM 2.0, this value is {major = 0x02, minor = 0x00}. |
| Media ID | 8 bytes | A 64-bit value corresponding to the OpenVideo ™ CONTENT_META→META_ID value. |
| Length | 8 bytes | A 64-bit value corresponding to the length of the media content payload. |

Figure 5:
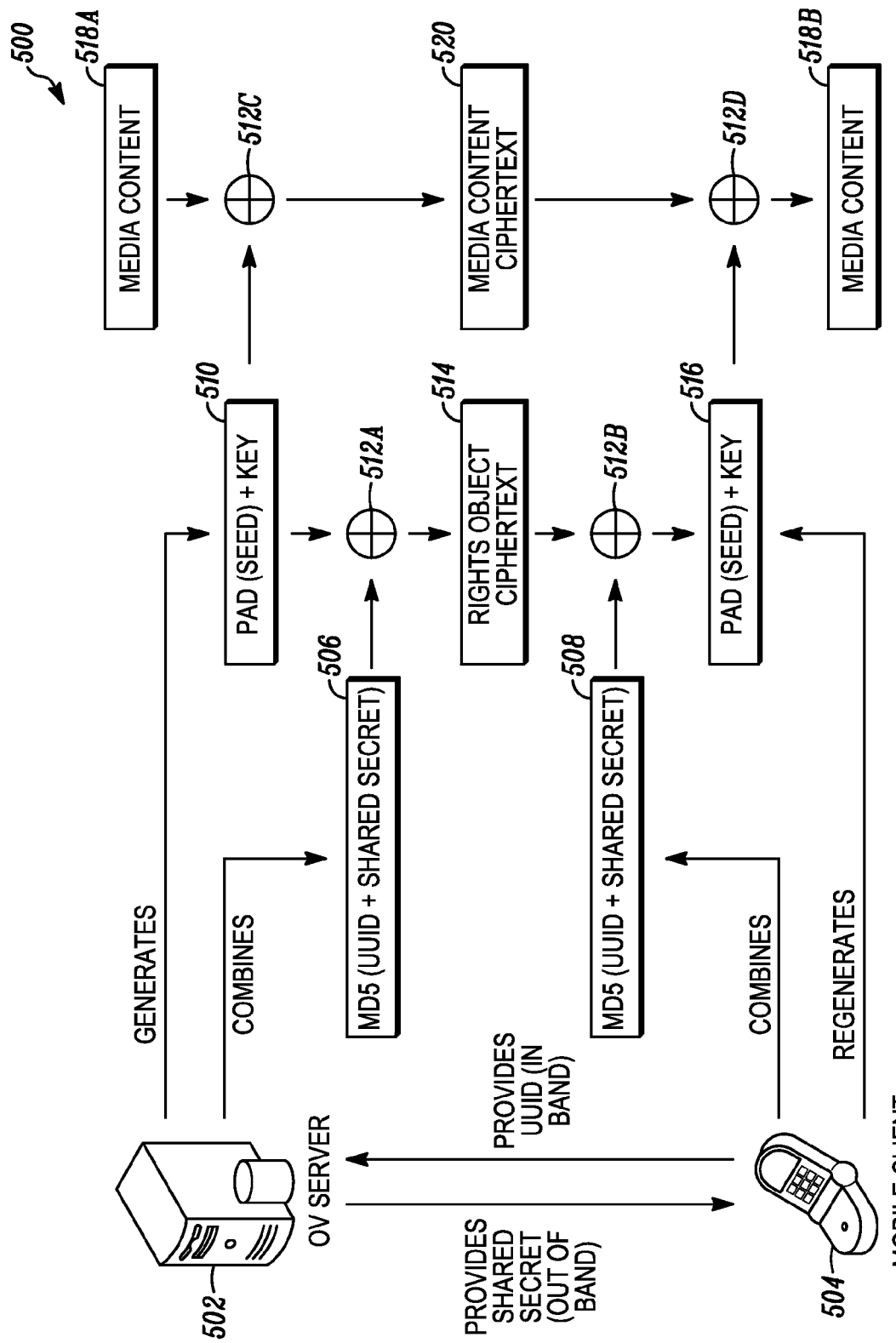
FIG. 5 illustrates the high level of the digital rights management encryption mechanism, according to an embodiment of the present invention.

FIG. 5 illustrates the encryption mechanism used in digital rights management according to an embodiment of the present invention. The encryption mechanism follows a two-step encryption process. The first stage uses an algorithmically-generated-pad and hybrid counter/chained block cipher mode, while the second stage uses a device-distinct identifier combined with a shared secret, as well as proprietary key-protection technology to obscure rights object data. The application server generates a unique seed and key pair and then encrypts the generated pad using the key. The resulting ciphertext is XORed with the plaintext to produce encrypted media. The seed and key are then further encrypted using a shared secret (UUID) which forward-locks the rights to the client.

In FIG. 5, the server 502 provides the shared secret to the mobile device 504. This is done out of band for increased security. The mobile device 504 sends its UUID to the server 502. This is done in-band. Server 502 combines the UUID and the shared secret, and sends the resulting combination to an encryption device 512A. The server 502 generates the seed and key pair 510, which is also sent to encryption device 512A. While these operations are occurring, the mobile device 504 is combining its UUID with the shared secret, 508. The resulting combination is sent to encryption device 512B. Encryption device 512B receives the ciphered rights object 514 from encryption device 512A and outputs the seed and key, 516. Seed and key 510 is sent to encryption device 512C along with media content 518A. Encryption device 512C outputs ciphered media content 520. The ciphered media content 520 is then input to encryption device 512D, where it is combined with the regenerated seed and shared secret 516. Encryption device 512D then outputs media content 518B.

The receiving device regenerates the pad using a predetermined algorithm based on the seed value. Each media content object uses a different pad seed and algorithm which provides an additional level of non-determinism to the pad algorithm. The algorithm is also renewable, while remaining backward compatible with previously downloaded content.

Figure 6:
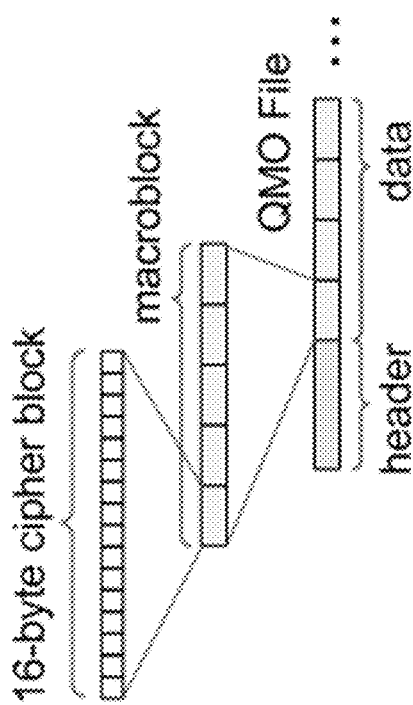
FIG. 6 shows the relationship between cipherblocks and macroblocks, according to an embodiment of the present invention.
Figure 7:
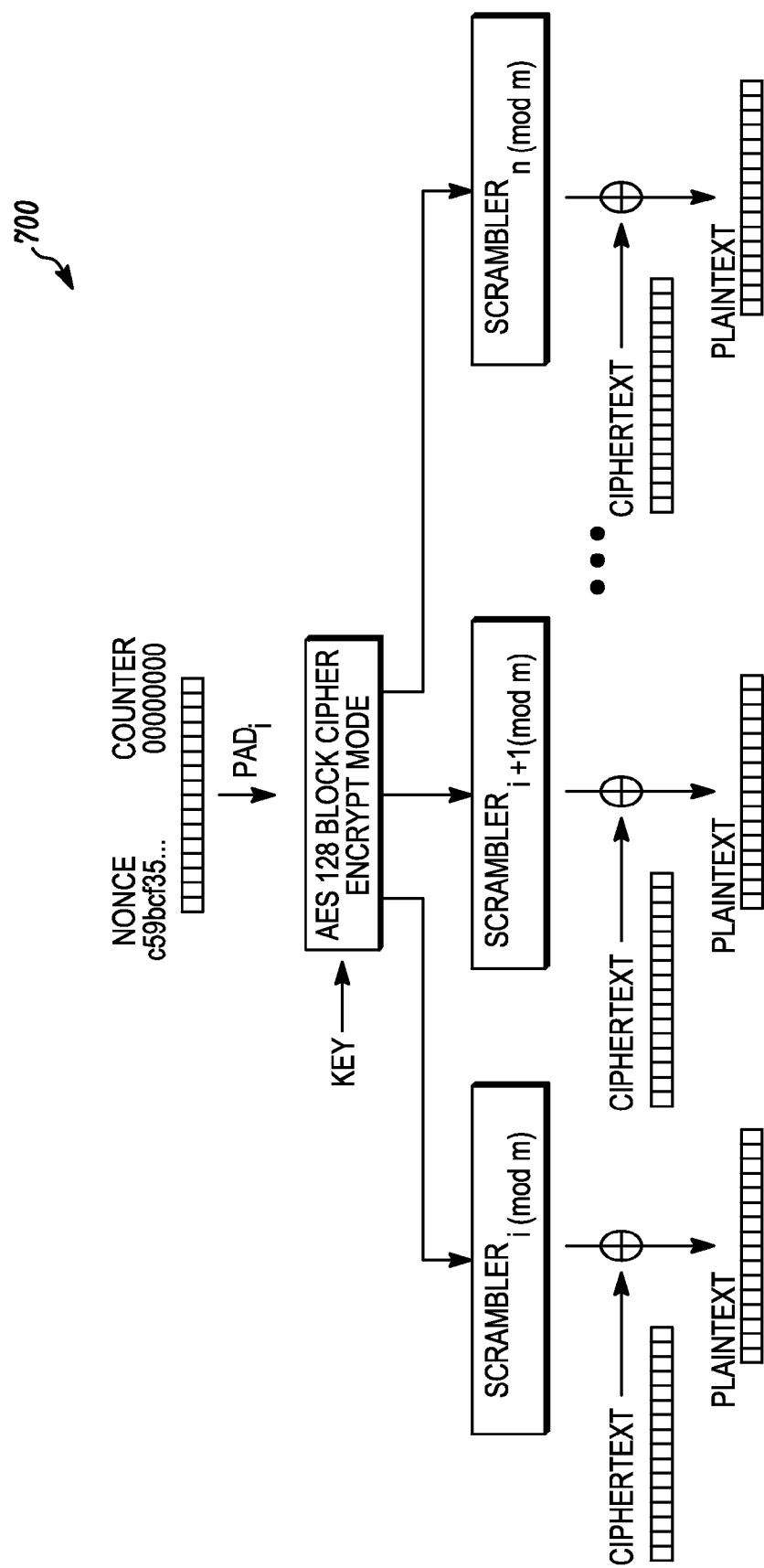
FIG. 7 shows the counter/chained cipher block encryption with enhanced performance, according to an embodiment of the invention.

FIG. 6 shows how this encryption mode operates on groups of 16-byte cipherblocks called macroblocks. The cipherblocks in the macroblock are encrypted using 128-bit AES in a hybrid of cipher block counter and cipher block chaining mode. Cipher block counter mode operates at the macroblock level, while cipher block chaining permutes the blocks within the macroblock using a using a one-way scrambling function whose performance is roughly an order of magnitude faster than AES. The one-way function chained mode provides better protection over a simple counter mode, while yielding significant performance over pure encryption using AES alone. FIG. 7 illustrates the above concept.

Figure 8:
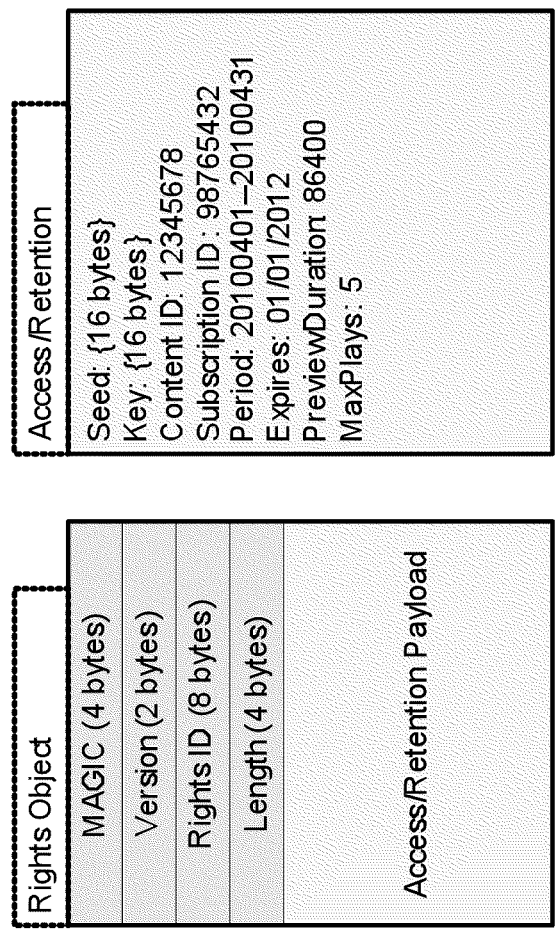
FIG. 8 illustrates the digital rights management media and rights object formats, according to an embodiment of the invention.

Media is encapsulated in a media object DRM container shown in FIG. 8, that identifies the protected contents. The Media Object can encapsulate any content type understood by the client. This media object DRM container acts like a storage locker for digital content, much the way a library stores physical copies of media content on discs or tapes. The media object's content identifier is used to look up an appropriate rights object. The rights object contains rules specified by the content providers and mobile operators, and grants specific entitlements to content. The media rights DRM container also allows a user to pause while viewing content and resume playback on an additional, different device that shares the application account.

The rights object is designed to contain arbitrary NV-pair data to accommodate arbitrary business rules. Typically a rights objects contains an expiry date and entitlement to consume this content lasts until the expiry. Other configurations may be used as determined by client requirements (the nvpair fields shown in FIG. 8 are examples. Rights objects can be used to provide a variety of business functions such as subscription, rental, preview, pay per view, etc. Providing an arbitrary rights objects data area also permits license chaining such that one 'root' rights object can grant access to one or more 'leaf' rights objects which, ultimately, unlock the target content.

All rights objects are encrypted using AES-128, stored only in encrypted form, and are decrypted just in time before entitlement checks and playback.

For limited-connectivity devices, a three-tier licensing strategy is used with the root license containing access restrictions and references to product identifiers, a leaf-license containing product identifiers and references to services, and the service-leaf license containing access to the actual content. FIG. 9 shows the root and leaf license structure. The client library must support decrypting from a root license (i.e. The library must know to navigate the chain of identifiers to resolve a particular content object.)

Key protection is achieved through nonce-generation, key-transformation, and counter-mode encryption. The media object is encrypted using a transforming key coupled with a dynamic encryption mechanism afforded by the virtual machine; each media object uses a different set of one-way scrambling functions, effectively altering the encryption mechanism on a per-media-object basis. The dynamic aspect of the encryption mechanism adds a further layer of non-determinism to thwart both static and dynamic analysis, making reverse-engineering and key recovery difficult.

FIG. 10 shows the structure of the macroblocks and the intermediate steps of the encryption process. The secondary benefit to media is encrypted to increase playback performance with the first of every n-blocks encrypted using AES plus scrambler, but subsequent blocks using lesser-complexity one-way functions to scramble the remaining blocks. the performance of which, s, is one-tenth that of AES, a.

Thus, a macroblock size of 1 yields the performance of a+s, whereas larger macroblock sizes yield an increased performance of (roughly), a+sn.

Since encrypting with a macroblock size of 1 yields poorer performance than using AES alone, a macroblock size of 1 is not used. More practical is a macroblock size of 5~10, and sizes as high as 15 for devices with sub-optimal processor performance may be used. The result is less overhead for greater video playback performance.

After content is protected and encapsulated by the QMO file, the ingestion services workflow calls upon the publisher to store the meta-data and resulting encryption key in the content management system, then push the content either to a local repository (if configured), or to an external content data network (CDN), which may be a separate commercially provided service.

The DRM 2.0 library generates a unique seed and encryption strategy for each call to its encryption routine. The result of the encryption routine is a specially protected key used to encipher the content encoding for the target device. This key is stored in relation to the target device (content encoding) and DRM version. This requires modifications to the CONTENT_ENCODING structure and pervasive changes to all code involving the CONTENT_ENCODING and CONTENT_DRM tables. Since DRM now not only supplies a key, but also varies by version, in some cases, a single client application may be presented with more than one DRM solution; the application handles this by accommodating the DRM id and version into the CONTENT_ENCODING table.

Figure 11:
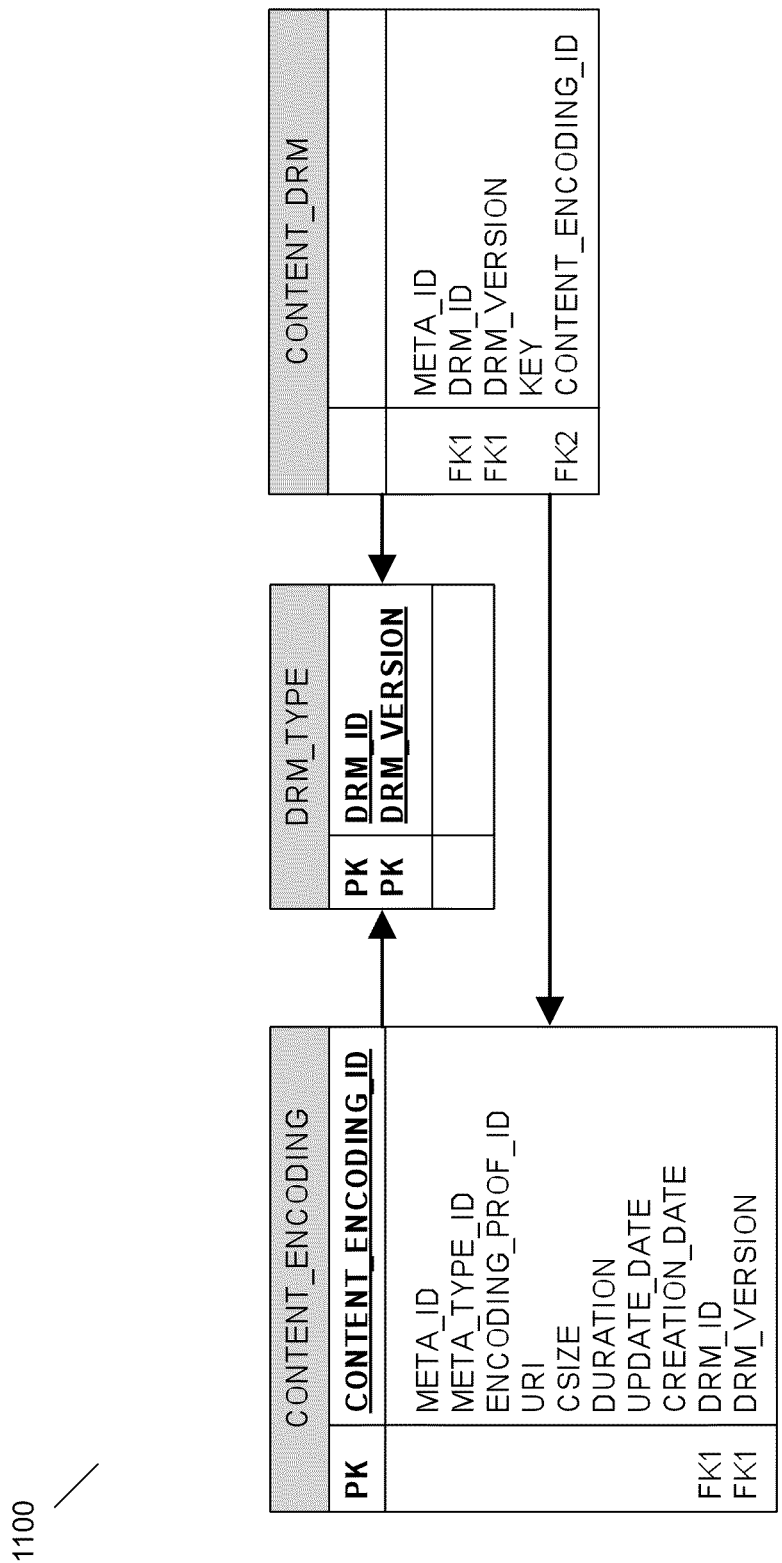
FIG. 11 illustrates the schema supporting DRM 2.0 modifications, according to an embodiment of the invention.

FIG. 11 shows the table modifications required to support the relationship between DRM versions, keys, and content encodings.

To provide new support for DRM 2.0 while remaining backward compatible with existing clients that are only aware of DRM 1.0, both the Content Catalog request, as well as the Rights Object request have been modified to default to DRM 1.0 encryption (where content for the request contains DRM support by way of the CONTENT_DRM table), or DRM 2.0 in the event the client states support for DRM 2.0. The client request parameter consists of the DRM_ID and DRM_VERSION.

The application securely stores the keys used to encrypt content in the CONTENT_DRM table of its relational database along with all other content metadata. The records in this table are identified by the internal application content identifier also known as a META_ID. Currently the application uses a custom encryption mechanism to encrypt the key prior to storing it in its DB. As a result, all queries against the CONTENT_DRM table will only present the encrypted version of the key to the user.

On retrieval, the key is decrypted before being served to the client device and this communication between the client and the server occurs over HTTPS.

The application securely stores the keys used to encrypt content in OpenVideo along with all other content metadata.

Figure 12:
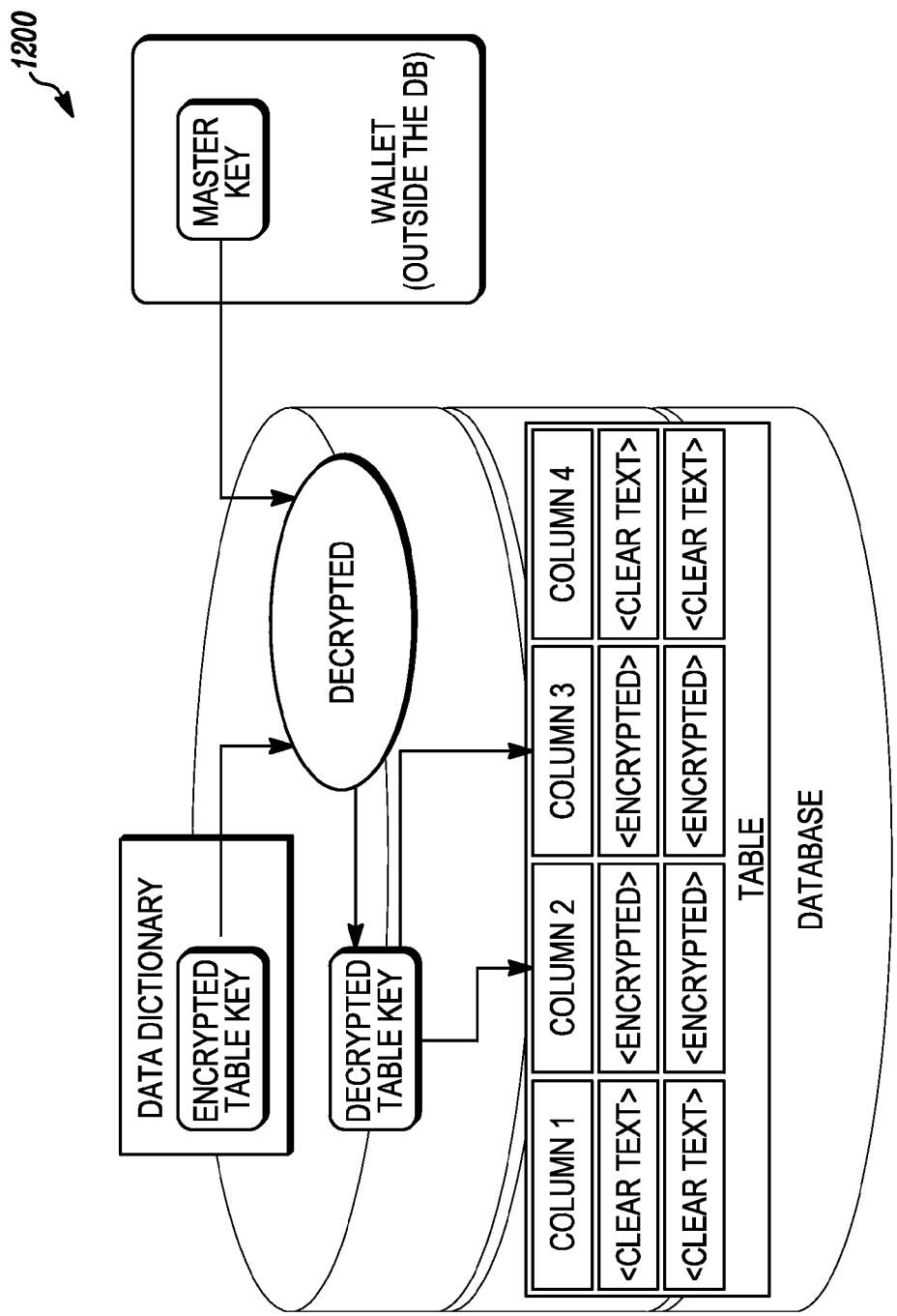
FIG. 12 depicts the operations involved in transparent data encryption, according to an embodiment of the invention.

The application may employ either a QuickPlay developed custom encryption mechanism using AES, or another encryption method, such as Oracle's Transparent Data Encryption (TDE) using AES FIG. 12 illustrates the relationships between the data dictionary, encrypted/decrypted table keys, and master keys in a TDE system. Keys inserted into the table should be enciphered by TDE so that casual read access cannot retrieve the key in plaintext. Since the key must at some point be recalled in plaintext so it can be sent to the client, TDE should be configured with two types of read access to the CONTENT_DRM table. One permits access without divulging the actual key values and the other restricts access to those processes involved in the key delivery to the client. Both types of read access are discussed in more detail below. READ ACCESS TYPE 1: TDE-protected passwords are read back without being deciphered. This permits the casual user to peruse the database table for purposes of OPS administration, development, and QA. The key is not exposed and is indecipherable by the average user.

READ ACCESS TYPE 2: TDE-protected passwords are returned as plaintext (that is, the actual key value before it was enciphered by TDE.) This access type is limited to only the application process that relays data to the application.

The encryption techniques discussed above may be used in a variety a ways. The quasi-hardware mobile device identifier may be used in conjunction with a unique encryption algorithm to encrypt and protect each video or media content item delivered to a mobile device. In a further embodiment, the video stream or file may be broken into blocks. The first block is encrypted using one of the techniques described above while the remaining blocks are scrambled. The scrambling is also based on the quasi-hardware mobile device identifier. One advantage to this method is that the decryption step is not required, thus, saving bandwidth.

LimeLight Networks is an example of a content delivery network (CDN) that may be used by MSTB, and it hosts all the content served to client devices. During the last stage of publication, QMO files are published to the CDN for distribution.

Figure 13:
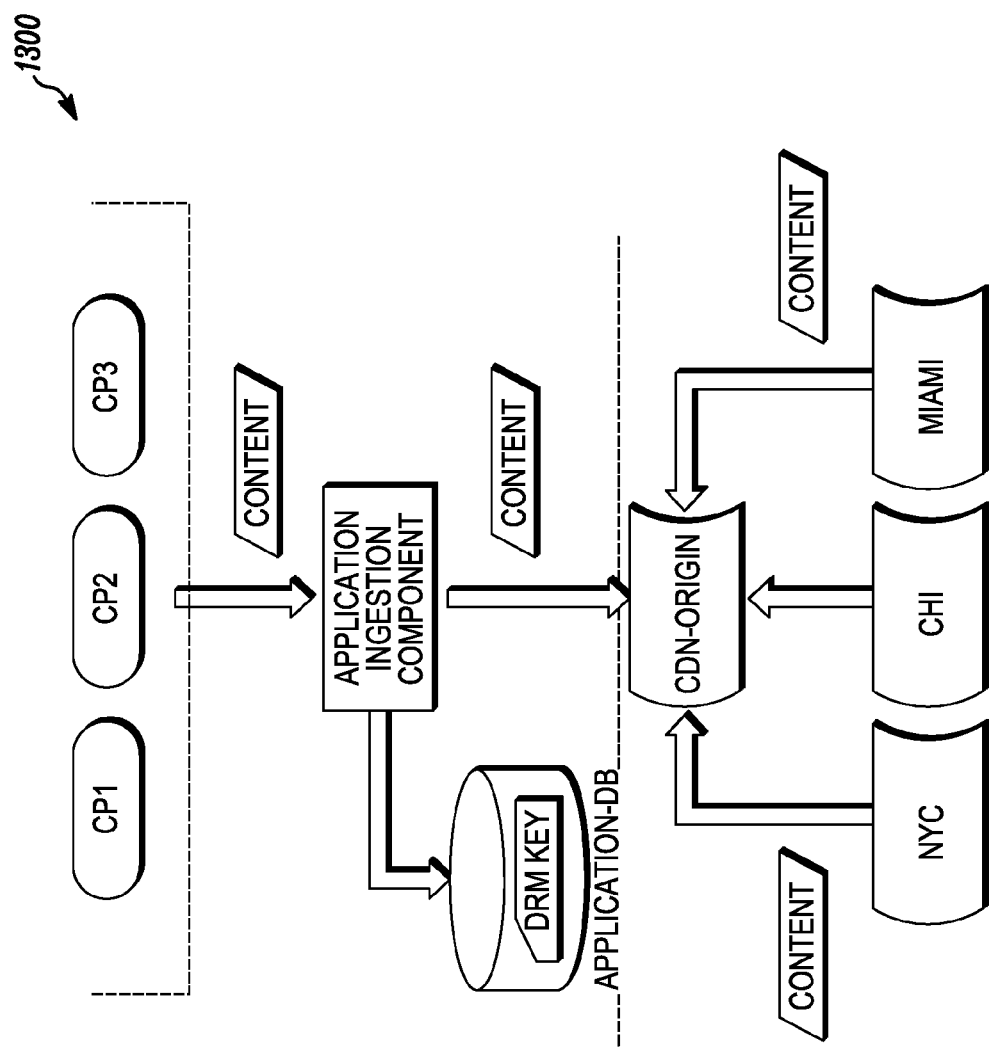
FIG. 13 illustrates the application interaction with the content delivery network, according to an embodiment of the present invention.

FIG. 13 shows MSTB interaction with the CDN origin and edge servers.

When content expires, the application issues a purge request to the CDN, forcing the encrypted media to be removed from all edge servers and the origin. Any subsequent request to download this expired and removed content returns an HTTP 404 error.

Content Providers dictate content publication, expiry, and update dates in the feed metadata. Content usually expires two weeks after collection, but varies from provider to provider. In some cases, content may have availability in the catalog for two (2) weeks, but it can only be stored on the user's mobile device for forty-eight (48) hours. Once content expires, the application automatically removes the content from the mobile device.

Once content is published, the application performs several interdependent steps before accessing content. It first authenticates with the server, an appropriate subscription is then obtained and validated by the server, downloads rights objects, and then obtains the content files themselves. During this process, access and communication with the server remains secure and valid. This communication between the mobile client and the server is conducted over HTTPS, with the exception of downloading media and icon files.

Figure 14:
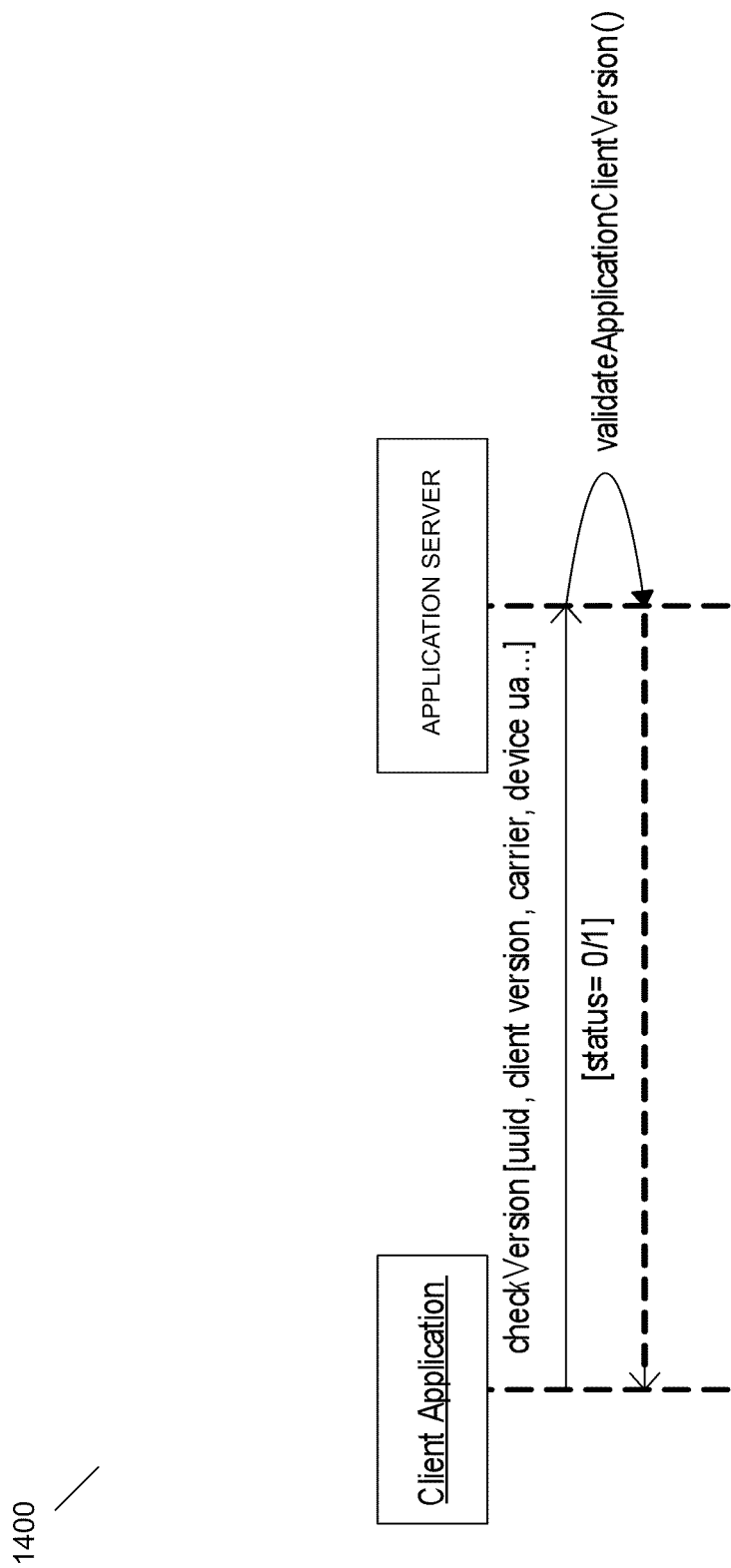
FIG. 14 shows a diagram of the version check sequence, according to an embodiment of the invention.

Before this process occurs a version check is performed. The application on the mobile phone sends a version check request to the server. The purpose of this call is to verify that the mobile device version of the application is valid for the specified carrier and device. FIG. 14 highlights the data passed and the calls made.

For mobile device application vending services that do not support forced upgrades, so the MSTB application can induce an automatic upgrade by preventing or limiting future access until the user opts to update to a newer version of the application. Once the client is up to date, the user will regain access to the service.

All connections to the application require that the client first submit to a challenge-response test. This challenge-response test exercises the application to validate its authenticity. The virtual machine then generates a response the initial login (such as with a new client or after resetting a client), the MSTB application makes a call to the application server to request a challenge submit and request several keys that are needed for subsequent access to the application and to download content. These keys are described below.

Application secret key (ASK): The application secret key is used to authenticate the MSTB client application, During login, the server provides a challenge string that must be combined cryptographically with the shared secret and relayed back. The server then validates the shared secret by performing the same combination and comparing the values. If the values are identical, the client is deemed authentic and may continue with the transaction.

Media Access Key (MAK): This identifier is used to download rights objects. It is part of a key-exchange mechanism whereby the application must supply the key and receive a new one in its place. This ever-changing session key exchange is used as an additional security measure to authenticate the client.

Application Id: This is an application-specific internal subscriber identifier that is unique for every subscriber and mapped to an external identifier.

Figure 15:
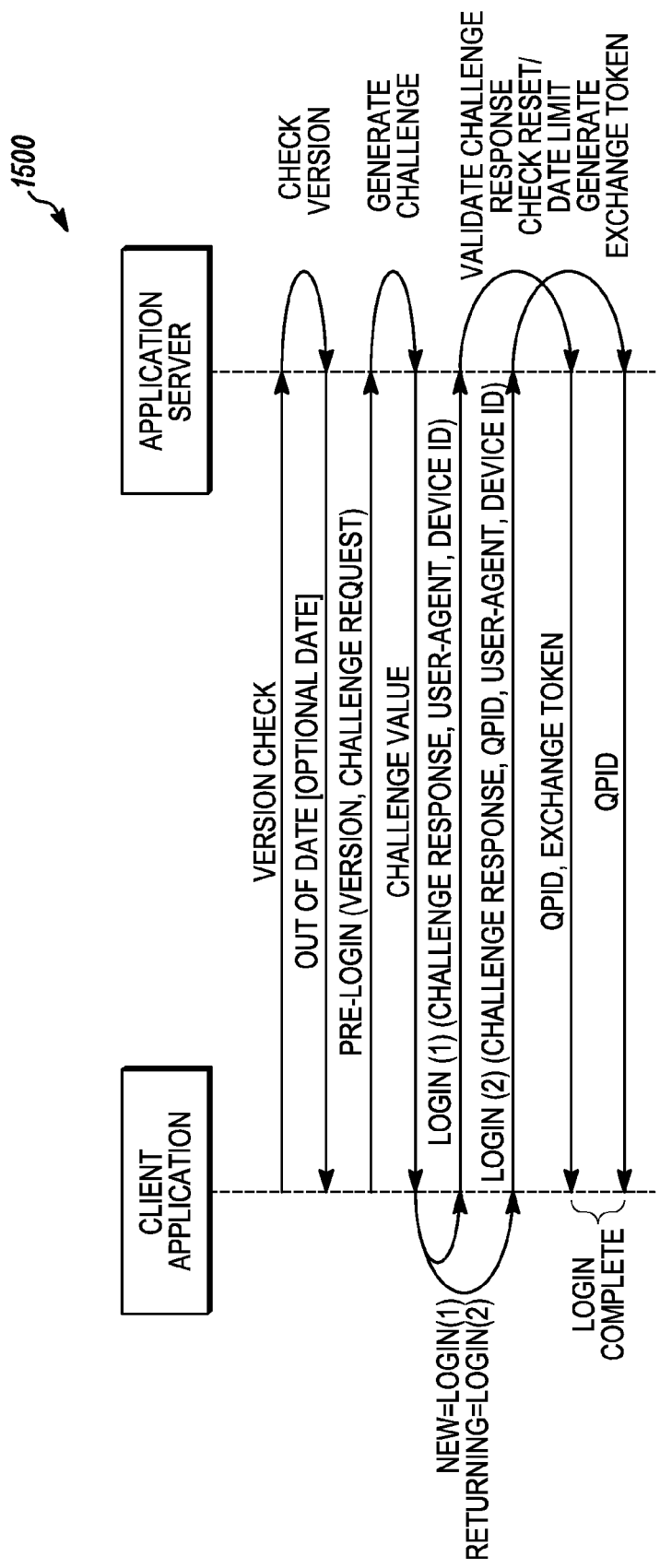
FIG. 15 provides a logic sequence diagram, according to an embodiment of the present invention.

FIG. 15 illustrates the client/server procedure to authenticate and log into the server. In this case the client is the application.

Login consists of two phases. The first is a challenge request which is used to retrieve a challenge keyword. This keyword is combined with the shared secret and hashed using MD5 and then sent in the second phase to the server where the challenge response is validated. Once the challenge and other user/client credentials are valid, a subscription General User Profile (GUP) is created in the OpenVideo™ database and associated to a QuickPlay Id and Media Access key. The QuickPlay ID and Media Access Key are returned to the client.

The mobile device application removes all downloaded media files and rights objects when an invalid subscription status is returned from the login request.

After a original successful login, a subscription exists in the system and has an assigned media access key and can be authenticated by submitting the application id and the application credentials.

The MAK is only validated when the user requests rights objects for content. This process is discussed further below.

Content browsing is the process of retrieving the most up-to-date metadata from the application server. Media is only served after these requests are performed over HTTPS.

Figure 16:
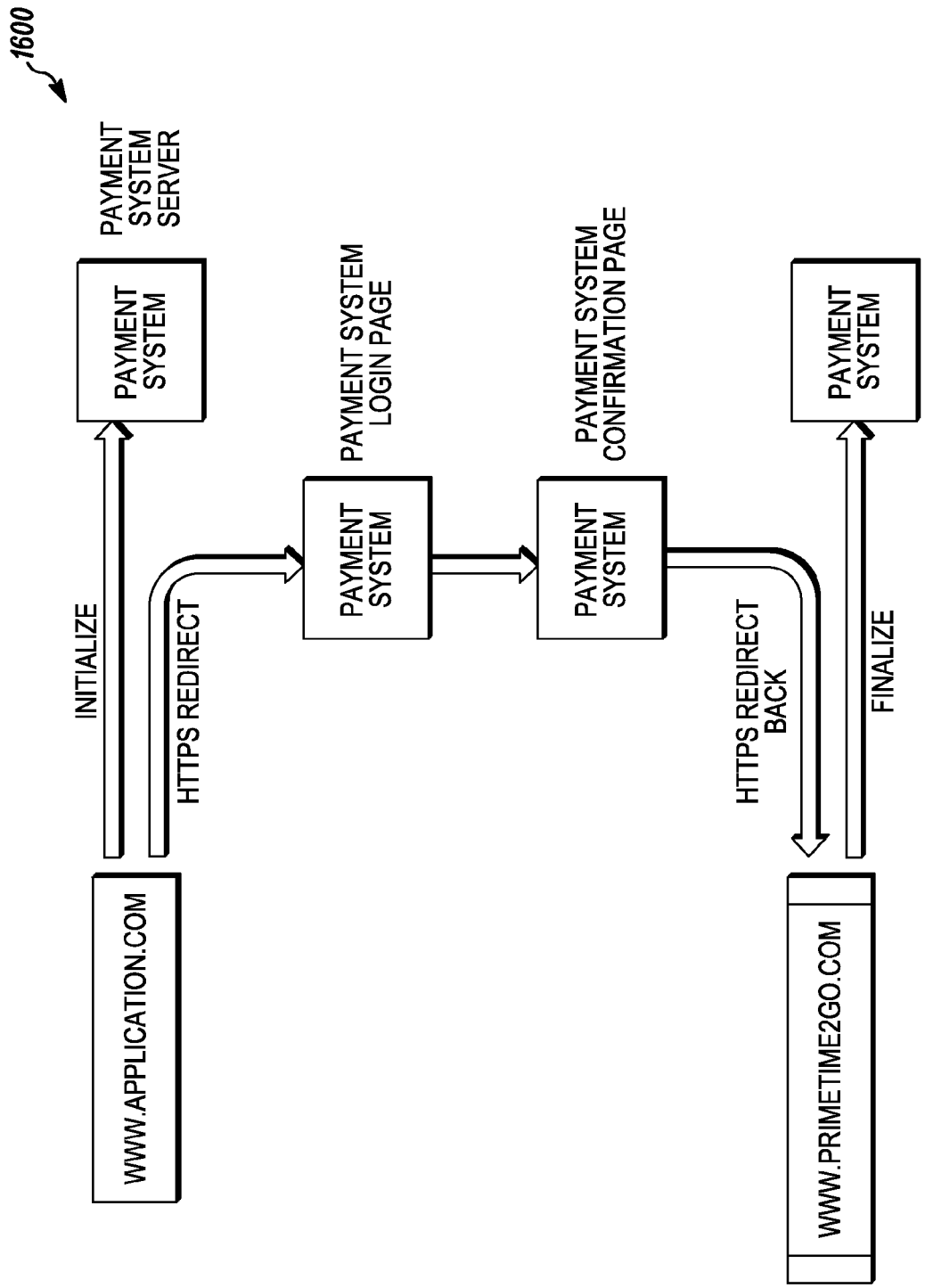
FIG. 16 illustrates use of a payment system in conjunction with the application, according to an embodiment of the present invention.

MSTB uses an online or mobile payment service such as PAYPAL to manage payment and subscriptions. Users log into the application website from their personal computers to initiate the subscription process. Once they enter their mobile device personal identification number (PIN) and decide to subscribe to the service, they are redirected to a payment service page where they can submit their payment service page credentials to become authenticated. Once a purchase is confirmed they are returned to the MSTB confirmation pages to finalize the purchase. None of the user's sensitive financial information is stored in the MSTB database. FIG. 16 illustrates the subscription process.

At the conclusion of a successful subscription process, a record is created in the MSTB database with a "subscribed" status allowing the user to consume the content.

MSTB performs subscription checks against its database to ensure that subscribers are still entitled to consume content. The service operates on a monthly subscription model. Users are charged at the beginning of their billing period and their status is recorded in the MSTB database. At the end of their billing month, the application server makes another call to the payment system to obtain the subscriber's current subscription status and update its records, the results of which are described in Table 2, below.

TABLE 2

Subscription call record parameters

| Parameter | Description |
| --- | --- |
| Subscription Status | Active/Pending/Cancelled/Suspended/Expired |
| Next Billing Date | Total amount collected thus far |
| Final Due date | Final payment due date if this subscription is set to expire on a given date |

MSTB is restricted to the continental US and therefore must verify that a request for content originates from an authorized location before delivering rights objects to the mobile client. If outside the restricted area, the user will not be permitted to download new content, but is permitted to view content previously downloaded.

MSTB may use services such as Digital Envoy's Net Acuity Server to verify the location of the users on the server.

Figure 17:
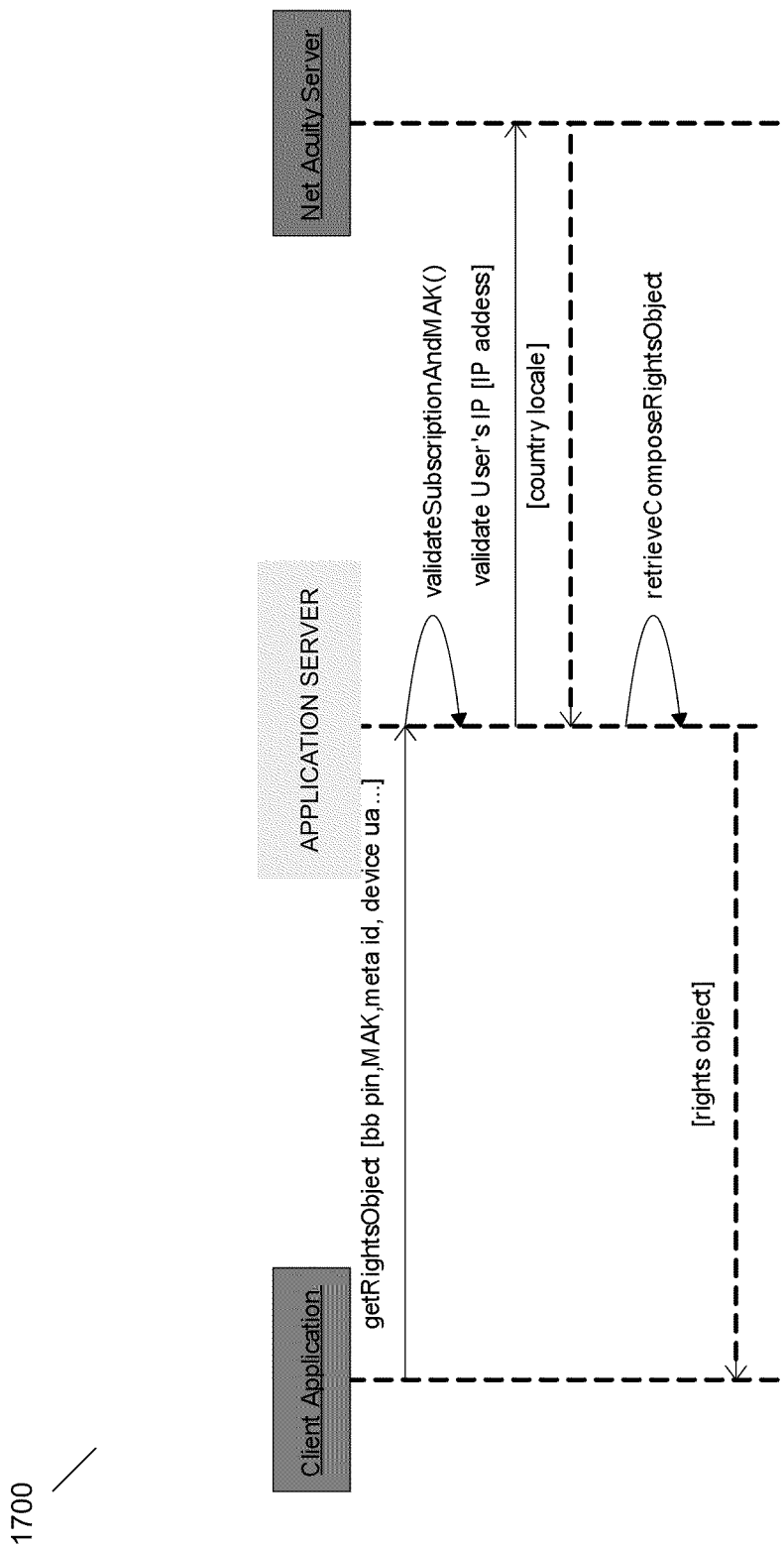
FIG. 17 illustrates the location check sequence according to an embodiment of the present invention.

FIG. 17 illustrates the steps in the sequence of a location check.

So as highlighted, the server extracts the IP address from the header parameters: X-Forwarded-For or Proxy-Client-IP. This address is then sent to the Net Acuity server to obtain its matching locale. The server then verifies that the locale is allowed, retrieves the DRM key and composes the rights object that is returned to the application.

In addition to verifying that the IP address is from an allowed locale, the server also invalidates any anonymous and proxy IP addresses.

Figure 18:
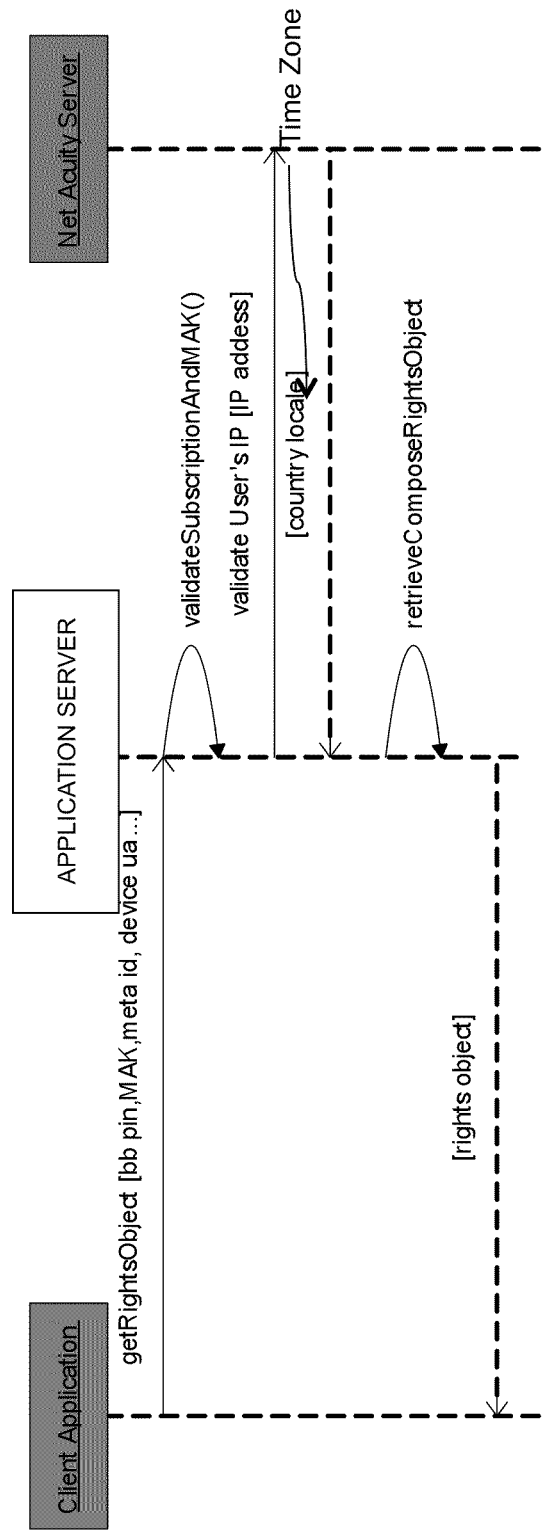
FIG. 18 illustrates the time zone check sequence, according to an embodiment of the present invention.

FIG. 18 illustrates the steps in the sequence of a time zone check. A time zone check may be used by a content provider to ensure that some programs, such as live results shows, are not viewed ahead of time by mobile users in a different time zone. Additionally, this check serves to prevent users from setting their mobile clock to a different time zone to access content before it is generally available in their actual time zone. The server extracts the IP address from the header parameters X-Forwarded-For or Proxy-Client-IP. This address is sent to the Net Acuity server to obtain the matching time zone. The server then verifies that the time zone is allowed, retrieves the DRM key and composes the rights object that is returned to the application.

Restrictions may also be applied to ensure that viewing blackout periods, such as those found with sporting events, are complied with. These restrictions may prevent a user from viewing content while a blackout period is in effect.

Figure 19:
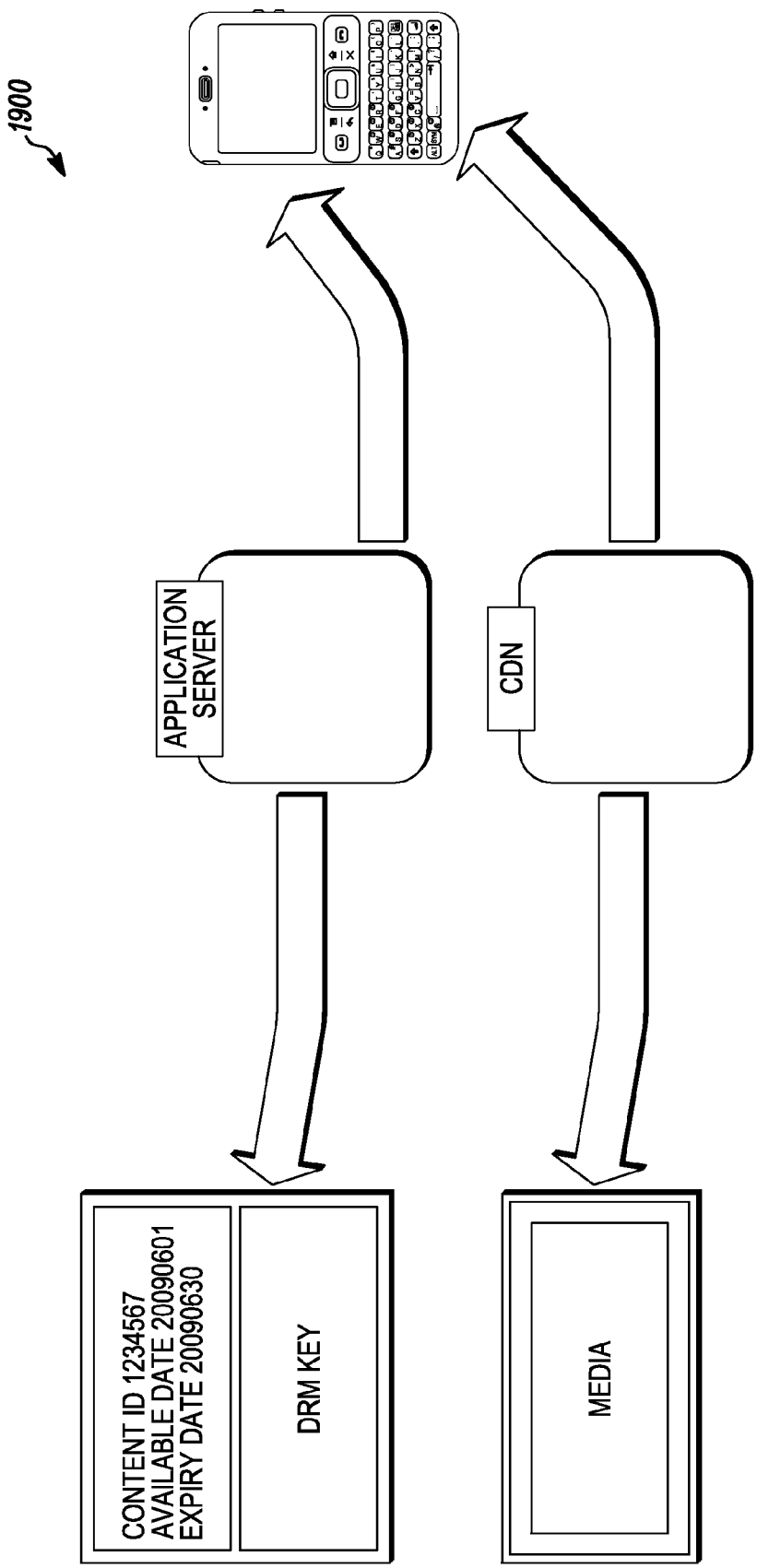
FIG. 19 illustrates a rights object sequent diagram, according to an embodiment of the present invention.

Before the rights object can be obtained, the mobile device application must exchange its media access key for a new one. If the server determines that the media access key is valid, it will issue a new media access key to replace the client's current key, and deliver the rights object. FIG. 19 shows the rights object sequence diagram.

Figure 20:
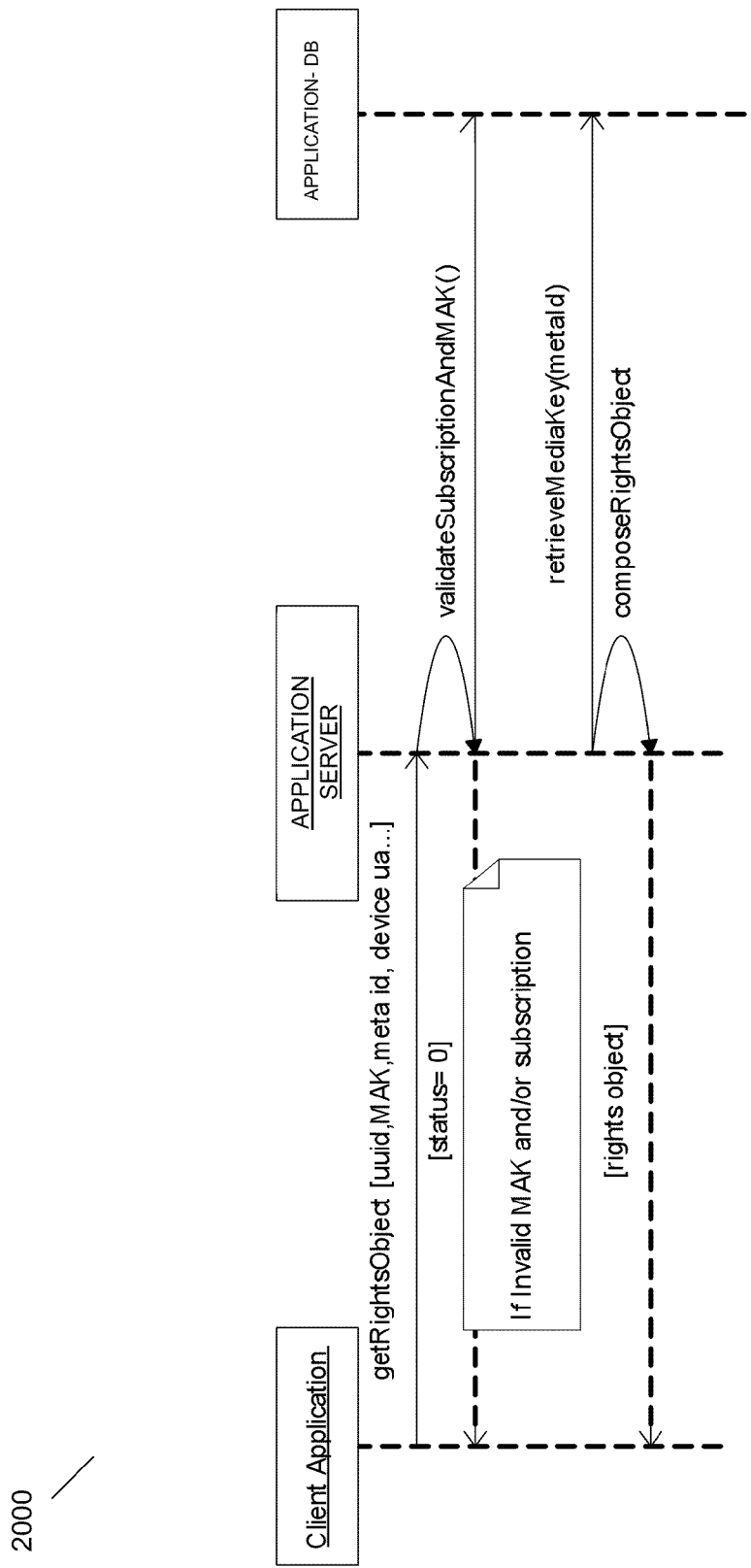
FIG. 20 shows the sequence of steps involved in the rights object sequence diagram according to an embodiment of the invention.

The rights object DRM Key is required in order to decrypt the media. The expiration date indicates when the mobile device application can delete the media file from the user's device. To request a rights object, the mobile device application submits the same media access key (MAK) returned previously. FIG. 20 illustrates this process in the rights object sequence diagram.

The server maintains a table with a primary key of DEVICE_IDENTIFIER and two media access keys for each unique device identifier, CURRENT, and OLD. The CURRENT column is initially populated during login with the first Media Access Key when it is delivered to the client.

The mobile device application, having received the CURRENT key stores this value internally. This key is required by the server upon each mobile device user's request of a rights object. When the server receives a Media Access Key that matches the CURRENT value for the mobile device user's DEVICE_IDENTIFIER, the server will move the CURRENT key to the OLD key column, generate a new Media Access Key into the CURRENT column, then deliver that new key and the requested rights object to the mobile device application. The mobile device application will replace its CURRENT key with the new key just delivered. This procedure is repeated for each rights object request.

In the event a media access key fails to reach the mobile device application (e.g. failed communication during the exchange), the client's CURRENT key will instead match the server's OLD key. If so, the server will ONLY generate a new key, replacing the CURRENT key, and deliver the new key to the mobile device application. The mobile device application must re-request the rights object as before using this new key.

The exchange protocol requires completion of the following steps;
1. The mobile device application logs in. Upon first login only, a row is created using the DEVICE_IDENTIFIER as a primary key, and the Media Access Key is stored in the CURRENT key position.
2. The mobile device application negotiates with server (e.g. subscribes to content) to accrue a state of authorization for the next step.
3. The mobile device application requests a rights object, passing its CURRENT key to the server.
4. 4a. The server compares the supplied DEVICE_IDENTIFIER and CURRENT key against those in the database. If no matching row exists, it rejects the request.
   4b. If the server matches the row, it atomically moves the CURRENT key to the OLD key position and generates a new media access key into the CURRENT position. The new media access key is delivered along with the rights object to the mobile device application.
   4c. If the server does not match the row, it then tries to match the supplied DEVICE_IDENTIFIER and CURRENT key against the database's DEVICE_IDENTIFIER and OLD key values. (At this point, it is presumed the client did not properly receive the last Media Access Key). The server will generates another new media access key into the CURRENT position and send ONLY the new media access key to the client.
5. The mobile device application stores the newly received media access key in its persistent store.
6. All subsequent requests for media rights objects begin at step 3.

The following paragraphs explain how the mechanism works to prevent unauthorized duplication/re-use of credentials: assume that a hacker has produced a rogue mobile device application with all the same credentials as the authentic mobile device. He will attempt then to log into the server and provide all the same credentials in an effort to obtain a rights object.

The rogue mobile device application connects to the server and supplies the current media access key a. The server will correctly match a against its own, move the CURRENT key a into the OLD key position, and generate a new key b into the CURRENT position. This key, b, is delivered to the client along with the rights object.

Meanwhile, the legitimate mobile device application who holds a as the current key is now out of phase with the server. When the legitimate mobile device application requests another rights object using a, the server will initially reject the request, issue another new media access key c. The b key will now become OLD, which causes the rogue mobile device application to be out of phase instead.

If the legitimate mobile device application requests another rights object with c, the server will move c to OLD, generate d into CURRENT, and b will be eliminated completely, locking the rogue mobile device application out.

While it is possible to have two mobile device applications constantly fight back and forth over who holds the valid CURRENT token, it is statistically unstable—eventually, one will lock out the others. Since only one mobile device application can realistically hold the valid CURRENT key at any given time, authentication is therefore protected against sharing.

The media object is most likely located external to the application's hosted services on a CDN. Media objects hosted by the CDN are enciphered and unusable without the corresponding rights object. Downloading of media objects is outside of the scope of this DRM design. This design imposes no constraint on how the media object should be handled or stored.

The DRM server is ultimately responsible for asserting that a mobile device application has the proper authorization to receive a rights object, but the application must support entitlement/consumption rules through the rights object declaration.

The DRM application is responsible for retrieving the rights object, storing them securely, ensuring that user consumption of media abides by rules declared in the rights object, and the prompt removal of content after it has expired.

Code signing operates slightly differently depending on what type of mobile device the application is running on. The following paragraphs describe code signing on a Blackberry or similar device using the same operating functionality.

The application is signed by the application vendor or creator using a PKI key-pair. It is further signed by RIM for API access. Object code is signed for several reasons which will be briefly reviewed.

Application vendor or creator signatures are required to enable trust in the application. When a MIDlet is signed, it is marked as Trusted, and security prompts will not appear when the user downloads the application, uses file connections, the push registry or RMS.

Application signing by the mobile device manufacturer of a Blackberry or similar device is exclusively for the purposes of enabling access to, and tracking of access to protected (cryptographic) APIs per export control laws. Links to API objects are resolved when the signatures validate access. The signature provides two other beneficial services: It is used as a key into protected storage such that only an application that created the protected storage can later access it. Another is tamper-proofing; if the code is modified, the operating system will deem it insecure and prevent access to protected APIs, which also disables the DRM that depends on the very same APIs.

Similarly, mobile devices using an Android or similarly functioning operating system also must be signed to prevent unauthorized modifications to the routine binary.

Obfuscation of the client is essential to further protect the intellectual property that protects the key. Obfuscation of the client is essential for protecting the intellectual property of those mechanisms required to protect the key. The client device binary shall be obfuscated using KlassMaster for Java devices, or other similar application, and the vendor or developer's own obfuscation tool for non-Java (native ARM), or equivalent platforms may be applied to client applications.

Obfuscation may be applied to all classes that implement business logic governing content entitlement, decryption, sensitive data storage, and application-server communication. The obfuscator uses as many as possible of the operations described below.

Reduce all class names, method names, and variable names to single or double letters, numbers, or visually similar symbols. Transform the flows of the program to make more difficult the analysis of such flows. Alter predicates to make branch analysis more difficult. Re-order byte-code instructions where possible to render decompilation difficult or impossible. Encrypt all static strings to make static analysis difficult or impossible. Calculate function offsets and lengths and/or calculate function checksums.

In addition when using obfuscation tools, all codes uses private, protected, or final fields, field accessors, and methods. After compilation the application is stripped of: source line numbers, all debug cod (including printf-type statement used for debugging), testing and debugging processor statements, development or testing URLs, and all logging statements except those needed for production build. Furthermore, additional code obfuscation tools such as control transformation, data hiding and additional lexical transformation may be used. Final binaries are then examined to recognizable data and identifiers, assessed for difficulty of decompilation, and additional lexical information.

When registering for the first time (and concordantly with payment of a subscription), the application server will issue a unique token that is stored by the mobile device application. This token must be exchanged for a new token each time a rights object is delivered by the server. An access key is required by the server whenever a rights object is requested, thereby thwarting attempts to hijack the session and steal content.

All communication between the server except for icon and media file downloads are conducted over HTTPS which prevents malicious users from benefiting from communication details.

Anti-debugging mechanisms are employed to thwart efforts to debug and analyze the running application.

Where possible on native-ARM compiled versions of the application, a post-compile analysis tool is used to calculate the offsets and checksums of functions, or in performance-sensitive functions, the offset and length. In effect, the tool will take a fingerprint of the completed application including MSTB Library. These fingerprints are factored into the virtual machine operation to uniquely affect the decoding operation such that if they are tampered with, so too is the decoding process. The resulting fingerprint calculation is then uploaded to the server and stored for the purposes of eliciting a challenge-response from the client Fingerprinting involves computing the checksums of functions to create a signature. This signature is then uploaded to a protected server. The signature is computed in various operations such that if the signature changes it introduces a non-identity matrix into the overall matrix calculation, the outcome of which is a different, or corrupt, output.

In the event a mobile device application is compromised by decompilation/recompilation, the signatures in the application will differ from those previously calculated. This difference will manifest as an error in decryption at some indeterminate time in the downstream decoding process that should result in undefined behavior, typically rendering the video corrupt.

The application software checks to see if it is running in an emulator. If so, the application may terminate immediately alter downstream behavior. or prevent operations requiring payment beyond the detection point. May employ various anti-debugging checks. If debugging is detected the application may terminate or alter its behavior to the detriment of some future operation.

The application software may employ various anti-debugging checks. If debugging is detected the application may terminate or alter its behavior to the detriment of some future operation.

The mobile client uses HTTPS for all communication except for the transfer of encrypted media files or icons. This prevents transport sniffing that might reveal the nature of communication with the server.

Before login, the mobile device application must check with the server to determine if its version is current. The server can filter by version, and "force" an upgrade by refusing to offer service to older versions. In the event of an error message, and depending on the business requirements of the MSTB client, the client shall either limit or refuse to provide service.

A shared application-server secret is generated for each build and stored according to version, carrier, etc. The client shall employ the application secret key before logging into the server.

A token is formulated and given to the mobile device application, in effect creating a unique session key that can only be held and used by one mobile device application at a time. As a mobile device client interacts with the server for security-sensitive items, the token is exchanged for a new, unique token. The token is held by the server along with the previous token. If the mobile device application fails to retrieve the new token, it may provide the old token in exchange for another attempt to garner a new token. Once the new token is provided, the previous old token is pushed off the stack. Any other mobile device application holding the same token will become out of sync, thus reducing the possibility to share credentials (exchange tokens) across multiple mobile device applications. An exchange token is first obtained by the mobile device application during its initial login phase after a successful challenge-response.

Before login, the mobile device application will request a challenge from the server. The server will generate a challenge that is dependent on the internal complexities of the mobile device application's virtual machine and the unique static and runtime details known only between the server and device. This challenge-response phase decreases the possibility of a rogue application being built to attack the server. The device must compute the correct response and relay it back during the login phase.

With the previously generated challenge-response, the application performs a login. On initial login (the very first time this instance has connected with the server) and validation of the correct challenge response, it shall receive an exchange token—in effect, a session key—that shall be required for subsequent security-sensitive operations. If this is a secondary or subsequent login, only the validation of the challenge-response is performed.

Before downloading any content, the mobile device application is subject to a subscription check by the server and validation of the proper exchange token. If the subscription check fails, the mobile device application halts further operation and terminates in a loop whereby the mobile device application can check its subscription status with the server. Only if the server asserts a proper subscription and returns a positive response can the mobile device application continue with the download operation. This check must be performed before each attempt to download a rights object.

The location check function checks the mobile device application's IP address against a lookup table to determine if the requested download of the rights object or content is permitted. First, radio status is used to determine the country code from the cell tower when the Blackberry or similar radio is on. Radio status can be obtained through the mobile device manufacturer's application programming interface (API). Other devices such as Android or similar also use APIs to provide similar functionality.

When the radio is off, the client will perform a location check by submitting a location check request to the server. The server will use mobile client's incoming IP address to perform a location lookup using the Net Acuity server.

Once the above steps have been performed, the mobile device application downloads the encrypted media directly from the CDN as described above in the show metadata. The downloaded media is checked using a secure hash algorithm such as MD5, to determine if tampering has occurred.

When metadata download is complete, determined by the size of the media object being equal to the declared size in the metadata, the mobile device application requests and downloads the rights object. All right objects are stored in a protected storage which is secured by the application developer code sign key using BlackBerry password based code signing authority tool, for Blackberry and similar devices. The rights object contains information about the media including a decryption key to allow decrypting a media file. A checksum is computed over the downloaded media and verified to determine if tampering has occurred. An expiry date in the right object indicates the validity of the media file. On each playback attempt, the mobile device application validates the rights object. An authenticated and authorized media access key (MAK) is obtained by the mobile device application and saved in a protected, persistent storage.

Rights objects are received in encrypted mode and shall only be stored in encrypted mode. When a mobile device application must read any value from the rights object, it must be decrypted on the fly, and the derived value discarded at the earliest opportunity.

If the target device does not provide a protected storage mechanism (e.g. code-signed storage on BlackBerry or similar mobile device), the application shall employ MSTB's own encrypted storage mechanism whereby the mobile device application provides a key+data and receives back a ciphertext version thereof. To reverse the process, it must supply the key+ciphertext to receive the original data.

All subscription states are governed by the server, and date checks are performed immediately before playback. In the event however that state data such as number of times played must be stored on the mobile device, it must be done in a way that prevents its alteration. The easiest mechanism for doing so is to encrypt the state data and only decrypt the data immediately before use and discarding the data as soon as is practicable. Some mobile devices provide a secure storage mechanism, such as on the RIM Blackberry or similar device, which facilitates storing the number of times content is played. Some content providers may wish to limit the number of times content may be viewed and the above provides a mechanism for this feature.

In addition, the mobile device application performs an appropriate digital rights check before beginning playback. These checks consist of the mobile device application asserts that the latched time is not greater than the current time. In addition, the mobile device application asserts that the expiration data of the media to be played is valid. If either of these checks fails, the mobile device application will refuse to play the content and will display a response alerting the user to the reason why the desired content cannot be played.

The mobile device application frequently checks with the server for EACH rights object currently in possession to assert that the expiration rules have not changed. In the event the expiration date has passed, the mobile device application takes evasive action to synchronize the rights object.

On application startup (after login, when the application directs the state to "My Shows") and on entry to the "MyShows" section, the mobile device application asserts that all downloaded rights objects and their corresponding media on the SD card are valid and that the user has a valid subscription. If the user subscription is invalid, all rights objects and media are removed. If the subscription is valid, only the remaining content that has expired and any media files for which no valid rights object exists are expunged.

After content is retrieved from the server, it is stored in a "Protected Store", a Blackberry OS feature, found on Blackberry and similar mobile devices, that secures the data from unauthorized access. Only the original creator of the store, the signed application, may access the protected store to gain access to its contents.

Media files downloaded to the Blackberry or similar mobile device are "forward-locked", which amounts to wrapping (encrypting) the content such that the content may only be decrypted by the same device.

The Android device is not expected to forward lock media since it has no such mechanism. If the Android developer discovers new API capabilities as the OS evolves, he shall avail himself of said APIs to further restrict the dissemination of protected media.

Figure 21A:
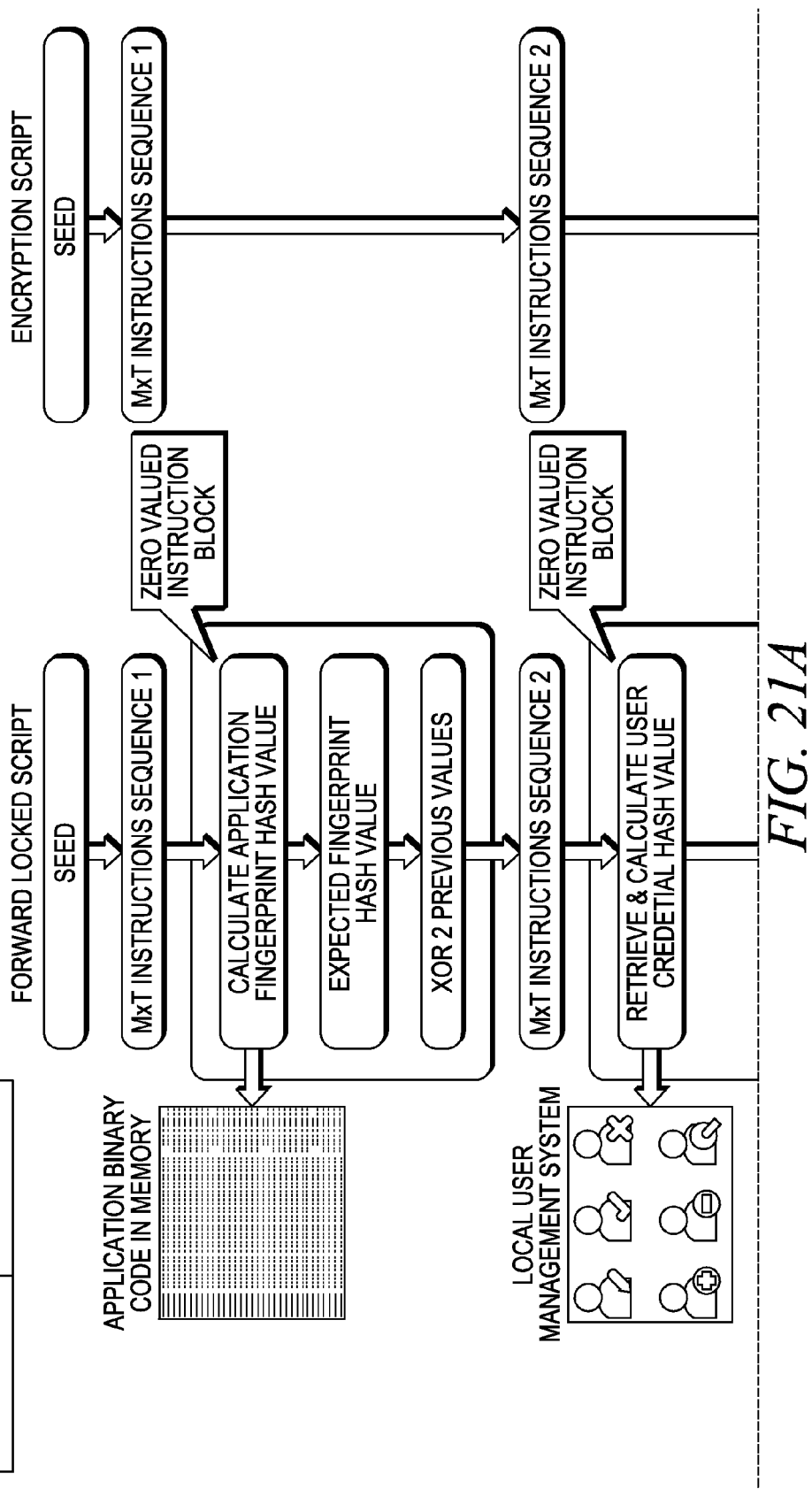
FIG. 21 illustrates the operation of the forward locked script in comparison with an encryption script, according to an embodiment of the present invention.
Figure 21B:
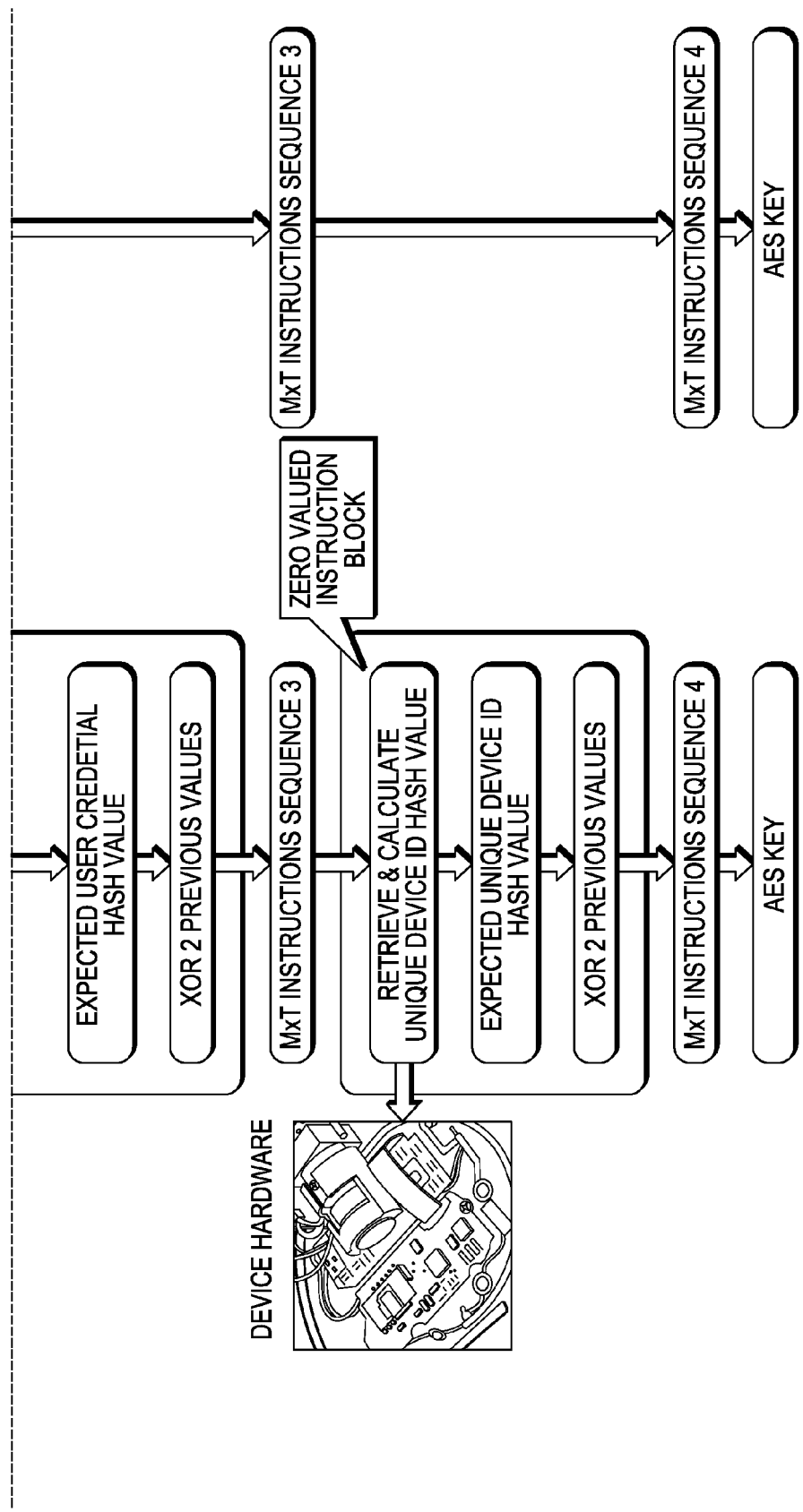

FIG. 21 compares a forward locked script with an encryption script. In mobile devices that utilize forward locking, after content is retrieved from the server, it is stored in a "Protected Store" on a Blackberry OS mobile device, or similar device. Only the original creator of the store, the signed application, may access the protected store to gain access to its contents. The steps in the process are shown in the flowchart of FIG. 21. This forward locking effectively encrypts the content such that the content may only be decrypted on the same device that made the original request. Mobile devices running the Android or similar operating system do not forward lock.

Figure 22:
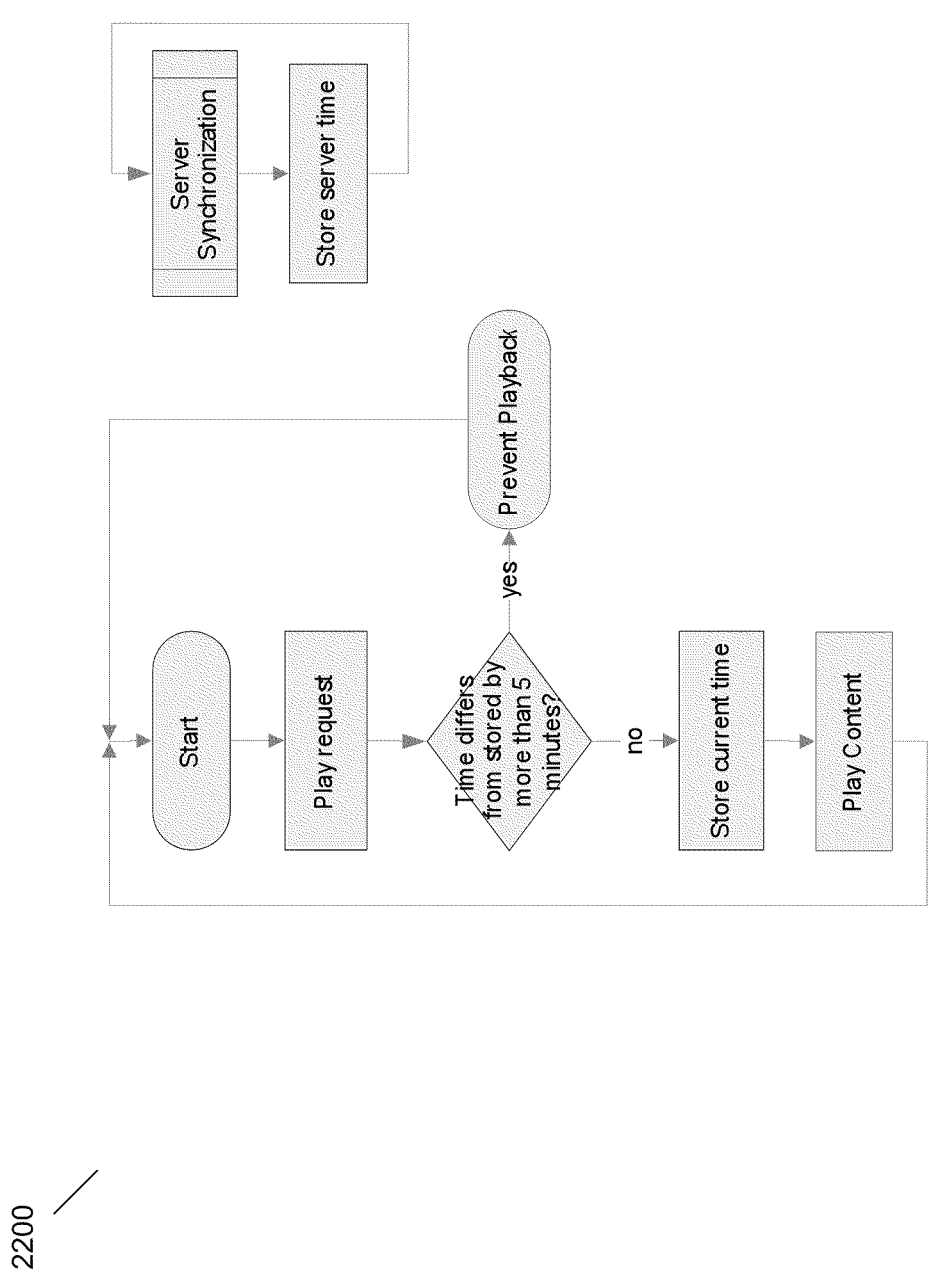
FIG. 22 shows how tampering with the device clock prevents playback, according to an embodiment of the present invention.

Most mobile devices do not offer an immutable clock for securing time-based DRM mechanisms, so a forward-latching mechanism is used as shown in FIG. 22 In this operation the current time is stored in program storage and compared each time playback is requested. In the event the user rolls back the clock on the device, the comparison of current time to stored time indicates a clock alteration (+/−5 minutes) and prevents playback.

While the device is online and in communication with its server, the client synchronizes with application server's immutable clock to strengthen the time-based mechanism. Together, the client and server clocks and surrounding mechanism make subverting the DRM mechanism unfruitful.

To prevent from accidentally setting time too far ahead and disabling access to content when the device time is set back to the correct time, the server time overwrites the stored time whenever connected. This assures that the device is always set to the correct time. It is recommended that the server transmit its time with each response, and that the mobile device application record and update the response on every call.

Hardware protection for the media content is automatically provided as most mobile devices do not include consumer-accessible video output ports that could be used to capture the digital rights enabled content. The audio jack on such devices provides only a degraded analog signal. On the iPhone or similar device, composite video is available through a headset jack using a special cable.

On devices featuring HDMI output, the client application registers with hooks in the operating system such that if HDMI output is engaged, the application will shut down.

In the event a key or its content is compromised, the MSTB service can revoke the rights for that content, thereby causing the mobile device application to immediately delete the associated rights object and content.

The MSTB service can also selectively suspend service by version, application, and device. The disabling routine is automatically triggered for normal functions such as subscription cancellation but can be manually triggered for exceptional cases resulting in the automatic removal of all videos and rights objects upon the next startup or synchronization.

Various options are available to suspend services, as follows: to suspend a subscription, the subscription PIN is removed or renamed; in order to suspend a mobile device the mobile device is disassociated from the application; to suspend service by version, the version for the offending application is removed or renumbered; and to suspend service by application, the application i.d. is removed or renumbered.

The MTSB service may be used in conjunction with a container or digital locker. The digital locker is a digital media service that allows an end user to purchase and rent media contents for playback using the IP enabled device of their choice.

The digital locker maintains entitlement rules for the content based on the user and also allows the user to playback media on multiple registered devices. Content entitlement details and playback information is synchronized between multiple registered devices. This allows a user great flexibility in enjoying and using content and provides a seamless experience while enjoying the media content. The using can rent or purchase a movie on a mobile phone, begin watching, and at a later time, finish viewing the movie at home on a television screen.

While many users enjoy viewing content on a mobile phone, others hesitate, being used to ownership of the content, as is found with a user who has a library of DVD movies. The digital locker bridges the gap to the physical ownership world and allows users to purchase media content through an available online channel using any IP enabled device they choose. The entitlements, or digital rights, are stored in the "cloud" and the ownership rights are retrieved by a user as described above, when the user views media content. This allows users to watch content they are entitled to on any registered device, at any time. This gives users flexibility and perpetual ownership, just as are now found in a DVD or other media collection. Unlike other ownership scenarios, the playback state transfers across devices.

Figure 23:
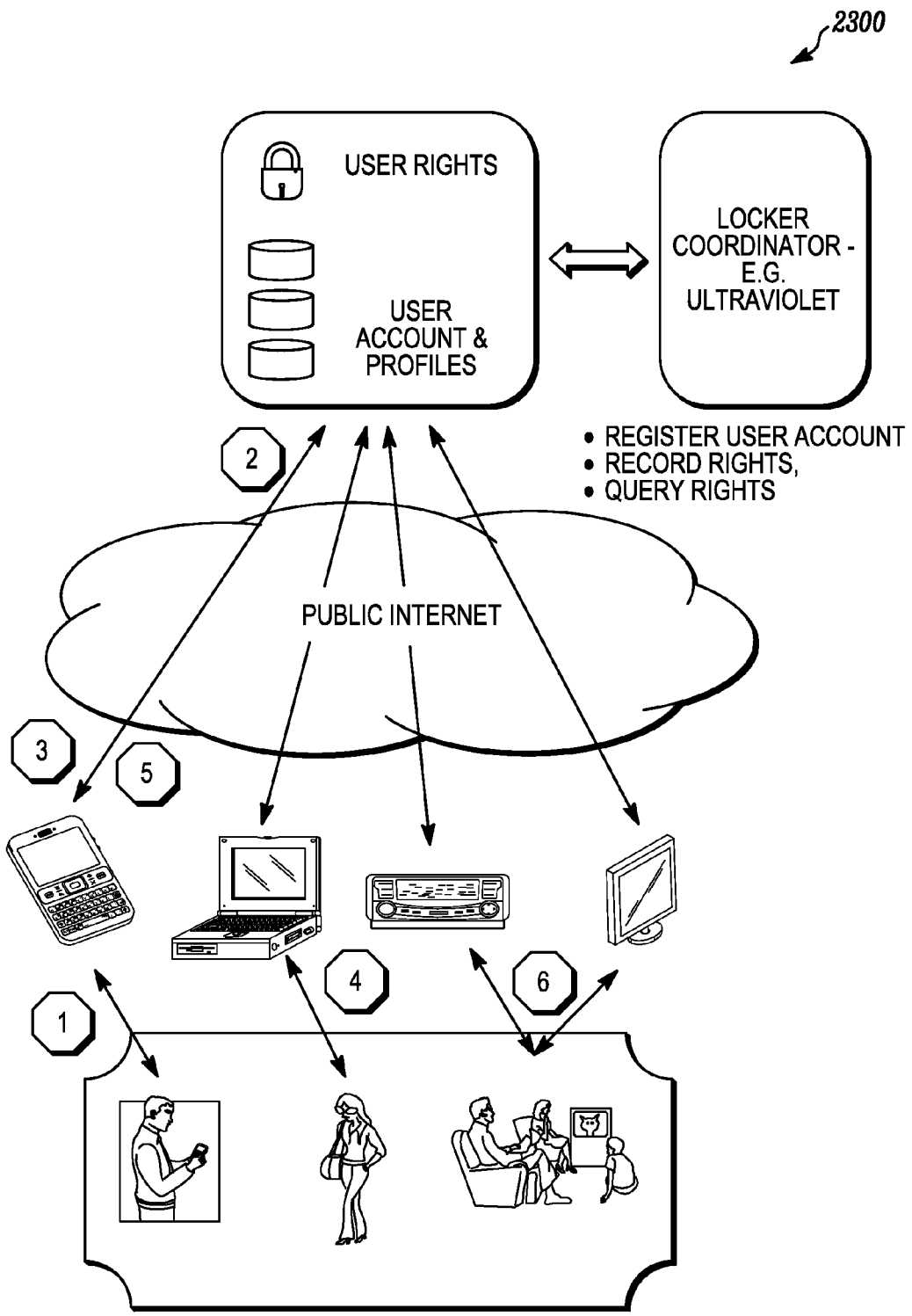
FIG. 23 depicts a sample usage scenario for the digital locker, according to an embodiment of the invention.

FIG. 23 illustrates a typical usage scenario for the digital locker. A user downloads the media application to his mobile device and creates an account for his family using the application. At the same time, the user associates his mobile device with the account.

The user then browses the catalog for content, rents a movie and begins watching the content on the trip to work. Meantime, his spouse uses the same account, accessing it through a personal computer, registers her personal computer, and rents a movie. She also begins viewing the new content.

In the meantime, the user has finished work for the day and begins returning home. While in transit, he watches the rest of the movie he selected that morning. Once at home, the family decides to watch a movie together. The family registers their set top box, select and purchase a movie, and begin watching. If the family does not finish viewing the movie, the child or other family member may continue watching the movie the following day on his or her personal device. The child or other family member has his or her own account, subject to a monthly allowance limit and parental controls. The family could opt instead to watch live streaming video of an ongoing event, or may opt for video on demand.

Figure 24:
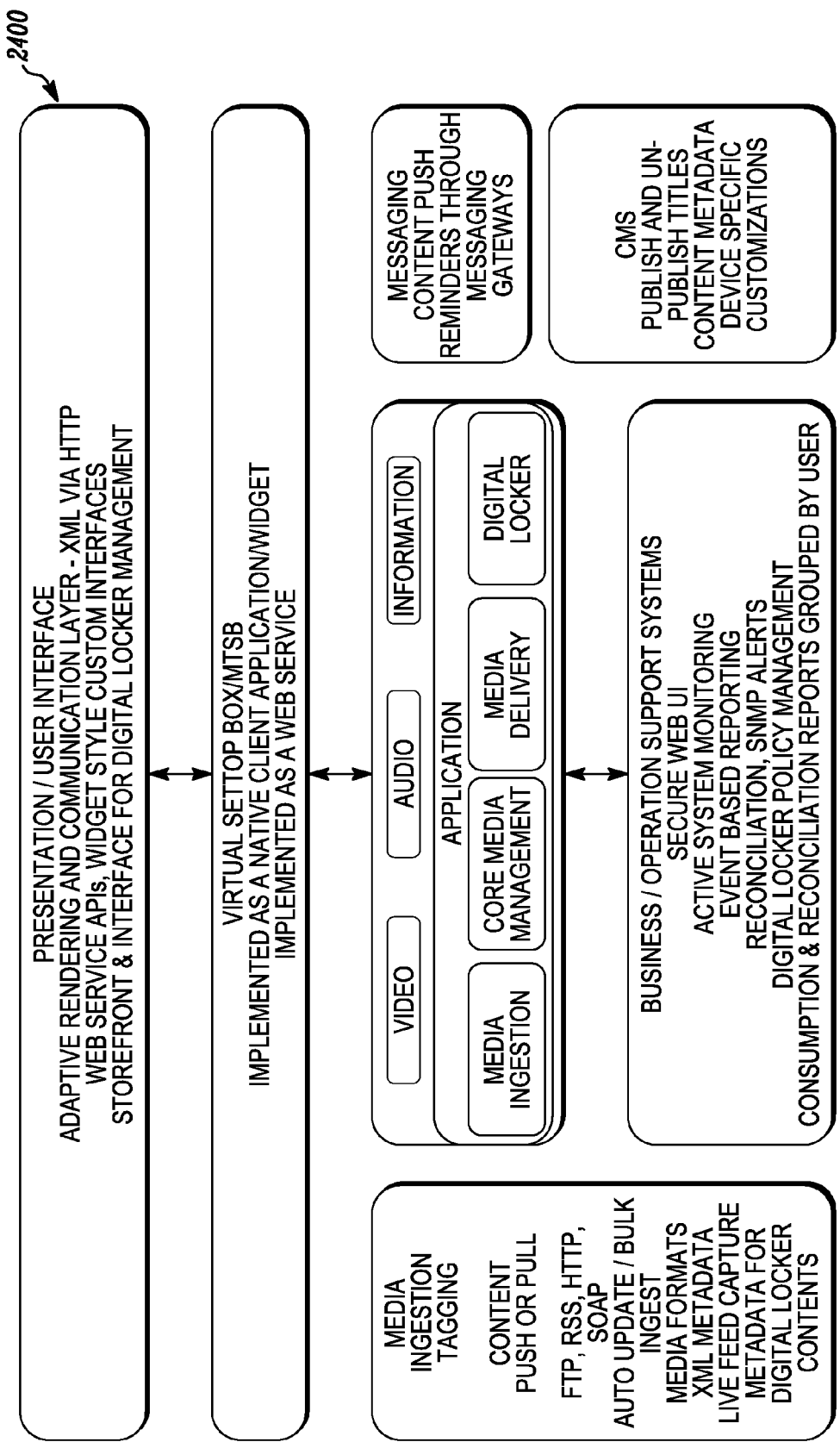
FIG. 24 shows the interfaces between a MSTB, digital locker, and associated support systems, according to an embodiment of the invention.

The description above pertaining to the application and digital rights management also applies and is integral to the concept of the digital locker. As described above, the application is an end-to-end platform that manages media, consumers, and transactions for mobile media delivery. This application platform includes the digital locker module. The digital locker module interacts with external components such as media ingestion, business/operations support systems, messaging gateways, and the presentation layer. FIG. 24 depicts a conceptual architecture of the complete system.

The user interface layer of the digital locker may be a client application that utilizes virtual libraries, widgets created for use within the system, or a secure web application programming interface (API). The web service API may also be used by another system wishing to implement a digital locker service, allowing service providers to offer the digital locker to subscribers. Using the API, the external system can implement a variety of features. These features may include, but are not limited to authorization and content entitlements for its subscribers. Administrators may monitor and configure the digital locker through a secure web user interface. The business support system layer allows for the conduct of event based reporting and handles reconciliation of data according the to the business rules imposed by the digital locker. This allows for the generation of usage reports grouped by user or device. The digital locker also may be interfaced with an external content management system (CMS) through the web service API provided by the digital locker. Thus, the digital locker functions as a portable media application.

The digital locker has a standards based interface allowing compatibility multiple applications used by a wide variety of device. In addition, multiple server modules provide associated services, including account management and billing. In addition the digital locker may be customized to operate with service providers, such as cable television, or wireless service providers.

The digital locker allows members of a family to purchase and share content among themselves and also supports multiple account users and multiple devices for each user. Each member may create a unique content queue and set multiple device profiles with all content being associated with the account, instead of the device. The digital locker maintains the playback state across multiple devices. In addition, the account administrator may set different controls for each registered user including accessible content, budget, and time restrictions.

Using the digital locker service begins with registration. The user launches the portable media application, or digital locker application for the first time after downloading it to his or her mobile device. The portable media application searches for user profile information on the local application folder on the device. A returning user may also select the "do not save my password" option and be presented with the login screen, just as a new user would. The login screen provides an option to register a new user. If the digital locker application finds a user profile, containing user details, the digital locker application authenticates the user and launches the digital locker home screen.

The digital locker application validates using cell tower or GPS technology that is available on the mobile device to note the current location, specifically country, of the user. The user's current country must be present in the list of allowed countries. If the user is not in an allowed country, the user is informed and taken to a screen where the user can view a list of titles, with no option to purchase or rent.

If the user wishes to register for the digital locker, the user selects the "Register Now" option and is taken to the registration screen. On the registration screen the user enters first and last names and an email identification for receiving communications about purchases, and content list updates. The user also supplies a date of birth, username and password.

If the system is implemented in a closed ecosystem (e.g. implemented by a carrier in their own ecosystem), the user details are already available with the service provider. In such a case, the user needs to input only the unique e-mail ID (used to register with the service provider) for registering to use the digital locker. The user is prompted to set a password. After this step, the user is taken directly to the device registration step.

The user then enters his residential/mailing address. On successful registration, the user is taken to the payment options screen. At the payment options screen the user enters credit card, payment service account information, or carrier information.

The next step is registering the user's device or devices. If the user's device is not already registered, the user is prompted to register the device. At that time, a unique device identification is generated by the digital locker application and is sent to the server. The user has an option to provide a device name to be included in the device registration. This allows a user to readily track the devices used and registered with the digital locker application. If the user elects not to register a device at that time, the user is directed to a screen where a list of titles may be viewed, with no option to purchase or rent. Normally, registration is a one-time step. Device registration is valid until a user manually de-registers the device. If registration is successful, the user is directed to the digital locker application home screen.

Alternatively, the user may login to the digital locker website on a personal computer. The registration rules, screens, and steps are as described above. The user location validation is done using geo-location information from the IP service provider.

Another alternative allows a user to register with the digital locker application server through a widget on an internet connected STB. The registration screen, rules, and steps are as described above. User location is performed using geo-location from the IP service provider.

Once a user has registered at least one device, a user may browse titles available for rent or purchase. To do this, the user launches the portable media application and is taken to a home screen that gives the user the following options: view a library listing of titles/assets that have been rented or purchase, a catalogue, account administration options, redeem a gift card, redeem a gift voucher or coupon that unlocks free moview or other content, and credit available information. This assumes that the user is logging in with a registered device.

If the user logs in with an unregistered device, the system detects the device and prompts the user to register the device as described above. If the user has already registered the maximum number of devices, the user is given the option to unregister one device. The user is then presented with a list of registered devices and may select one from the list to unregister. The chosen device is then unregistered.

The user then selects the library option from the home screen. The library displays thumbnails of all the titles the user it entitled to. There are three types of entitlements: rented titles, purchased titles, and titles available as part of a subscription package. A user may also have a season pass for renting or purchasing a group of titles.

For rented titles the user sees the following: rental period remaining, viewing period remaining, an indication whether the title has already been downloaded to the mobile or local device, playback modes (watch video and keep a local copy, or watch offline), a brief synopsis of the content, and ratings from other users.

For purchased titles the user sees the following: purchase date, year of release, an indication of whether the title is already downloaded to a mobile or local device, playback modes (as described above), brief synopsis of the content, and ratings from other users.

For each of the titles available as part of a subscription package, the user will be able to see the following details: year of release, an indication of whether the title is already downloaded to a mobile or local device, playback modes, brief synopsis of the content, and against each episode, an indication of whether the user has already watched it, either completely or partially, and ratings from other users.

The user then selects media list from the home screen. The media list screen displays the list of titles available to the user that may be either rented or purchased. Movies and television shows are displayed in separate lists. For each title the following information is presented: availability for rental or purchase, pricing details, discount details, if any, offer period (a default, such as six months, but may be set as desired), synopsis, ratings from other users, and the option to watch a trailer of the title. The user may also be presented with an option to buy a season pass for rental or purchase.

When a user opts to purchase a season pass, the user is entitled to multiple titles, including future titles not yet released, at one time. When new titles in the series become available the user is notified via email.

The account administration screen gives a user the options to: unregister a device, create a sub-account, either for a child or an authorized user, change email identification, and sign up for email updates.

If a user opts to unregister a device, the user is presented with a list of registered devices. The user selects a device to unregister and the digital locker application requests that the user confirm the selection, and then removes the device from the list. Similar operations are used for changing email accounts and payment options.

In the payment options the user has the choice of viewing a purchase history, or modifying or registering a new payment method. As described above, the user may pay by credit card, payment service, such as PAYPAL, or opt for carrier billing.

The user may also opt to redeem a gift card. The user enters the gift card number. The credit amount is immediately updated and displayed to the user on the user's home screen. The user may also opt to redeem a gift coupon or voucher on the home screen. The gift voucher or coupon unlocks titles available for free once the user enters the number found on the voucher or coupon. The user is taken immediately to the title page of the new content.

The digital locker also provides mechanisms for the creation and management of policies for media content consumption. Media content consumption occurs in two parts, the user interface console and the backend policy management. The system administrator uses an application console to set policies for the digital locker. The administrator has multiple choices of policy categories: content consumption policies; catalog listing policies, and others.

In operation, the administrator selects the content consumption category. In this screen section the administrator chooses from rental and purchase policies, device policies, and location policies. In addition, a time zone policy governing accessibility based on the user's time zone may also be available. The time zone policy is designed to allow users to access media content only when their time zone is authorized. This prevents users with subscriptions from viewing content before it would be shown, perhaps on television, in their area. If the rental policy is selected by the administrator, the administrator inputs the offer period, availability period, and viewing period. If the purchase policy is selected the administrator inputs only the offer period. Values entered by the system administrator take precedence over the values that were ingested when the media content was loaded into the application. The administrator selects the titles of the media content to apply the policy. Titles may be selected individually or based on category. Some examples include: titles from one content provider; titles ingested or added to the system between specified dates. After making selections, the administrator selects "Apply Policy" and the policy is applied.

The administrator may also choose device policy and may create a new policy. This is done by selecting "create new policy" and selecting the type of policy. The administrator chooses between restricting playback and allow playback. The next step requires selection of the device class, which involves selecting from mobile devices, computer, set top box, and gaming consoles. In addition, an exhaustive list of devices is included in the device class listing. The target device class is selected as well as the target titles, and the policy is applied.

Location, naming, and catalog listing policies are also modified in the manner described above. Custom categories, depending on system administrator needs and preferences, may also be created using the same method.

The digital locker system also allows the administrator to create reports and may specify the criteria to be used. Reports may be generated for the overall system, or for specific user groups, or for specific devices or platforms.

Catalog management is an important part of the digital locker functionality. The digital locker provides a customized and dynamic listing of titles based on context. In addition, options for pricing and discounts at the clip level are provided. Catalog management may also interface with an external billing module.

When a user logs in to the digital locker, the user sees a virtually unlimited quantity of titles available for purchase or rent. Each user is presented a customized catalog based on the user's profile, viewing history, time of day, day of week, and billing address. A search box is provided for the user to discover content of choice. The user may also select a preferred category. Search results are provided to the user. These search results allow a user to select a title and be taken to the corresponding title home screen to find out more about the selection. While on the title home screen the user may view ratings from other users and review comments. A user may opt to rent or purchase the title and makes the selection at the title home screen.

Discovery features may also be provided as part of catalog management. The user may see a "Recommend Videos" screen on the media list screen. Here, the user may review what is new, being watched now, and featured titles. This presentation may also be made in the context of what's hot, a top ten, category, and time.

A consumption profile (including a device profile, user profile, network profile, encoding profile and DRM profile), unicast/multicast/broadcast seamless switching, advanced encoding/transcoding, automated content tagging, pause and resume and mediation and settlement, all as described herein, may each be related to, consider, incorporate, affect or be affected by a pseudo-hardware device identifier, protecting different segments of content through different means, blending different methods of protection, such as encryption and scrambling, and location and time zone based logic, all as described herein.

The digital rights management systems and methods described herein may affect and be affected by a consumption profile 102. A consumption profile 102 may represent an ability to automate, optimize and tailor delivery of content over a network. In an embodiment, a network may include a wireless network. A consumption profile 102 may allow for characteristics, such as device characteristics, network characteristics and the like, rules, such as operator rules and the like, user preferences and the like, location characteristics and the like, date-time characteristics, content restrictions and the like to be applied. A consumption profile 102 may allow the platform to match up content, with devices and users over the network. The consumption profile 102 may take into account static and dynamic information, as described herein. The consumption profile 102 may be used to determine the manner in which content is presented and delivered to the end user, including by impacting ingestion 118, encoding/transcoding 104, delivery, search, recommendations and personalization, including for content delivery, targeted content, including ads, as well as permissions and the like. The consumption profile 102 may interact with and be implemented within a distributed architecture. The consumption profile 102 may be used with tagging 108 and to enable snacking behavior in which the end user consumes short audio and video clip content, as well as consumption of long-form content such as full length movies and the like. In certain embodiments, tagging 108 may be used to enable the snacking behavior. The consumption profile 102 may allow for optimization given limited screen real estate.

Figure 25:
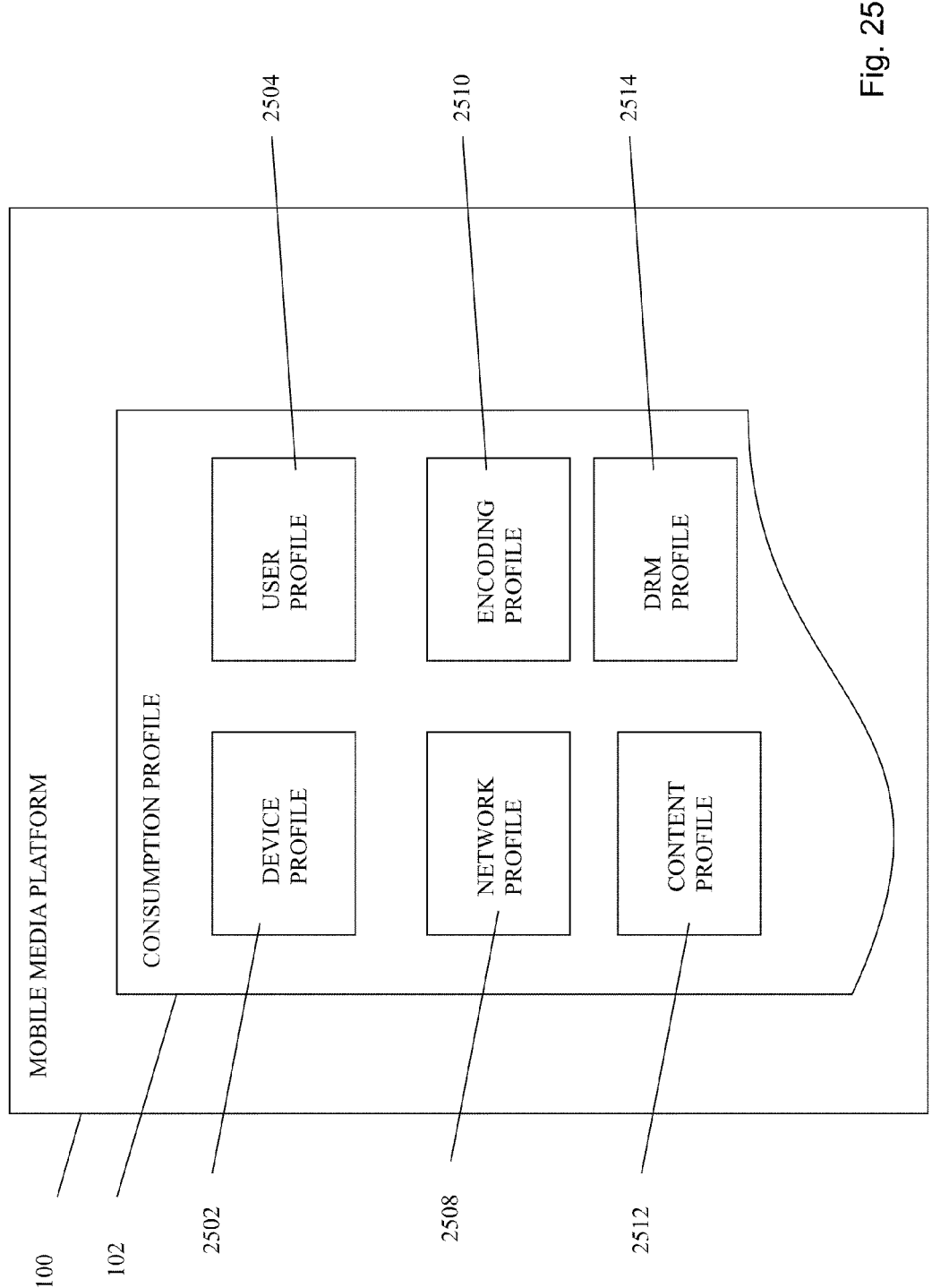
FIG. 25 depicts an embodiment of a consumption profile in a mobile media platform.
Figure 26:
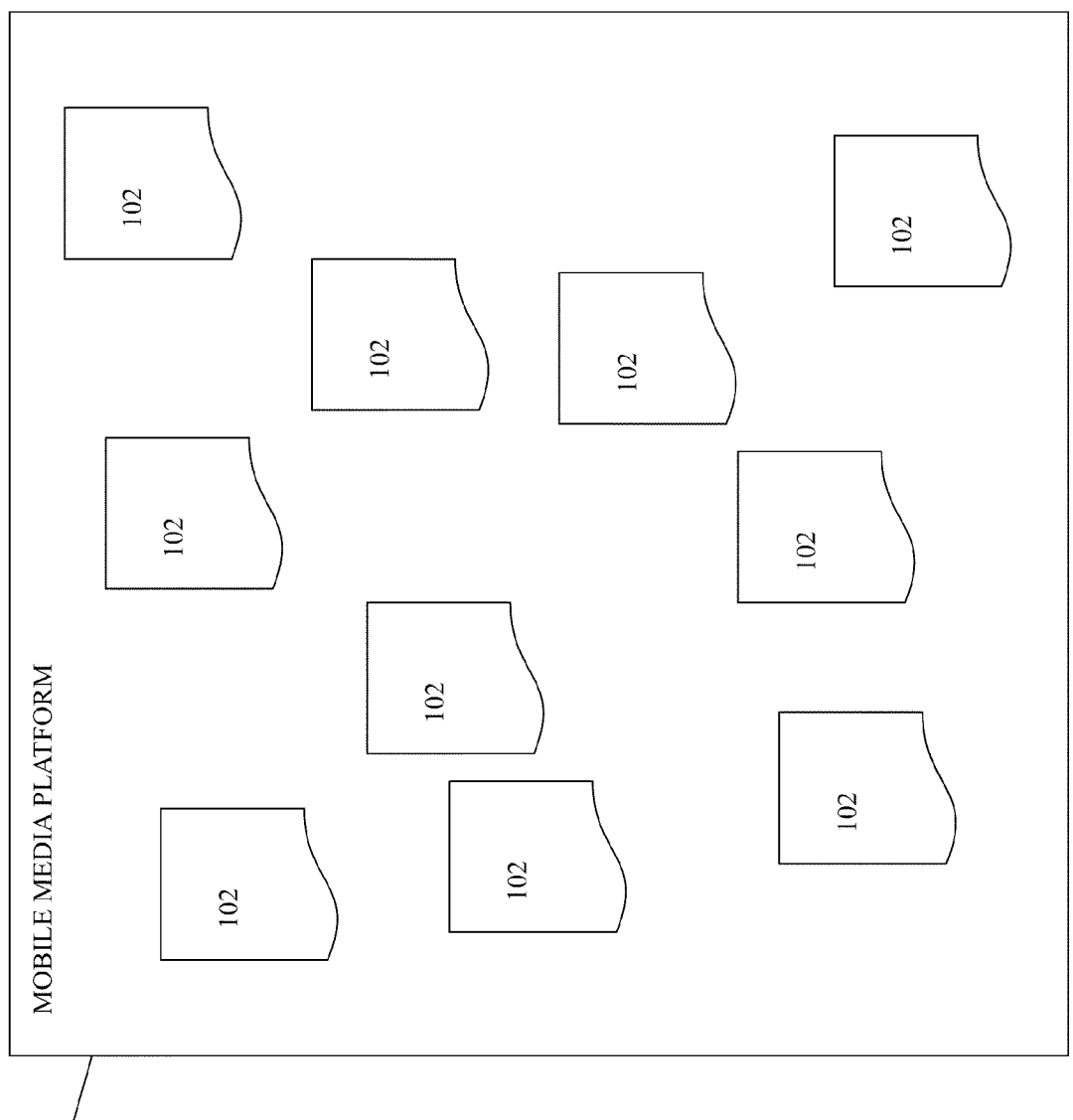
FIG. 26 depicts an alternate embodiment of the embodiment of FIG. 25.

Referring to FIG. 25, a mobile media platform 100 may include a consumption profile 102 which may include a device profile 2502, user profile 2504, network profile 2508, encoding profile 2510 and content profile 2512, each as described more fully herein. Referring to FIG. 26, a mobile media platform 100 may include a plurality of consumption profiles 102. As an embodiment, a consumption profile 102 may be pluralized. Many consumption profiles 102 may be pre-configured for a mobile media platform 100. A consumption profile 102 may take the form of a number of combinations of rules that together form the presentment and best quality of service delivery to the user. Through awareness of the environment, a consumption profile 102 may be selected for use. The encoding profile 2510 may take into account preferences and requirements related to digital rights management. In an embodiment, the encoding profile 2510 may encode content in particular formats, subject to particular encryption based on the pseudo-device identifier, as described herein. In embodiments, encoding profile 2510 may encode content in segments and allow rights for each segment to be protected through various means, as described herein.

The consumption profile 102 may encompass the encoding profile, as described herein. The consumption profile 102 may encompass the device profile 2502, as described herein. The consumption profile 102 may take into account variations in input file types and supported file types. The consumption profile 102 may encompass the network profile, as described herein. The network profile 2508 may include information regarding network usage rules, maximum bandwidth, IP addresses and the like. The consumption profile 102 may encompass a location profile including current and historical and future predicted location information and location intelligence 148. The consumption profile 102 may encompass current and historical and future predicted date-time and content restrictions profiles and/or information.

The consumption profile 102 may take into account and/or impact the user interface. In an embodiment, the consumption profile 102 may impact the sliders, menus, polls and the like included in the user interface 140. The consumption profile 102 may take into account location information, as described herein. The consumption profile 102 may also take into account user preferences, as described herein. The consumption profile 102 may aggregate and/or take into account any of the characteristics, factors and the like discussed herein.

A consumption profile 102 may represent an ability to automate, optimize and tailor content delivery and may be related to a device profile 2502. A consumption profile 102 may reference a device profile 2502, may include aspects of the device profile 2502, or may include a plurality of device profiles 2502. A consumption profile 102 may take into account device features that may be included in a device profile. Device features may be determined by looking at a device, such as a device connected to a network. Device features may include, without limitation, screen resolution, network support, media format support, delivery format (e.g. streaming, http, and the like), and any hardware or software aspect of the device (e.g. memory size, browser software version, and the like). A device profile, and device features may be determined from a device user agent profile xml document, such as a profile that complies with UAProf as defined by the Open Mobile Alliance. Accessing a UAProf compliant user agent profile may include receiving, from the device, a URL identifying a network location of the profile. To facilitate creating and maintaining consumption profiles 102, a registry of user agent profiles or device profiles 2502 may be established by the platform for each device. A user agent profile may be combined with a unique identifier for a specific device, such as a device serial number, to further facilitate establishing and maintaining consumption profiles 102.

The registry of device profiles 2502, such as a registry of UAProf, may be structured to facilitate consumption profile 102 generation and application. The structure may include rule sets, decision trees, relational databases, and the like. The structure may provide support for application level configuring of the mobile media platform 100 to conform to a consumption profile 102. In an example, available content may require a minimum display size. The media platform may use the device profile 2502 registry rule set to quickly determine if the available content may be delivered to the device. A content provider may benefit from a structured registry of device profiles 2502 by identifying combinations of features that may facilitate the content provider preparing content that is readily delivered to the device. A device profile 2502 component of a consumption profile 102 may be beneficial in that standardization of mobile devices may be lacking The device profile 2502 may include a pseudo-hardware unique device identifier as described herein, which may be based on whole or in part on hardware, software, operating system, technical specifications and other features of a device. A device may be a mobile device or any other device such as a computer or set top box.

A consumption profile 102 may be related to a network profile. A consumption profile 102 may include one or more network profiles 2508, or aspects of one or more network profiles 2508 that may affect consumption by devices connected to the network. The platform may define network profile 2508 aspects that may be included in the consumption profile 102. Alternatively, the platform may convert network provided profile aspects to a platform preferred format. Converting network provided profile aspects may allow the converted data to be used across a plurality of consumption profiles for devices on the network. Network profiles 2508 may be different for different wireless network technologies. Consumption profiles 102 may need to reflect these differences to best utilize the network technologies. Each wireless network technology may provide different capabilities that may affect consumption by devices. Operators of networks may have preferences for which of the features and capabilities associated with a given network technology they enable through their network operations. Although a network technology may support a particular capability, the network operator may not want to provide this particular capability or may restrict the capability to certain users, such as users who pay a premium for the capability. In this regard, a consumption profile 102 may include network technologies and network operations rules as part of a network profile. Therefore a consumption profile 102 may abide by or enable enforcement of network usage rules by including the network profile. In an example, a consumption profile 102 may include requiring bandwidth sharing if the network operator or carrier indicates any one user cannot use the entire network bandwidth capability. In another example, network operators may identify maximum file size limits for files being delivered over the network. This limitation may result in a file size maximum identified in the consumption profile 102 that is smaller than that which could be sent over the network technology and smaller than the connected device could support. In another embodiment, the network profile 2508 may indicate requirements in connection with using a blend of encryption, scrambling and other content protection methods as described herein.

A network profile 2508 may communicate to a consumption profile 102 other network operator or carrier rules, preferences, and guidelines such as network preferred display resolution. A single preferred resolution may be included in a network profile 2508 or a plurality of preferred resolutions may be communicated to the consumption profile 102. Bandwidth demand on a network may vary and therefore the consumption profile 102 may include parameters by which the platform may determine what portion of the bandwidth to utilize. In an example, network bandwidth available for advertisements during a peak period may be limited more than during non-peak periods. The consumption profile 102 may include network peak period constraints so that media content delivery may conform to the changing constraints. In an example, a network operator may impose constraints on file size during peak periods and the platform may recognize the change in constraints from the consumption profile 102 and therefore adjust delivery accordingly.

Other factors that may be included in network profiles may also be included in or impact the consumption profile 102. These other factors may guide the fulfillment of objectives of the platform and facilitate optimal utilization of the network capabilities. In an example, cost of bandwidth may be another factor. Cost of bandwidth may be represented by cost per kilobyte of data delivered over the network. To achieve a cost objective of the platform such as the aggregate cost of bandwidth, the platform may self-limit bandwidth usage based on the cost of the bandwidth. In another example, the factor may be IP address and IP addresses for certain locations may be subject to rules that differ from those applied to other areas. The consumption profile 102 may also assist with selecting among various networks that may be available. In an embodiment, the consumption profile 102 may help with the selection among the following networks for consumption of media on a mobile device: operator cellular based, wireless broadband, wireless narrowband, short range limited bandwidth (such as BLUETOOTH) and the like.

The consumption profile 102 may represent abilities of a mobile media platform 100 that encompass various capabilities of networks and devices. The consumption profile 102 may represent a union of mobile device features and limitations with network features and limitations. The consumption profile 102 may represent an intersection of the mobile devices and the network. The consumption profile 102 may alternatively include all devices features and all network features, including device features not yet supported by the network, and network features not yet supported by the device, thereby creating a highest common feature denominator associated with platform. The highest common feature denominator may be established from a network profile, a device profile, or a combination, such as a network profile 2508 and a plurality of device profiles.

A combination of a device and a network may be uniquely associated with a consumption profile 102. Such a unique combination could facilitate automatically setting the device, determining an encoding scheme, selecting or generating a consumption profile 102, and the like. The unique combination of a device and a network may further facilitate identifying the features of the combination such that the features may be automatically applied to generate a consumption profile 102. In an example, a uniquely identified device, such as may be determined by querying the device on a network, may support display features that can be associated with the network profile 2508 to enable delivery of high resolution content. A consumption profile 102 may exist for this unique device/network combination. A consumption profile may also consider the pseudo-hardware device identifier as described herein. To utilize the relevant consumption profile 102, the device display features may be automatically enabled through the network and content may be managed to comply with the consumption profile 102, thereby enabling the delivery of high resolution content to the device over the network.

Automatically setting or adapting a device may be facilitated by a comprehensive adaptor mechanism that may support a variety of configurations of devices, networks, content, and the like that may be available now or in the future. A comprehensive adaptor mechanism may also identify a device on a network that may support content available for delivery, such as by matching up the aspects of the available content with relevant aspects of the device profile. Based on the results of the match-up, the comprehensive adapter mechanism may signal the device, such as through the network, to adapt the phone settings to enable receiving the available content. In an example, if content is available for delivery over a network in a specific encoding and a device on the network is identified to include features that support the encoding, the comprehensive adapter mechanism may interact with the device to enable the features that support the encoding of the available content. A beneficial match-up may be tagged 108 as a rule that represents a content profile. The rule may be provided to a device and when the device re-enters the network, the relevant features can be activated to facilitate receiving delivery of the content. Alternatively, the rule may be applied during content delivery rather than being embedded in the device. The comprehensive adapter mechanism may match up content with devices, users, locations, time of day and the like.

A consumption profile 102 may determine factors associated with delivery and presentation of content. The factors may be related to features of the mobile media platform 100, such as ingestion. The impact of a consumption profile 102 on ingestion may include affecting what content is ingested 118, how the content is ingested 118, ingestion frequency, ingestion preferences, ingesting the same content from multiple sources, and the like. A content profile 2512 may be generated from the consumption profile 102 that may be used as a template for content sourcing, ingestion 118, and creation.

A consumption profile 102 may impact what content is ingested so that the platform may preferably ingest content that is compatible with the consumption profile 102. Because the platform may only ingest content that is compatible (or can be adapted to be compatible) with currently applied consumption profiles 102, different content may begin being ingested when a suitable consumption profile 102 is applied. A consumption profile 102 may impact how content is ingested. In an example, content ingestion may be adjusted based on the available resolution of a device associated with a consumption profile 102. If a high resolution device connects to a network being serviced by the platform, the associated consumption profile 102 may indicate to the platform to ingest high resolution content for delivery to the device. A consumption profile 102 may impact how often content is ingested. Ingestion frequency may be based on aspects of the consumption profile 102, such as how many concurrent devices are utilizing the consumption profile 102. Ingestion preferences may be impacted by a consumption profile 102. A consumption profile 102 preference for small video clips may impact the ingestion preferences so that small video clips are ingested for delivery to devices to which the consumption profile 102 is applied. Content may be available for ingestion from a plurality of sources and there may be differences among the sources that relate to consumption (e.g. resolution). A consumption profile 102 that supports high resolution may be applied when a high resolution device connects to a network serviced by the platform so content that is being ingested from a low resolution source may be complemented with the same content being ingested from a high resolution source. A consumption profile 102 could interact with a content delivery network to instruct on the most ideal source location for delivery of the content.

Encoding and/or transcoding 104 may be impacted by a consumption profile 102. Encoding may target a consumption profile 102 to facilitate delivery to devices to which the consumption profile 102 applies. A consumption profile 102 may manipulate the content via encoding 104 so that encoded content conforms to the consumption profile 102 content delivery requirements. A consumption profile 102 may relate encoding with content availability so that content that is not available in an encoding compliant with the consumption profile 102 may not be visible to the user. Such content may not appear in search results. Alternatively, the content may be indicated as available but not viewable through the user device. The consumption profile 102 may identify alternatives for presenting content that is not available in the applicable encoding. In an example, the consumption profile 102 may indicate that text from the content be delivered. In another example, the consumption profile 102 may indicate an alternate encoding, such as a composite type that may be partially compatible so that at least some of the content may be presented to the user. The user may be presented with an option to move to another alternate encoding 104 to view content that is incompatible with the encoding indicated by the consumption profile 102, such as by transcoding 104 the content. The user may not notice an automatic change defined by a quality of service level policy and the like. The user may be charged an additional fee for this option. The user profile 2504 that may be associated with the consumption profile 102 may include preferences or restrictions associated with such an option. These restrictions or preferences may be related to parental controls, blocking techniques, fee limits, monthly charge limits, content rating, and the like. The user profile 2504 may include the pseudo-hardware device identifiers relating to the user. The user profile 2504 may also contain the typical locations, areas, time zones and the like associated with a user.

A content encoder 104, such as an encoder 104 of the mobile media platform 100 may include the consumption profiles 102 to facilitate providing encoded content that meets the consumption profile 102 requirements. A method of getting an encoding 104 ready for consumption may be impacted by the consumption profile 102. Encoding required by the consumption profile 102 may require specific tools to be applied to the content to provide the encoded format. An identification of the required tools, methods, and the like may be included in a consumption profile 102 so that an encoder may determine which tools to use.

Encoding prioritization may be impacted by consumption profiles 102 in that encoded content may be stored and forwarded to network operators so the content may be readily available when needed to be delivered. Encoding 104 may be performed on an on-demand basis based on a consumption profile 102. The platform may determine encoding 104 required at time of request based on conditions of the device, network environment (such as type and bandwidth), decoder format available on device and the like.

A consumption profile 102 may indicate support for real time delivery so a source that provides real time encoded content may be associated with the device to facilitate delivery of real time content.

The consumption profile 102 may impact delivery. Delivery may be optimized for mobile consumption as may be determined from the consumption profile 102. Optimizing factors may be based on a consumption profile 102 such as factors that vary for each individual application of a consumption profile 102. Each individual application of a consumption profile 102 may represent an individual usage session with factors associated with it such as location, user preferences, time of day, available network bandwidth, and the like. Other factors associated with a consumption profile 102 that affect delivery include device playback capabilities, device content delivery mechanism support, content digital rights management regime, content characteristics, and the like.

A consumption profile 102 may contain device capabilities and the device capabilities may impact delivery optimization. Device audio and video playback capabilities may require specific CODECs to facilitate optimized delivery. To optimize delivery the consumption profile 102 may identify device attributes that may vary from device to device such as screen size, color depth, memory, CPU power, content receiving methods, network support, bandwidth support and the like.

A consumption profile 102 may identify one or more delivery methods supported by the network and device to which the consumption profile 102 is being applied. Delivery methods such as streaming, download, progressive download, MMS, WAP push, and the like may be associated with an application of a consumption profile 102 and therefore may impact the method of delivery.

The consumption profile 102 may have an impact on search and recommendations. Search may be impacted in that results returned from a search may be constrained to content that may be delivered in compliance with the consumption profile 102. One or more search terms may be automatically inserted in a user search query to automatically limit the search to compliant content. Alternatively, search results may be post filtered or ordered based on the consumption profile 102. The consumption profile 102 may impact search and/or recommendations based on user preferences or other data that may be related to the user, a user profile, a device profile, a network provider, and the like. In an example, a search for Orioles, Cardinals and Blue Jays requested by a sports fan who may subscribe to sports content packages may be impacted by the consumption profile 102 associated with the user, so the search results are ordered and/or filtered so that results related to sports teams (e.g BALTIMORE ORIOLES, SAINT LOUIS CARDINALS, TORONTO BLUE JAYS) appear ahead of general results related to birds. The consumption profile 102 may include the additional search terms. The consumption profile 102 may include a redirection to a search engine that optimizes search results for the device and network associated with the consumption profile 102. Recommendations, such as may be provided from a recommendation engine, may be impacted by the consumption profile 102 so that the recommendations adhere to any limitations included in the consumption profile 102. In an example, a recommendation for viewing a presidential candidate debate may be different for a device with limited video display capability or bandwidth than for a device with high speed bandwidth. The consumption profile 102 may include guidelines, preferences, and requirements that may be provided to a recommendation engine for making recommendations.

A consumption profile 102 may be associated with tagging. Tagging may include tagging content, keywords, metadata, and the like. A tag may include a reference to one or more consumption profiles to which the tagged content complies. A consumption profile 102 may include one or more tag IDs that identify content supported by devices and networks to which the consumption profile 102 applies. Tagging 108 may be an alternate for identifying within a consumption profile 102 each type of content that complies with the profile. A tag may combine content attributes, such as encoding 104, resolution, and the like so that the tag can be examined to quickly determine if the content complies with the consumption profile 102. A consumption profile 102 may include a list of valid tagging methods, such as RSS.

The consumption profile 102 may be used with tagging and to enable snacking behavior in which the end user consumes short audio and video clip content, as well as consumption of long-form content such as full length movies and the like. In certain embodiments, tagging 108 may be used to enable snacking behavior.

The consumption profile 102 may be linked to level-driven encoding 104 based on quality of service and may be linked to the user's presence and availability and preferences relating to the user's presence and availability. Level-driven encoding 104 may involve adjusting and affecting the encoding process in order to achieve certain levels or values for certain parameters. In an embodiment, a parameter may be frames per second and the resolution and sampling rate of the encoding 104 may be varied to ensure a certain minimum frames per second even during periods of network congestion or across slower regions of the network.

The consumption profile 102 may take into account file types, such as types of files that may be delivered to a device. A consumption profile 102 may include a list of supported file types that may meet one or more network or device profile 2502 requirements. Alternatively, file types may be parameterized based on device profile 2502 features to facilitate easy cross reference of file types to device features. A list of supported file types may facilitate determining the applicability of a newly provided file by providing a readily accessible mechanism for comparing the file type of the new file to the list of supported file types. A new file type that includes parameters that match a minimum number of parameters of supported file types may be determined to be supported and may be added to the list. In an example, a new file type that is encoded such that the encoding is not supported by networked devices associated with the consumption profile 102 may only need to be transcoded 104 to be included in the supported file type list. A file type that is not supported may require different ingestion 118 parameters or processes to be supported by the consumption profile 102. A consumption profile 102 supported file type list may include standard file types that may be identified by their extension, such as .mp3, .wav, .mov, and the like. File types that may be supported may include, without limitation, 3GPP (MPEG4 Level 0/Level 1 and H.263 video codecs with AMR-NB, AMR-WB, AAC audio codecs)—mobile video transport format; AVI (RAW, MPEG1/2/4 and Huffman codecs)—Audio Video Interleave format; WMV/ASX/WMA (v.7, v.8., v.9)—WINDOWS Media format; M2A, M2V, M2T, M2P, M1A, M1V—MPEG1/2 streams format; MOV (Sorenson codec)—QUICKTIME video format; WAV (PCM, 16 bit, 8 bit, 8-48 kHz)—Uncompressed audio files format; AMR, MP2, MP3, AAC, RIFF, OGG—Compressed audio files format; and BMP, JPEG, GIF, PNG—Image files format. By using standard extensions, a consumption profile 102 may be configured to support all .mp3 files. Delivery protocols may include HTTP, RTSP, RTP, MMS and the like. In an alternative example, a consumption profile 102 may identify a .mp3 file as supported only when it is encoded 104 with a preferred encoding bit rate. A consumption profile 102 may impact a user interface of a device to which the consumption profile 102 is being applied. The consumption profile 102 may include user interface parameters that a device may apply to a user interface. When a consumption profile 102 is being applied to a device, the device may automatically adjust the user interface to comply with the user interface parameters of the consumption profile 102. Parameters may impact any aspect of the user interface, such as sliders, menus, polls, screen usage, and the like.

A consumption profile 102 may include rules associated with location information about a device connected to a mobile network. Location rules included in a consumption profile 102 may facilitate taking broadcast rights into account. In an embodiment, the consumption profile 102 may enable blackout zones for a sporting event. For example, mobile devices within 60 miles of an arena may be not be permitted to receive video from a sporting event occurring in the arena, unless the event is sold out. The restriction may be enforced by the platform through transcoding so that video content or composite content that includes video of the event may be delivered without the video component. Location information in connection with a consumption profile 102 may be associated with the pause and resume functionality of the platform. In another embodiment, location information concerning another device may be used to impact the content delivered to the user's device. For example, if a user is out with his wife near dinner time, advertisements concerning nearby romantic restaurants may be delivered to the user's device. In another embodiment, proximity information may be used to delivery ads or other content, such as to promote local businesses. A consumption profile 102 may include a user preference to deliver content associated with devices within a certain proximity to the user's device. In an example, a user agreeing to meet someone for drinks may receive content, such as from public information sources, about the person when the devices are within a predetermined proximity. A business may enforce consumption profiles for devices provided to employees so that confidential information is not presented to a device that is outside a security area of the business. The consumption profile 102 may identify a plurality of security areas, such as remote offices, a home office, a headquarters, and the like.

Broadcast rights may be supported by a location based aspect of consumption profiles 102. A user within a broadcast area may receive content from a local source when the device is determined to be within a broadcast range of the local source. In an example, a user may view a NEW YORK YANKEES game through a local affiliate in Portland Me. when the user is in the broadcast range of the affiliate. Likewise, the same user may receive the NY Yankees game through a San Francisco affiliate when the user is in broadcast range of that affiliate. In this way, local broadcast rights may be maintained as availability of content expands.

Consumption profiles 102 may be associated with device location based technology. A consumption profile 102 associated with a user who uses a device with GPS, compass-based, or cellular based location technology may take advantage of the technology. In an example, a device with GPS based location technology may receive content based a direction of movement of the device. As a user with the device walks along a street, the consumption profile 102 may direct content gathering to acquire content related to places or people that the user may come upon located in the vicinity of the direction of the user.

Preferences, such as user preferences, may be included in a consumption profile 102, and may facilitate the platform complying with the preferences. Applying a consumption profile 102 may result in preferences that are defined in the profile being automatically applied. Preferences that may be included in a consumption profile 102 may include user preferences, cost caps, content item fees, monthly cost cap, fee cap on bandwidth, and the like. Preferences may be automatically enforced by the platform so that cost cap preferences are carefully monitored to ensure costs are not exceeded. In an example a user may specify preferences associated with media video quality. The user may prefer high quality videos and low quality advertisements, high quality sports, medium quality news, and the like. In another example, a user preference, such as maximum download or transfer time may be configured in a consumption profile 102 and, when applied, may determine delivery method selected. If a cellular network download would exceed the preferred maximum download time, then the download may be performed through a wireless broadband connection. In an alternative embodiment, the user may be prompted and offered the option of performing the download for an extra charge or as part of an upgraded subscription. User preferences may include favorite actors, sports, sports teams, artists and the like.

A content profile 2512 may be derived from a consumption profile 102. A content profile 2512 may identify aspects of content that relate to delivering content to a device to which the consumption profile 102 is being applied. Aspects of content that may be in a consumption profile 102 that may be useful in identifying content may include content type (including, without limitation, long form, short form, advertisements, talking head, sports and the like), metadata, content analysis, content tag, content ingestion process, content encoding and the like. The profile of content may be determined from one or more of the aspects described above. A content profile 2512 may identify the types of encryption and digital rights management to be applied to certain content. For example, the content profile may provide that content is to be divided into segments of a certain size and each segment is to be protected with a different access key or in a different manner, as described herein. The content profile may also provide for the application of location and time zone based logic to be applied to the content and access thereto, as described herein.

A DRM profile 2514 may be associated with a consumption profile. The DRM profile may provide for the types of digital rights management systems and methods, as described herein, to be applied to content and delivery of that content to a device. The DRM profile 2514 may be linked to a digital locker, as described herein. The DRM profile 2514 may consider or incorporate a pseudo-hardware device identifier, protect different segments of content through different means, and blend different methods of protection, such as encryption and scrambling and location and time zone based logic, all as described herein.

A consumption profile 102 may be associated with use cases. Use cases associated with a consumption profile 102 may include a user experience with a carrier, an application, a video service model, providing content to a carrier, delivering content in any network condition, and the like. A user experience associated with a consumption profile 102 may be related to a carrier so that a user experience that is tied to a carrier may be attributed to the consumption profile 102. Parameters associated with the carrier and included in or related to the consumption profile 102 may determine aspects of the user experience, such as user interface 140, access to network capabilities, content availability, and the like. A user may experience unacceptable performance if a carrier has established bandwidth limitations for the user or the user's device type in a consumption profile 102 being applied by the mobile media platform 100.

A consumption profile 102 may be associated with an application. An application may require device features that may be specified in the consumption profile 102. Content, such as interactive content, may include one or more applications or may require one or more applications to be operating on a device to access certain features of the content. The consumption profile 102 may be adapted to include appropriate reference to applications so that content that requires the applications may be sourced and delivered to the device. A consumption profile 102 may identify applications that enable features of a device, such as broadband access. Through identification of such applications, the consumption profile 102 may facilitate automatically configuring a device. In an example, when a device first connects to a network, the device may be queried to determine the most appropriate consumption profile 102. The carrier may automatically configure the device through the network to support the network and delivery features associated with the consumption profile 102 to provide the best user experience while connected to the network. The carrier may apply a consumption profile 102 that provides premium features at no charge to a new user on the network, such as during a free trial period.

A consumption profile 102 may be associated with a video delivery service. A video service may utilize consumption profiles to determine a video delivery model that would comply with the consumption profile 102. The video delivery service may utilize the consumption profile 102 to increase market share by making their video delivery service available to all uses associated with the consumption profile 102. A consumption profile 102 may include a directory of video services that deliver video content that complies with the profile so that a user of a device to which the consumption profile 102 is being applied, may utilize the directory to select one or more video delivery services. An advantage of such an approach is the device user does not have to review video service device and network requirements when searching for and selecting a service.

A consumption profile 102 may be associated with providing content to a carrier. A carrier may need to balance user wants of always best quality and always being available. One approach to providing the best quality may be for the carrier to always apply the best consumption profile 102. To balance availability the carrier may apply an alternate consumption profile 102 that may support adapting delivery based on network bandwidth constraints. In an example, an alternate consumption profile 102 may facilitate ensuring a video advertisement is delivered—as a high resolution video when bandwidth is available, as a low resolution video when bandwidth is limited or as a pop-up banner advertisement instead of a video when network quality is low. A banner advertisement may include text, a static image, a dynamic image, active content, and the like. A consumption profile 102 may be associated with viral sharing of content. In an embodiment, a consumption profile 102 and/or user profile 2504 may include destinations and other users for sharing of content. The destinations and users may include portals, communities, friends, families, business connections and the like.

A consumption profile 102 may be associated with primitives, composites, and marketing types. The platform may be adapted to facilitate delivery of each type of primitive which may be identified by the consumption profile. The consumption profile 102 may also identify which composite form to deliver from a plurality of composite forms of content available. By determining primitive related aspects of the network and the device from the consumption profile 102, the platform may self-select content composite form, generate or form the primitives, and deliver them to a device in a manner that is no different than accessing the content on the web.

A consumption profile 102 may be associated with tagging. Tagging 108 may include tagging content, keywords, metadata, and the like. A tag may include a reference to one or more consumption profiles to which the tagged 108 content complies. A consumption profile 102 may include one or more tag IDs that identify content supported by devices and networks to which the consumption profile 102 applies. Tagging 108 may be an alternate for identifying within a consumption profile 102 each type of content that complies with the profile. A tag 108 may combine content attributes, such as encoding, resolution, and the like so that the tag can be examined to quickly determine if the content complies with the consumption profile. A consumption profile 102 may include a list of valid tagging methods, such as RSS.

A consumption profile 102 may be associated with network switching. Network switching may be seamless, may occur while delivering content, may be required to deliver content, may require minimum device features, and the like. A consumption profile 102 may include rules, guidelines, and conditions for how to deal with switching among networks. A consumption profile 102 may include associations of networks to content types to facilitate determining which network to switch to for receiving delivered content. A consumption profile 102 may indicate criteria for switching networks so that switching networks occurs seamlessly to the user.

Switching from a mobile carrier network to a broadband mobile network to receive content may occur automatically based on the requirements identified in the consumption profile. The consumption profile 102 may indicate to the mobile media platform 100 the networks to which the device can be switched so that the platform may select the content source based on the network support. In an example, a device that supports both cellular and Wi-Fi networks may be served through a consumption profile 102 that indicates the device can support both networks. The mobile media platform 100 may determine to send content over the cellular or the Wi-Fi network based on various conditions, rules, and the like. If the mobile media platform 100 determines that the Wi-Fi network is not acceptable due to cost, availability, and the like, then content suitable for delivery over the cellular network may be sourced and delivered to the device.

A consumption profile 102 may indicate user preferences associated with network switching. Network switching may result in charges being imposed on a user, so a user may establish preferences in the consumption profile 102 regarding network switching to adhere to a cost goal or budget. Because certain features (e.g. VoIP) may only be available by switching networks, a consumption profile 102 may indicate user preferences that impact access to the features and therefore impact network switching. A consumption profile 102 may indicate a minimum level of service quality to be provided across the supported networks. Service providers may determine the network and equipment needed to provide the minimum level of service and thereby decide to support the consumption profile.

A consumption profile 102 may indicate the network technologies supported by a device, such as cellular (GSM, GPRS, EDGE, HSDPA, UMTS, CDMA, CDMA 1X, EVDO and the like), Wi-Fi, WIMAX, UWB, BLUETOOTH, MEDIAFLO, DVB-H, DMB and the like.

The mobile media platform 100 may enable, include and/or be associated with a mobile content provision service that combines an on-demand unicast or multicast cellular mobile content service with a mobile broadcast content service. In an embodiment, the content may be video and television. For example, the content provided using unicast or multicast may be video content and the content provided using broadcast may be televisions, resulting in the combination of broadcast and unicast MOBILE TV services. Throughout content may be discussed as video and/or television possibly under the name Mobile TV, but is understood to be any of the content types, from any of the content sources and with any of the content parameters discussed herein. In addition, in certain embodiments unicast may be discussed; however, it is understood that unicast may be replaced with multicast or the like.

Figure 27:
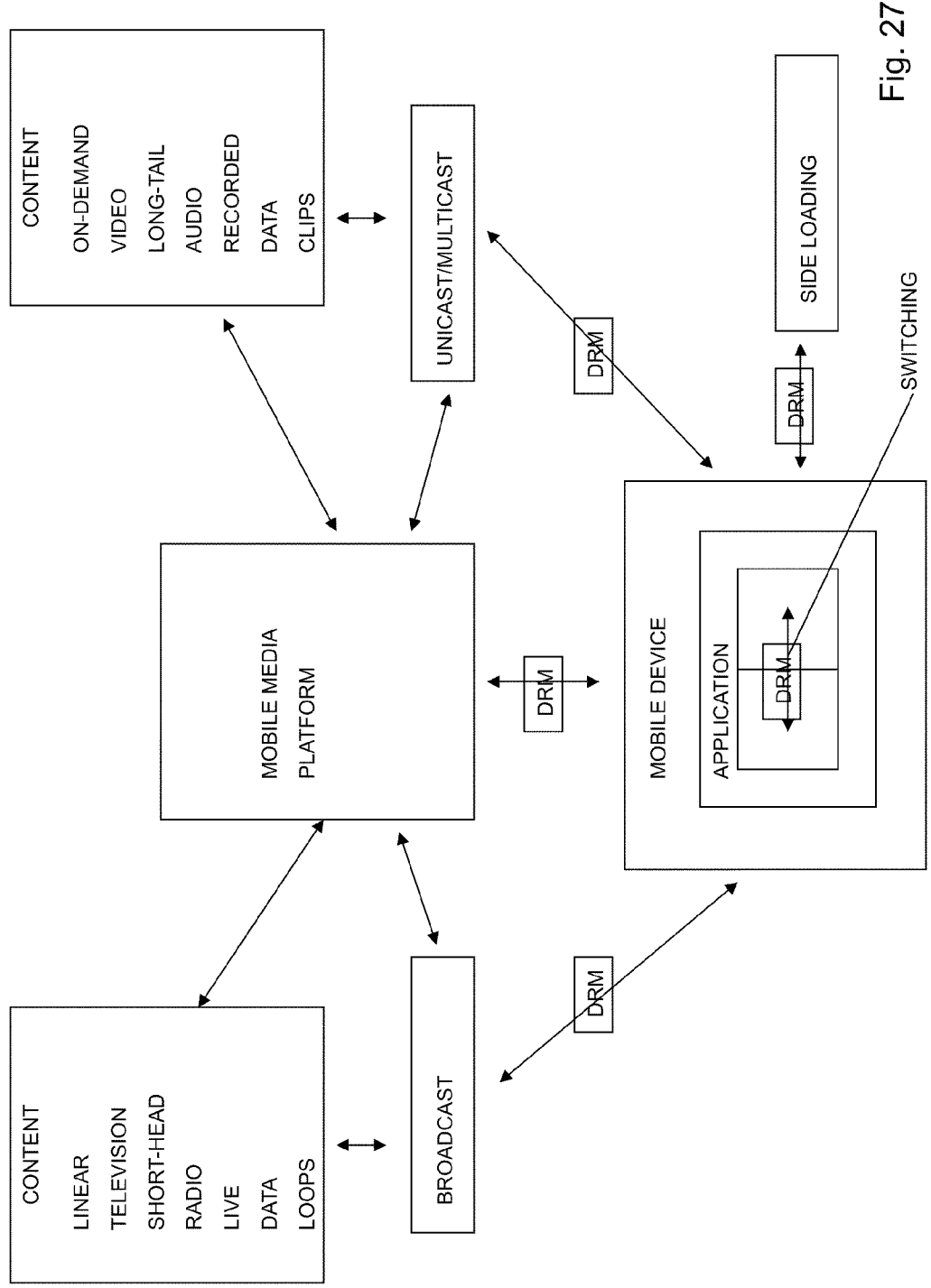
FIG. 27 depicts mobile media delivery mode switching.
Figure 28:
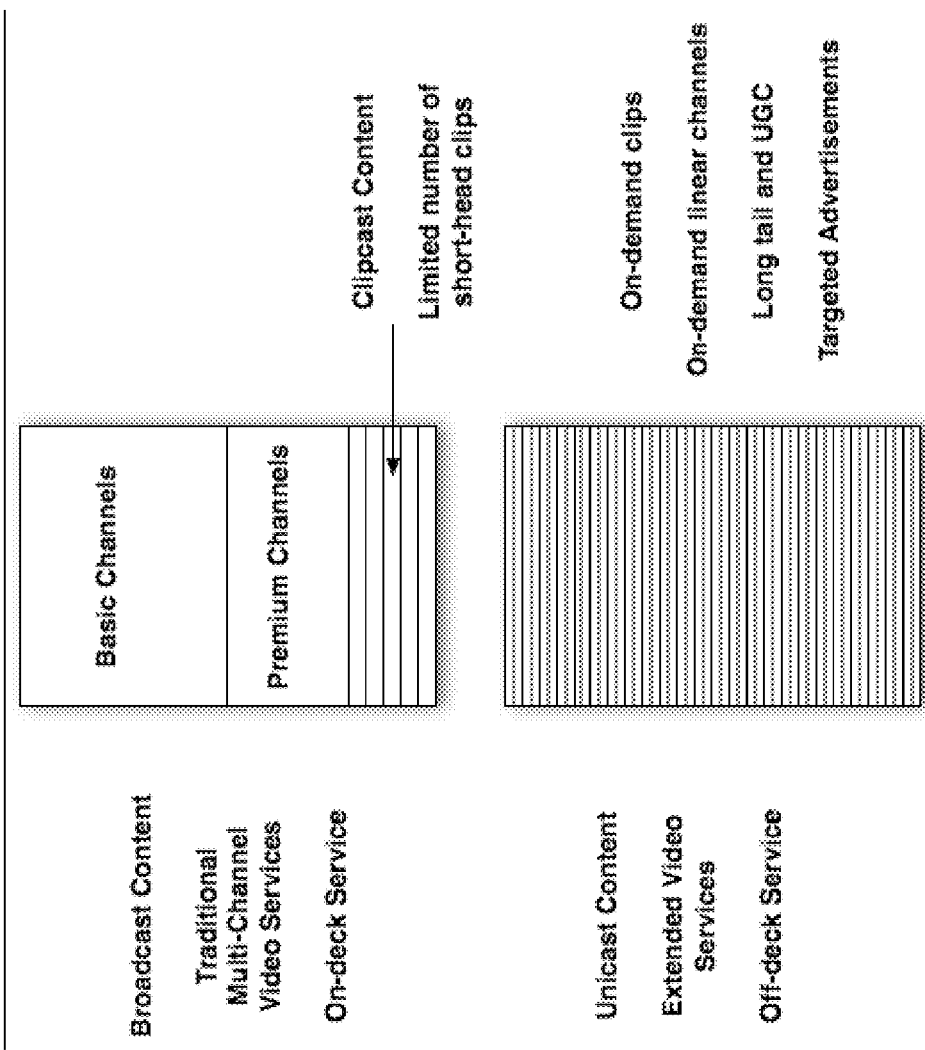
FIG. 28 depicts differences between unicast and multicast/broadcast delivery.

In this manner, a user using a mobile device may be able to switch 110 between unicast/multicast content and broadcast content, which, in certain embodiments, may correspond to switching 110 between on-demand content and broadcast television content. The broadcast content may be linear programming and/or live programming. Technologies for delivering content, such as television, to mobile devices via broadcast may include MEDIAFLO, DVB-H, DMB, ISDB-T, DVB-T, DVB-SH, a cellular broadcast over an upgraded network, a separate wireless broadcast network and the like. Technologies for delivering content, such as on-demand video, to mobile devices via unicast/multicast include 3.5G cellular networks, 4G cellular networks, WIMAX, HSDPA, EVDO, EVDO rev A, CDMA, WIBRO, FLASH-OFDM, cellular unicast over an upgraded network, a separate wireless broadband network and the like. Delivery of content may be accomplished by sideloading which may involve a user selecting and downloading content in a wired web session on their PC or similar device and then transferring the content to their mobile device. Delivery of content may be accomplished by downloading in off-peak hours. In an embodiment, long form content may be downloaded to a mobile device during off-peak hours when network traffic may be sufficiently low to allow increased video traffic without voice service degradation. The various content and sources of content among which the user may switch may be protected by different means of digital rights management, including the methods and systems described herein. FIG. 27 depicts a possible embodiment of this service. In this embodiment the application on the mobile device may be a MOBILE TV application and the service and application in combination may allow the user to switch between the content provided via broadcast and the content provided via unicast/multicast. Referring to FIG. 27, digital rights management may be considered as content is transferred from or to or accessed from broadcast sources, unicast/multicast sources, the mobile media platform, side loading and at the point of switching at the mobile device.

Unicast, multicast and broadcast methods, among others, may be used to enable mobile content delivery or MOBILE TV. MOBILE TV may include a service that delivers video to a mobile device. MOBILE TV may be unicast, multicast and/or broadcast. MOBILE TV may involve various user consumption methods, such as on-demand and linear programming. In an embodiment, MOBILE TV content may be delivered via a unicast network, whereby video is streamed over a cellular network in which there is a one to one relationship between the transmission source and the receiver. In an embodiment, video content may be delivered via broadcast. In a broadcast service, a single radio signal may be transmitted to a potentially infinite number of receivers. Viewers who are tuned in to a specific channel may see the same video program simultaneously.

In an embodiment, content for an on-demand service may be sourced in the form of pre-recorded clips. In an on-demand service, a user may select the content and play of the content commences from the beginning of the clip. Both broadcast and unicast MOBILE TV services may provide the ability to select content on an on-demand basis to a certain degree. In a linear programming service, a user may tune in to a channel in progress, and joins the program at the point at which the program on that channel is currently being played. Linear programming content is generally sourced from either live terrestrial TV channels and retransmitted intact over the MOBILE TV service as a simulcast or it may be constructed as a loop of a series of pre-recorded clips concatenated together to form a longer duration set of content that is repeated over time. Both broadcast and unicast MOBILE TV services may deliver linear programming. In an embodiment, linear content may be delivered as channels over a broadcast network, and personalized, timely on-demand content may be delivered over a bi-directional one-to-one unicast cellular network. In an embodiment, the user may not notice any difference in how content is delivered. The user may have a single user interface 140 (such as an integrated TV client) on a mobile device to access all content. A unicast network may provide access to a catalogue of long-tail content, and the one-to-one nature allows for delivery of personalized, targeted content. Broadcast networks may be complementary to unicast networks: they efficiently deliver the same signal to a large number of users simultaneously, and therefore may be well-suited to delivery of short-head content, both long format and short format. In an embodiment, using a combination of unicast and broadcast networks can optimize network capacity and investments.

FIG. 26 depicts a possible programming line-up for a combined unicast and broadcast service. Traditional multi-channel video services with base and premium tiers may be delivered over the broadcast network, providing the majority of the short-head content. Extended video services provide long-tail content from niche producers and user-generated content possibly through a video on demand service that includes clips and niche linear channels not provided via the broadcast portion of the service. This programming line-up may reflect an on-deck vs. off-deck strategy, in which on-deck content is limited to only the most popular content (such as short-head content), while the long-tail content can be managed and delivered without the operator's involvement. In an embodiment, the content may be audio content. For example, broadcast audio content may be radio and unicast content may be particular songs, interviews or radio programs. In an embodiment, the content may be data. In an embodiment, the content may be data as part of a datacasting service for traffic, weather, emergency info and the like. In an embodiment, the content may be clips. For example, a clipcasting service may push a small set of video clips to a mobile device for subsequent viewing on demand. In an embodiment, network technologies may include point-to-point cellular, cellular broadcast, mobile broadband, mobile broadcast technologies and the like.

In a certain embodiment, a user watching a mobile broadcast of a linear live sporting event program is provided with a link to view pre-recorded 5 minute video clip of an interview with the player who just scored a goal. The video of the interview would be served up on-demand over the cellular network when the user clicked the link. After viewing the clip, the user could be provided other links to allow them to choose from a list of other content that is available on either the broadcast or cellular networks, or the user could choose to resume viewing the original broadcast. In this way, the "short-head" broadcast content can be used as a driver for users to discover "long-tail" on-demand content, and vice-versa.

MOBILE TV may also provide and/or be associated with browsing, recommendation and search functionality for on-demand pre-recorded clips and broadcast TV to allow for discovery of current and upcoming broadcast programming. This functionality may also extend to any content, including content that has been recorded on a home or network-based PVR or the phone's PVR. The platform may include and/or enable PVR-like capabilities in which the broadcast content is buffered on the device so that the user can choose to resume viewing where they left off, or go back to the program in progress. In an embodiment, the service may allow picture-in-picture display where the on-demand clip and the live game are on the screen at the same time, and the user can switch between the two via a single click.

In an embodiment, a user interface for MOBILE TV may be presented through a unified MOBILE TV client application on a mobile device. The client may be enabled by server-side functionality provided by the platform. The user interface 140 may include an EPG similar to the traditional grid of linear TV, or it may be less linear and similar to a streaming content portal. The user interface 140 would allow a user to seamlessly move between content via broadcast and via unicast without a noticeable change in the user experience. The user may be able to directly browse and select linear and on-demand content.

In an embodiment, the mobile content provision service may provide recommendations for other associated content that encompasses both the broadcast and unicast content universes. A user will be able to personalize their experience by setting preferences that include favorite linear channels and programs, favorite on-demand categories, favorite genres, areas of interest, notification settings and the like. The service may deliver targeted ads to the user based on a number of factors, including the consumption profile, their demographic info, their preferences, their location, location intelligence, usage history, operator and device type. In an embodiment, ads may be delivered as clips for inclusion as interstitials. Delivery could be via unicast, allowing very specific targeting, or with less granularity via the clipcast/datacast mechanism of broadcast networks.

In an embodiment the service may provide targeted links to allow the user to browse to sites related to the content being viewed. In embodiments, the links may allow users to purchase related content or goods and services via operator or third party storefronts. In embodiments, the service may include community interaction functionality, such as recommend to a friend, send to a friend, user rating and the like. In embodiments the service may include content localization functionality to facilitate restriction of delivery of content to specific areas. For example, local news and weather reports, targeted ads based on location, as well as for implementing content blackouts of broadcast programming. Content search and discovery may span across unicast and broadcast content, facilitated using metadata. In embodiments, the service may also include protection controls which may control access to content. This functionality may grant or restrict access to certain services based on specified criteria. In an example, a user may be granted access to a particular channel or category for a specified period of time based on the amount of content the user purchased. Content protection may also apply to usage rights that are applied after the content has been delivered and determine how a piece of content may be used according to specified conditions and constraints.

Figure 29:
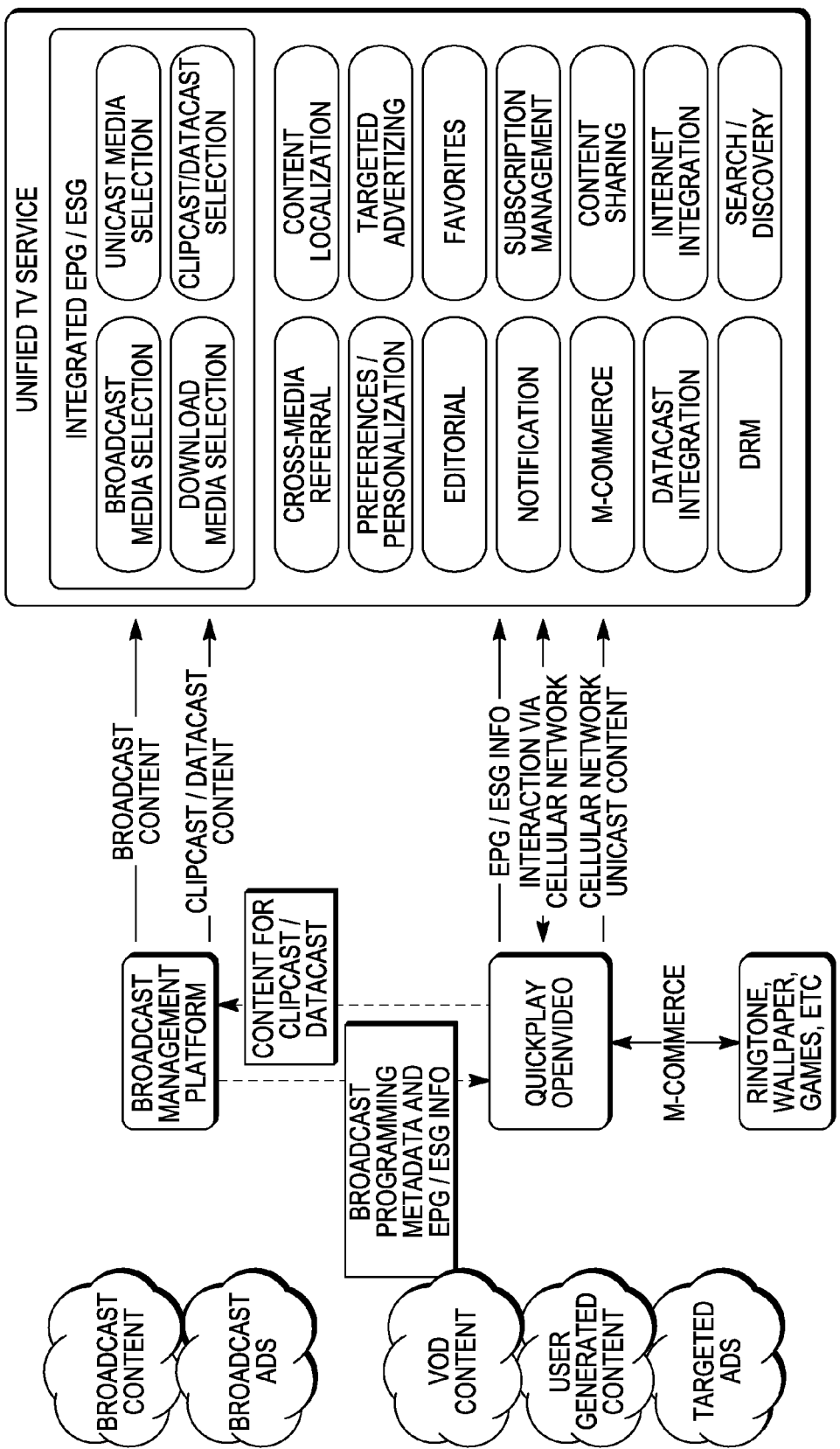
FIG. 29 depicts a unified TV mobile media environment.
Figure 30B:
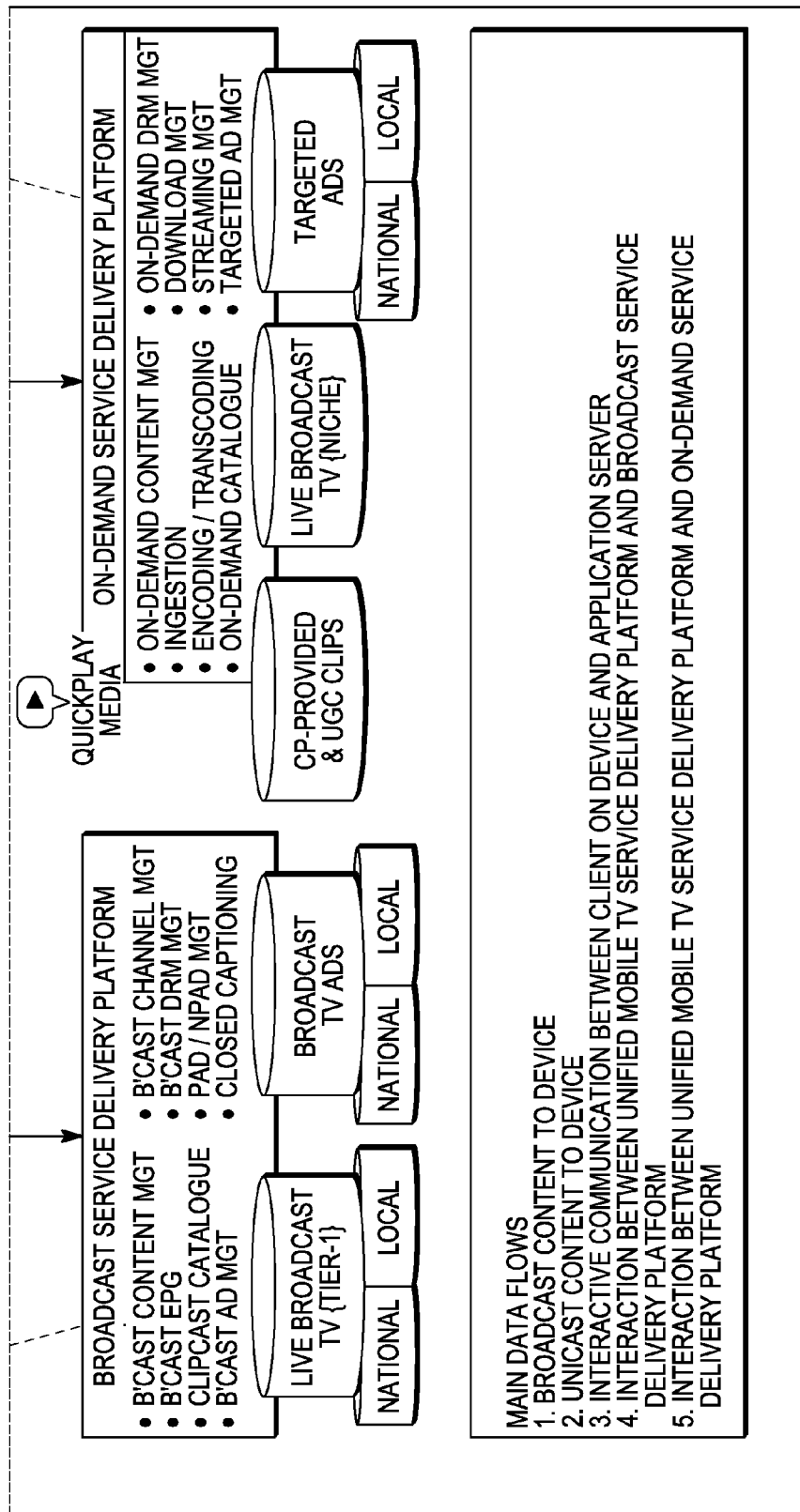
FIG. 30 depicts data flow to support mobile media delivery mode switching.

FIG. 29 depicts a general implementation of a specific embodiment of a combined unicast and broadcast service. It is understood that this is only one specific embodiment and that other implementations are possible. All connections and arrows in the figure may flow both ways and elements may be connected even though not depicted in the figure. FIG. 30 depicts another general implementation of a specific embodiment of a combined unicast and broadcast service. It is understood that this is only one specific embodiment and that other implementations are possible. All connections and arrows in the figure may flow both ways and elements may be connected even though not depicted in the figure. In this embodiment, the on-demand service delivery platform may manage the on-demand content, ingest the content, and perform encoding and transcoding. In this embodiment, the unified MOBILE TV service delivery platform may perform the unified EPG, broadcast/on-demand synchronization, cross-promotion, content targeting, ad targeting, device management, content localization, preference management, discovery, recommendation, personalization, DRM enforcement, pricing, service bundling, billing integration, subscription management, authentication, authorization, accounting functionality and the like.

The platform may contain an application that combines on-demand delivery of video over a cellular network with live television broadcast content that is delivered over a mobile broadcast technology, such as DVB-H, DMB, MEDIAFLO or the like, together into a single user experience. In one embodiment, a user watching a mobile broadcast of a sporting event may be provided a link to view a pre-recorded video clip that covers the highlights of the game to that point. Clicking the link may result in the application switching video delivery sources from the mobile broadcast network to the cellular network and causing the highlighted video clip to be streamed on-demand to the user via the cellular network. After viewing the clip, the users could be provided other links to allow them to choose from a list of other content that is available on either the broadcast or cellular networks. In another embodiment, the application may simultaneously source content from various networks and/or external repositories and integrate the data from these various sources in order to provide the user with a high quality experience. Additionally, the content sourced from various networks and/or integrated repositories may be related to the interests, whether accumulated or point in time, of the user. This may reduce or remove a need to search on the mobile handset. This process may result in effectively increased bandwidth.

Advanced encoding and/or transcoding 104 may be based on architecture that facilitates supporting real-time encoding and/or transcoding 104 of content while also supporting cost effective and space efficient encoding and cataloguing of content for later retrieval by a mobile device 3102. A mobile media platform 100 may be associated with advanced encoding and/or transcoding 104 by at least aspects of the encoding/transcoding 104 architecture. An advanced encoding and/or transcoding 104 architecture may include pipelining and parallel operation of certain features to reduce encoding latency. A pipeline operation may allow content to be serially loaded into a first encoding stage while each subsequent encoding stage may receive a first output of the first encoding stage while subsequent content is serially loaded into the first encoding stage. The process may be repeated for a third and a fourth encoding stage so that latency from when the first content is serially loaded into the first encoding stage to the first content being serially delivered out of the last encoding stage is minimized. An advanced encoding/transcoding 104 architecture may also support on-the-fly encoding wherein content is encoded using one or more encoders with different encoding schemes when it is either presented to the platform or when it is accessed within the platform for delivery to end user. Architecture techniques such as caching may also facilitate reduced latency and therefore may improve user perception of a mobile media platform 100.

The platform may be associated with an advanced encoding/facility 104. The advanced encoding/transcoding facility 104 may include ingestion 118 of external content. Ingestion 118 may be automatic; it may be self-aware ingestion 118; it may include encoding 104; it may include tagging 108; and it may include various combinations, such as automatic ingestion 118 and encoding 104.

An advanced encoding/transcoding facility 104 may manage content that has been ingested by a self-aware ingestion module 118. The self-aware ingestion module 118 may perform ingestion 118 automatically for any content type and for any content format. Self-aware ingestion 118 may bring content into the platform in a format that is useable by the platform such as QAR format or RSS feed format. The self-aware ingestion module 118 may be part of the advanced encoding/transcoding facility 104 or it may communicate with the advanced encoding/transcoding facility 104 to deliver content to be managed. Self-aware ingestion 118 may facilitate normalizing content so that content from any type and any format may be normalized, such as through recoding and format conversion, into a format useable by the platform and/or the advanced encoding/transcoding facility 104. Encoding, recoding, and transcoding 104 may be performed by the self-aware ingestion module 118. Alternatively, the self-aware ingestion 118 capability may be an attachment to an encoding process of the platform so that ingestion 118 and encoding 104 may be operated under separate constraints.

A self-aware ingestion 118 process may function as a web service or may function analogously to a web service. It may include encoding 104 and/or publishing capabilities, or may enable such capabilities in the platform based on the availability of content. In an example, a self-aware ingestion 118 module may automatically act on new content when new content is available such as through a content feed, search capability, content posting, and the like.

A self-aware ingestion 118 process may determine automatically how to act on any content. Self-aware ingestion 118 may be performed based on the content, metadata associated with the content, aspects of the content source, encoding 104 of the content, format of the content, attachments to the content, and the like. Self-aware ingestion 118 may determine what encoding, recoding, transcoding 104, format conversion, filtering, and the like is needed based on ingestion 118 parameters associated with the advanced encoding/transcoding facility 104 and/or the platform. In an example, a self-aware ingestion 118 module may compare the encoding of newly presented content to a representation of encoding supported by the advanced encoding/transcoding facility 104. If the newly presented content is in an encoding that is supported by the advanced encoding/transcoding facility 104, then no recoding may be performed. If the newly presented content is in an encoding that is not supported, the self-aware ingestion 118 module may order recoding from an attached encoding facility before directing the content to the advanced encoding/transcoding facility 104. In another example, a self-aware ingestion 118 module may determine that a transcoding process exists to recode newly presented content from it's presented encoding to a preferred encoding. In such a situation, the self-aware ingestion 118 module may perform the transcoding to present the content in the preferred encoding.

An advanced encoding/transcoding facility 104 may perform self-aware ingestion 118 based on a trigger, such as content being deposited into a location known to the advanced encoding/transcoding facility 104. A location may include a directory, an FTP site, an RSS feed indicating new content, an email received with the content or with a link to the content, an email with an attachment containing the content, an address (URL, port, and the like) to which content is streamed, an address (URL, port, and the like) to which a notice of content availability is sent, an external scheduler that may be linked to a guide such as TV guide, and the like. A location may be location external to the platform, may be internal, or may be a handoff between modules of the platform, such as between the advanced encoding/transcoding facility 104 and the self-aware ingestion 118 module.

Self-aware ingestion 118 may be performed on externally supplied or discovered content, or it may be performed on content already known and/or managed by the advanced encoding/transcoding facility 104. In an example, the advanced encoding/transcoding facility 104 may manage content that is stored in an encoding that is not compatible with a device to which the advanced encoding/transcoding facility 104 desires to publish the content. The advanced encoding/transcoding facility 104 may signal the self-aware ingestion 118 module to retrieve the content and take any action necessary to prepare it for compatible publication to the device. The self-aware ingestion 118 process may determine what encoding is present, what encoding is desired, what transcoding is necessary, and may perform or direct an encoding facility to perform the action.

Figure 31:
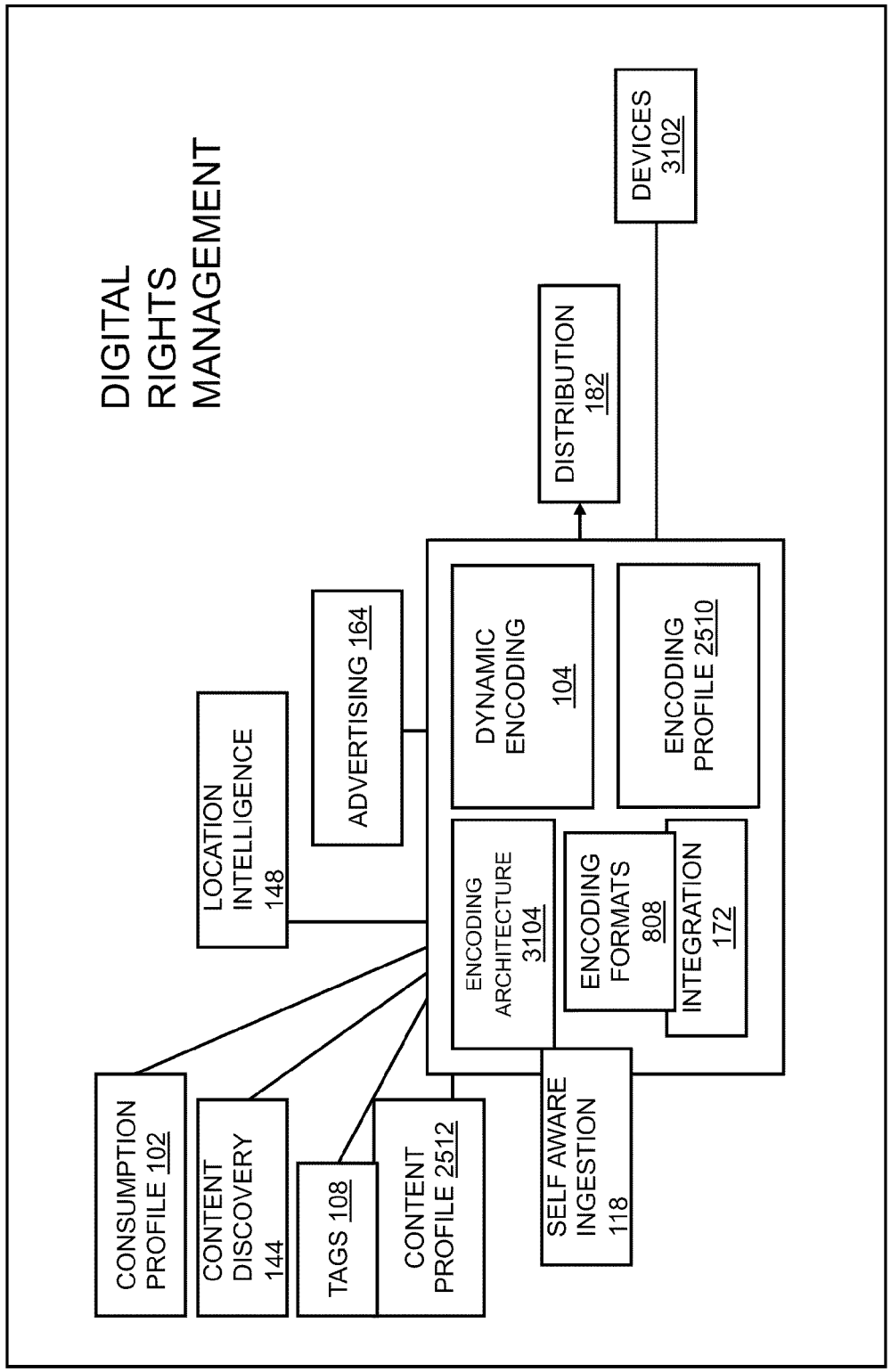
FIG. 31 depicts advanced encoding/transcoding.

Referring to FIG. 31, advanced encoding/transcoding may encompass an encoding architecture 3104, encoding formats 3108, encoding profiles 2510, dynamic encoding 104, self-aware ingestion 118. Advanced encoding/transcoding 104 may also relate to advertising 164, location intelligence 148, consumption profiles 102, content discovery 144, tags 108, content profiles 2512, distribution 182, and devices 3102. As depicted in FIG. 31, digital rights management, including all the systems and methods described herein, may affect and be affected by various aspects of advanced encoding/transcoding.

Self-aware ingestion 118 may use an encoding profile 2510 to determine what action to take on content that it is aware of Actions associated with self-aware ingestion 118 may be based on device characteristics 3102 such as device players, codecs, device screen size, display color depth, pixel resolution, device memory size, device processing power, and the like. Actions associated with self-aware ingestion 118 may be based on characteristics associated with a network through which the device and the platform communicate, such as network type, network speed, network bandwidth available for delivery of the content, and the like. Similarly, self-aware ingestion 118 may be based on device operator characteristics that may include content use rules, policies, bandwidth restrictions, content restrictions, digital rights management restrictions and the like. Content characteristics may at least partially determine what actions may be associated with ingesting content by a self-aware ingestion 118 module. An example of content characteristics that may impact self-aware ingestion 118 is content motion type. Ingestion 118 of talking head type content may be performed by a self-aware ingestion 118 module very differently from ingestion 118 of live action, sports, movies, advertisements, and the like. To perform ingestion 118 of talking head content may require less processing power, and therefore may reduce communication bandwidth. A self-aware ingestion 118 module may signal system resources accordingly such as to optimize system resource utilization.

Aspects of a delivery method associated with the content may also determine what actions and resources a self-aware ingestion 118 module requires for ingestion 118 of the content. Delivery methods may be based on content type because delivery methods may be different for a live linear source than for a clip linear source. Additionally live linear delivery may be broadcast type delivery, unicast type delivery, multicast type delivery, and the like. Clip linear delivery may be based on a unicast type delivery. If the intention is to store the content, such as in a database associated with the platform, and deliver the content at a future scheduled time, the self-aware ingestion 118 module may take actions to ingest the content into storage at this time and take additional actions to retrieve the stored content and ingest it using other actions for delivery at the delivery time. In this way encoding profile 2510 factors that take into account static and dynamic factors may be used by enhanced encoding/transcoding 104 and self-aware ingesting 118 processes.

Enhanced encoding/transcoding 104 may also be associated with self-aware encoding and/or transcoding of content, such as video content. Similarly to self-aware ingestion 118, self-aware encoding/transcoding 104 may be automatic. Automatic self-aware encoding/transcoding 104 may be based at least in part on a consumption profile 102 as herein described. Automatic self-aware encoding/transcoding 104 may be based on content availability, aspects of the available content, acquisition of the content, mobile device 3102 acceptance and/or support of tagging format, tagging 108 related to the content or metadata associated with the content, and the like. A self-aware encoding/transcoding 104 capability may impact content acquisition and detection. A content manager with self-aware encoding/transcoding 104 capability may acquire or detect content in a wide variety of formats and types that may be readily transcoded by the self-aware encoding/transcoding module. Automatic self-aware encoding/transcoding 104 may consider a pseudo-hardware device identifier, protect different segments of content through different means, and blend different methods of protection, such as encryption and scrambling and location and time zone based logic, all as described herein.

A selection of carrier rules may be impacted by self-aware encoding/transcoding 104. Similarly, self-aware encoding/transcoding 104 may be impacted by a selection of carrier rules.

Other benefits of self-aware encoding/transcoding 104 include content links can be syndicated such as an RSS feed, and content may be composite content. Based on attributes of the composite content, a self-aware encoding/transcoding 104 module may select one or more of encode, transcode, deliver, and the like when presented with composite content.

Self-aware encoding/transcoding 104 may transcode and deliver on demand, removing the need to have storage of multiple encoded versions of a file, saving on disk storage. Delivery formats may be based on what the requesting client supports.

Self-aware encoding/transcoding 104 may provide benefits when used with time sensitive content and may be based on the time sensitivity of the content. In an example, breaking news may be immediately encoded, whereas other news reports may be encoded only when encoding bandwidth is available.

Self-aware encoding/transcoding 104 may also facilitate optimization of ingestion 118. Encoding may be time shifted or prioritized to optimize aspects of ingestion 118 such as bandwidth, processing power, detection, acquisition, and the like. Self-aware encoding/transcoding 104 may also facilitate managing and/or prioritizing actions over multiple CPUS. Such adjustments associated with self-aware encoding/transcoding may be performed automatically.

Self-aware encoding/transcoding 104 may be based on a schedule. The schedule may be an ingestion 118 schedule. In an example, ingestion 118 may be performed as content is available, but encoding/transcoding 104 may be performed on the ingested content based on a schedule for encoding. A self-aware encoding/transcoding 104 schedule may be based on resource utilization, carrier demand, and the like. The encoding/transcoding 104 may be scheduled across multiple CPUs.

Enhanced encoding/transcoding 104 associated with self-aware encoding/transcoding 104 may also be associated with job management. Automatic actions, which may be considered natural actions of a self-aware encoding/transcoding 104 process, may be based on content type. Through job management, encoding/transcoding 104 may be scalable to support greater throughput, faster response time, higher complexity of content, more sophisticated transcoding 104, and the like. Job management may be combined with a scheduler to further improve encoding/transcoding 104 associated with a self-aware encoder. Encoding job management may also provide benefits associated with distributed computing, such as workflow processing. An encoding job may be managed so that various computing facilities may act on the content as it flows through a workflow associated with the job. Workflows may include various aspects of enhanced encoding/transcoding 104 including elements ranging from content creation through ingestion 118 and distribution 182. Workflows may also be represented graphically, such as with a process graph and may incorporate user specified parameters. Workflows may embody constraints associated with ingestion 118 optimization, resource utilization, encoding preferences, and the like that a self-aware encoding/transcoding 104 module may access to process content through workflows.

Content profiles 2512 may also be used by a self-aware encoding/transcoding facility 104 to determine a type of content and therefore determine what actions to take. Content profiles 2512 may identify aspects of content that a self-aware encoding/transcoding facility 104 may analyze, such as metadata, content type (e.g. talking head vs. live action), content tags 108 and the like.

Self-aware encoding/transcoding 104 may also be characterized by taking consumption profile 102 factors into account. Consumption profile 102 factors such as network characteristics, features, and capabilities; device characteristics 3102, features, and capabilities; and user preferences, and the like may be considered. In an example, user preferences associated with video quality may be considered such that encoding/transcoding 104 ensures that video is encoded to provide high quality rendering, whereas advertisement 164 may be encoded to only support low quality rendering. Sports may be encoded for high quality while movies may be encoded for medium quality to satisfy display requirements, user preferences and balance network, other resource requirements and the like.

Encoding actions associated with a self-aware encoding/transcoding facility 104 may be directed toward the network. In embodiments, encoding actions may be optimized for network and operator characteristics, including network speed, bandwidth and other factors described herein. In an embodiment, content may be pre-encoded for shifting between network speeds, such as to EVDO and 1X and back. The mobile media platform 100 may, generally, be associated with encoding and transcoding 104. In particular, content ingestion 118 may include various encoding and transcoding 104 features and capabilities as herein described. The following is an overview of various aspects of encoding/transcoding 104 that are described in association with various other aspects of the invention elsewhere herein. Encoding may be performed for a distribution 182 network type, for a device type (such as captured in a pseudo-hardware device identifier), for a delivery method, may support various encoding formats 3108, may be embodied variously, and the like.

Encoding for a distribution 182 network type may include optimizing for network and operator (e.g. wireless service provider) characteristics or requirements such as network speed and bandwidth (e.g. dynamic based on time of day), or pre-encoding to facilitate shifting between various speed networks (e.g. EVDO to 1X, 1X to EVDO, and the like) that may be encountered throughout the distribution 182 network. Encoding for a distribution 182 network type may include optimizing for protecting different segments of content through different means, blending different methods of protection, such as encryption and scrambling, and location and time zone based logic, all as described herein.

Encoding actions associated with a self-aware encoding/transcoding facility 104 may be directed toward the device. Encoding for device aspects 3102 may include consideration of screen size, content type, video quality (such as corresponding to talking head, sports, music videos and the like), audio capabilities (such as corresponding to the human voice, music and the like), color depth, audio/video synchronization, file type, device memory, CPU, device processing power or type, operating system, and the like. In an example a device may be suited for human voice audio output (e.g. a basic mobile phone), so that audio encoding of high fidelity music may be adjusted to gain the best quality of sound from the device. Encoding for a device may include encoding based on a device attribute such as screen size, color depth, memory, CPU, operating system, and the like. Device targeted encoding may be based on an association of content with the device type. Device encoding may be based on video type (e.g. talking head, sports, music video, advertisement, document), audio type (e.g. human voice, music), device file type, and the like.

Self-aware encoding/transcoding 104 may be directed toward encoding for a delivery method. Delivery methods such as streaming, download, progressive download, MMS, WAP push, and the like may each impact encoding in different ways. A self-aware encoding facility may adjust encoding based on the delivery method.

Encoding, and in particular self-aware encoding/transcoding 104 may support a variety of encoding and content formats. A self-aware encoding/transcoding 104 module may support one or more of these formats: 3GPP (MPEG4 Level 0/Level 1 and H.263 video codecs with AMRNB, AMRWB, AAC, ACC+ audio codecs)—mobile video transport format; H.264, AVI (RAW, MPEG1/2/4 and Huffman codecs)—Audio Video Interleave format; WMV/ASX/WMA (v.7, v.8., v.9)—WINDOWS Media format; M2A, M2V, M2T, M2P, M1A, M1V—MPEG1/2 streams format; MOV (Sorenson codec)—QUICKTIME video format; WAV (PCM, 16 bit, 8 bit, 848 kHz)—Uncompressed audio files format; AMR, MP2, MP3, AAC, RIFF, OGG—Compressed audio files format; BMP, JPEG, GIF, PNG—Image files format; and the like.

A self-aware encoding/transcoding facility 104 may be embodied as a MEncoder, an FFMPEG encoder, an MP4Box encoder, and the like.

Enhanced encoding/transcoding 104 may be associated with automated ingestion 118 in combination with encoding. Automated ingestion 118 and encoding may facilitate detecting and acquiring content from sources of various quality. Automated ingestion 118 and encoding may facilitate acquiring, tagging, encoding, and packaging any digital format content for distribution 182 to any mobile device 3102. Acquiring content may be done through polling third party sites for content. The various third party sites may contain widely varying content formats that may be readily supported by automated ingestion 118 and encoding. Formats such as video, audio, images, text, and the like are examples of content that may be managed by automated ingestion 118 and encoding methods. Content may be submitted or obtained for automatic ingestion 118 and encoding via an interactive web portal, an FTP upload (push or pull), a Web Service API, and the like.

Encoding may be embodied in one or more encoding architectures 3104, such as a flexible content encoding system that provides identical (but automated) ingestion 118 capability to the mobile media platform 100, but is extensible and scalable for the future. It may be built upon a modular component system that leverages a tree-like data structure and a normalized object model to provide consistent interfaces across many services such as collection, encoding, validation, and publication.

Automated ingestion 118 and encoding may be based on a scalable architecture 3104 that enables handling a broadening number of incoming content clips and producing an even broader number of uniquely encoded clips for delivery. Automated ingestion 118 and encoding may reference device profiles, network profiles, consumption profiles 102, content profiles 2512, and the like to identify and execute ingestion 118 and encoding actions.

Encoding may be a part of ingestion 118 or may be done separately. Encoding may be based on criteria that are unrelated to ingestion 118. Automated ingestion 118 combined with automated encoding may open or create new standard acquisition methods. It may also facilitate repurposing non-mobile ready content for mobile use thereby turning the non-mobile content into a more valuable digital asset.

A mobile media platform 100 associated with automatic ingestion 118 and encoding may relate to existing standards such as RSS. Automatic ingestion 118 and encoding may be compatible with existing standards. Methods and actions associated with or resulting from automatic ingestion 118 and encoding may provide material that may be added to standards, such as acquisition focused standards. Standards may facilitate content generation being acquisition friendly/focused. However, an automatic encoding/transcoding 104 process that supports diverse content formats and types may impose no new minimum constraints on content providers while offering opportunities to enhance standards related to content generation, encoding, delivery, and use.

A mobile media platform 100 associated with automatic ingestion 118 and encoding may work beneficially with a standard such as RSS. The platform may provide methodologies and/or tags 108 for using RSS to feed content based on consumption profiles 102, content profiles 2512, device profiles, user profiles, and the like. Consumption profiles 102 and the like may be useful in defining content to be acquired. Attributes related to profiles may be added to content generation and delivery on top of any attributes or specifications associated with using RSS. Such attributes may enable content providers to direct content by making the generated content RSS feedable to mobile user.

RSS may also facilitate using tags 108 to enable auto ingestion 118 and encoding. RSS tags 108 may be related to publishing. Tags 108 may also be related to content lifecycle. Ingestion 118 may consider tags 108 related to content lifecycle to determine, for example, how long content has been available. Other actions associated with content lifecycle tags 108 may include when to stalemate it, when to publish it, when it was published, when to remove it, when to delete it, when to archive it and the like. Tags 108 may be used during ingestion 118 and encoding and/or may be passed through ingestion 118 and encoding to be used by downstream resources. In an example, a tag associated with content lifecycle may be passed through ingestion 118 and may be stored in association with the ingested content. At a subsequent encoding activity, such as a scheduled encoding activity, the content lifecycle tag may be used to determine what actions to take. If the content lifecycle tag indicates the content is no longer valid (e.g. it may be past an expiration date/time), the content may not be encoded.

RSS may facilitate device profiling in association with automated ingestion 118 and encoding. Using RSS features may allow the mobile media platform 100 to facilitate directing content to specific device types 3102. The mobile media platform 100 may take advantage of existing content definition and may allow an expansion of RSS standards to apply to content primitives.

Automated ingestion 118 and encoding may support composite content through enabling encoding directed toward each portion of the composite content. In an example, news content may be a form of composite content in that it may include images, text, video, audio, all of which may be synchronized. Because news content may need to be delivered to a device that may have capabilities that affect each composite content type, encoding for text may require an encoding process that delivers encoded text that is targeted to the device and may be different than the encoding that delivers video targeted to the device capabilities. A mobile media platform 100 may be capable of expanding composite content support, such as to support further composite attributes. In an example, a mobile media platform 100 may use primitives to extract more benefit from composite content types, such as in the ingestion 118 and encoding processes.

On-demand encoding and transcoding 104 may be associated with the mobile media platform 100. On-demand encoding and transcoding 104 may be used with live linear, audio and video clips, large content databases with small disproportionate usage, and the like. Pre-encoding content with small usage may not utilize the platform resources for storing encoded content efficiently or cost effectively so such content may be sourced and encoded/transcoded on-demand. ON-demand encoding and/or transcoding 104 may be used to deliver the content to the user device as well as generate a pre-encoded version to be stored for later access. On-demand encoding may be useful for large content libraries and remote sources. Generally on-demand may provide at least medium quality output using a single pass encoder. Generic encoding may efficiently performed by on-demand encoding/transcoding 104. A hardware architecture 3104 for on-demand encoding may yield very high performance with minimal latency. Such an architecture 3104 may be readily scaled through a server based, modular computing environment that may support a high degree of encoding concurrency. Low and moderate content access frequency or high and sporadic requests may be handled by on-demand encoding.

ON-demand encoding allows the platform to rely on the content source server to host the content. In an example, a user may direct a request (e.g. search) for content to the mobile media platform 100 that causes the platform to gather the content from the content host server storage, ingest, encode, and deliver the content to the user device. Example of hosts may include AOL, YOUTUBE, news sites, TV and broadcast cable sites, and the like. Another example involves creating an application that directly interacts with a content provider's website (e.g. AOL) to present a mobile version of the content provider's site. A user would browse, search, and display details of the content provider's assets directly from the website, but would request the content through the mobile media platform 100. The platform would obtain, transcode, and cache the requested content from the content provider site whilst feeding the mobile device 3102 through a live or cached stream.

On-demand encoding may be used with raw content that is stored (e.g. hosted) on the mobile media platform 100 (e.g. encoding host) instead of content stored on a content source host server. In another example, a content provider, such as AOL would bulk download content to establish a base of content that may be encoded on-demand. Updates and additions to the available content would be downloaded as it becomes available. The mobile media platform 100 may encode the downloaded content and host it locally, making it available to all platform services (e.g. search, personalization, and the like). An on-demand encoding mechanism would further reduce the latency between the time new content is downloaded from AOL, and the time it is available for distribution 182. On-demand encoding may protect different segments of content through different means, blend different methods of protection, such as encryption and scrambling, and consider location and time zone based logic, all as described herein.

Pre-encoding of content may be beneficially applied in a mobile media platform 100 content serving environment. Content may be encoded into popular encodings, such as encodings based on consumption profiles 102 of users currently connected to the network or currently requesting various content to be encoded. Pre-encoding facilitates easier and more rapid response to requests for content. However, pre-encoding usually entails several sequential steps. These steps may perform multi-pass encoding that increases the quality substantially over single-pass encoding. The time to encode may depend on the load, quality, processing requirements, and the like, but may be slower than needed to support real-time encoding. In an embodiment of multi-pass sequential encoding, outputs of a previous encoder are daisy-chained to the inputs of a next encoder resulting in a delay before the encoded file is available for consumption. To reduce latency associated with sequential encoding, while achieving equivalently high quality, successive encoding stages may be configured in a pipeline such that the output of a first encoder is fed to the input of a second, so that encoding in each encoder is offset by a small amount of time, allowing most of the encoding to is run in parallel. The total latency may then approximate the sum of the latencies of each encoder from the first block read in to the first block written out. The total latency may readily facilitate real-time multi-pass encoding. To yet further improve latency from content access to consumption, a live linear encoding may be run in parallel with the multi-pass encoding to allow the content to be available through the live linear encoder even before the entire content is pre-encoded. Once the entire content is pre-encoded, subsequent requests for the content can be delivered from the higher quality pre-encoded content. Pre-encoding may consume greater computing resources than single pass live on-demand encoding so the platform may queue up pre-encoding jobs and allocate off-peak time for executing the jobs, thereby reserving computing power during peak time to on-demand encoding.

Pre-encoding may be used for small to moderate sized content libraries. Pre-encoding may result in high quality and high resolution encoding using a multi-pass encoding method. Although a hardware architecture 3104 can support pre-encoding, it may be efficiently performed by a general purpose processing environment using software encoding algorithms. Pre-encoding may improve mobile media platform 100 resource utilization for high demand content. A pre-encoding method may scale through a model based on resource prioritization, bulk encoding, regular scheduled encoding, and the like.

On-demand encoding may further facilitate in-stream ad insertion for live linear feeds. Delivery of encoded live linear feeds may be switched to advertisement feeds while the live linear feed continues to be ingested 118, encoded 104, and cached for delivery at the completion of the advertisement delivery. Encoding methods may be combined during a consumption session so that delivery may be separated from encoding method. In an example, live linear content may be encoded on-demand and pre-encoded advertisements may be inserted in the delivery stream.

Advanced encoding/transcoding 104 may facilitate distribution 182 of live linear content with targeted advertisements by distributing a plurality of streams, each with its own advertisement sourcing criteria and instream ads, to individual users in a unicast distribution 182 or to groups of users in a multi-cast distribution 182. A single live linear creative content feed may be replicated through encoding and transcoding 104 into the plurality of delivery streams.

Live linear encoding may be beneficially applied to live content feeds such as live events, news, and the like. A hardware architecture 3104 may be well suited to deliver live linear encoding due to the high input rate. An architecture 3104 for live linear encoding may be server based and therefore may scale well through distributed and parallel processing. A single live feed may be ingested by a plurality of encoding facilities and each encoding facility may deliver encoded content through unicast and multicast distribution 182.

Figure 32:
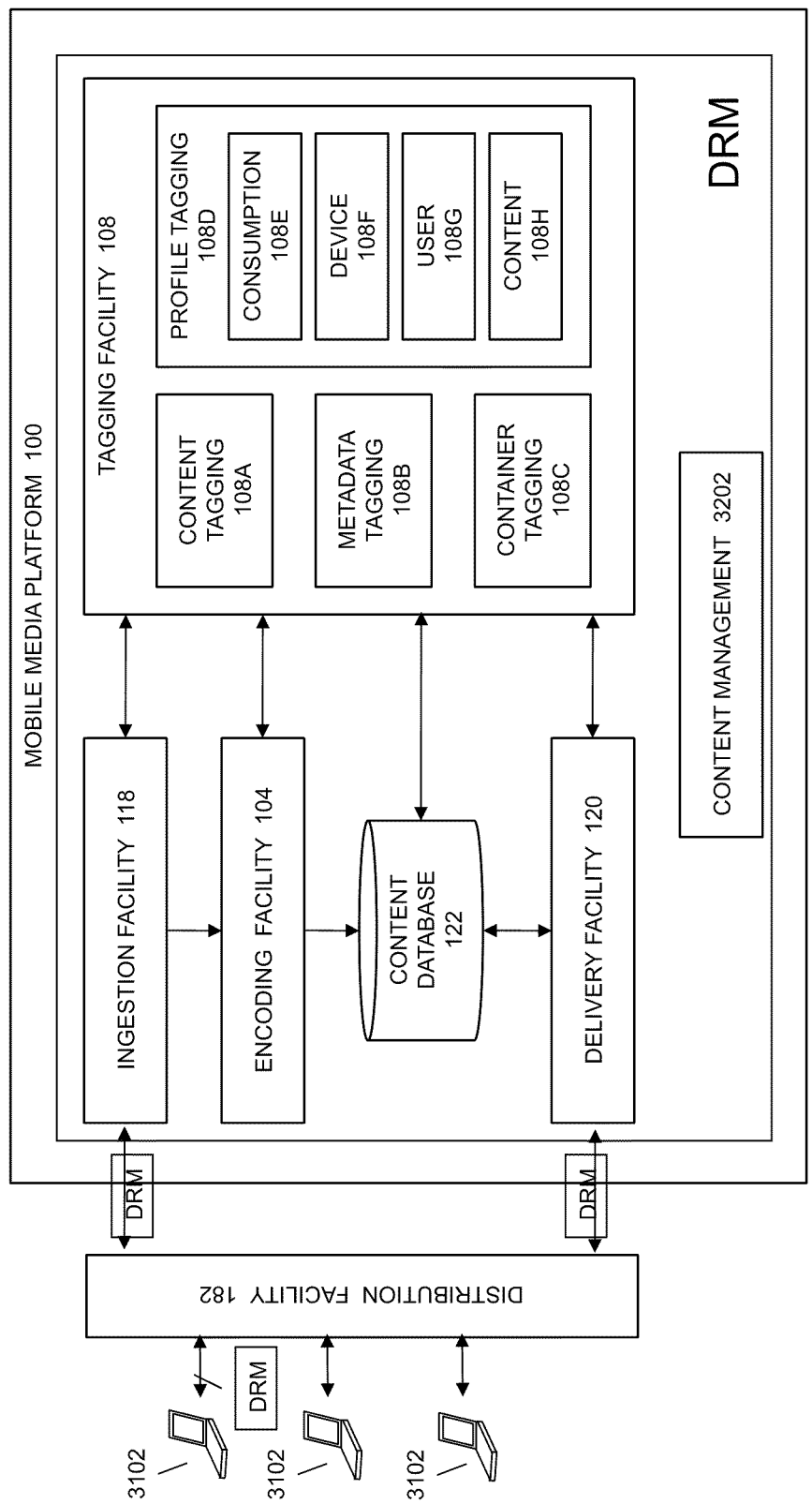
FIG. 32 depicts automated tagging in a mobile media platform.

A mobile media platform 100 may be associated with content related tagging 108, as shown in FIG. 32. Content related tagging 108 may include tagging 108 of content 108A, metadata tagging 108B associated with content, content container tagging 108C, profile tagging 108D such as consumption profiles 108E, device profiles 108F, user profiles 108G, content profiles 108H, and the like, and may be associated with delivery of content to mobile communications facilities 3102. Tagging 108 of content may be performed by a mobile media platform 100, such as by an advanced encoding/transcoding facility 104, a self-aware ingestion facility 118, a self-aware encoding facility 104, a distribution facility 182, a delivery facility 120, a content database 122, and the like. Tagging 108 may be automated. As depicted in FIG. 32, all aspects of tagging may affect or be affected by digital rights management, including the rights management methods and systems described herein. In embodiments, digital rights management may be applied at ingestion, delivery and distribution of content. Tagging 108 may facilitate using rules associated with ingestion 118 to setup encoding 104 and delivery 120. Tagging 108 may be used to propagate information related to content from one aspect of a mobile media platform 100 to another aspect of the platform, to a device, to a carrier, to a network, to a content storage facility, to a delivery medium, and the like. Tags 108 may be provided through a syndication feed medium such as may be defined by RSS. In an example, tags 108 associated with the mobile media platform 100 may be provided to a community through RSS. The tags 108 and their associated definitions, values, interpretations, and the like may be included in an RSS specification. Tags 108 may be used by a mobile media platform 100 to help define the end results of enhanced encoding/transcoding 104 and other content management functions. In an example, a device or the mobile media platform 100 may poll a source of content based on tags 108 associated with the mobile media platform 100. If a source of content includes content with the polled tags 108, then the content may be pulled down to the device or platform. The device may poll a mobile media facility and use tags 108 provided by the mobile media platform 100 to help select content for the device. The tags 108 provided by the mobile media platform 100 may include attributes associated with devices, users, and the like. Facilities of a mobile media platform 100 may tag content 108A based on consumption profiles 108E, user profiles 108G, device profiles 108F, and the like so that the content may be delivered through RSS to devices.

A function that may be associated with content ingestion may include tagging 108 content to establish a uniform basis for identification of content, describing content, and normalizing content with standard formats and descriptors.

Content tagging 108A may include multiple levels of tagging 108 which may include tags 108 in a physical file such as source content, encoded content, downloaded content, uploaded content, database content, content attached to an email, message, or other electronic communication, and the like. A tag 108 may be an explicit component of a file, such as metadata, a header, an inter-clip identifier, and the like. A tag 108 may be an implicit component of a file, such as an image tag 108 in a live linear feed. An image tag 108 may be a placeholder for content insertion, such as an advertisement.

Content tagging 108 may be automatic. The mobile media platform 100 may facilitate automated tagging 108, tag 108 recognition, decoding, interpretation, utilization, processing, creation, updating, and the like for content sourced by and/or distributed from the platform. All functions of the mobile media platform 100 associated with tagging 108 may be automated. Tags 108 and tagged content 108A may be automatically processed by ingestion 118, encoding 104, advanced transcoding 104, delivery 120, mediation, settlement, pause and resume, and other features, functions, and capabilities of the platform. In an example, content may be tagged 108 during ingestion 118 based on relevancy to one or more mobile user requests for content. Automated tagging 108 may be subject to and controlled by restrictions and/or rules associated with the tags 108, tagging 108 functions, tag 108 standards, and the like.

Tags 108 may include a name of a content clip, an artist, a genre, a content provider, a publication date, a file size, digital rights management information and the like. Tags 108 may be useful in allowing a content manager 3202 to compile an album of content. In an example, digital music songs may be tagged with an album name and the mobile media platform 100 may organize the digital music songs so that songs with matching album name tags 108 may be combined. Alternatively, a user may request that the content manager 3202 discover content with an album tag 108 and deliver the content to a user's device 3102 as it is discovered. The tags 108 could then be used by the device 3102, such as a digital music player (e.g. MP3 player) to organize a play list of the delivered, tagged content 108A based on the album name tag 108. Attributes associated with tags 108 may be logical representations of content or information related to content as herein described.

Composite content may include one or more tags 108 that are associated with each type of content within the composite. Also composite content may not contain tags 108 that are related to content types that are not included in the composite. In an example, composite content that does not include audio type content may not include tags 108 that represent audio related attributes. In another example, when content includes composite content such as news content that includes audio, video, and text may include audio related tags 108 associated with the audio type content.

Tagging 108 may also help address content management 3202 challenges associated with composite content, diverse content types, various encoding methods, device and delivery network differences, and the like. Tags 108 may facilitate a content management facility 3202 in defining content in a way that relates to delivery to mobile devices 3102 without enforcing strict content management 3202 methods. Tagging 108 may allow a mobile media platform 100 to work with generic content such as media, documents, and the like. Tagging 108 may also allow for light content definitions while supporting a wide variety of content.

A mobile media platform 100 may facilitate an extensible model of tagging 108, such as by offering flexibility and allowing continuous evolution of descriptors associated with tags 108. Tag 108 model flexibility may be supported by tags 108 not being content, but rather tags 108 may characterize content in terms of aspects that are important to the platform or delivery. As an example, tagging 108 may describe image size, color depth, and the like within the image file itself. These tags 108 may include descriptors that may be embedded by a camera acquiring the image and delivering it over a network. Tagging 108 model flexibility may also support the addition of new tags 108. Tags 108 may be newly defined as needed or desired to support content management 3202 and delivery 120. An example of a tag 108 that may be newly defined may be a camera model number tag 108 attached to image content. As content is moved from a source throughout a network, instances of the content may be tagged 108 to facilitate distributed sharing of content. In an example, a portable media player 3102 may receive a local download from a user's personal computer of content that was delivered from the mobile media platform 100 to the personal computer. A content manager on the portable media player 3102 may tag 108 the content based on associations of the content to other content already on the device so that when the newly tagged 108 content is uploaded to the user's personal computer, it may include the new tags 108. If the newly tagged 108 content were ingested by a mobile media platform 100 content manager 3202, the new tags 108 may be detected, examined, and be included in a knowledge base of tags 108 associated with the media platform 100.

The platform 100 may maintain tags 108 of significant and representative words in a media clip. These tags 108 could be used to locate time places and seek commands to return or search for timeline ranges to continue playback. Tagging 108 may be used to associate advertising targets and provide better relevance of association.

Enhanced encoding/transcoding 104 may support tags 108 provided within content, such as a camera model number within an image taken by the camera. A flexible tag 108 model associated with a mobile media platform 100 may allow for such use. A tag 108 may also include basic descriptors related to content, such as is the image a photo, line art, rendering, cut from a video, and the like. In this way, tags 108 may define image content more precisely. A flexible mobile media platform 100 may support tags 108 that may add content to an item. Some examples may include a tag 108 holding text for a thumbnail image, a location of a full size image associated with a thumbnail image, the source of a thumbnail and the like. For content that may not be directly analyzed, such as binary content, tags 108 may be used to provide metadata. In this way tags 108 become vehicles for providing support and management of content that otherwise may be encrypted, or may include text in any language, and the like.

A content management facility 3202 may utilize tagging 108 to represent portions of content in different modes. An audio track may be analyzed, the speech or lyrics may be extracted and converted to text, and the resulting text may be added to a tag 108 and attached to the audio content. Such an application may facilitate translating content, providing subtitles, supporting closed captioning, and the like. Also, text tags 108 may be analyzed similarly to text content. By building up tags 108 attached to content, the content becomes more readily analyzed and therefore may be more valuable. In an example, an advertiser may pay more to sponsor content that includes certain words such as a vendor name or sports team name. In this example, local news content that includes a story about a national sports team may be sponsored by advertisers who desire for their advertisements to be associated with the national sports team. The advertising may be automatically associated with the local content so that the local news provider may reduce costs associated with separately promoting their news broadcasts to acquire sponsors.

In addition to attaching tags 108 to content, tags 108 may be attached to content metadata 108B, content wrappers 108C, and the like. The mobile media platform 100 may support tags 108 associated with content 108A, metadata 108B, wrappers 108C, enclosures 108C, and any other aspect or element necessary or beneficial in content generation, distribution, delivery, management, use and the like. In an embodiment, a tag 108 may be geo-location data relating to the location at which the content was created or to which the content relates. For example, a tag 108 may include the longitude and latitude at which a photograph was taken.

When contrasted with composite type content, tagging 108 may provide more detailed and more extensive descriptions of content than what just a composite type indicator may provide. Tags 108 may further support a composite profiling process such as to enable transcoding based on information in the tag 108, rather than just on the ingested content encoding format. Tagging 108 may provide descriptions of content in a way that is similar to how a news announcer provides descriptions for the images, video or other content provided to the user along with the news announcer audio. Tagging 108 may provide the rough equivalent of commentary in a sports broadcast. Tagging 108 may also including functional data such as URLs, addresses, contact information, actions, and the like. Tags 108 may include cumulative information such as access counts or download counts.

It is envisioned that new tags 108 may be created to facilitate using the mobile media platform 100. Tags 108 that support the mobile media platform 100 may include front-end tags 108 (e.g. identify the content), middle-level tags 108 (e.g. functional tags that may direct actions within the platform), and back-end tags 108 that may facilitate customized user experience. Tags 108 may also link up with other information such as information associated with a user including demographics, location, psychographics and the like.

Tagging 108 may provide benefits to content discovery by focusing on ways of discovering and acquiring the content. Seeking content based on a tag 108 or a tag value may allow better indexing of content and therefore may facilitate locating content. In an example, if a user is interested in receiving content that is certified by a regulatory agency, the regulatory agency may tag content that it has certified and the user may direct the mobile media platform to seek out content with a certification tag 108 from the regulatory agency. In this way the content may be handled by a secondary filter or targeting facility after it has been discovered through tag 108 searching. The agency may also use the mobile media platform 100 to seek out content that includes a tag 108 requesting certification. In this way content may be considered to be finding its own way from a content provider to a destination.

A content management facility 3202 may use tags 108 to classify content into more descriptors. The descriptors may be tagged 108 with appropriate uses and actions to take with the content.

Tags 108 may themselves contain the purpose of the tag 108 so that tags 108 do not need to be predetermined into a limited set of tag types. A publishing engine may tag 108 content to determine the content destination and content routing or delivery systems may identify the destination tag 108 and thereby make appropriate routing decisions to move the content to its destination.

Tagging 108 may also facilitate building community through attaching community tags 108 to community designated content. In an example, a condominium association may publish various documents such as a master deed, master insurance plan, rules and regulations, meeting minutes, financial statements, association news, bylaws, and the like that may be available to the public but is most beneficial to members of the association. The content may be generated with an 'association' tag 108 attached that allows interested members of the public to receive the content published by the association.

Mobile media platforms 100 may beneficially utilize and support tags 108 to facilitate things like producing text from a soundtrack, accessing content descriptors without opening and analyzing the content, targeting network operators, determining aspects of a device on which a recorded content was recorded, and the like. By utilizing tags 108 for physically representing information relevant to the content, the tags 108 may provide descriptions about the content as well as about themselves. In an example, a tag that identifies content encoding format may allow an automatic encoding/transcoding 104 module to self-determine what is being encoded. Without tagging 108, the encoding 104 may require the content to be opened to examine the content or a header of the content to determine the encoding format of the content.

Tagging 108 may be more broadly applied to facilitate use of user generated content and/or codec. Certain applications or tools are required to handle certain file types (e.g. Excel is required to handle files with a .xls extension in the file name). Without knowing the file type, it may be very difficult to determine which application or tool to use with a file. Tagging 108 the file or tagging 108 the content within the file may allow a content management system 3202 to identify the correct application or tool for each file provided. In an example, a tagged 108 file that is tagged 108 with descriptors of the file (e.g. file size, frames per second, bits per second, encoding rate, and the like) may be more easily handled in a mobile media delivery environment than an untagged file. The untagged file may need to be opened and analyzed to determine the relevant elements for appropriate enhanced encoding/transcoding 104, delivery 120, use and the like.

A mobile media platform 100 may manage content, including adjusting or changing content, to facilitate delivery of content and use of content by mobile devices 3102. When variables of the user, the device, and content related categorization are handled by the platform, tagging 108 becomes an attractive medium for robustly handling diverse and broad content related information. Operationally, tagging 108 also may facilitate matching content being requested to information about available content that is stored in tags 108 associated with the available content.

Figure 37:
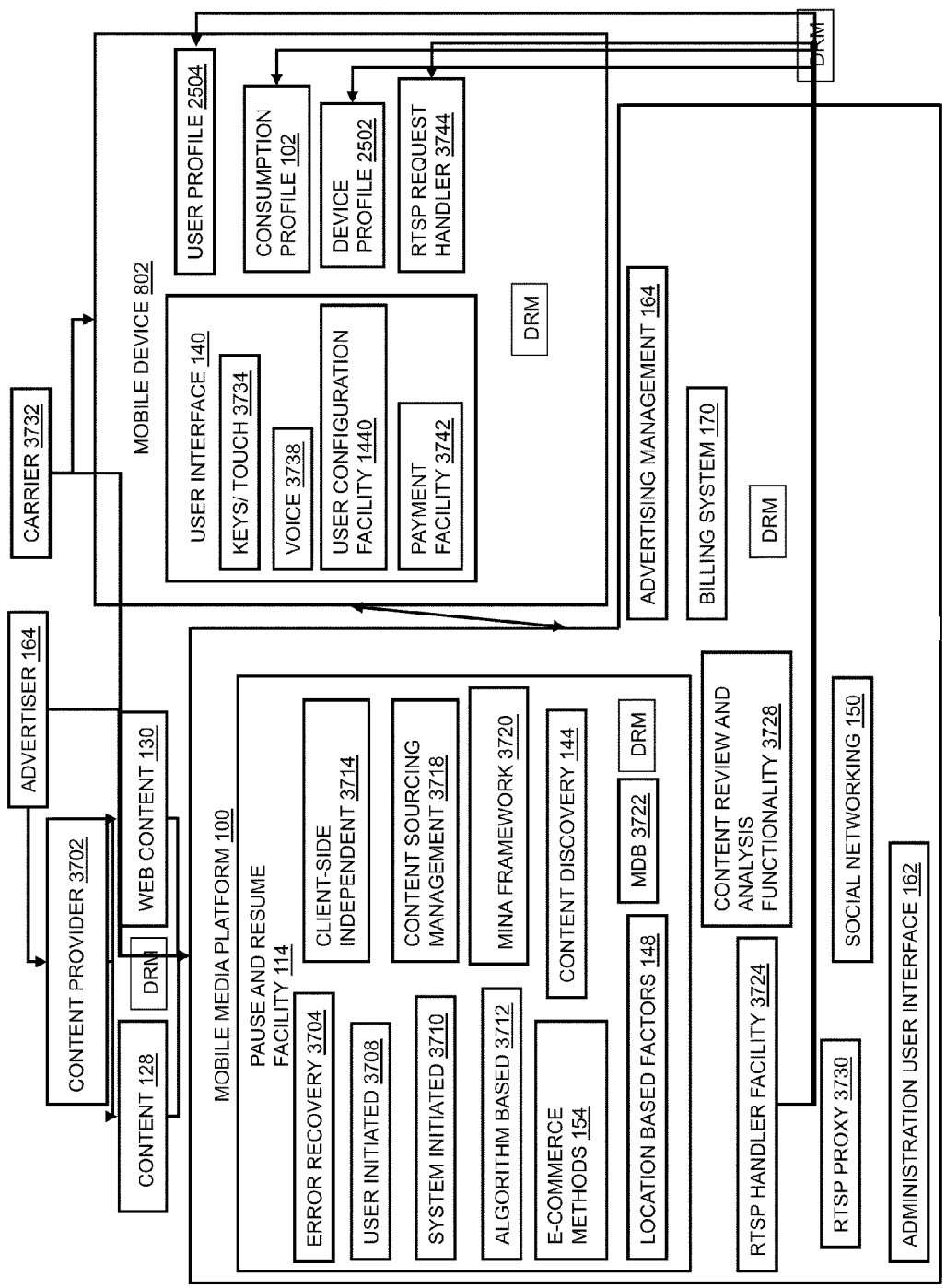
FIG. 37 depicts pause and resume in a mobile media platform.

Referring to FIG. 37, the mobile media platform 100 may include digital PVR type capability including pause and resume 114 of content 128 being ingested and/or delivered to a mobile user. Such capability may support resuming a content 128 stream at a point at which it was previously stopped. Pause and resume 114 capability may also facilitate error recovery 3704 that may interrupt playback of content 128 on a mobile handset. A pause and resume 114 functionality may be network based, thereby facilitating supporting any mobile device 3102 without requiring changes to the hardware or software running on the mobile device 3102. Pause and resume 114 may be user initiated 3708, system initiated 3710, and the like. Certain types of content 128, such as long form content 128, may benefit from pause and resume 114 functionality in that users may be more likely to access long form content 128 knowing that they can pause and/or resume the content 128 so that the entire content 128 does not need to be viewed in one session. Pause and resume 114 may support various e-commerce methods 154 that associate content playback with an event such as payment or advertisement viewing, and the like.

As depicted in FIG. 37, pause and resume 114 may affect and be affected by digital rights management, including without limitation, a pseudo-hardware device identifier, protecting different segments of content through different means, blending different methods of protection, such as encryption and scrambling, and location and time zone based logic, all as described herein. DRM may be applied to content from a content provider 3702. In embodiments, the pause and resume facility 114 may include a DRM facility. In embodiments, the mobile media platform 100 may include a DRM facility. Referring to FIG. 37, the mobile device 3102 may also include a DRM facility or other DRM capability. Communications to and from the RTSP Handler Facility 3724 may be impacted by DRM.

Figure 38:
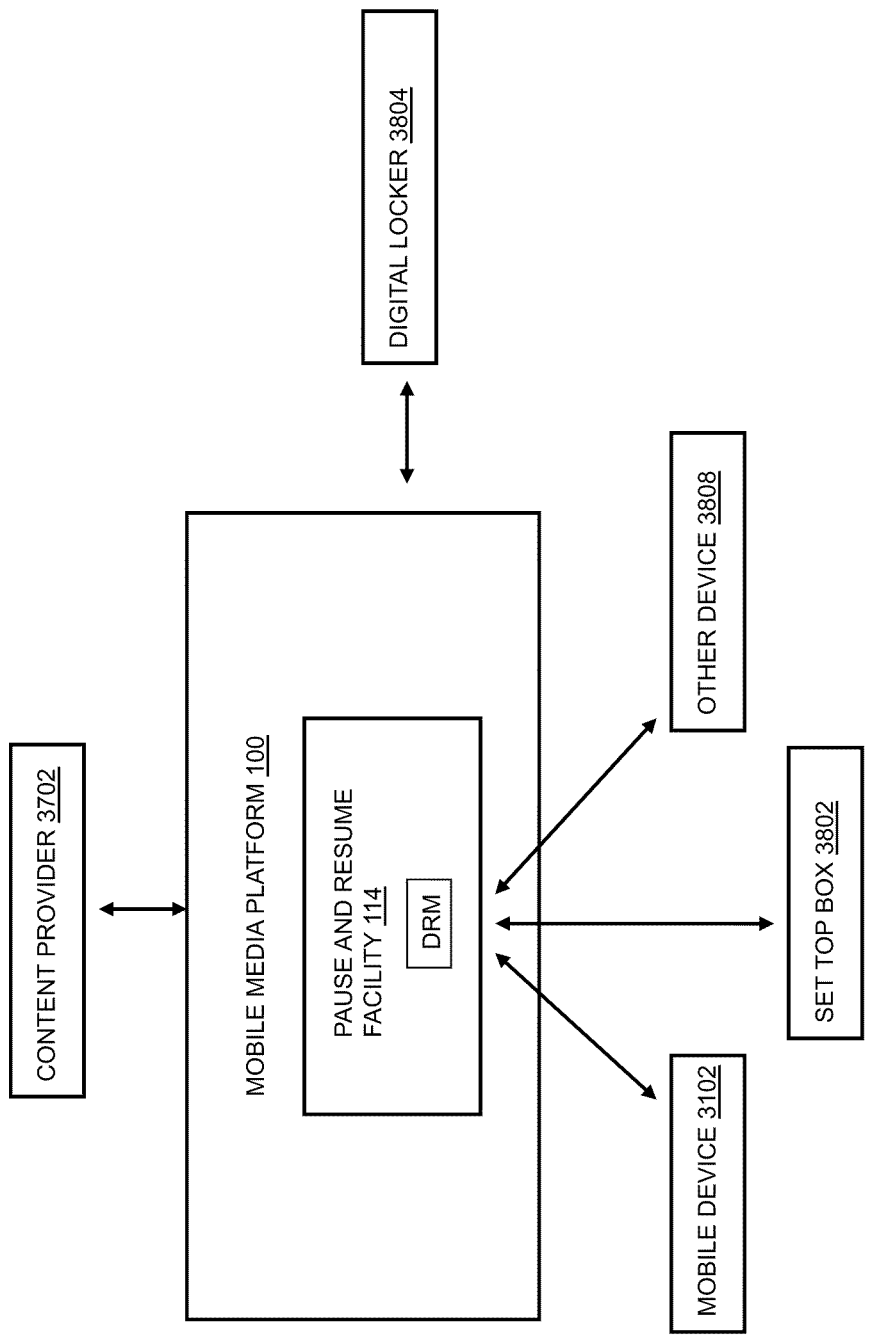
FIG. 38 depicts pause and resume in a mobile media platform among various devices.

As provided herein and referring for FIG. 38, the content may be paused on one device and resumed on another and the devices are not required to be mobile devices. Referring to FIG. 38, content may be provided by a content provider to a mobile media platform 100. A pause and resume facility 114 which may contain a DRM facility or otherwise have DRM capabilities, such as the DRM capabilities described herein, may enable content to be paused on one device and resumed on another, as described herein. The devices may include a mobile device 3102, a set top box 3802 and any other device 3808. Each device may be associated with a pseudo-hardware identifier, as described herein. The mobile media platform 100 and the pause and resume facility 114 may be associated with a digital locker 3804, as described herein. The digital locker may contain content and/or may include the rights particular users and devices have to particular content.

In embodiments, the content may be paused on one device and permitted to be resumed on other devices based on their pseudo-hardware identifiers, as described herein. In another embodiment, the content and/or access rights may reside in a digital locker and devices among which content may be paused and resumed may be associated with the digital locker. In an embodiment, content may be paused then the rights to access such content no longer permit access. This may be due to expiration of the rights, revocation of rights, traveling to a location for which the user does not possess rights, traveling to a time zone for which the user does not possess rights, and the like. Playback may be resumed when the rights are reinstated, the location or time zone is changed to a location or time zone for which a user has rights, and the like.

Pause and resume 114 may be user configurable, such as with a user configuration facility 1440, and user activated. A user may specify conditions associated with pause and resume 114 that may be associated with a user profile 2504 and/or a consumption profile 102. A user may access a pause functionality during content playback through features associated with a mobile device 3102. A user may access resume functionality when content 128 is accessed through a mobile device 3102 or other compatible device. In an example, a user may signal that content 128 currently being presented on the user device is to be paused by pressing one or more function, data, or soft keys 1434 on a mobile handset. The keys 1434 may be fixed, programmable, or screen based. When a user accesses content 128, the user may be presented with options associated with the playback of the content 128 including resuming playback of the content 128 based on a pause related action taken earlier by the user, the mobile device 3102, the network, a server, a carrier, and the like.

A device related action may cause a user initiated 3708 pause to require reestablishing a connection with the paused content 128 to resume playing. Device related actions may include battery power being low, a unit turning off due to battery power, a loss of signal, a pause timeout exceeding a device determined threshold, tampering with the device, such as may impact the pseudo-hardware identifier, and the like. A network related action may cause content 128 being presented on a mobile device 3102 to pause without the user taking any action. A pause associated with a network may be based on network bandwidth limitations, duration of a session, signal quality, and the like.

Pause and resume 114 may be algorithm based 3712. Algorithm based 3712 pause and resume 114 may be associated with e-commerce 154, advertising, and the like. Content 128 may be provided to a user free of charge and may play free of charge for a trial duration, such as 30 seconds. At the end of the trial duration, the content 128 may be paused and the user may be presented with options for resuming the content 128. A user may be presented with an option of accepting responsibility for a charge that may be applied to a form of payment or may be automatically included in their mobile device 3102 usage bill (for example). A user may be presented with other alternatives as well including, without limitation, submitting a form of payment such as through a payment facility 1442, agreeing to perform an action (e.g. viewing a commercial, taking a survey, and the like), providing demographic information, agreeing to receive additional content 128 (e.g. advertisements, promotions, and the like), and other alternatives as may be beneficial to the user, the content provider 3702, the network carrier, the mobile media platform 100, and the like. In an example, a user may have available a certain amount of credit in a prepaid credit account that may be used toward playback of content 128. Content 128 may be played back until the credit account has insufficient funds to continue playback at which point the playback is paused. The user may be presented with an option of topping off the credit account to resume playback. Because playback may not be dependent on the user device, the user may top off the credit account at a later time and resume playback any time after the credit account has sufficient playback funds. The user may use a payment facility 1442 associated with a user interface 140 to perform payment transactions.

Algorithm based 3712 pause and resume 114 may be used to pause creative content playback so that an advertisement or other sponsored content 128 may be presented. Because the algorithm may be based on aspects of the session, the user, the provider, the advertiser, the carrier, or the creative content 128, there may be no need to provide specific support for advertisements within the content 128 as is typically done. In an example, creative content 128 may be sourced and it may not include any special tags, markers, intercession breaks, and the like at which time an advertisement may be inserted. Instead, an algorithm, such as a duration of play time between advertisements, may be used to determine when to pause the content 128 and present an advertisement.

The mobile media platform 100 may include content 128 review or analysis functionality that may facilitate placement of advertisements in association with algorithm based 3712 pause and resume 114. In an example, an algorithm may identify a change of scene in the content 128 as an opportunity for pausing the creative content 128 to present an advertisement. Image analysis methods may be employed to determine change of scene. An algorithm may further include factors such as a user profile 2504, carrier preferences, creative content provider 3702 preferences, advertisement placement demand associated with the creative content 128, and the like to determine pause and resume 114 of playback of creative content 128.

Pause and resume 114 functionality associated with a mobile media platform 100 may include location based factors 148. Pause of live content 128, such as performances or competitions, may occur based on a location of a mobile device 3102 displaying the live content 128. In an example, a blackout area around a live event, such as a sports competition, may be established to promote attendance at the event. A mobile device 3102 that enters the blackout area during live playback of the event may be subjected to the blackout and the playback of the event may be paused automatically. Playback may remain paused, so that playback does not resume while the mobile device 3102 remains within the blackout area.

Upon exiting the blackout area, the playback may resume. Alternatively, playback within the blackout area may resume after a delay, such as after the completion of the competition. The blackout pause and resume functionality may be enabled by the digital rights management systems and methods described herein. Other types of location based 148 pause may include a mobile device 3102 moving outside a secure zone, such as the interior of a building or a secure property. Certain types of content 128 may be paused based on location of the mobile device 3102. In an example, display of confidential information may be paused when a mobile device 3102 is determined to be located in a public area such as an airport. Playback may be paused based on proximity of the playback device to other devices. Device proximity pause may be useful to limit unauthorized sharing of content 128, preventing unauthorized users from potentially viewing content 128, such as private content 128, and the like.

Pause and resume 114 may require no client side dependency 3714. The mobile media platform 100 may include one or more network components, such as a server, a streaming protocol server, and the like that may monitor content 128 delivery to a user so that resuming playback of content 128 may be requested by a user from another device. In an example, a user may be viewing playback when the battery of the mobile device 3102 dies, the device disconnects from the network, and the playback stops. One or more of the network components may detect the mobile device 3102 disconnection and may effect pausing the playback so that the user can resume the playback at a later time. The user may turn to a friend or co-worker and use their mobile device 3102 to access the paused content 128. When the user accesses the content 128, the user may be able to select the paused content 128 for playback starting at the point when the user's mobile device 3102 battery died. The paused content 128 may be made available to the user through a secure login, for example. For example, a user may pause playback of a video on his in-car device via WIMAX and resume viewing playback of the content on his PC or IPTV at home.

Pause and resume 114 may also be used to facilitate managing content sourcing 3718. Streaming content 128 that is being sourced from a first content source may be paused and upon playback resumption, the content 128 may be sourced from an alternate source, such as a preferred source. In this way, a user may select content 128 for playback and the platform may adjust content sourcing to manage bandwidth, costs, and the like. In an example, a user may request content 128 and to ensure delivery of the content 128 to the user is not delayed, the mobile media platform 100 may begin streaming content 128 from the first source detected containing the content 128. However, the platform may determine that another source, such as a file repository of the mobile device 3102 carrier, contains the content 128 and that using the carrier provided content 128 would benefit one or more of the user, the carrier, the content provider 3702, the platform, a sponsor, and the like. Pause and resume 114 functionality associated with the platform may briefly pause the playback and switch to the preferred source to resume playback. Alternatively, the platform may not pause playback but instead pause ingestion and seamlessly switch delivery from the first identified source to the preferred source using the methods of resuming playback as herein described. This may be accomplished by the platform identifying a point in the content 128 at which the ingestion is paused and requesting streaming of the content 128 from the preferred source at the pause point and then seamlessly delivering the content 128 from the preferred source in sequence with the pause point of the first source. Seamless transition from the first to the preferred source may be facilitated by pipelining content 128 from the first source to establish a buffer of content 128 that is accessed until the preferred source playback is available.

Pausing and resuming playback may be beneficially applied to short form content 128, long form content 128, live content 128, on-line games, video, audio, e-books, multimedia content 128, and any other type and composition of content 128 as here in or otherwise disclosed. Live content 128 may be buffered, such as in temporary storage, during a pause so that playback can be resumed immediately by the user. If the content 128 is paused for an extended time, the content 128 may be transferred to more permanent storage to allow playback at a later time while reducing platform resources that otherwise may be used for delivering unpaused content 128.

Figure 39:
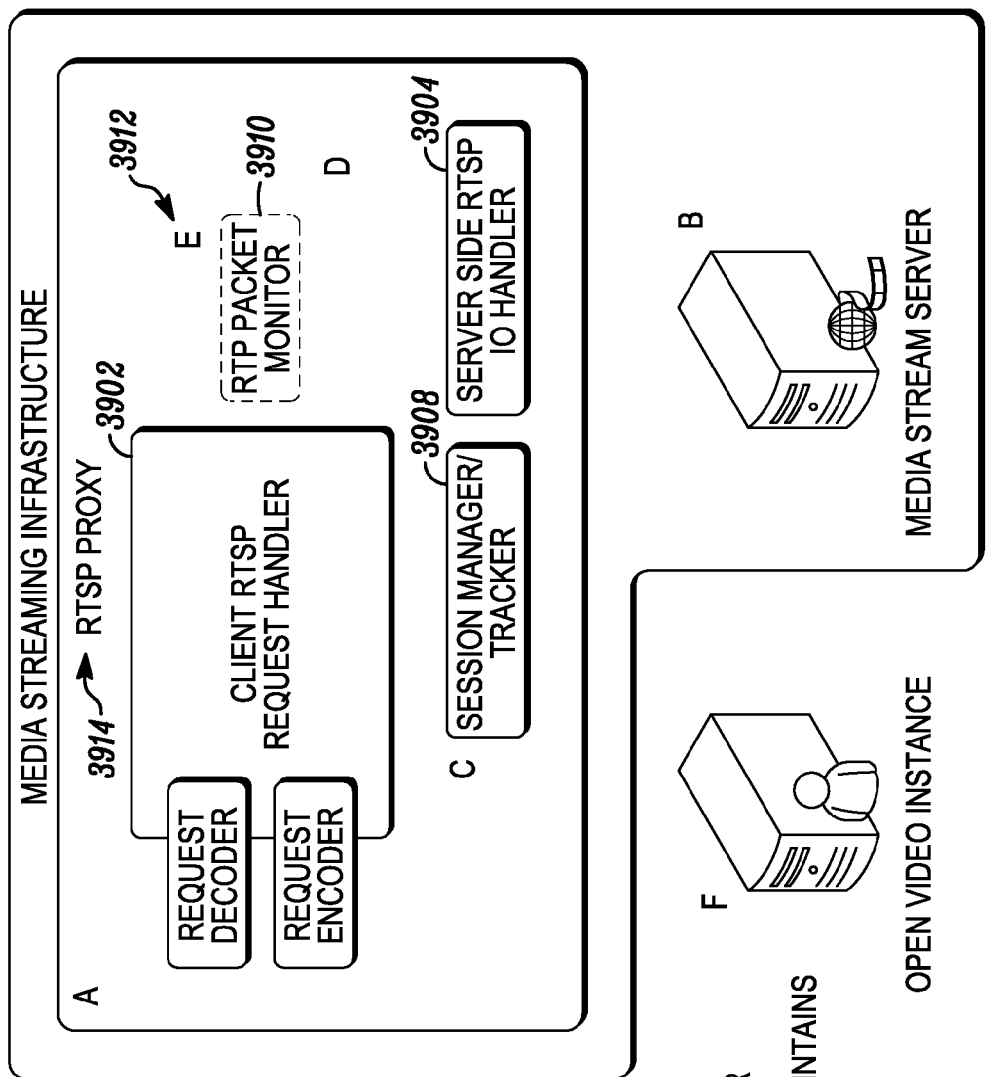
FIG. 39 depicts an RTSP proxy for pause and resume.

Referring now additionally to FIG. 39, pause and resume 114 functionality may be supported by aspects of the mobile media platform 100, such as a Real Time Streaming Protocol (RTSP) handler facility 3724. A RTSP handler facility 3724 may include a client RTSP request handler 1502 that accepts RTSP requests from a client. The client RTSP request handler 1502 may decode the RTSP into a request that a streaming server will understand. The client RTSP request handler 1502 component may also keep track of intended start time per request as well as information about the user. It may also translate the response from the streaming server. A server side RTSP IO handler 1504 may handle basic input/output operations related to the streaming server. A session tracker/monitor 1508 may maintain an in-memory map of the active client connections the RTSP handler 1502 is handling. An RTP packet monitor 1510 logs the number of bytes transferred per stream per session. An embedded Derby 1512 is the repository where the RTP packet monitor 1510 logs and persists information. In an example, when RTP data packets are transmitted to a destination (e.g. a mobile device 3102), the RTSP handler 1502 may record the number of bytes transferred per track. On termination of a session the RTSP handler 1502 can transmit the total number of bytes transferred. A message-driven bean (MDB) 3722 associated with the mobile media platform 100 may receive this byte count and may calculate the position at which the client stopped viewing the clip. Alternatively, the functionality of calculating stop and resume position may be performed by other aspects of the platform including the RTSP handler 1502, an RTSP proxy 1514, and the like. An RTSP proxy 1514 may be an open source proxy server that works with the RTSP in multimedia streaming reproduction. Its purpose may be to establish the conditions of an audio-video streaming session. This protocol may allow a client to remotely control a streaming media server, issuing VCR-like commands such as "play" and "pause", and allowing time-based access to files/live broadcasts on a server. The streaming data may then be sent over other channels using other protocol such as RTP (Real Time Protocol), and the like.

Pause resume functionality may use a Multipurpose Infrastructure for Network Applications (MINA) framework 3720 to help users develop high performance and high scalability network applications easily. MINA 3720 provides various event driven and asynchronous APIs. MINA 3720 may support various transports such as TCP/IP, UDP/IP via Java NIO, and the like. MINA 3720 presents advantages over raw NIO protocol by separating "Networking Code", "Protocol Codec" and "Business Logic". MINA 3720 may be used to form an API over which an RTSP proxy 1514 may be written. The RTSP proxy 1514 may be capable of accepting requests from RTSP clients, translating, forwarding them to a streaming server, keep track of bytes transferred per session, and the like.

The RTSP facility 3724 may be associated with a consumption profile 102, a user profile 2504, a device profile 2502 and the like to enhance pause and resume 114 functionality associated with the mobile media platform 100.

Figure 40:
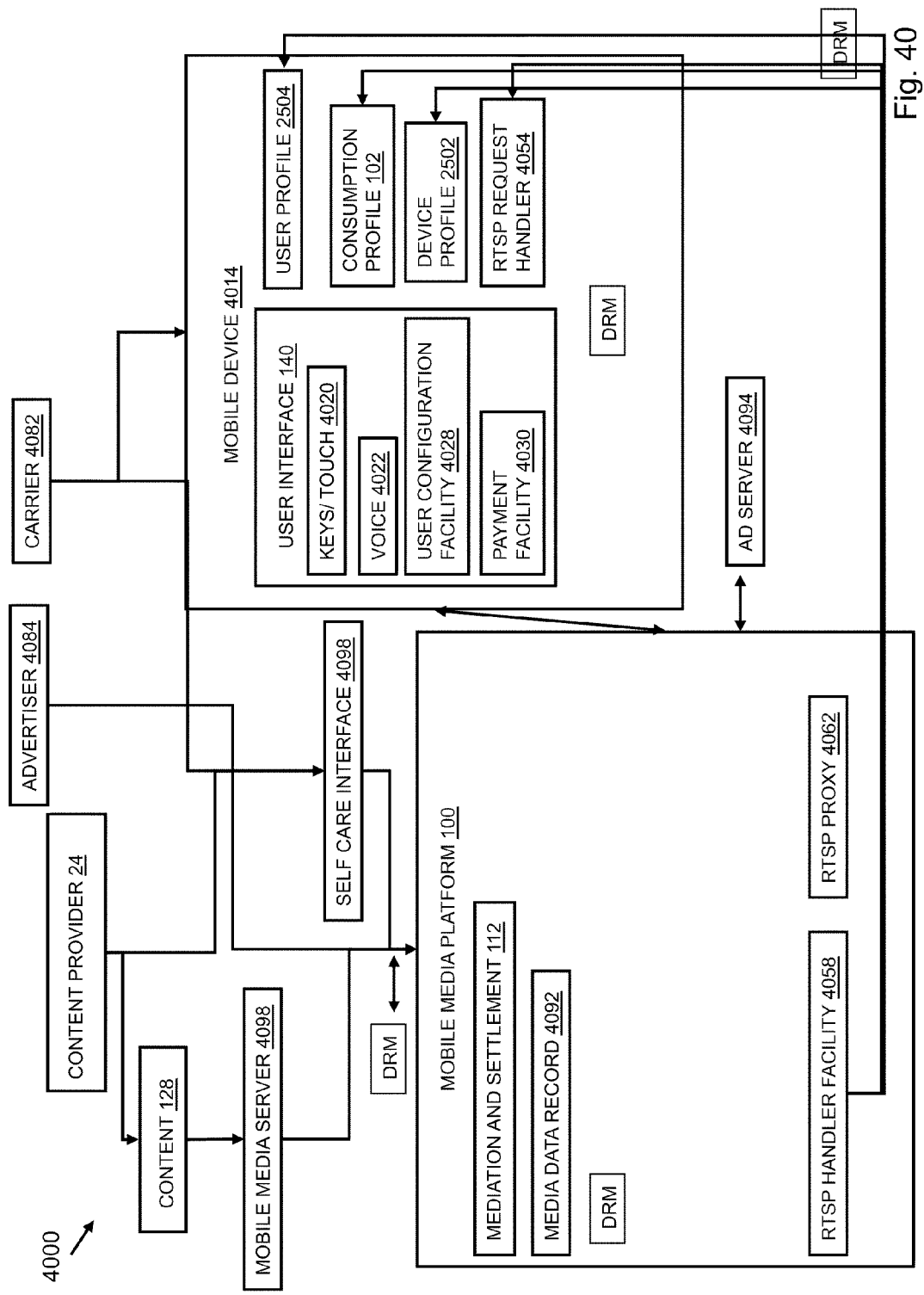
FIG. 40 depicts mediation and settlement in a mobile media platform.

Referring to FIG. 40, methods and systems of mediation and settlement 112 are herein described. A mobile media platform 100 may be associated with mediation and settlement 112. As depicted in FIG. 40, mediation and settlement 112 may affect and be affected by digital rights management, including without limitation, a pseudo-hardware device identifier, protecting different segments of content through different means, blending different methods of protection, such as encryption and scrambling, and location and time zone based logic, all as described herein. DRM may be applied to content input or output from the mobile media platform 100. In embodiments, the mobile media platform 100 may include a DRM facility. In referring to FIG. 40, the mobile device 3102 may also include a DRM facility or other DRM capability. Communications to and from the RSTP Handler Facility 4058 may be impacted by DRM. Mediation and settlement 112 may grant and revoke digital rights based on payment information and status. In an embodiment, when access to content is purchased mediation and settlement 112, in combination with the DRM aspects of the platform, may cause rights to the content to be implemented on devices, such as devices with particular pseudo-hardware identifiers. In embodiments, mediation and settlement 112 may facilitate the transfer of payments for certain digital rights purchased by users to certain content providers. In embodiments, mediation and settlement 112 may check payment status for subscriptions to certain content, as well as payment for rights in particular locations and time zones and though the digital rights management systems and methods described herein regulate access to the relevant content.

Content providers 4024, such as creative content 128 owners, are continuing to look for new and broader methods of distributing their content 128 and for opportunities to further monetize content 128. In addition, the number of content providers 4024, dealers, affiliates, and the like are continually increasing. To facilitate distribution of content 128, such as creative content 128, sponsored content 128, promotional content 128, and the like an increasing number of content 128 distributors are offering opportunities for marketing content 128 to end users. Likewise mobile device 4014 service carrier 4482 continue to offer expanded networks, capabilities, services, and support a widening array of device types and features. Content 128 types continue to diversify, essentially increasing the number of different types of content 128 that must be handled by the distributors, the carriers 4482, the devices, and the users.

Within this expanding mobile content 128 service environment, a mobile media platform 100 may facilitate a radical change in how content 128 is sourced, encoded, combined, distributed, tracked, mediated, financially settled, reported, and the like. The user may benefit from the mobile media platform 100 in that the user may receive more satisfying content 128 at ever lowering costs. Carrier 4082 may benefit from the mobile media platform 100 by gaining financial control over the extraordinary reach of their networks while facilitating a more open mobile content 128 distribution and access environment. Creative content 128 owners may benefit from a mobile media platform 100 by better accounting of the uses of their content 128 and near universal access by all mobile users to their content 128. Content 128 sponsors, such as advertisers 4084 may benefit from a mobile media platform 100 by increased flexibility in ad serving without compromising ad reach or increasing expense for distributed but unviewed ads. The methods and systems of mediation and settlement 112 describe herein may provide these and other benefits.

A mobile media platform 100 may support a very large quantity of an increasing array of content 128 types that are provided by an increasing number of creative and sponsored content 128 owners to carriers 4084 that continue to diversify their offerings to end users. Mediation and settlement 112 may facilitate normalizing the diversities created by the content 128 owners, content 128 types, carrier 4084 requirements, and device functionality so that content 128 view accounting, tracking, and therefore business methods associated therewith may be substantially improved. Normalization associated with mediation and settlement 112 may include establishing and maintaining a media data record 4092 that may be associated with one or more media data events, transactions, interactions, user activity, automated content 128 selection and serving, and the like. Through the use of a media data record 4092, mediation and settlement 112 may allow the business methods to accurately indicate content 128 distribution related revenue that is shared by each partner, for any transaction (event), for any application (service), at any given time, and based at least in part on an understanding of the revenue sharing partners at the time of the event and each partner's quota in revenue sharing at the time of an event represented by the media data record.

A media data record 4092 may include information associated with a mobile content 128 event or events wherein the information may be sourced from a wide array of record keeping and accounting systems. The media data record 4092 may be a normalization of the various data sources. Media data record sources may include different streaming servers, such as different streaming logs that have varying formats, content 128 order, recording methods, and the like. In an example, a media data record 4092 may content 128 streaming data that is normalized from data from one streaming server that records a count of packets streamed and average time duration of each packet and from data from another streaming server that records a start time, an end time, and a count of packets. Both streaming server data records can be normalized in a media data record 4092 to allow mediation and settlement 112 using the one and the other streaming server data. A media data record 4092 may include a wide variety of information associated with distributing and playback of content 128, such as mobile content 128. A media data record 4092 may include content 128-based information (e.g. owner, sourcing server, sponsor, length, genre, type, encoding, origination date, modification date, and the like), carrier 4082-based information (e.g. carrier 4082 name, geographic region served, network features used, service plan, and the like), user-based information (e.g. demographics, user ID, preferences, and the like), device-based information (e.g. device type, device capabilities and features, status of battery power, and the like), ad-based information (e.g. ad server URL, ad cost, ad payment options, genre, target user, ad type, and the like), and other information as may benefit mediation and settlement 112 of mobile content 128 distribution.

Figure 41:
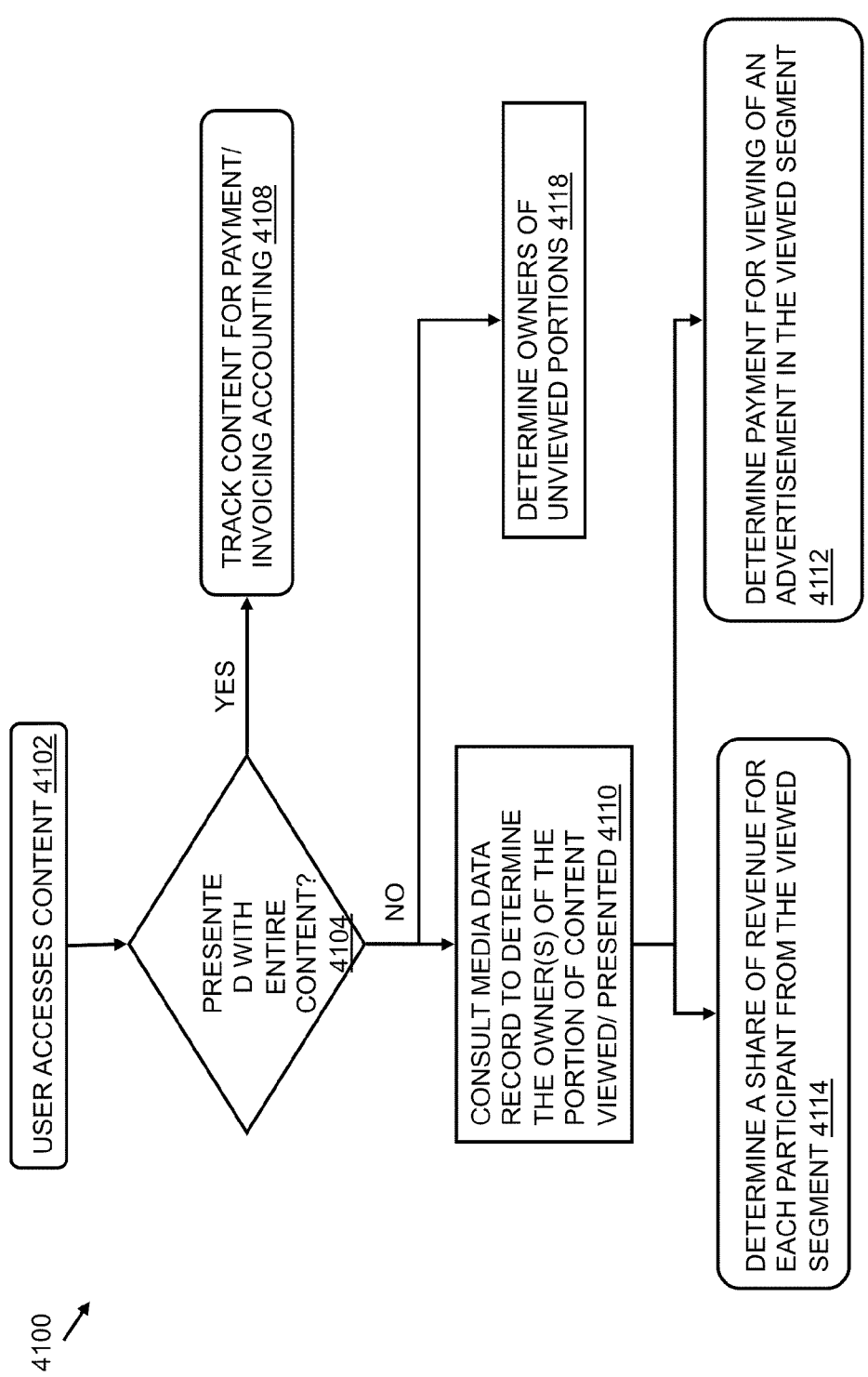
FIG. 41 depicts data flow of mediation and settlement.

A media data record 4092 may include, or may be used to determine viewing of portions of content 128 associated with the media data record 4092. Streaming content 128 delivers content 128 to a user device desktop or interface so that the user is presented the content 128 as it is streamed to the device. A media data record 4092 may facilitate determining, on a packet by packet basis, which portion of the content 128 was streamed to the user device and therefore presented to (or viewed by) the user. Therefore even if a user terminates a request for streaming content 128 after only a portion of the content 128 is streamed, the mediation and settlement 112 functionality of the mobile media platform 100 may determine what portion of the content 128 was viewed and associate the viewed portion with participants (e.g. content 128 owners, advertisers 4084, and the like) represented in the viewed portion to ensure accurate accounting for payment and/or invoicing the participants. Referring to FIG. 41, in an example, a user may request to view content 128 that is thirty minutes long, such as in the logical step 4102. However, the user stops viewing after only ten minutes, such as in logical step 4104, by canceling the stream, such as by pressing 'stop', selecting another function, turning off the mobile device 4014, or closing the top of a two-piece mobile device 4014. The mediation and settlement 112 functionality may access the mobile media data record 4092 and determine the owner or owners of the content 128 streamed in the first ten minutes, such as in logical step 4110, and take an appropriate action, such as determine a share of revenue from the viewed segment, such as in logical step 4114, determine payment for viewing of an advertisement in the viewed segment, such as in logical step 4112, and the like. Mediation and settlement 112 may also make note of content 128, advertisements, and the like associated with the unviewed portion of the content 128, such as in logical step 4118, and make this information available to participants for purposes such as marketing research, accounting reconciliation, and the like. Revenue share may be allocated across many different participants and may be based on each participant's complex share agreement. In an example, revenue share settled through mediation and settlement 112 may result in 10% for each ad that is stitched with streamed content 128, 30% for the carrier 4082, 30% for the creative content provider, 10% for an external reference (search, affiliate, and the like), and 20% for an operator or owner of the mobile media platform 100.

Advertisements may be streamed to a user device 4014 in coordination with creative content 128. Advertisements may be served from a third party ad server 4094 and may be served directly to the user device 4014 without being distributed by the mobile media platform 100. In this situation, the mobile media platform 100 may have determined, based on examining the content 128 packets being streamed to the user device 4014, that an advertisement was served, yet the source of the ad and the owner of the ad may not be directly known by the platform. To facilitate completion of the media data record 4092, either the ad server 4094 may notify the mobile media platform 100 of the request/service of the advertisement or the mobile device 4014 may report back to the platform 100 which ad was served. Alternatively, the information associated with the ad request and serving may be logged by the ad server 4094 so that the log is available to the mobile media platform 100. The information from either the ad server 4094 or the device 4014 may be near real-time, may be posted at a scheduled time, or may be aggregated and made available to the platform 100 based on an aggregation threshold being reached (e.g. a number of ads served, a cost of ads served, and the like). Ad serving may be facilitated by using content 128 that includes metadata as defined by the SMIL standard. SMIL is an example of ad aware playlisting technology that may allow the mobile media server 4098 or the user device 4014 player to reach out to an advertisement server 4094 to pull an advertisement to be presented to the user. A data collection agent may be associated with or operated in association with the media server 4098.

The mobile media platform 100 may include a Real Time Streaming Protocol (RTSP) handler 4058, such as an RTSP proxy 4062, that may analyze each packet sent to the user device so that an accurate determination of what content 128 was delivered to the user. The RTSP proxy 4062 may also analyze the content 128 to determine if the content 128 is creative content 128, advertising, public domain, privately owned, licensed, and the like to further facilitate generating an accurate media data record 4092.

Mediation and settlement 112 may be beneficial to carriers' 4082 efforts to monetize their networks while opening them to additional sources of content 128. Mobile network carrier 4082 typically maintain content 128 traffic tracking systems for network management (to manage spikes, and the like). Mobile network carriers' 4082 tracking systems may not include application logic or content 128 analysis capabilities that facilitate mediation and settlement of content 128 value and network feature utilization with content providers. As carriers 4082 move from substantially closed networks in which they control all of the content 128 provided on their networks to open access networks, the mobile media platform 100 may allow the carrier 4082 to measure network utilization and allocate costs to content providers 4024 as well as sharing in revenue associated with sponsoring (advertisements) of the content 128. Carrier 4082 may create new business models, new billing plans, and the like that may be based around accurate measurement of content 128 value, advertisement value, and the like based on viewership of the content 128. In an example, a carrier 4082 may sanction MTV to openly deliver videos over the carrier 4082 network. Although the carrier 4082 may not control the content 128 being provided (presumably MTV controls the content 128), the carrier 4082 can receive compensation for the use of their network based on data in a media data record 4092. In an example, MTV streams a trailer of a new movie to users on a mobile carrier 4082 network. The mobile media platform 100 may determine, through mediation and settlement 112, that the trailer is viewed by a minimum number of users and the carrier 4082 is notified by the platform 100 so that the carrier 4082 may debit a planned amount from the promoter of the trailer. Content 128 that utilizes a network carrier 4082 high bandwidth capability may be charged differently by the carrier 4082 than content 128 that is served using a low bandwidth network. The media data record 4092, and therefore mediation and settlement 112 may take factors such as bandwidth utilization into account when determining an allocation of revenues or charges associated with content 128 distribution. Similarly, mediation and settlement 112 may be beneficial to a third party participant of the platform 100 in facilitating settling their portion of the revenue share or costs associated with content 128 distribution. Mediation and settlement 112 may also enable third parties to make adjustments in their business, such as if they were paying too much, not paying enough, and the like.

A media data record 4092 may be associated with a mobile content 128 transaction such as a usage event, an ad pull, streaming of creative content 128, requests for content 128, and the like. A mobile media event may occur substantially within a media player. To facilitate capturing mobile device 4014 based media events, media players may be directed to provide input to the mobile media platform 100 based on the content 128 provided and the media event. By accepting a stream of privately owned content 128, a user may also agree to allow the media player to report mobile media events such as replay, fast forward, and other events associated with the stream.

Participants may access information associated with mediation and settlement 112 through a self-care interface 4098, such as a graphical user interface, a program interface (e.g. an API), and the like. A self-care interface 4098 may make information available so that participants may react to information as it is gathered and normalized in one or more of real-time, daily, weekly, based on a threshold associated with mediation and settlement, and the like.

A mobile media platform may be associated with various types of content that may be sourced from a variety of sources. Types of content may include audio, video, text, images, photos, applications, games, data, ring tones, wall paper, fonts, hyperlinks, tables, tabular formatted text, user generated content, media, radio, content primitives, composite content, marketing type content, and the like, and new content types that may continue to be invented and adapted over time that the mobile media platform may extend to cover.

Primitive content types may include basic types such as text, images, and the like. Composite content may include a plurality of primitives such as an image with overlay text or a video with a soundtrack. The mobile media platform may manage an assembly of primitives as composite type content. Marketing type content may be various composite configurations that may be associated with market media such as a music video, a news broadcast, and the like. The mobile media platform may manage an assembly of composite and/or primitives as marketing type content. The content may be short form content. Short form content may be content a user consumes in a single content consumption episode. Short form content may be content consumed during content snacking behavior. Short form content may be content less than approximately five minutes in length. Short form content may include short clips of news, weather, sports, comedy music videos, movie trailers, user generated content, adult content and the like. The content may be long form content. Long form content may be content a user consumes over multiple content consumption episodes. Long form content may be an approximately 20 or 45 minute episode. Long form content may be longer than 5 minutes. Long form content may be comprised of a series of short form content. Long form content may be a movie having a duration of over an hour. Longer format content may include TV shows, movies, live events, such as sports, music, and news, and the like.

Content may be short head content which may be very popular content. There is typically a small number of very popular content titles comprising the short head. After the short head there is typically a rapid decline in title popularity, followed by a populous but relatively unpopular set of titles which have appeal to a relatively smaller audience, comprising the long tail. In embodiments, catering to the audience of long-tail content can be as lucrative as catering to short head audiences. Content includes all new types of content invented over time.

Content, such as content associated with the mobile media platform, may be sourced from a variety of sources. The sources may be associated with a content type, such as a primitive, composite, or marketing content type. The mobile media platform may support content sourced from content owners, content creators, movie studios, television networks, broadcasters, individual content creators, radio broadcasts, pod casts, digital sources, audio sources, mobile carriers, satellite broadcasts, cable, media companies, databases, archives, content programming, content aggregators, files, streaming sources, and the like. A file source may be static and represent a discrete instance of content. Streaming content sources may generate dynamic real-time content that may not be associated with static or discrete instances of content.

Content that may be associated with the mobile media platform may include a wide variety of content and may represent a wide variety of material including, without limitation, television shows, movies, movie trailers, sporting events, music videos, instrumental videos, news, music, lectures, talk shows, commercials, classic television shows, classic commercials, play lists, electronic programming guides, games, programming languages, markup languages, home movies, documents, transactions, records, and the like.

Figure 42:
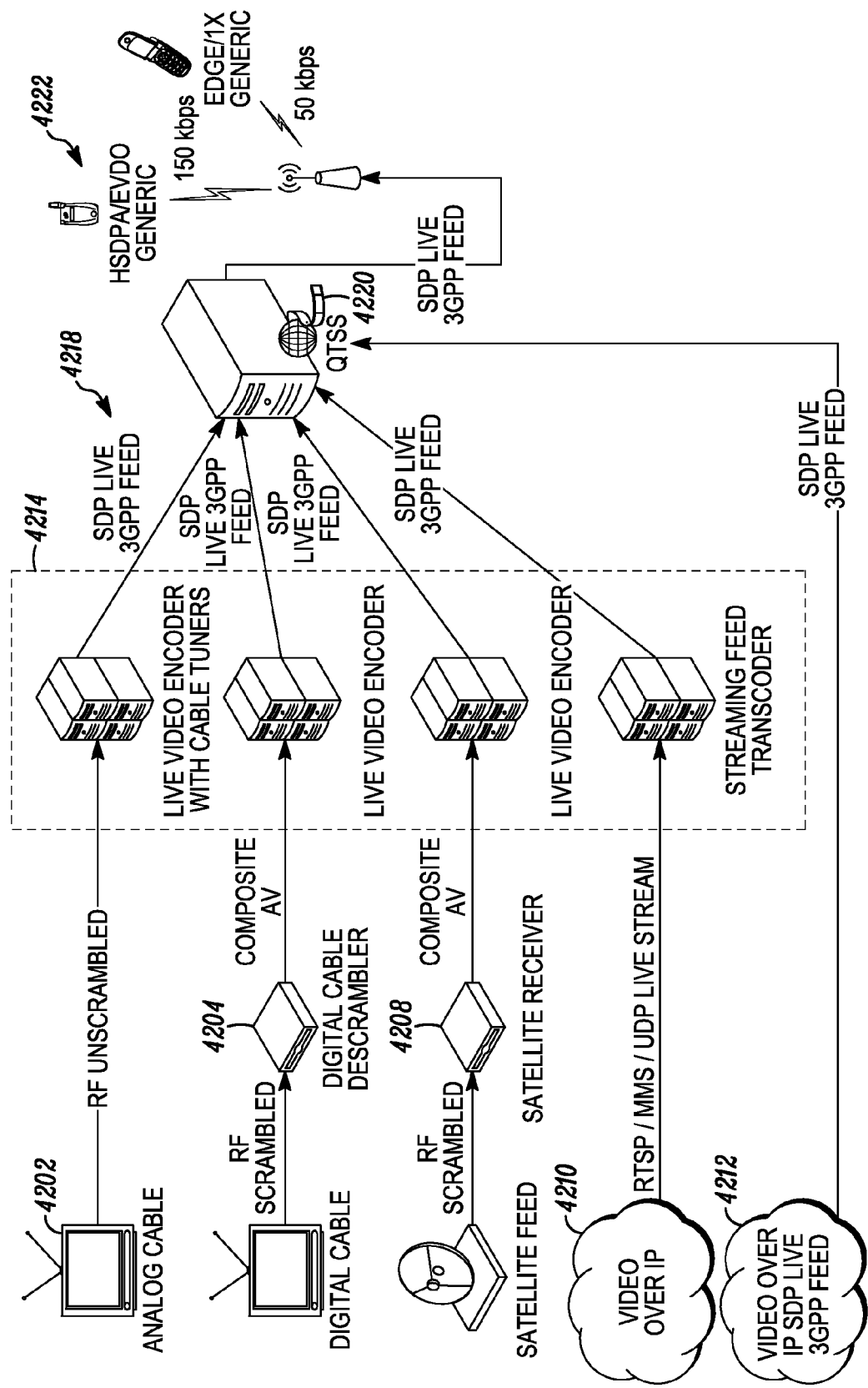
FIG. 42 depicts live content sourcing.

Referring to FIG. 42, live content sources may be include analogue cable 4202, descrambled digital cable 4204, satellite feed 4208, Video over IP 4210 such as RTSP, MMS, UDP live stream, and video over IP SDP live 3GPP feed 4212. Each live unencoded source may be fed into a live raw encoder 4214 configured for the incoming live source. The encoded sources, such as a SDP live 3GPP feed 4218 may be presented to the mobile media platform 4220 for distribution to mobile devices 4222.

Web content may be content originating on the World Wide Web or the Internet. Web content may have originated from a different source directly or indirectly before being placed on the World Wide Web or Internet. Any of the types, sources and examples of content discussed herein may be web content. With the mobile media platform web content may be delivered to a mobile device. Web content may require user interface enhancements and/or high capacity transcoding, such as on a server or on a client to deliver web content to wireless devices that provide high degrees of customer satisfaction.

A mobile media platform may include content ingestion functionality and capability that may be associated with a consumption profile, content management, and the like. Content ingestion may include activities associated with sourcing, acquiring, packaging, and adapting content for distribution to any mobile device. In addition to the content types and sources, content to be ingested may be acquired from sources of various or unknown quality. Not only may the integrity of the content (for purposes of safely ingesting the content) be in question, but the content may not fairly match information that may describe the content such as metadata or keywords. The mobile media platform may support various techniques to acquire, tag, encode and/or package any digital format of content for distribution to mobile devices over a mobile service network.

A mobile media platform's content ingestion may acquire content by polling third party sites for content, may use content source methods, such as RSS, spiders, direct user download, automatic update and the like. In an example, content may be submitted or obtained via an interactive web ports, FTP upload (push or pull), or a Web Service API.

The mobile media platform capabilities and features may include hosting; which may be configured as a secure site and may include redundancy to ensure ingestion and delivery of content to mobile users. Hosting may involve making content available or receiving content over a network. In an embodiment, hosting may involve making content available to or receiving content from a mobile device. Hosting may involve at least one server and at least one client.

The mobile media platform may be associated with and may facilitate delivery to mobile devices. Content that is delivered may be personalized using similar genres, teams, communities of interest, and other content based mechanisms. Delivery may include downloading such as delivering content via HTTP, RSTP download with additional wrappers for DRM, and the like. Delivery may be performed with streams, such as to delivery audio and video content via 3GPP, Real Media streaming, and the like. Delivery may include other types of download, including progressive download.

Delivery services associated with the mobile media platform may determine an appropriate mechanism to deliver a specific element of content based on the element's type, the application to which it will be delivered, a user's preferences, device and network capabilities as describe herein below. Delivery may include delivery of messages to an end user.

Delivery may include combining delivery of content from different sources or via different means. The mobile media platform may contain an application that combines the on-demand delivery of video over a cellular network with live television broadcast content that is delivered over a mobile broadcast technology, such as DVB-H, DMB, MEDIAFLO or the like, together into a single user experience.

In an example, a user watching a mobile broadcast of a sporting event may be provided a link to view a pre-recorded video clip that covers the highlights of the game to that point. Clicking the link may result in the application switching video delivery sources from the mobile broadcast network to the cellular network and causing the highlighted video clip to be streamed on-demand to the user via the cellular network. After viewing the clip, the users could be provided other links to allow them to choose from a list of other content that is available on either the broadcast or cellular networks.

In another example, the application may simultaneously source content from various networks and/or external repositories and integrate the data from these various sources in order to provide the user with a high quality experience. Additionally, the content sourced from various networks and/or integrated repositories may be related to the interests, whether accumulated or point in time, of the user. This may reduce or remove a need to search on the mobile handset. This process may result in effectively increased bandwidth.

The mobile media platform may facilitate visibility of available content. The mobile media platform may facilitate periodic dynamic generation of a content catalogue feed (such as in XML, RSS and the like) with special listings of content to enable content items to be indexed by external systems, such as search engines, web crawlers, spiders, and the like. The catalogue feed may be posted and retrieved by an external system. Alternatively the catalogue may be pushed, such as through RSS, email, WAP push, and other delivery mechanisms. In addition, these special listings of content could include featured, recommended, or popular listings of content that are editorially based or algorithmically generated.

Platform content visibility may include visibility into consumption profiles, device profiles, ingestion profiles, and any other type of content, data, or information associated with the platform. In an example, the content catalogue feed could include user information such as aspects of a user's consumption profile in order to facilitate an improved user experience through targeted presentation of services to the user or to support user loyalty based services.

Content, including web content, may be delivered to or received from a mobile device. In embodiments, delivery of web content to a mobile device may require high bandwidth and/or on-demand transcoding. In embodiments, delivery may be in the form of a notification, such as an email, text message or instant message, including a link or reference to the content or with the content embedded in the notification itself.

The mobile media platform may support optimization associated with various processes, capabilities, and features of the mobile media platform. Optimization may be enacted for ingestion, encoding, transcoding, hosting, delivery, and the like. Optimization may be used to create device profiles. Optimization may support adjusting to available bandwidth that is available for content delivery. Bandwidth adjustment optimization may be a function of the mobile network technology (e.g. cellular (GSM, GPRS, EDGE, HSDPA, UMTS, CDMA, CDMA 1X, EVDO, etc.), Wi-Fi, WIMAX, UWB, BLUETOOTH, MEDIAFLO, DVB-H, DMB, and the like). Bandwidth adjustment optimization may also be a function of the mobile device's network capabilities. In an example, although an operator network provides GPRS, EDGE and HSDPA network connectivity, a mobile device attempting to access our content may only be capable of connecting to GPRS networks. Bandwidth related optimization may also be a function of the effective bandwidth of the network as a function of the mobile operator's specific network configuration. Optimization may also be based on variations in the bandwidth as a result of the mobile device moving from one network technology to another during a content consumption session. Optimization may be implemented by adjusting encoding parameters (e.g. frames per second, bandwidth allocations, codec and the like) to suit current network capabilities.

Optimization may be associated with device playback capabilities so that a device with different audio and video capabilities may be delivered composite content that meets the device capabilities for presenting each. Differences may include different video and/or audio CODECs, capabilities of onboard players and/or CODECs. In an example, for different CODECs, each CODEC may require different encoding settings based on variations in screen size, variations in color depth, resolution, device memory, device CPU power, and the like. Optimization may also be based on device content delivery mechanisms, such as streaming, downloading, progressive download, MMS, WAP push, and the like.

Optimization may also be associated with digital rights management (DRM) and may be a function of the mobile device's DRM technology, or may be a function of the mobile operator's choice of DRM.

Content characteristics related to optimization may include automatically determining characteristics of the content itself (e.g. talking head .vs. sporting event in which the picture changes rapidly and significantly), human or algorithmic determination.

The mobile media platform may facilitate packaging content including repackaging ingested content. Packaged content may be provided in archive files, such as QuickPlay archive files, in a proprietary file structure, may combine metadata and multiple versions of the media itself Packaged content may be delivered through a batch encoding, a single encoding, and real-time encoding. Packaging content may include wrapping content in descriptors defined in XML.

A mobile media platform may also include storage and at least one storage facility. Storage may be for the storage of content, data, metadata, attributes, parameters and the like. Storage may be online or offline, provided through the platform, provided on a mobile device and/or provided through a network. Storage may be provided using various methods, including, without limitation, magnetic storage, optical storage, semiconductor storage and the like. Storage may be provided using various devices, including, without limitation, a hard drive, flash memory, tape drive, magnetic disks, optical discs, minidisc, semiconductor memory, USD flash drive, xD card, SD card, compact flash card and the like.

A mobile media platform may include a user interface for enabling interactivity, viewing thumbnails, facilitating game day tracking, enabling rich new reader features, managing end user presentation, and the like. The user interface may also include dynamic rendering of text and images to optimize the user's experience based on the user's device capabilities. The user interface may include skinning, multi-tabbing, content schedules, daily features, flipbooks, sliders, displaying multiple items at once, split screen applications, and the like.

Enabling interactivity may include framing content with links, such as presenting information about content in a frame around the content. In an example, framed content may be created from a baseball game broadcast. The frame of the broadcast content may include links to websites of the sports teams involved in the broadcast, statistics such as team standings, information about the contest (e.g. date, time, starting pitcher, current balls & strikes, links to advertisers or information about products included in the broadcast, and the like.

A user interface associated with the mobile media platform may, for example enable displaying thumbnail images that can be integrated into textual displays. In an example, a device may have limited screen size that is known to the mobile media platform through a device or consumption profile. A document with integrated text and graphics may be transcoded and/or reformatted based on the device profile prior to delivery so that the graphics may be adapted to be replaced with thumbnail images. The thumbnail images may be identified and tagged during an ingestion process of, for example, the document, the images in the document, content from a thumbnail generation or lookup web service, and the like. Alternatively the mobile media platform may reformat an image during ingestion to generate and store a variety of thumbnail images based on a variety of profiles (e.g. consumption, user, device, network) associated with the mobile media platform. The generated thumbnail images may be tagged so that when content referencing or including the source image is requested by a mobile device, the appropriate thumbnail image may be selected and delivered to the requesting mobile device. Thumbnails may also be interactive in that they can include active elements so that when a thumbnail that is displayed on a mobile device is selected, an expanded image, a video, or an audio stream may be delivered and presented. Thumbnails need not be small enough to fit on the mobile device screen. A thumbnail may be scrollable, such as through a built in user interface of the mobile device or through an interactive framing of the thumbnail.

Applications of a user interface associated with the mobile media platform that may be presented to a user of a mobile device may include game day tracker or a rich news reader. A game day tracker may include a multi tabbed view of the latest news with images, text, audio and video, and the like. Real-time updates of in-game scores, final results, standings, rankings, fantasy football results, and the like are some examples of game day tracker information that may be made available to a mobile user. A rich news reader may push information tickers, news stories with images, audio, video and text integrated into a single view. One approach to facilitate a rich news reader is to tag news stories with metadata so that multiple media types associated with the same story can be displayed together in an integrated fashion.

A mobile media platform user interface may facilitate managing end-user presentation of content and the like by supporting UI widgets (e.g. user interface related software that generate interactive content), a light client approach, an upgrade process, presentation of interactive elements (e.g. widgets), presentation of a discovery interface, presentation of recommendation interface, personalization of the user interface, and the like.

A mobile media platform may include an administrative user interface allowing mobile users, administrators and other users of the platform to configure and manage all or certain aspects of the mobile media platform. In embodiment, the aspects being managed using the administrative user interface may include ingestion, content management, content delivery preferences, reporting, analytics and the like.

A user interface may support or include other features that may optimize a user's experience. These features may include dynamic rendering based on a device profile, presentation of multimedia elements simultaneously within a unified environment, skinning (e.g. user determined, content determined or branded), multi-tabbing, content schedules, daily features, flipbook of images for browsing, a pop-up or fly-in menu (e.g. a scroll wheel type dial), sliders that may add fluidity to menus, displaying useful related content simultaneously (e.g. music download selectable icon while a music video is playing), split screen (e.g. watch a sports broadcast and type a text message).

A mobile media platform may facilitate notification and delivery of messages to mobile device users. The mobile media platform may support user directed management of notifications so that the user may determine how and when notifications, alerts, and messages are delivered. A notification may be related to content. In an embodiment, a notification may be an email, text message, instant message or the like, which may include a link or reference to the content or with the content embedded in the notification itself. Notifications may be related to availability of new content, reminders of broadcast content schedules, delivery of email, billing notices, advertisements, and the like. In an example of notification and message facilitation, the mobile media platform may track user notification preferences and generate a message when an event occurs that matches user preferences. In another example, the mobile media platform may construct messages and use a message management module to deliver the constructed messages to a network operator messaging system.

Figure 43:
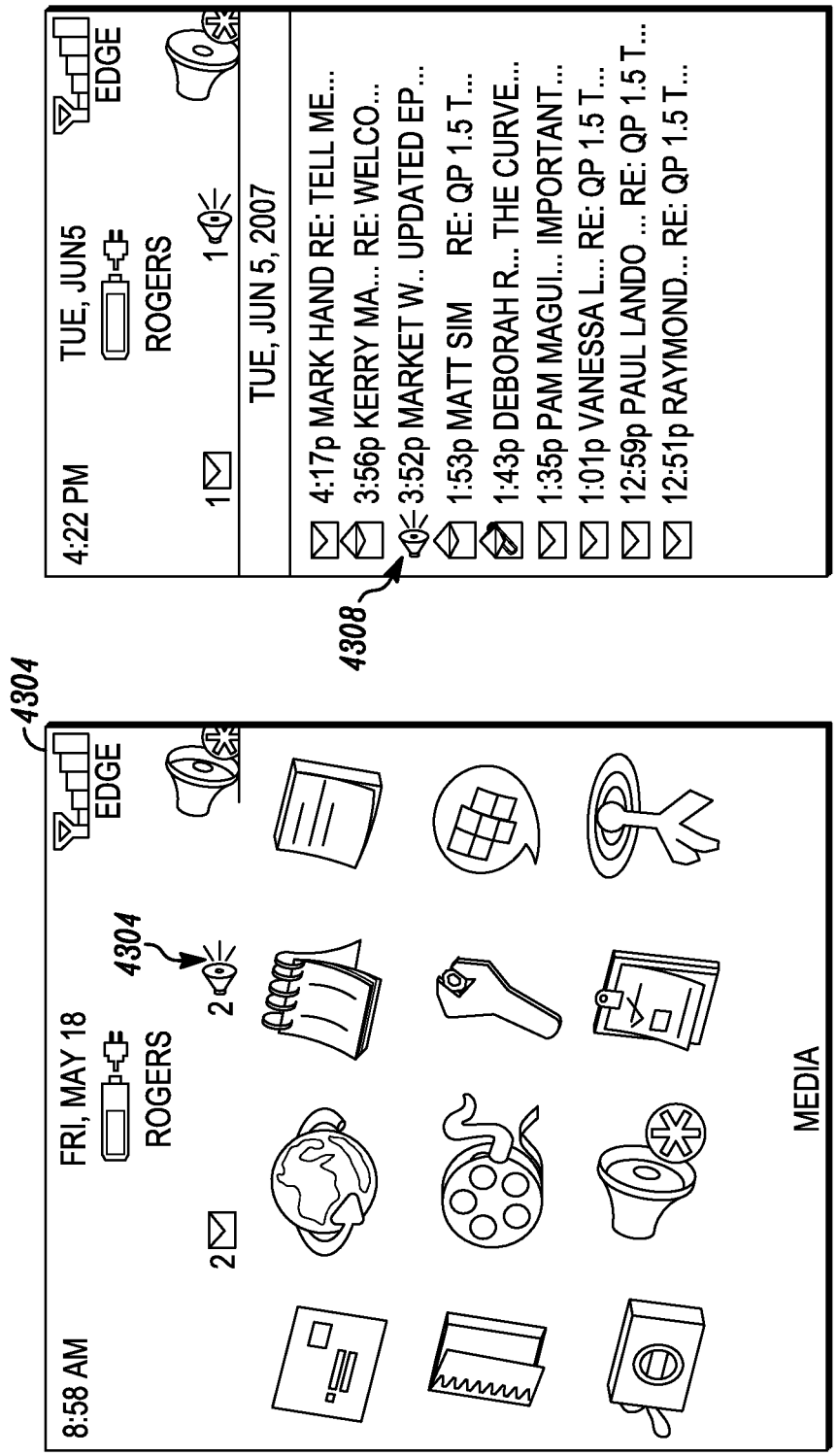
FIG. 43 depicts notification.

Referring to FIG. 43, a mobile device desktop 4302 may include a notification 4304 of an email notification. Upon selection of the desktop notification 4304, an email notification icon 4308 may indicate mobile content being associated with an email. Selecting the email notification icon 4308 may result in content being delivered to and presented on the mobile device.

The mobile media platform may facilitate content discovery. Content discovery may include search, recommendations, content catalog feeds, management, filtering, rating, community polling, personalization, tagging, processing, hierarchical organization, and the like. Search may include searching content, metadata, tags, categories of content, third party search integration, crawling multiple content stores (and presenting in one unified search result), and the like. Examples of recommendation capability associated with the mobile media platform may include a recommendation engine for generating recommendations that may include popular clip algorithms, such as most consumed content, popularity based on a community, popularity based on all users (mobile and non-mobile), popularity based on a subset of users related to the current user (e.g. similar interests, preferences, purchase history, etc). A recommendation engine may generate recommendations based on inferred preferences via algorithmic analysis of historical usage behavior, based on direct user preference input, based on mobile activity context, such as the sensed context of the user, (e.g. location, time of day, type of handset, network operator, time of year, and the like).

In a certain embodiment, the mobile media platform may provide a user with accurate suggestions of relevant content before, during and after a user starts their viewing session to allow the user to quickly engage. Notifications, for example, of upcoming preferred live programming or the availability of new pre-recorded content the user will enjoy, will allow the user to decide what content to watch, and when. The mobile media platform may provide cross-referral suggestions of content while the user is viewing other content, allowing the user to discover more widely varied content. The mobile media platform may understand the user's viewing habits. For example, the platform knows a particular user watches sports highlights and weather in the morning and their favorite sports team and which weather coverage areas they are concerned with and may use this information to deliver appropriate content. In another example, the platform may know that a user typically watches the market recap on their commute home, and is able to adjust the user's experience appropriately by automatically providing the market recap content and related content.

Content may be discovered using keyword searching, metadata sources, recommendation engine, deep linking, MyPlays, popular plays, and the like. Metadata sources that may enable content discovery may include keyword tagging during an ingestion process, voice to text recognition, third party public databases (e.g. IMDB, GRACENOTE), third party private databases (e.g. subscription, membership based) in-house databases (e.g. via integration with content provider and/or operator managed databases).

Content discovery may be associated with a recommendation engine. Newly discovered content may be dynamically recommended to a user based on the user's historic content behaviors. Content management facilities may be directed to discover content to fulfill a recommendation requirement of genre, topic, or other categorization that a user has directly or indirectly demonstrated an affinity for. In an example, new content may be separated from previously discovered content to so that only new content is presented to the user as recommended content.

A content catalog feed may enable content discovery, such as in connection with search and recommendations. In an embodiment, a content catalog feed may be provided to search engines, including mobile search engines. In this manner, content on the mobile media platform may be included in search results, including mobile search results. In an embodiment, a content catalog feed may be enable recommendations. In an embodiment, a content catalog feed may be associated with an active push or feed of content. In an embodiment, a content catalog feed may be associated with a passive pull or post of content, such as though the use of a search engine, web crawler and the like. Content discovery may be enabled through content management. A generalized content management data model may allow the mobile media platform to provide the ability to manage any type of digital data.

Content discovery may be facilitated by deep linking In embodiments, there may be a defined URL for an item of content, which may allow for the promotion of content and viral distribution. In embodiments, WAP push may be used to access the link. Content discovery may be associated with MyPlays in that new content that is related to criteria for MyPlays may be presented as a shortcut (e.g. at or near a top level of navigation) to facilitate a user immediately accessing favorite areas of content. Content discovery may also provide input to MyPlays capability of the mobile media platform so that new content that may have a high relevance to a user's MyPlays content description may be available through a MyPlays short cut. Similarly, content discovery and a popular plays facility may allow a user to immediately access the most popular content directly from the top-level menu of a personal portal page. To facilitate an association of content discovery and popular plays, a popular play facility may combine the number and/or frequency of downloads with various sources of user ratings of a content to determine popularity.

In addition to the content management features associated with content discovery, content recommendations, and content search, content management may also include content filtering that may allow a user to setup various content based filters, content rating that may enable a user to view content rating and generate content ratings (e.g. using a star system, averaging ratings, through feedback), community polling through flexible format multiple choice questioning, personalization of content delivery (e.g. based on a user profile, a consumption profile, operator or wireless carrier input (based on data about the user that comes from the carrier), various personalization algorithms, recommendations, ratings, and the like), tagging of content, font processing, hierarchical category organization, clip-based retrieval, and the like. A generalized data model may provide the ability to manage any type of digital data.

A consumption profile may include history of content consumed over a period that may facilitate personalized content discovery features for end users. One such feature may include popular plays—a popular content listing may be generated based on aspects of content consumption history, average user ratings of content, and the like to create a ranked list of content. Another such feature may include personalized recommendations that may be based on a consumption profile (e.g. consumption history, user preferences, and the like) by associating keywords and category names of content with the consumption profile.

A mobile media platform may provide and/or utilize information relating to the location of a mobile device or user and/or intelligence derived in whole or in part from such location information. Location information may be determined or provided by the mobile device, using a global positioning system or a similar technology, by the mobile media platform, by locating a device on a network, such as a cellular network or Wi-Fi network, by user input, by examining transactions and selections made using the device and the like. Location information may be updated in real time, at set intervals, periodically, on-demand and the like. In an embodiment, location information may be used to identify businesses located near to the user. In an embodiment, location intelligence may be used in conjunction with other information to present content to a user. In an example, the location of a user combined with data regarding the time of day may be used to present the user with advertisements, menus and coupons for restaurants located in the vicinity of the user. In an embodiment, location intelligence may include determining if a user is in a car, train or plane based on the location of the user and the velocity of the user. In an embodiment, location intelligence may be used to determine that a user is approaching a traffic jam and local traffic video content may be presented on the mobile device.

A mobile media platform may be characterized by a personalized user experience. The platform may leverage information about users and user preferences to personalize the user experience. In embodiments the platform may leverage recommendations from the communities to which the user belongs and use the information to present relevant content. In an example, for a sports fan the platform may include the user's favorite teams at the top of menus and search results to make it easier for the user to locate relevant content. This is especially helpful since on a mobile device it is difficult to present more than 2 or 3 links, not 20 or 30 as on a computer. In another example, a user may routinely watch the news, weather and horoscopes every morning. As a result, the platform may serve this content to the user.

The mobile media platform may enable a mobile device to be used as a personal entertainment portal to a personal entertainment server or vice-versa. The mobile media platform may operate as a personal content portal that enables browsing functionality and featured content. The mobile media platform may support QuickPlays that may include predictive content recommendations, MyPlays that may include user subscribed preferences to content, popular plays that may be dynamically populated with content that is highly rated by a community of users, search integration, content ranking that may show a community ranking and allow a user to enter a ranking, deep linking to allow direct access to content rather than going through various affiliates or redirection so that a deep link may be sent to a friend or other mobile user.

A user may associate the mobile media platform with an interactive programming guide. Another way to view this is that the mobile media platform may generate a customized interactive programming guide for a user, such as based on the user profile, an associated consumption profile, or a device profile. The interactive programming guide may include combining broadcast and on-demand content and may be enabled by metadata tagging and inter-content relationships developed through application of user behavior algorithms, editorial control, and the like.

A mobile media platform may be associated with social networking or community aspects. Social networking aspects may include user content referral, user content rating, forums, gifting, buddy list management, peer-to-peer management, communities of interest, profile pages, dMail, points, message boards, newsletters, shopping, dynamic home page construction, advertising, notifications, and the like. User content referral may enable mobile users to inform other users about content through message transmission (e.g. SMS with a WAP push, MMS, email). When combined with buddy list management, message transmission may be directed to a subset of mobile users selected from the buddy list. Social network or community ratings may allow users to rate a piece of content after the user has listened to or viewed the content on the user's mobile device. Community ratings may be based on a scale such as a star scale (where more stars may mean a higher rating). Community or other user ratings may be used (such as through an averaging algorithm) to drive popular plays and other content discovery mechanisms.

Social networking aspects of a mobile media platform may facilitate forums, such as forums related to content. Forums may provide facilities for users to conduct online conversations with other forum members. Forums may be standalone or may be integrated with existing web-based forums or blogs. A forum may provide private access to content for forum members. The mobile media platform may support forum membership through allowing forum members to invite other mobile users to join the forum or to join a topic based private conversation of forum members. Alternatively, private messaging features associated with the mobile media platform may be useful to communicate between forum members and other mobile users. Messages may be communicated via SMS, email, private forum pages and the like.

Although not limited to social networking environments, gifting may be facilitated by social networking aspects of the mobile media platform. In an example, a user may send content to another user as a gift so that the sending user is billed for the content and perhaps for the gifting service. Similarly, a user may request a gift, such as from a community member who may be soliciting requests for content gifts.

Buddy list management is an integral part of social networking and on-line communities. The mobile media platform may allow a user to build and manage a list of other mobile users as a buddy list. The mobile media platform may also allow a user to classify buddies into groups.

In addition to gifting and message based content sharing, peer-to-peer management may facilitate sharing content via one or more servers, such as mobile media platform servers, network servers, third party servers, and the like. To manage peer-to-peer sharing, shared content may be tracked through the mobile media platform so that digital rights management, billing for content, and the like may be managed. Paying for shared or gifted content may be done through a direct bill to the user's mobile service provider account, a credit card for per-use or subscription services, or through a third party payer service such as PAYPAL.

Social networking may also be beneficial to the formation and management of communities of interest. The mobile media platform may support communities of interest through user registration. Users may be placed into specific communities automatically or through a selection of interests. Additionally, communities of interest may be organized along sets of criteria which can be used to determine eligibility. Communities may also have voting for special members of the community. This may be reflected graphically in an avatar representation of the member. This representation may make it obvious who are the voted community tastemakers, trendsetters, power brokers, brand strokers, persuasive influencers, and the like.

Profile pages may be users' individual spaces in a community. Each user may get one that they may customize. The mobile media platform may provide services that allow a user to import appearance skins that they may customize with a slide show, quote, favorite link, and the like. Profile pages may derive information from a user profile associated with the mobile media platform and may include blog links, bookmarks of favorite content, interests, buddy lists and friend connections and the like. Interests may be published and provide the ability to see a list of people who share them. People may be added to friends' lists as well as see who has marked them as a friend in return.

An internal community email system may permit message sending within a specific community or across a service.

The mobile media platform may facilitate earning, reporting, and redeeming points associated with mobile media platform based activity related to the social networking community. A user may, by participating in a community in different ways earn points. In an example, a user may earn points for playing games, blog posting, posting messages in message boards, and the like. Points may accumulate for individuals or groups of individuals. Points may be redeemed and prizes may be presented to high point earners. Point ratings may be presented on a user's home page; may be included in content or messages originating from a high points earner, or in association with an avatar so that other community users may identify these users.

Social networking also typically includes message boards that may be themed to provide an opportunity to communicate openly within a community to share ideas relevant to the community, newsletters in which users may contribute articles and images for consideration to be included in a periodical newsletter, shopping through interactive storefronts with themed merchandise that can be purchased, advertising that may be built into various aspects of the community to support features, notifications that a user may receive about different things happening related to the community. The homepage may change every day to reflect additions to the service, and draw users' attention towards what's new, what's hot, and so on. Users may also share content and their experiences with other users. Users may be able to express their opinion on the content in the form of rating (one to five stars) and tagging (e.g., for a clip categorized under extreme sports, a user could add their own community tags of hang gliding, crash, scary). They may also recommend content to their friends and other users and see what content their friends, peers or the user population as a whole are watching and recommending. A user may place a link to mobile content on a Web 2.0 site.

Content may be shared on mobile devices as an aspect of social networking. In an embodiment, this may enable sharing of viral videos. In an embodiment, this may result in the use of an email inbox as a content portal on mobile devices, such as mobile smartphones. In an embodiment, an email may be sent from one user to another containing content and/or links to content. A user will be able to send such an email to another user even if the other user is on a different network or is using a different device. In an embodiment, an email may contain notification of new content and may contain the content and/or links to the content. In an embodiment, content may be pushed to the mobile device at an off-peak time. The inbox may receive content in the same way that email messages are received, such as an over-the-air push, rather than on-demand. In embodiments, user profiles may be used to store notification preferences and awareness of which users are participating in the system. In embodiments, user profiles may also enable the platform to send a user customized content.

Figure 44:
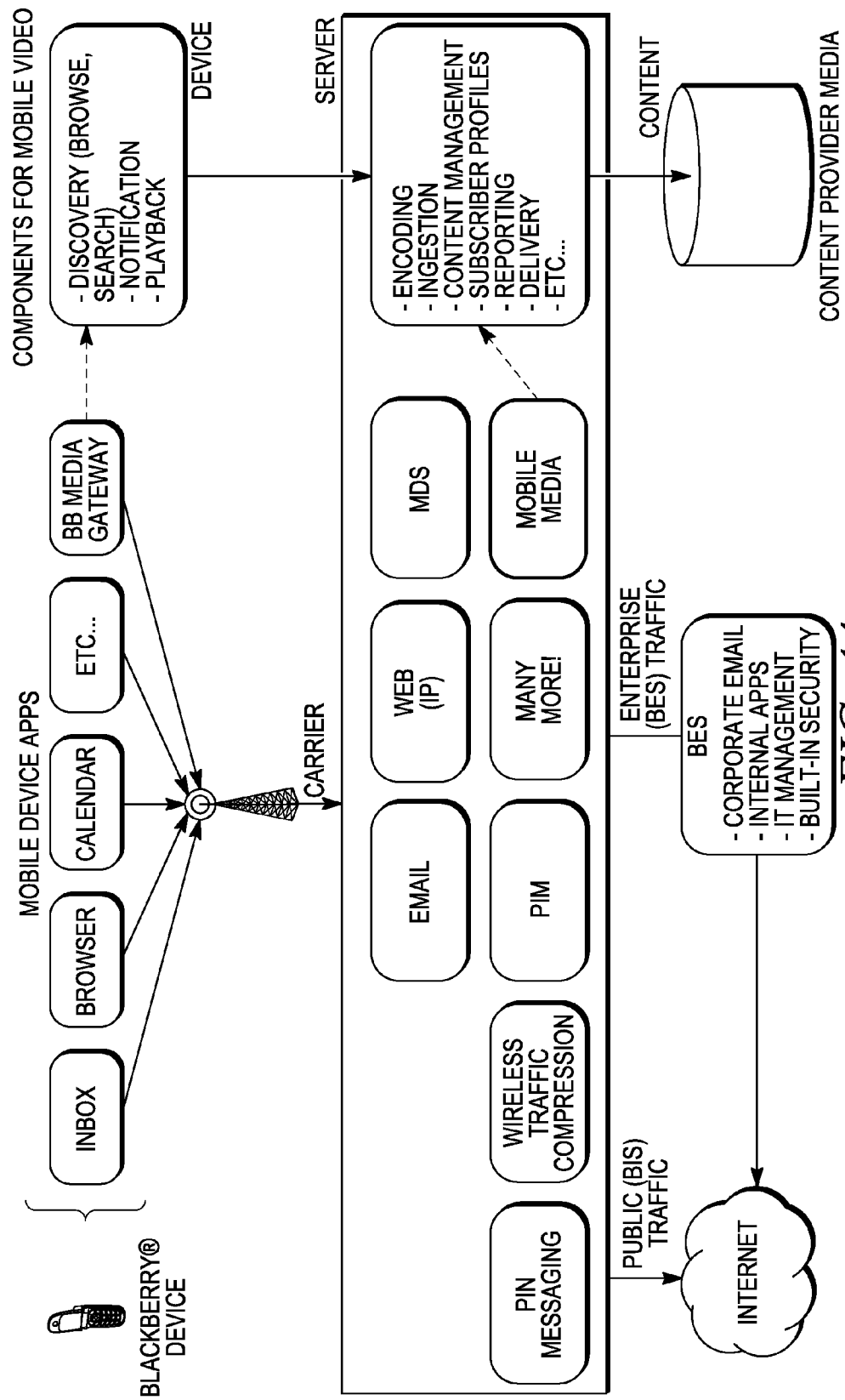
FIG. 44 depicts mobile media integrated in email communications with a mobile device.

In a certain embodiment, such as the embodiment of FIG. 44, the mobile device may be a blackberry device. A blackberry device may have the capability to receive and display HTML emails. The mobile media platform may be configured to send HTML emails to these devices. This may allow the user to receive emails which contain hyperlinks that are more graphically pleasing than normal emails. A blackberry device may support the JSR 211 ContentHandler API which may allow a mobile application to be associated with certain types of content, allowing the mobile application to launch when the user opens that type of content. A blackberry device may contain a MailListener API, which supports scanning the Inbox for email messages which meet certain criteria. As an example, a mobile application could listen for emails arriving which contain a certain subject, and perform some action when it arrives. A blackberry device may contain an API to display small notification icons on the main screen of the device. A blackberry device may contain an API to embed a media player within a mobile application, so that users can watch videos inside applications, as well as through the built-in media player that comes with the device. In relation to sharing content on mobile devices, the mobile media platform may have the ability to store personalization information about a unique user, including user notification preferences and contact information, to send HTML-formatted emails and to configure the MIME-type which may be returned with custom HTTP requests. In a certain embodiment, the mobile media platform may notify a user when new content is available and present the user with the new content and/or a link to the new content via email. The user installs a mobile application on their mobile device, which registers itself as the handler for a particular MIME-type. The user uses the application to communicate their notification preferences to the mobile media platform; for example, notify me about new sports videos. The mobile media platform sends the user emails when new content is available to view. These emails may contain a hyperlink to a small file on the mobile media platform. The mobile media platform may be configured to return these small files with the same MIME-Type for which the application was registered. The user receives the email, and clicks on the link to the small file. The email is an HTML email, and therefore the actual file being downloaded is masked from the user by a pretty hyperlink. The application may scan the inbox for these notification emails, and display a customized notification icon when these special emails arrive. The application launches, downloads the small file, which contains a mapping to a particular video to play back to the user. The application then plays the video.

In a certain embodiment, one user may send content to another user using the technique described above for the platform to notify the user of new content, however, the email may be initiated differently. An application may permit a user to send a video to a friend, making a request to the mobile media platform, which sends an email to the appropriate person. If the recipient already has the application installed, then the behavior may be identical to that described above, including the display of notification icons. If the recipient does not have the application installed, the email can provide them with a link to download the application or another means of accessing the content.

The mobile media platform may facilitate carrier management. The mobile media platform may be associated with ecommerce such as billing, pricing, event tracking, bundling, tiered services, content purchase (e.g. individual pieces, collections, subscriptions), discounts, free services and content, multimedia advertising delivery and monetization. In an embodiment, a subscription may be to certain content and certain additional content is identified as premium content outside the subscription plan and the user has to pay extra to access this content. The platform may also allow users to preview content (such as a music video) or try/demonstrate content (such as a game) before the user purchases the content.

Billing price plans may be tightly associated with specific content that may be associated in a content catalogue layout whereby, the billing price plan defines access to content (e.g. a single content item, multiple content items or a group of categories each containing content items). Pricing complexity and flexibility may be supported by nesting billing price plans and otherwise combining simple price plans.

Billing price plan definitions may be used in various billing models. Examples of billing models include:

Pay Per Duration—Users can pay for access to content (a single content item, multiple content items or a group of categories each containing content items) over a period of time.

Subscription—Users can pay a recurring charge for access to content (a single content item, multiple content items or a group of categories each containing content items).

Pay Per Use—Users can pay a one time fee for consumption of content, such as a single item of content, a library of content, a subset of content, and the like.

The mobile media platform may enable digital rights management. The mobile medial platform may permit the administration of rights in a digital environment. The mobile media platform may allow rights holders to track and receive compensation for use of their content and other intellectual property. The mobile media platform may adapt the implementation of digital rights management to different carriers.

The mobile media platform may also provide reporting facilities, such as transaction logs, event logs, digital rights and virtual property use and consumption royalties and recommendation reporting. Reports may be generated and/or accessed through a web interface.

The mobile media platform may facilitate mobile media platform related administration. Administration may include managing users, user account management, administrator user account management, preference management, server side and client side management, mobile media platform management, user profiles, user registry, carrier profiles, consumption profiles, device profiles, encoding and transcoding features, and the like. Mobile media platform management may include monitoring and configuring the operation of the mobile media platform, management reporting, system performance monitoring, content management, pricing management, and the like. User profiles and management may include profile management components that each user may crate and customize with their preferences and settings on an ongoing basis. User registry management may include global user profiles, user application preferences, extensibility management, managing a unique user identity (and/or classification of a user to a category of users) within or across mobile networks and/or associating a mobile network profile with a fixed web based profile. Profiles similar to user profiles may be maintained for carriers. The user interface may be extensible. Applications can use this information to determine the most appropriate content and delivery method, providing a personalized user experience. A user identifier can be unique within a mobile network or potentially across mobile networks or extending to a fixed web based profile. A user identifier can be a category of users.

In a certain embodiment, the mobile media platform may provide a user interface for content management, including administrative aspects of content management. Referring to FIG. 45, the content management user interface may be provided as the content tab of a larger user interface. The user interface may allow a user to select content, view content, manage parameters and attributes of content, create a content index or queue, move content, copy content, remove content, filter content, order content and the like.

Figure 46:
FIG. 46 depicts an aspect of an administrator user interface.

In a certain embodiment, the mobile media platform may provide a user interface for reporting, including administrative aspects of reporting. Referring to FIG. 46, the reporting user interface may be provided as the reporting tab of a larger user interface. The user interface may allow a user to generate reports for certain data ranges with certain filters applied.

Figure 47:
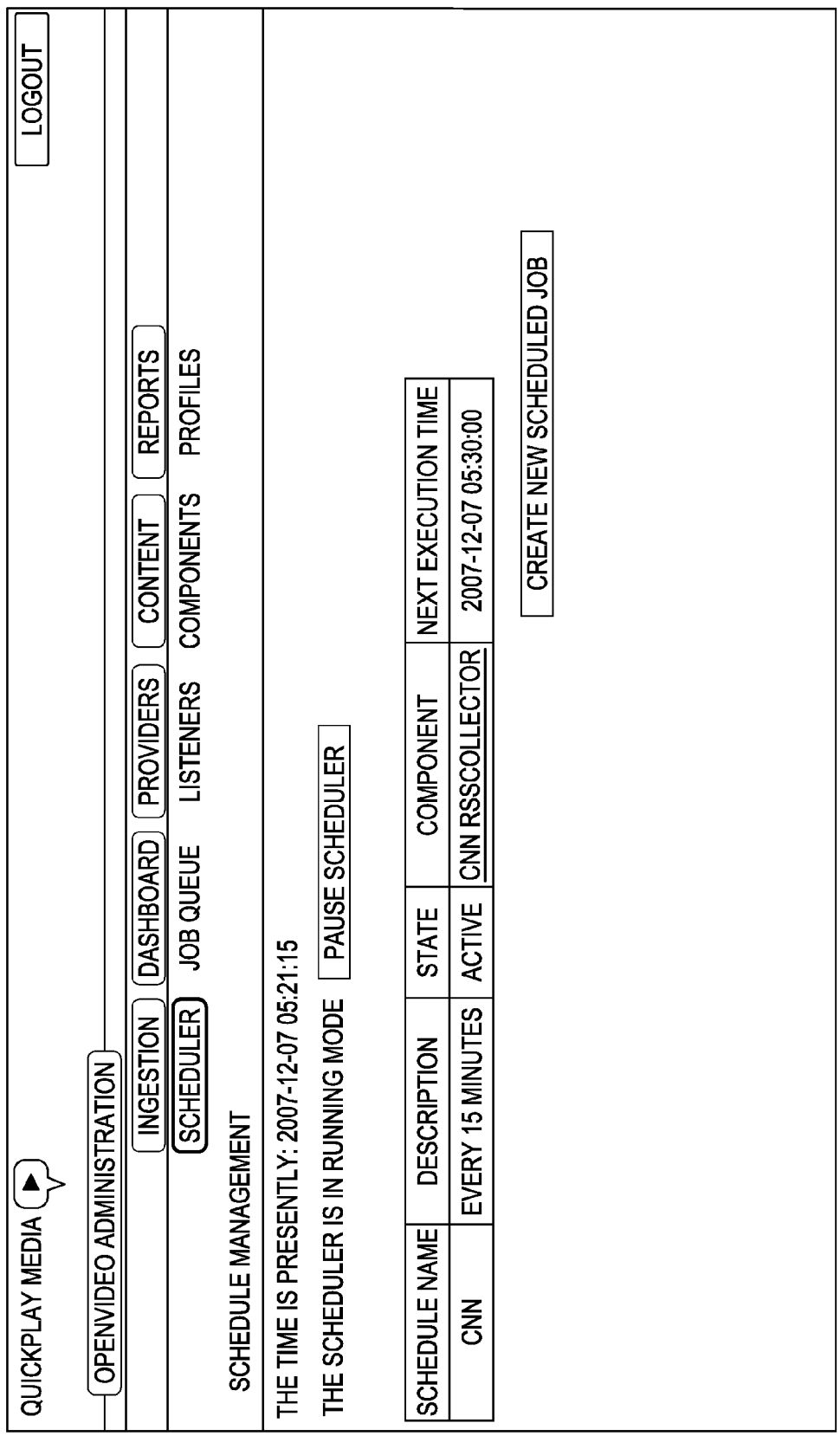
FIG. 47 depicts an aspect of an administrator user interface.

In a certain embodiment, the mobile media platform may provide a user interface for ingestion management, including administrative aspects of ingestion management. Referring to FIG. 47, the ingestion management user interface may be provided as the ingestion tab of a larger user interface. The user interface may allow a user to schedule ingestion from a particular source at a particular time or on a particular schedule. The user interface may allow a user to pause ingestion. The ingestion management user interface may also include tabs, menus and/or pages for job queue, listeners, profiles and components. Referring to FIG. 48, components may include components for encoding with associated profiles.

Figure 50:
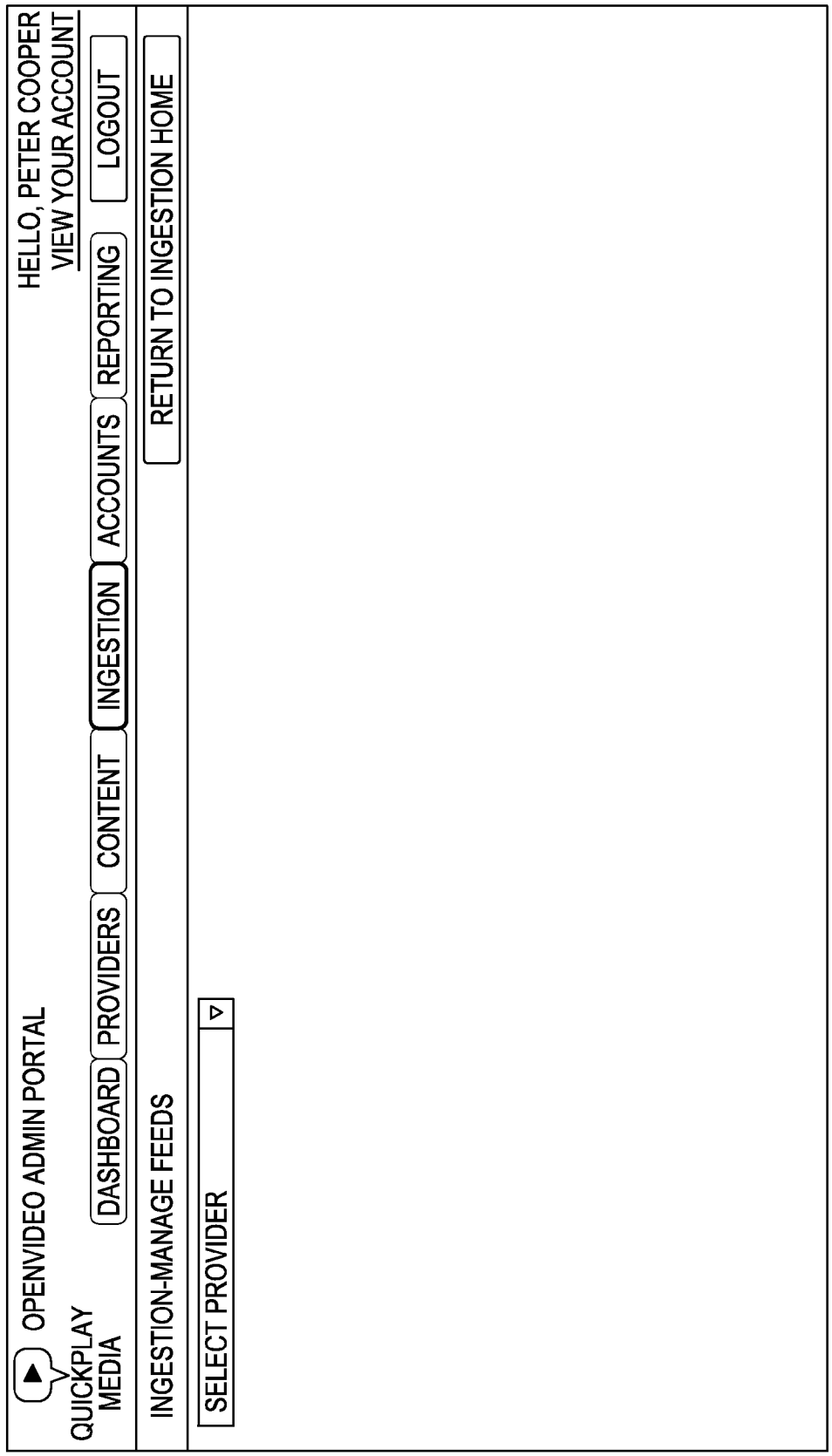
FIG. 50 depicts an aspect of an administrator user interface.
Figure 51:
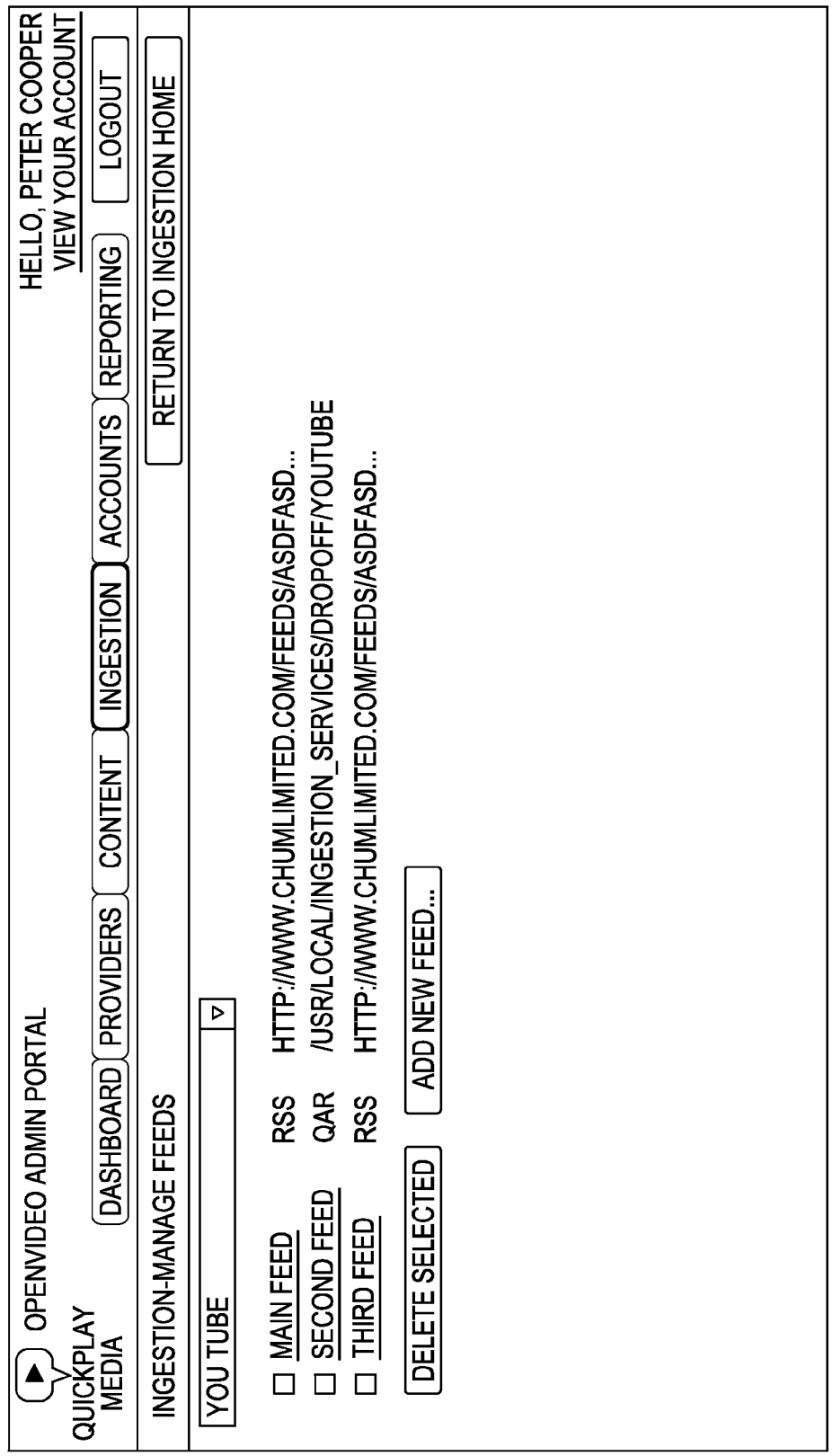
FIG. 51 depicts an aspect of an administrator user interface.

In a specific embodiment, the ingestion user interface may be as described in FIGS. 49 through 64. Referring to FIG. 49, the main ingestion page may provide links to all the key ingestion-related functions. FIG. 50 depicts how feeds may be viewed and managed. With this interface a user may choose a provider from the dropdown that contains the providers in the system. Once a user chooses a provider from the dropdown, the page refreshes to display FIG. 51, which is populated with information specific to the chosen provider. This page may contain a table which contains the feeds that have been set up for the provider. The table may display the feed name, type, and the first 40 characters of the URL/path (truncated and with an ellipsis appended) and the like. The name may be linked, and may take the user to the "EDIT FEED SUMMARY (page 8/8)" page. This table may be sorted alphabetically by name. Each row of the table may be preceded by a checkbox. The table may contain a DELETE SELECTED button. Clicking this may refresh the page, and delete the checked rows. When a user clicks "ADD NEW FEED" the used is linked to the "ADD FEED WIZARD (page 1)" page as shown in FIG. 52. This is the first page of the Add Feed Wizard. It prompts the user to enter the feed type and feed name. It may also displays the feed provider as uneditable text. The wizard may contain a subnav down the left side of the page. When ADDING a new feed, this subnav may contain the title of each page in the wizard, and also may give the user an indication of how far along they are in the wizard process. Items in this subnav can be in many states including: greyed text+unlinked (future step); bold+unlinked (current step); and normal text+linked (past step). The user may be able to click on a "past" link and go back to that step in the wizard process. When the user is EDITING an existing feed, the subnav may function as tabs, to navigate from one area of the feed to another. In that case, all of the items in that area may be links. Every page of the wizard may have the "BACK", "NEXT", FINISH and "CANCEL" buttons. On the first page, the "BACK" button may be disabled, on the last page the "NEXT" button may be disabled. During ADD, the FINISH button may be disabled on every page but the final one, and during EDIT it may be active on every page. Clicking NEXT and BACK buttons may maintain any information that the user has entered thus far (ie: if they click back then next, the data they entered on a particular page should still be there). However, the feed may not truly exist within the system until the user presses FINISH at the end, to commit the changes.

Figure 53:
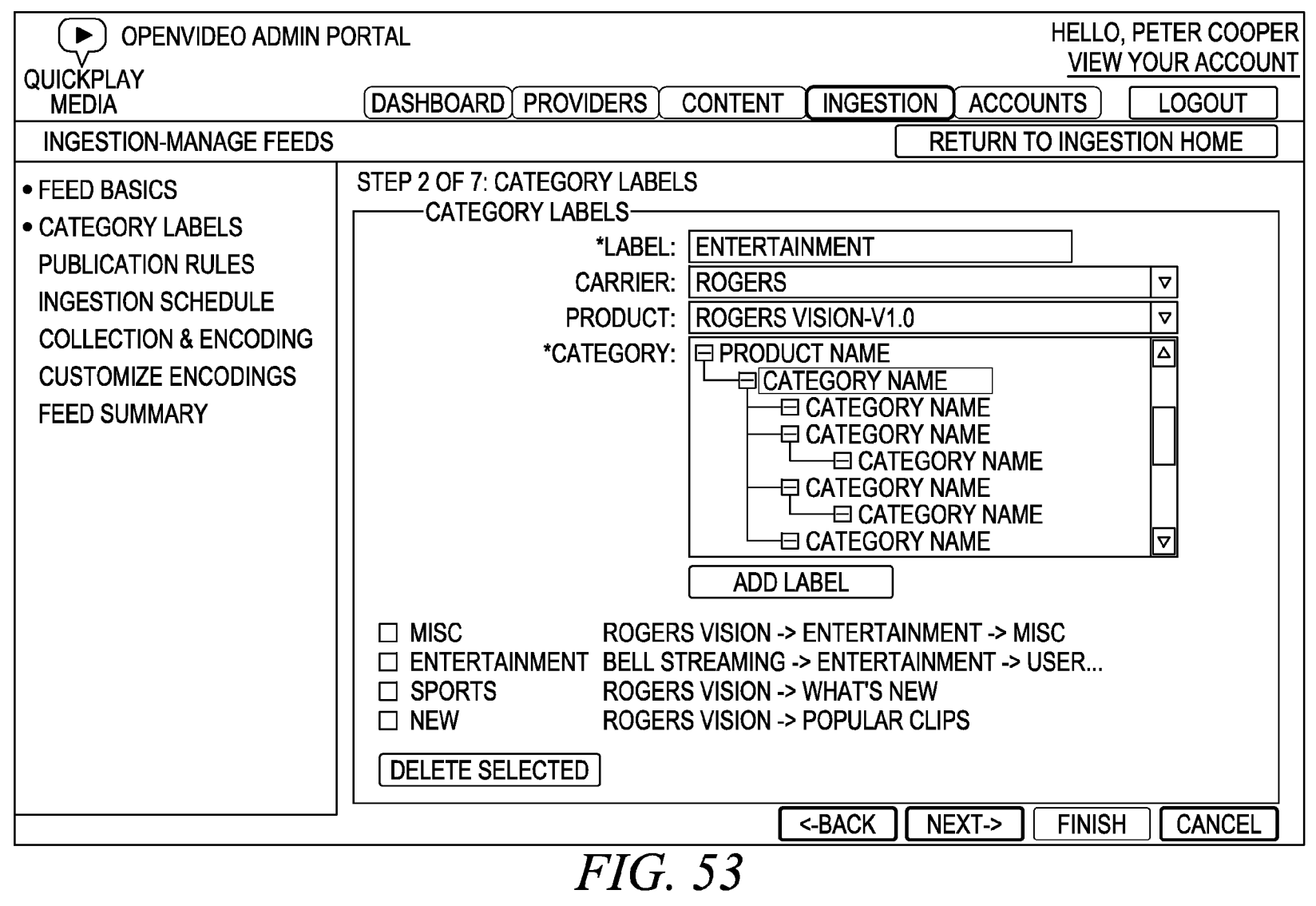

FIG. 53 depicts the second page of the feed wizard, which may allow a user to select the category labels that will be associated with the feed. The majority of this page may be occupied by a Fieldset, which allows the user to add multiple category labels to the feed without navigating on to the next page of the wizard. The user can enter a label, and then select the Carrier. Once they've selected the Carrier, the Product Dropdown may populate with the products attached to that carrier. This dropdown may contain both the product name and version number. The user selects this, and the category control may populate with a tree view. Users then may pick a category to associate with the label. Clicking "ADD LABEL" will then add this pair to the list of labels below. Beneath the "ADD" button, there is a list of all the labels that have been created for this feed. The list is sorted by label name, and the sort order may not be modified in certain cases. Each label may have a checkbox next to it. The user may click the checkboxes and then press "DELETE SELECTED" to remove labels from the list. All actions within the fieldset may either function via javascript or may simply refresh the page with the new information. In this particular embodiment, at least one category code must be created before the user is allowed to proceed to the next page.

Figure 54:
FIG. 54 depicts an aspect of an administrator user interface.
Figure 59:
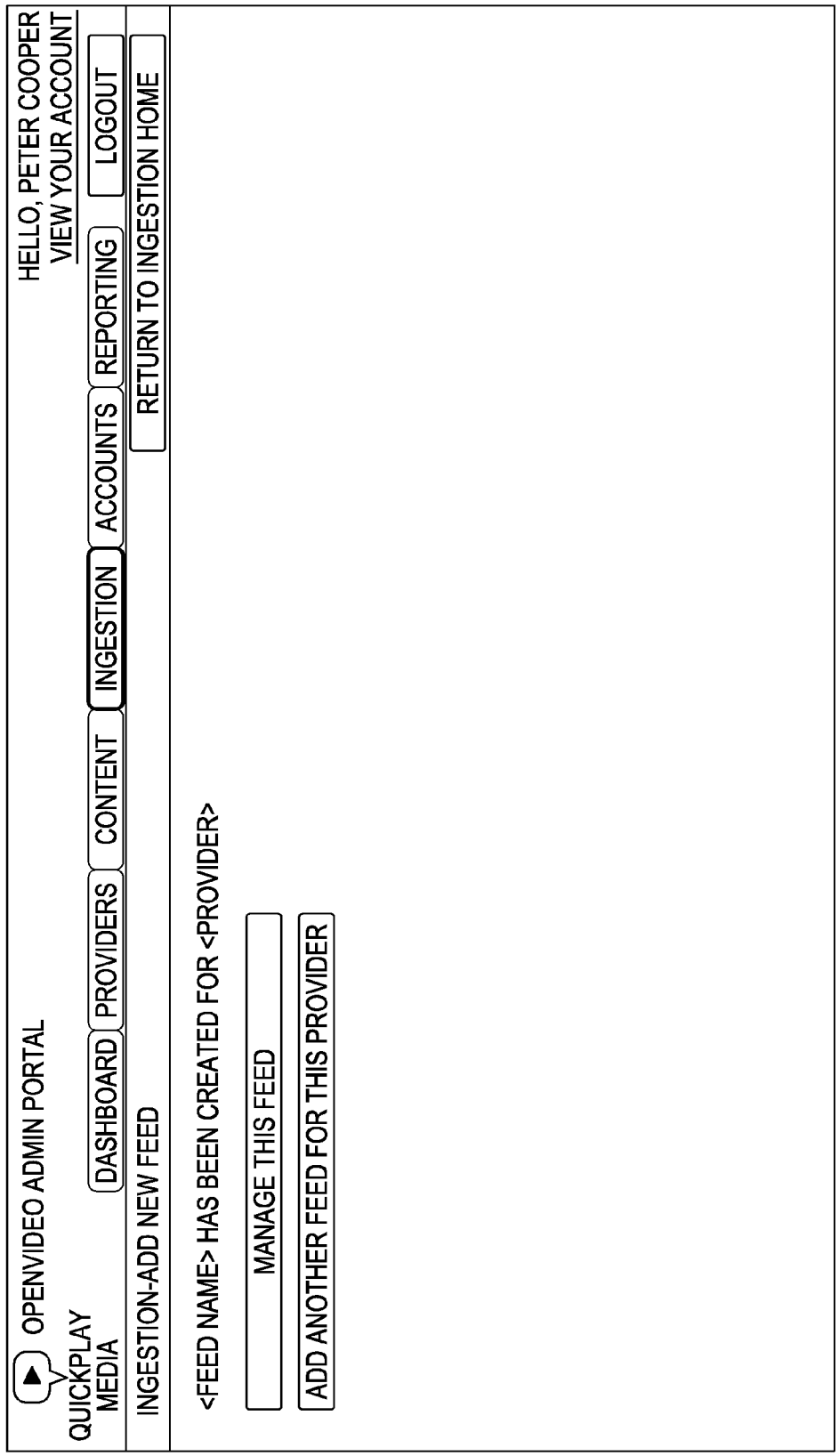
FIG. 59 depicts an aspect of an administrator user interface.
Figure 62:
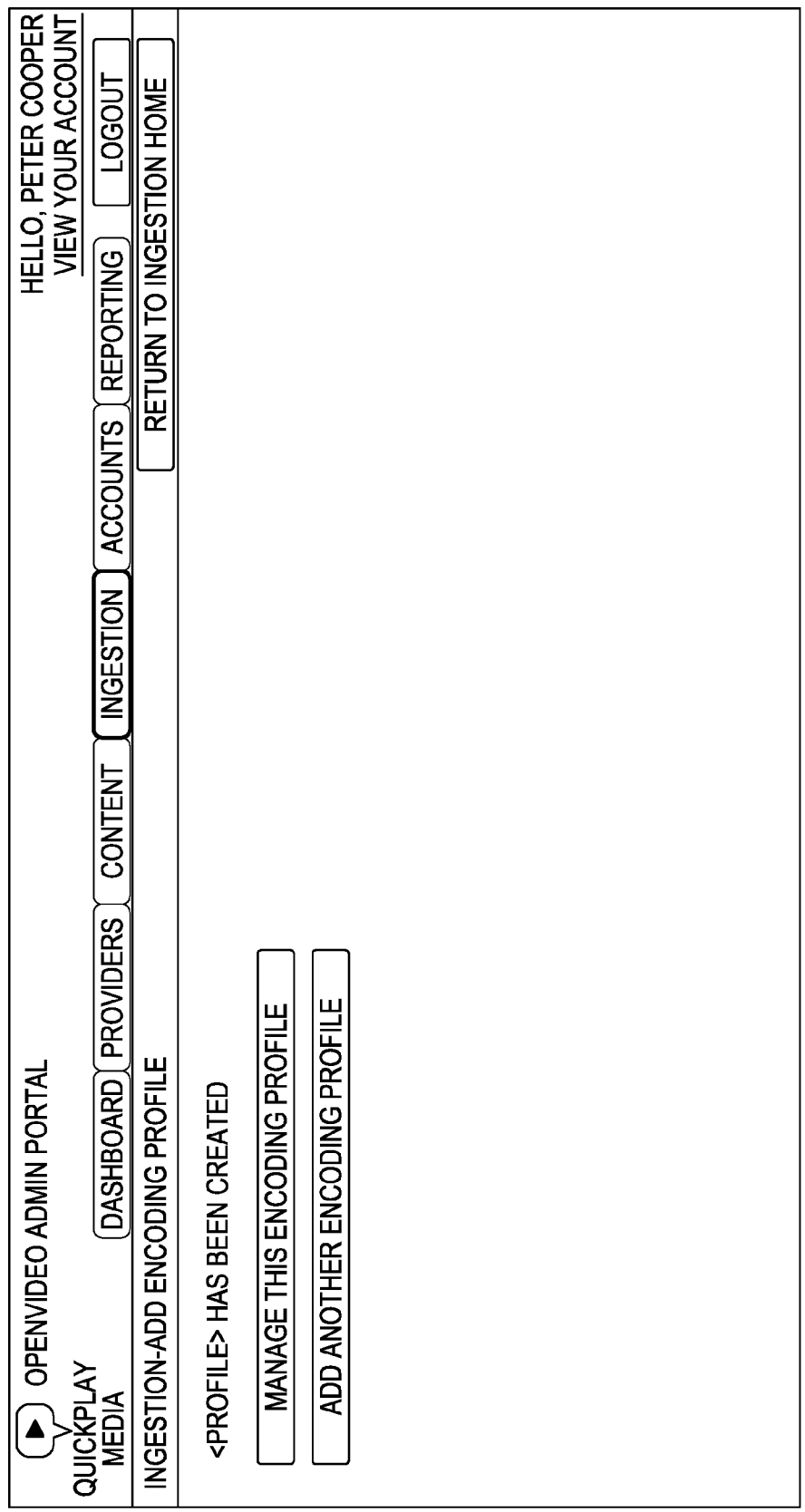
FIG. 62 depicts an aspect of an administrator user interface.

FIG. 54 depicts the interface allowing a user to choose the publication rules for the feed. "Simple" and "Batch" publication may be two of many methods. Both SIMPLE and BATCH publishing methods may cause clips to be placed "FIRST" in the category. The user may also choose the default category for clips to be placed in, in case the content provider does not specify where they should go. This may be a dropdown containing a list of all the CATEGORY CODES that were created during STEP 2. FIG. 55 depicts the interface allowing a user to set the ingestion schedule, which is the schedule that may be used to both check the feed and publish the content. As shown in the figure, the user may also specify other options using the interface. In this embodiment, the first run of the feed's publication schedule should be set for a future time. If the user chooses the options in such a way that the "first" scheduled update time occurs in the past, then the system should compute when the first "future" run will be, based on that time, and schedule it as the first run instead, rather than trying to run a backlog of multiple jobs at once. For example, the current time is August 13, 13:54 and the user schedules things to run every half hour, starting at 12:30 (a typo). The first run should be scheduled for 14:00. It may be that the Start Time is changed before being saved, so that it appears this way when the user returns to this page.

The interface shown in FIG. 56 may allow a user to type in the feed URL of the feed and the encoding type to expect. There may be a PERFORM ENCODING? Checkbox, which may be checked by default. If this is unchecked, the "FIRST ENCODING PASS" dropdown may become disabled. The "FIRST ENCODING PASS" dropdown may contain all the encoding profile names. If the feed is of type RSS, then the user may type in a URL. If the feed is of type QAR, then the user may type in a PATH. The text should may change appropriately. Also, with QAR, the "SECURE FEED" controls may not need to be displayed. The field on this page may be skipped in certain cases. For example, when a separate feed setup exists.

Figure 57:
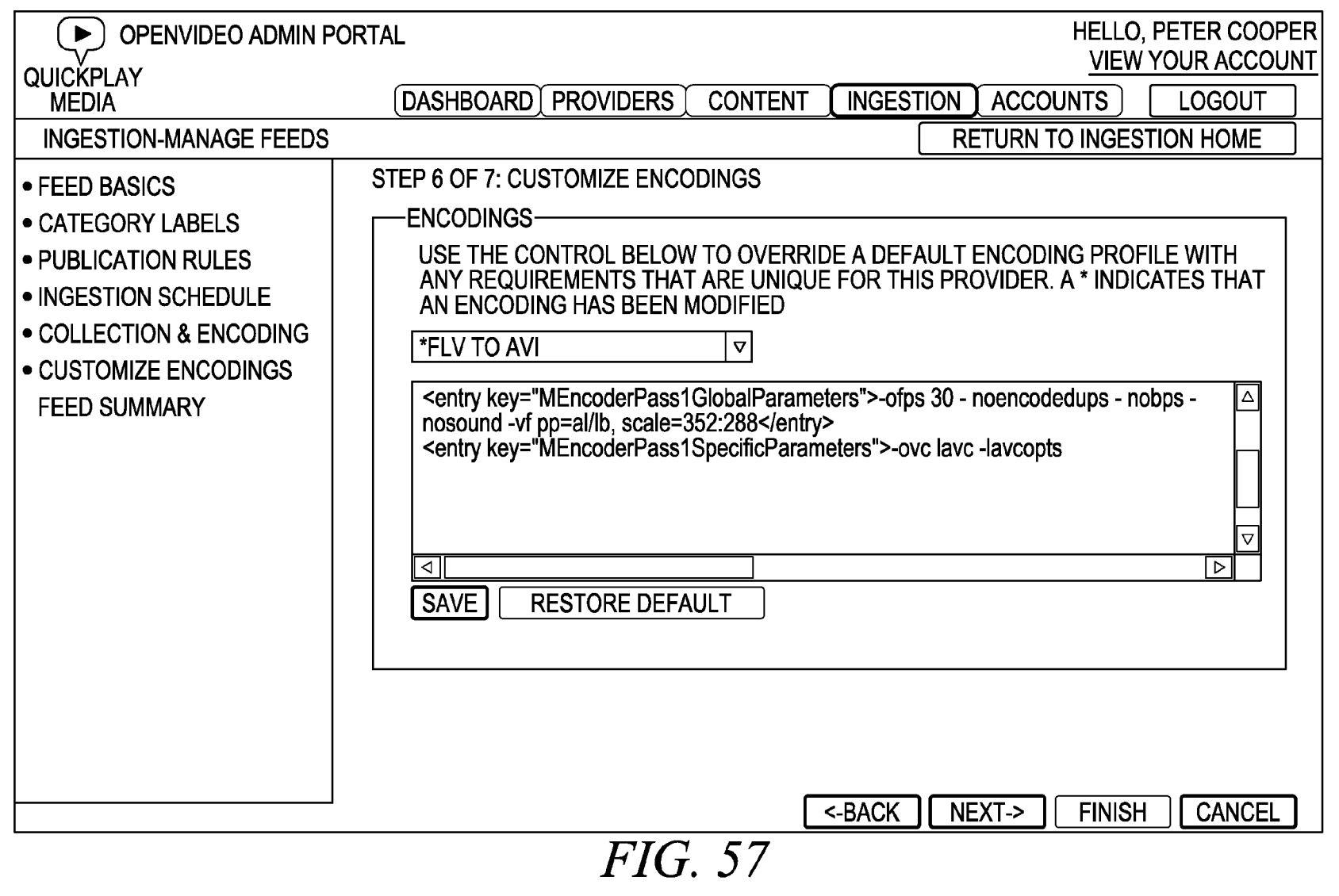

The interface shown in FIG. 57 may allow a user to customize the encoding profiles that are being used for this feed. "Default" encoding profiles may be set up in the system (see "manage encoding profile" pages), but these may also be customized. The controls in the second fieldset allow for customization. A dropdown may appear, containing the name of each profile. Selecting a particular item in the dropdown may populate the profile in the text area. The user may then modify it there. Clicking save may cause the overridden profile to be associated with this feed for that encoding profile. When a profile has been over-ridden, it may appear in the dropdown with an asterisk (*) pre-pended to its name. Additionally, when the user views this profile, the "RESTORE DEFAULT" button may be enabled. Clicking this button may delete the over-riding version, and restore the default profile. The text areas may simply contain the XML profile but may also specify encoding profiles. The dropdown may be filtered to contain profiles which are being used for a particular feed. The "First Pass" encoding (as chosen during a previous step) may appear here, as will the OUTPUT encodings, which are algorithmically determined based on the user's category choices.

The interface shown in FIG. 58 may summarize the details of the feed that have been set up by the user. It may also be the page that a user arrives at if he chooses to EDIT an existing feed. Once a new feed has been saved FIG. 59 may be shown. This interface may provide intelligent navigation options including MANAGE THIS FEED which may displays the FEED SUMMARY screen and ADD ANOTHER FEED which may return to the first page of the ADD NEW FEED WIZARD.

FIG. 60 displays the ingestion schedule for every feed in the system, which may not be a list of jobs, but a list of feeds. The list in the table may contain the following columns: a checkbox, to select that row; feed provider+feed name (this text may be linked); feed schedule (plain English); last execution date and time; next execution date and time; and pass? (which is an indication of whether the last ingestion ran successfully, or not). The list may be ordered by "next execution date and time", ascending (ie: soonest first). There may be a maximum 20 rows that can be displayed at a time, with pagination at the bottom of the table if more feeds are scheduled. When a particular feed is "paused", then the word "PAUSED" may appear beneath the NEXT EXECUTION column. If the job is running, it may say "RUNNING". All "paused" feeds may appear last in the list due to the sort order. If a feed has not run yet, then its LAST EXECUTION column may be blank. Clicking on the Provider+Feed link may link to the appropriate "EDIT FEED" page. Beneath the table there may be a dropdown which can be used to perform actions on the feed. This dropdown may contain the following values: RE-RUN IMMEDIATELY, PAUSE and UNPAUSE. Each of these actions may cause the action to happen on the selected feeds immediately, and may cause the page to refresh with the new data.

The user interface of FIG. 61 may be used to add a new encoding profile. The fields may include NAME and CONFIGURATION. The "Configuration" text field may contain an XML profile. After SAVE, the user may be shown a confirmation message at the top of the page (as displayed). Clicking cancel may return the user to the page they were just at, without saving anything. Once a new profile has been saved, FIG. 62 may be shown. This interface may provide intelligent navigation options, including MANAGE THIS PROFILE (which may display the MANAGE PROFILE screen with this price code selected in the dropdown and its information pre-populated in the fields) and ADD ANOTHER PROFILE (which may return to the ADD NEW PROFILE screen with blank fields ready to be filled in).

Figure 63:
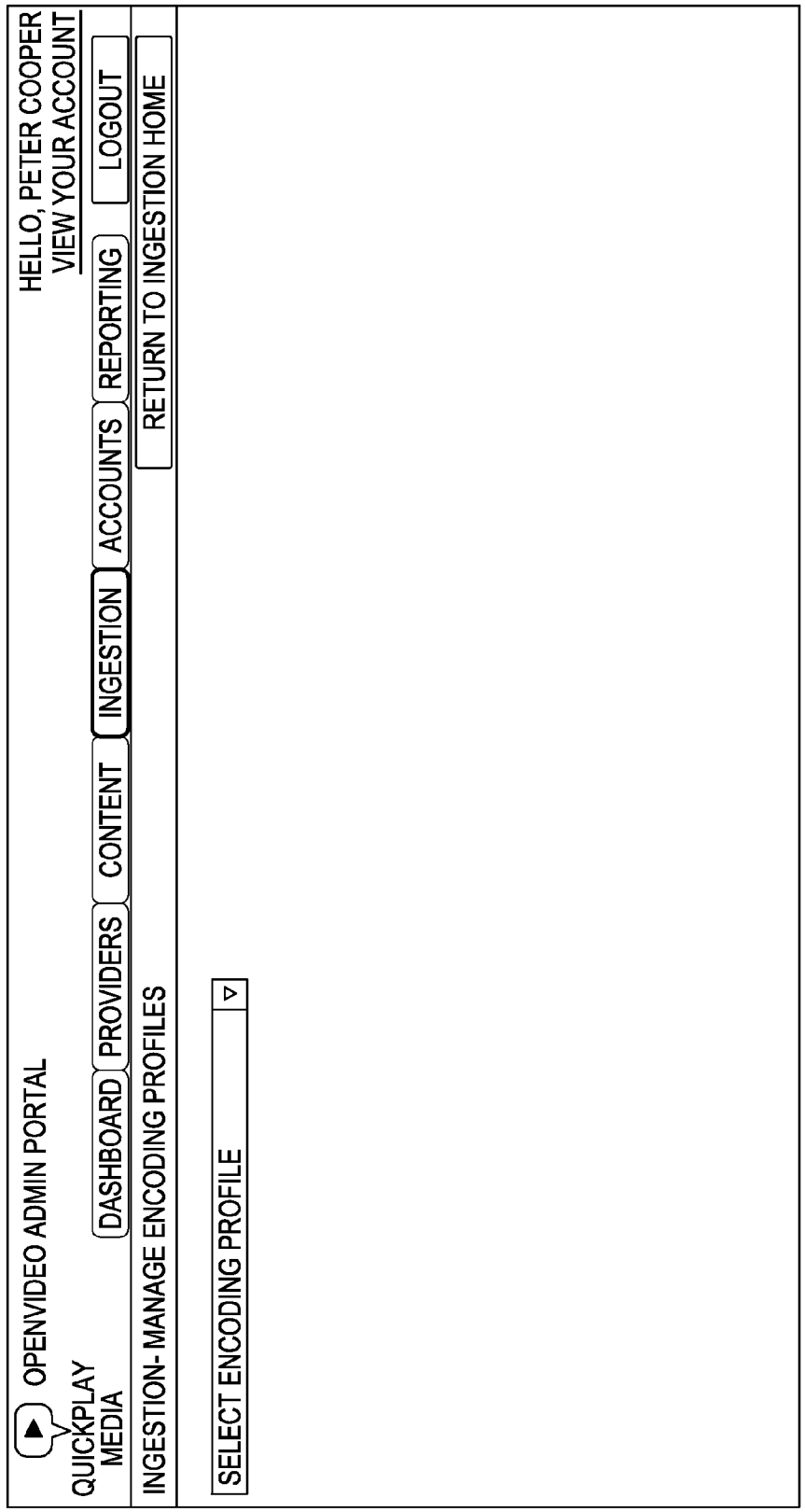
FIG. 63 depicts an aspect of an administrator user interface.

FIG. 63 may be the user interface a user arrives at when they choose to manage an encoding profile from the main ingestion page. A user may be able to select an existing profile from the dropdown. This may refresh the page with the details for that particular profile. The user interface of FIG. 64 may be used to edit an existing encoding profile. User interface fields here may include NAME and CONFIGURATION. The "Configuration" text field may contain an XML profile. After SAVE, the user may be shown a confirmation message at the top of the page (as displayed).

Content may be advertisements, marketing materials and the like. The content may be an interstitial advertisement, banner ad, in stream ad, ad placed in the content itself, ad framing the content, an ad appearing before or after the content and the like. Advertisements may be placed into pods. Advertisements may be clustered and positioned, such as within, adjacent to, in front of and behind other objects. Advertisements may be inserted into other content, such as mobile content. Insertion of advertisements may take place with both a thin client and a rich client. An advertisement may be interactive allowing a user to access additional information and content by clicking on or otherwise interacting with the ad or aspects of the ad. An advertisement may be associated with one or more related or companion advertisements. In an example, a user may click on an ad and be shown a companion ad. An advertisement may be associated with one or more prohibited advertisements that may not be shown near in time or space the advertisement. For example, ads for a competitor of an advertiser may be negatively associated with the advertisements of the advertiser, and not permitted to be shown on the same screen or within one hour of delivery of an ad for the advertiser. Ads may be automatically tagged to facilitate delivery, targeting, interaction, impression measuring and the like Ads may be ingested, tagged, encoded, transcoded and the like in a manner similar to other types of content.

The mobile media platform may be associated with advertising management. Advertisements may be managed and served within the platform, or through integration with advertisement management systems, such as those of a content provider. The mobile media platform may contain various user interfaces for management of advertising. There may be separate user interfaces for end users, advertisers, carriers and the like. Advertisement management may allow insertion of banner and interstitial advertisements into mobile applications, such as through thin and rich clients. Advertisements may be managed and served within the mobile media platform or through integration with content provider advertisement managerial systems. In an example, advertisements may be organized into advertising pods, cluster advertising, and the like that may be placed next to, in front of, or behind other content objects delivered to a mobile user by the mobile media platform.

The mobile media platform may be associated with targeted advertising. In an embodiment, a consumption profile may facilitate targeted advertising. In another example, one possible method to support targeted advertising may include analyzing a user's consumption profile and determining common genres that the user may like. This information could be used in third party ad-server integration for targeted advertising. In embodiments, data about the user and user preferences may also be used to facilitate targeted advertising. In embodiments, location information and location intelligence may also be used to facilitate targeted advertising.

Social networking may be associated with advertising on the mobile media platform. Content and related advertisements may be referred through the social networking aspects of the platform. Ad spaces and sponsorships may be built using the platform. The mobile media platform may be associated with an ad fulfillment engine. The ad fulfillment engine may use techniques for targeting and delivery of ads to fulfill certain advertising related objectives. Objective may include one or more of delivering a certain number of ads, delivering ads to a certain demographic of users, delivering ads for a certain advertiser, delivering ads during a certain time period and the like. The ad fulfillment engine may generate or be involved in the generation of reports regarding the delivery and consumption of advertisements and other content. The ad fulfillment engine may interface with, assist or be assisted by the settlement and mediation processes of the mobile media platform.

The Mobile media platform may include a security facility and security functionality, which may include authentication, authorization, passwords, purchase verification, access control, biometric identification, encryption and the like. Security may be directed at securing access to the platform and may also be directed at protecting the content and information of the platform, such as during data transfers.

A variety of billing systems may be supported by and facilitated by the mobile media platform. Usage collection may provide a mechanism to collect relevant information related to the consumption of content and store it in a central location for billing and reporting purposes. Pricing for billing may enable establishing pricing for content to allow an advice of a charge for access to or consumption of the content prior to the access or consumption. Pricing may be set locally or can be established via integration with content provider or mobile operator product catalogues or billing systems.

Billing price plans may be tightly associated with specific content that may be associated in a content catalogue layout whereby, the billing price plan defines access to content (e.g. a single content item, multiple content items or a group of categories each containing content items). Pricing complexity and flexibility may be supported by nesting billing price plans and otherwise combining simple price plans.

Billing price plan definitions may be used in various billing models. Examples of billing models include pay per duration and subscription, among others. In pay per duration a user may pay for access to content (a single content item, multiple content items or a group of categories each containing content items) over a period of time. In a subscription model, a user may pay a monthly recurring charge for access to content (a single content item, multiple content items or a group of categories each containing content items).

Operator billing facilities may be provided for billing consumers via their mobile operator. Off-portal billing may allow the integration of credit card clearing houses, third party payment systems such as PAYPAL, and the like to pay for billed services. Billing services may be integrated with loyalty programs associated with the mobile media platform so that users of the mobile media platform may be rewarded for their loyalty through frequent buyer discounts, special offers, tiered levels of service, and the like. Billing may also be integrated with mobile operator billing systems to include content pricing queries, IPDR direct content billing channels, SMPP premium SMS billing channels, proprietary web services (e.g. AMDOCS), carrier BSS and/or OSS. Billing may also use a percent of billing event methodology and/or a data charge based the amount of bandwidth consumed by the delivery of a piece or collection of content. A charge can either be a bulk (wholesale) purchase of the right to send and receive a certain amount of data on a mobile telecom providers network or it may be an individually metered data transaction.

The mobile media platform may be integrated with other systems by various methods of integration. Other systems may include carrier systems, content provider systems, systems of mobile devices, ad servers, Internet-based systems, web-based systems, billing systems, content delivery systems, encoding and transcoding systems, storage systems, social networking systems, hosting systems, ingestion systems, security systems, search engines, mobile search engines, device providers, and the like. The platform may integrate with companies and/or systems that provide services and devices, such as YAHOO-APPLE (IPHONE, ITUNES), YAHOO (e-books, reader device), VERIZON (phones and services), and the like. Methods of integration may include hard coding, loose coupling, over a network, using application programming interfaces, using interfaces and the like.

General architecture aspects of the mobile media platform are disclosed through this specification and may include, without limitation, any of the following: application layer (J2ME, BREW, WAP, HTML, etc), a business module including a content facility layer for fulfillment and hosting, a commerce facility layer for merchandising and billing, a culture facility layer for communities and personalization, a component layer with modules and/or facilities that include search interface, digital rights management, loyalty programs, partner management, a registry of the parties involved in the creation and delivery of content, and the revenue sharing relationship between the parties. Revenue shares may be determined, and facilities may be provided for revenue reconciliation between the various entities, peer-to-peer management, buddy list management, browser interface, streaming service, off-portal billing, customer service representatives, self-care management, content filter management, gifting, encoding, transcoding, download service, operator billing, advertisement manager, notification management, forum/blog/rant, content ingestion, device management, pricing, management console, profile management, user content rating, content management, delivery management, usage collection, storefront, user registry, user content referral, and the like. The mobile media platform may also or alternatively include a system layer with a component management architecture, a thin client or a thick client mode, device registry, and the like.

The mobile media platform may be usefully and beneficially applied to a wide variety of applications. Additionally, the platform may provide a wide variety of applications related to mobile media methods and systems. Applications of the platform may include branding; increasing brand strength, e-commerce, channels, games, purchasing platform, home shopping network, digital distribution, distribution channels, creation of communities, social networking, web browsing, creation of a portal, targeted advertising/marketing, advertisement fulfillment engine that may use data about the user and user preferences, and store front applications. This sample descriptive list of applications that may be associated with the mobile media platform is not intended to be limiting.

Figure 65:
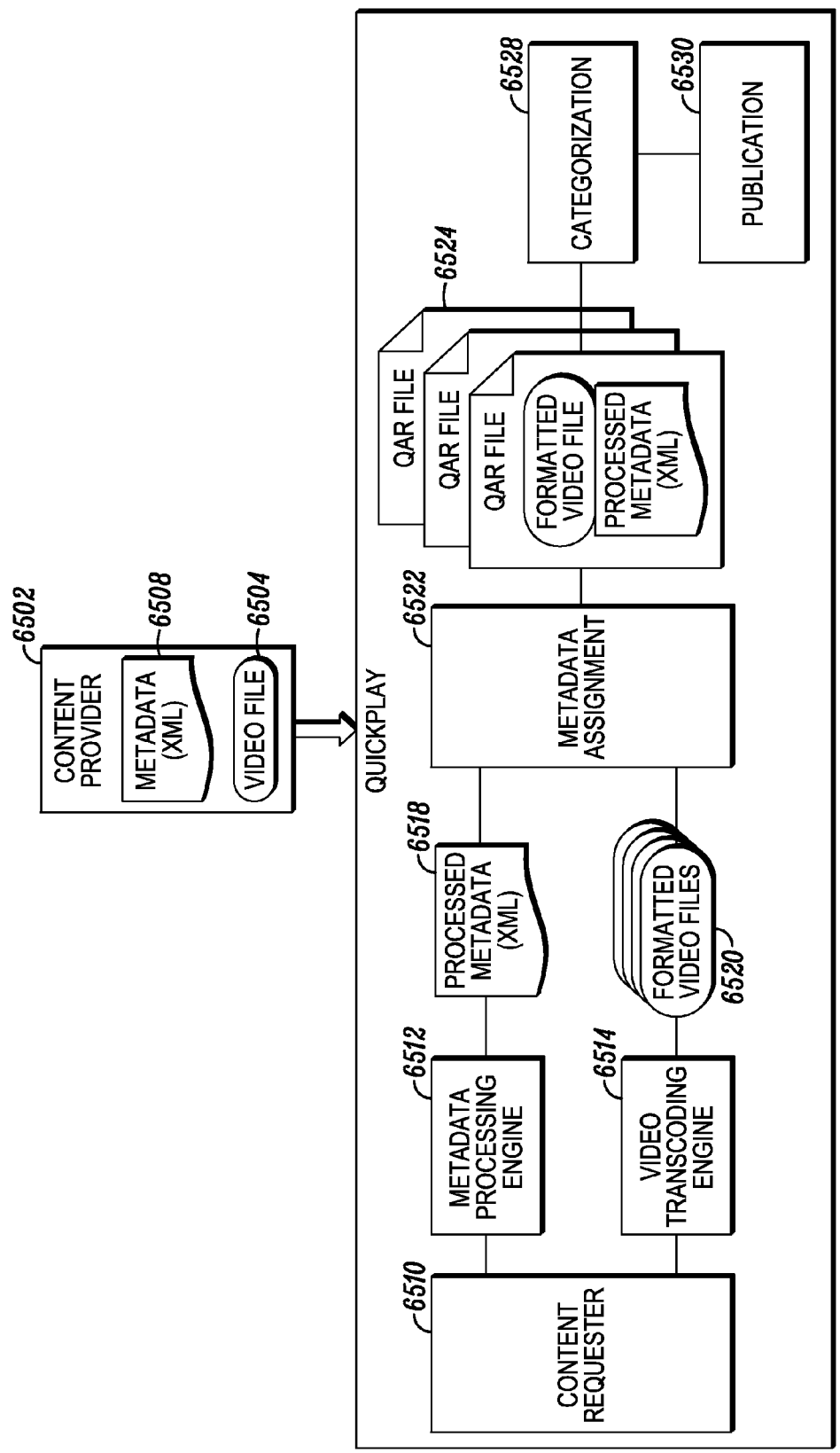
FIG. 65 a mobile media encoding flow with metadata files.

FIG. 65 depicts one particular embodiment of a video content hosting process. A content provider 6502 may provide the content, such as a video file 6504, along with metadata in XML format 6508. The platform may include a content requester 6510, metadata processing engine 6512, video transcoding engine 4114, processed metadata 4118, formatted video files 6520, metadata assignment 6522, archive files 6524, a categorization facility 6528 and a publication facility 6530. FIG. 65 depicts the use of descriptors defined in XML to wrap content and tag it into the platform. Content may be aligned by device, so that common infrastructure will service the needs of a carrier's network; for example, for a particular carrier all of their core networks, such as EVDO, iDEN and CDMA may be supported.

Figure 66:
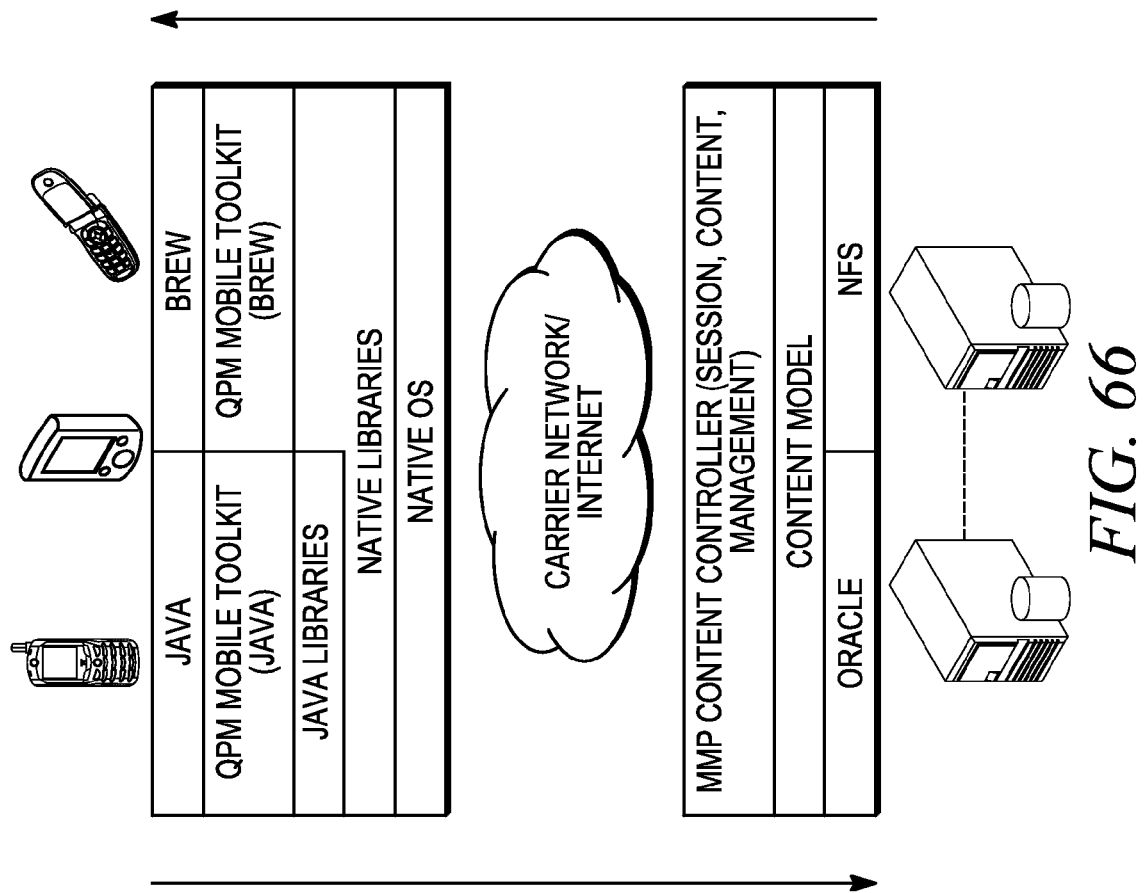
FIG. 66 functional modules of a mobile media platform.

Referring to FIG. 66, the client application architecture may enable a device independent rich user experience, a proprietary or other communications protocol and ease of porting. The device independent rich user experience may use J2ME, BREW, WAP, RIM jde, SYMBIAN, Linux Mobile, WINDOWS and the like. The device independent rich user experience may use and/or enable embedded or proprietary players. The device independent rich user experience may use or enable business logic and/or sessions managed on a server. The device independent rich user experience may use or enable carrier specific network and handset logic, such as handset capability determination and delivery method determination. The proprietary or other communications protocols may enable in-background processes, optimization of bandwidth (client cache), application version checking, update notification and the like. Ease of porting may enable intelligent pagination, scalable graphics, dynamic custom fonts and the like. The platform may dynamically calculate the amount of text that can be shown and may dynamically render it instead of hard coding (pagination, graphics and fonts).

Referring again to FIG. 66, the platform may contain a thin client portion and a firmware level for each device. Each device may have different firmware settings and hardware profiles, such as different screen resolutions, color depths, memory, memory handling and the like. The thin client aspect of the platform may facilitate interaction with the disparate devices and may allow for a framework where connectivity and applications can be built on top of the device. The platform may also contain a communications protocol which may permit initiation of more than one process simultaneously. The platform may also allow for optimization of bandwidth and cached content on the device. The platform may also enable the ability to upgrade the application in real-time once it is delivered to the market place. This may be advantageous as many users do not look for new versions, decline upgrades and/or are not sophisticated enough to complete the update process. Instead of hard coding pages, the platform may enable the dynamic calculation and optimization of page sizes, font type and sizes, amount of text to display and the like based on properties of the device and the platform.

The platform may contain its own user interface layer which is built on top of the development platform for each device. This layer may be repeatable and may function as a library, such as a library of APIs, which can be leveraged across various platforms. In this regard, the platform may handle a wide range of devices, operators, networks and the like. This layer may also allow for depth of content, services, customization and the like.

A store front application associated with the mobile media platform may include a facility to market content to consumers via a number of channels, including interactive WAP, web, and mobile rich client applications, as well as SMS short code, and mobile bar code campaigns. The store front application may enable consumers to discover content, provide a means for content providers to highlight and display the valuable content to the user via product placement in the user interface through 'most popular' feature rotation and content grouping based on themes and providing interactive cues (e.g. "more like this"). A store front application of the mobile media platform may include a web interface that may be used by content management editors and the like to manage editorial content features, such as may be defined by special promotional or other business drivers. The mobile media platform may also include or function as a purchasing platform. The mobile media platform may enable or function as a mobile home shopping network. Through purchasing, shopping and storefront applications, among other applications, the mobile media platform may assist with branding and impact brand strength.

The mobile media platform may include or function as a portal, content portal or the like. The platform may include or function as a distribution channel, such as a content distribution channel, digital distribution or the like. In an embodiment, the platform may include or function as a retail channel, wholesale channel or the like.

Figure 67:
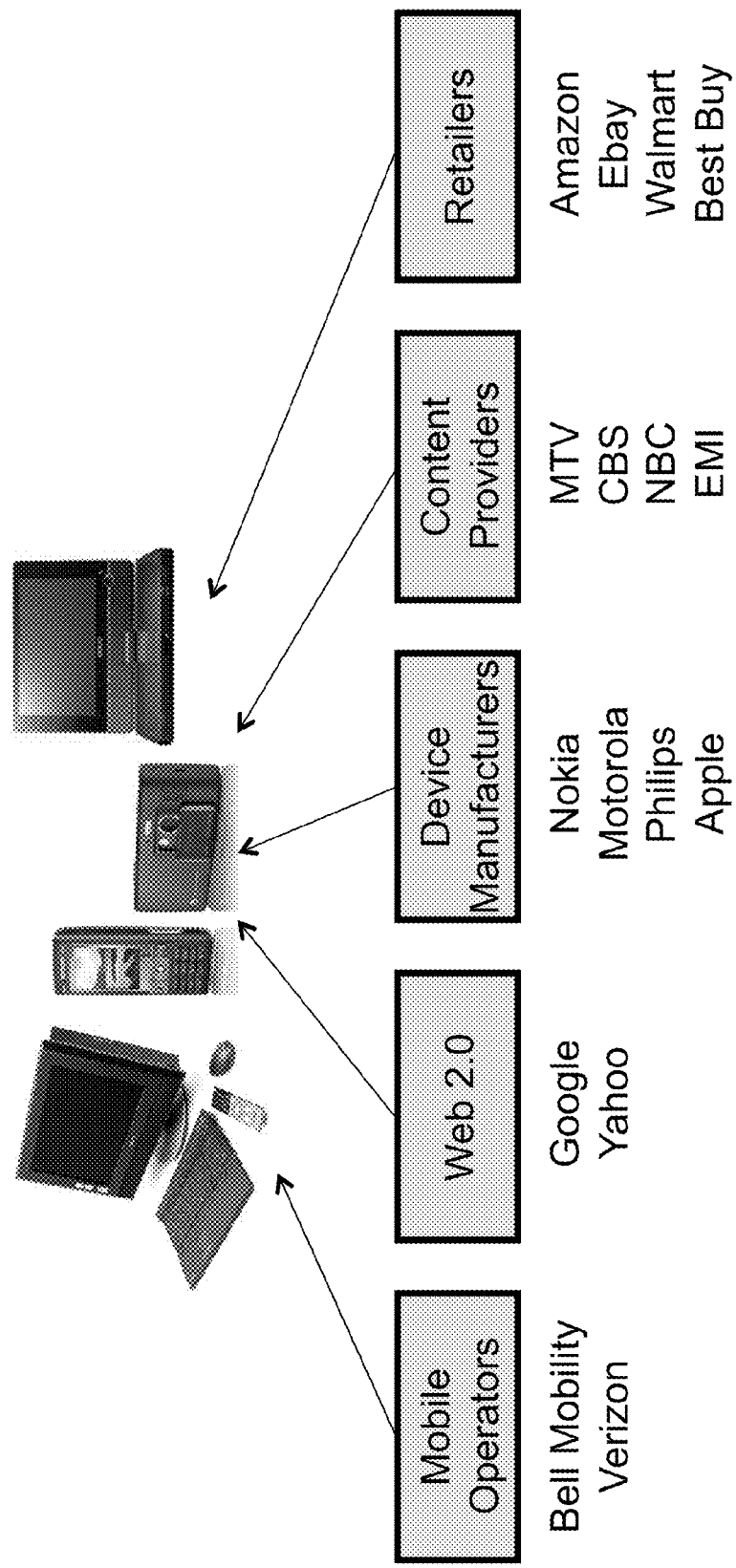
FIG. 67 depicts mobile media distribution portals.

Referring to FIG. 67, the mobile media platform may function as a syndication platform for content providers to enable their content to be delivered to end users via various distribution points, such as mobile operators or carriers like VERIZON and Bell mobility, Web 2.0 distributors like GOOGLE and YAHOO, device manufacturers like NOKIA and APPLE, content portals like MTV and CBS, retailers like AMAZON and WAL-MART.

Figure 68:
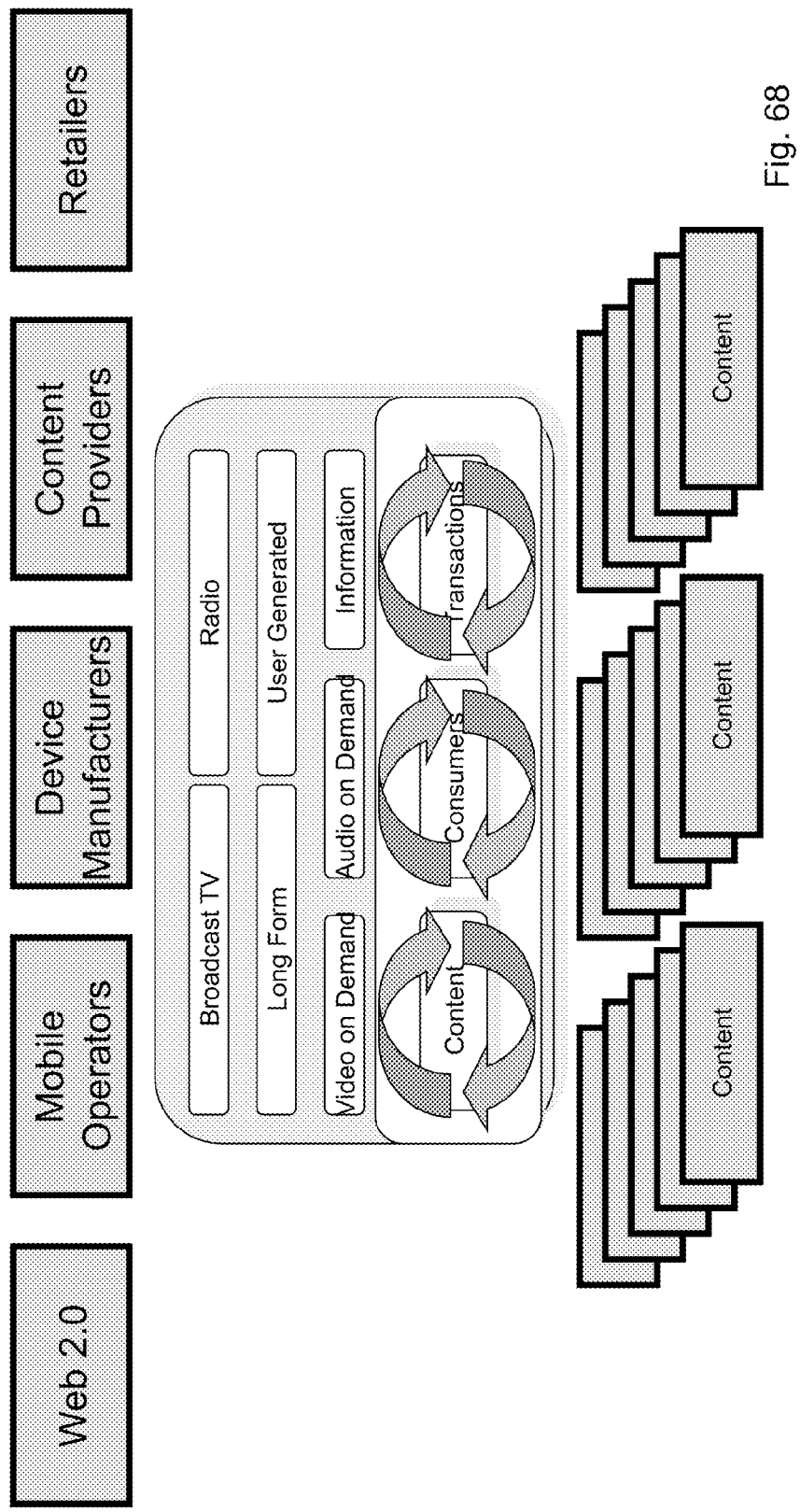
FIG. 68 depicts content flow to mobile media distribution portals.

Referring to FIG. 68, the mobile media platform may facilitate content providers reaching consumers, preparing their content for distribution, facilitating transactions, and the like through capabilities that support broadcast TV, radio, long form content, user generated content, video on demand, audio on demand, information gathering and presentation, and the like. Distribution points may provide mobile users with gateways to the content and the mobile media platform may deliver the content through the gateway or directly to the user through a referral from the gateway.

The mobile media platform may include, enable and/or facilitate games, such as mobile games. The platform may include or enable a gaming portal, gaming community or the like. A user may play a game on a mobile device. Games may be played over a network. The games may be single player games or multiplayer games. A game may include or be associated with one or more virtual worlds or real-world communities. The platform may facilitate mobile game tournaments and allow users to share scores, in addition to playing against each other.

The mobile media platform may support and be associated with a wide variety of users who may interact with, benefit from, or otherwise have a relationship to the mobile media platform or to aspects of the mobile media platform. Representative users may include end users; consumers, advertisers, marketers, content providers, content owners, networks, broadcasters, media companies, mobile carriers, record companies, movie studios, regulators, mobile device designers, mobile device manufacturers, mobile device offerors, mobile service consolidators and affiliates, retailers, and the like.

The mobile media platform may be associated with various business models. Business models may include models for operating the mobile media platform, providing services associated with the platform, establishing business relationships with partners, capitalizing on market opportunities, protecting and promoting platform related intellectual property, internationalization, and the like. Mobile media platform related business models may include shared risk, shared reward, short code and bar code campaigns, white label/private label, payment and pricing models (e.g. subscription, per-use, pre-paid, post-paid, free trial, gifting, begging), distribution models (e.g. initiated on deck (i.e., via the operator's portal facilities), initiated off-deck (i.e., via non-operator portal), initiated via short code, initiated via viral distribution and the like), ad-supported models (e.g. bulk, per view, click-through, search keyword auction, ad media, banner ads, audio/video bumpers, splash screens, interstitials, location based), revenue share management (e.g. content provider, mobile operator), and the like. The mobile media platform may facilitate multi-vendor business models through mediation and settlement of mobile content events associated with content discovery, ingestion, encoding, syndication, notification, distribution, streaming, ad serving, and other capabilities of the platform. Mediation and settlement may further enable supporting complex business models as new participants, technologies, and content intersect with current business models. In an example, a business model may include giving end users free access to most mobile content and charging the user a fee for some specialized and/or premium content. This model may enable additional ad sponsoring arrangements to mitigate the end user charges associated with the specialized and/or premium content.

In embodiments, a consumption profile 102 may impact seamless switching among unicast, multicast and broadcast content 128 and between networks. In an embodiment, switching between broadcast and unicast/multicast content 128 may be facilitated by a consumption profile 102. In an embodiment, the network profile 2508 may be used to facilitate seamless switching between two separate networks. The networks may differ in underlying technology. Networks may be GSM, GPRS, EDGE, HSDPA, UMTS, CDMA, CDMA 1X, EVDO, Wi-Fi, WIMAX, UWB, BLUETOOTH, MEDIAFLO, DVB-H, DMB and the like.

In embodiments, a consumption profile 102 may be affected by and/or facilitate advanced encoding and/or transcoding 104. In an embodiment, parameters and attributes of advanced encoding and/or transcoding 104 may be determined by a consumption profile 102. The encoding profile may specify the parameters and attributes of encoding and/or transcoding. The network profile and device profile may influence the attributes and parameters of encoding and/or transcoding so that the content 128 will be compatible and optimized for the network and device, respectively. The content 128 profile and user profile may also impact advanced encoding and/or transcoding 104. The content 128 profile and user profile may determine which content 128 is encoded and/or transcoded.

In embodiments, a consumption profile 102 may be affected by and/or facilitate automated content 128 tagging 108. Tags may be maintained as part of the consumption profile 102. The consumption profile 102 may also include information that impacts how tags are applied to content 128 and the types of tags that are applied to content 128. In embodiments, a consumption profile 102 may be affected by and/or facilitate pausing and resuming playback. Markers and the like associated with pausing and resuming 114 may be maintained as part of the consumption profile 102. The consumption profile 102 may also contain user preferences in connection with pause and resume. For example, a user may prefer that content 128 is paused when a mobile device enters standby mode, but not when a mobile device is powered off. In embodiments, a consumption profile 102 may be affected by and/or facilitate mediation and settlement 112. Information contained in the consumption profile 102 may be used to accomplish mediation and settlement 112. Mediation and settlement 112 may occur among content 128 providers, dealers, affiliates, distributors, advertisers and other constituents and users of the mobile media platform 100.

In embodiments, a consumption profile 102 may include information regarding content 128. The information may include the types of content 128, as described herein, and the sources of content 128, as described herein. In an embodiment, the consumption profile 102 may take into account the source of a request. For example, different parameters and attributes may be associated with a request for content 128 originating on a social networking or Web 2.0 website than for a request originating on a mobile device for dedicated video delivery. In an embodiment, through the consumption profile 102, the origin of a request may impact mediation and settlement 112 associated with the request. For example, a request initiated through a retail channel may be subject to different pricing terms than a request initiated through a Web 2.0 website. In an embodiment, the content 128 may be web content 130. As part of the consumption profile 102, web content 130 may be associated with specific encoding profiles and the network profile for web content 130 may only include a subset of all available networks. In embodiments, the user profile may include user preferences in connection with web content 130. For example, web content 130 may be associated with higher costs and bandwidth usage so a user may prefer to receive lower quality web content 130 or prohibit access to web content 130.

In embodiments, a consumption profile 102 may impact and be impacted by ingestion 118. In an embodiment, a consumption profile 102 may specify the ingestion parameters. In an embodiment, aspects of the consumption profile 102 may be specified as a result of ingestion 118. In embodiments, a consumption profile 102 may be hosted. In embodiments a consumption profile 102 may specify hosting 132 attributes and parameters. In embodiments, hosting parameters and attributes may be captured in a consumption profile 102.

In embodiments, a consumption profile 102 may impact the delivery of content 120. A consumption profile 102 may impact the content 128 that is delivered to a user. For example, based on user preferences, the consumption profile 102 may result in arts content 128 being delivered to a user over sports content 128. In embodiments, a consumption profile 102 may impact how content 128 is delivered to a user. For example, encoding and technical delivery parameters for certain types of content 128 as included in the consumption profile 102 may determine the network technology over and quality level at which an item of content 128 is delivered. In embodiments, a consumption profile 102 may determine when content 128 is delivered to a user. For example, based on historical user behavior which is included in the consumption profile 102, the mobile media platform 100 may provide morning news content 128 to a user at 9 am since the user historically accessed such content 128 at such time. In embodiments, a consumption profile 102 may be used to assist with the targeted delivery of advertisements to a user.

In embodiments, the ingestion, encoding, transcoding, hosting and delivery of content 128 may be optimized 134 based on a consumption profile 102. The consumption profile 102 may contain information which allows the mobile media platform 100 to optimize 134 the ingestion, encoding, transcoding, hosting and delivery of content 128. For example, in connection with delivery of an item of sports content 128, the network profile may contain information regarding the characteristics of the available networks, the device profile 2502 may contain technical characteristics of the device and the user profile may contain the fact that the user prefers to view sports content 128 at the highest possible resolution and frame rate regardless of cost. Based on this information, the mobile media platform 100 may facilitate delivery of content 128 in satisfaction of all the parameters.

In embodiments, information contained in a consumption profile 102 may form metadata that is included with content 128 in a single file 138. In embodiments, metadata included in a single file with content 128 may form part of a consumption profile 102 and/or may correspond to information that is actionable based on the information included in the consumption profile 102. For example, based on network conditions and information in a consumption profile 102 it may be determined that an item of content 128 encoded at 20 frames per second is optimal for delivery. The metadata included as part of a single file 138 containing content 128 may include information regarding the frame rate, allowing for the selection and delivery of content 128 with the optimal frame rate. In embodiments, a consumption profile 102 may be stored, such as in a storage 122 facility.

In embodiments, a consumption profile 102 may impact one or more user interfaces 140 of the mobile media platform 100 and/or a mobile device. In an embodiment, a consumption profile 102 may impact the look and feel of a user interface 140, including skins applied to a user interface 140, sliders provided as part of a user interface 140, the speed and sensitivity of the user interface 140 and the like. In an embodiment, the consumption profile 102 may impact the menus and/or tabs of the user interface 140, including the order and presence or absence of certain tabs, menus and menu items. In embodiments, a consumption profile 102 may impact rendering of a user interface itself, in addition to content 128 accessed through the user interface 140. In embodiments, a consumption profile 102 may impact the content 128 provided on a start-up screen and the types of information that are prominently displayed in a display. In an embodiment, one or more consumption profiles 102 may be managed through a user interface 140. In embodiments, messages, notifications and alerts may be provided in connection with a consumption profile 102.

In embodiments, content 128 discovery may be impacted and facilitated by a consumption profile 102. In an embodiment, a consumption profile 102 may impact searching. In an embodiment, a consumption profile 102 may be used to rank, filter and cluster search results. In an example, a user profile which favors sports content 128 may result in a higher ranking for content 128 search results for the Blue Jays baseball team than for the birds when a user searches for "blue jays" for his or her mobile device. In an example, search results may be filtered based on a device profile to exclude content 128 that cannot be accessed on a particular device. In an embodiment, a consumption profile 102 may be used to present recommendations. In an embodiment, recommendations may be based on a consumption profile 102. For example, recommendations may be made based on user preferences. In an example, a user profile may list a favorite sports team and the mobile media platform 100 may recommend to the user new content 128 relating to that team as it becomes available.

In an embodiment, location information and location intelligence 148 may be included in a consumption profile 102. In an embodiment, the location information and location intelligence component of a consumption profile 102 may be used to rank, filter and cluster search results, recommend content 128, target advertisements and the like. In embodiments, a consumption profile 102 may enable personalization of user experience 152. A consumption profile 102 may include user preferences allowing the platform to ensure that the user experience is personalized to these user preferences. In an embodiment, the mobile media platform 100 may include a personal entertainment server and/or interactive programming guide and the content 128 recommended through the server and/or guide may be influenced by a consumption profile 102.

In embodiments, a consumption profile 102 may impact social networking 150 and social networking aspects of the mobile media platform 100, including content referral, content rating, gifting, forums, gifting, buddy list management, peer-to-peer management, communities of interest, profile page, dMail, points, message boards, newsletter, shop, home, advertising, notifications, sharing content 128 on mobile devices and the like. In an embodiment, user content 128 rating may take into account consumption profiles 102 associated with various users. The ratings for a particular item of content 128 provided to a user may be weighted for similarities between that user's consumption profile 102 and the consumption profiles 102 of the users who rated the content 128. For example, if users with a particular device profile rated the content 128 as poor and users with a particular device profile rated the content 128 high, then a user with a device provide similar to the first group should be informed that the content 128 received a low rating, not a medium rating. In embodiments, a consumption profile 102 may contain user preferences regarding opting in or out of certain social networking aspects. For example, a user may elect to maintain privacy of the content 128 the user has viewed and not have his viewing behavior included in even aggregate public data.

In an embodiment, a consumption profile 102 may impact e-commerce 154 and e-billing aspects of a mobile media platform 100. In an embodiment, a consumption profile 102 may be integrated with digital rights management. In an embodiment, a consumption profile 102 may include information relating to user preferences regarding digital rights management 158. In an embodiment, a consumption profile 102 may include information relating to a device profile in respect of digital rights management. For example, the device profile for a particular device may indicate that it does not support digital rights management. As a result the mobile media platform 100 may restrict certain content 128 subject to digital rights management from being provided to the device. In embodiments, a consumption profile 102 may include information from various reports generated by the mobile media platform 100, including transaction logs, event logs, royalty reports, recommendation reports and the like. In an embodiment, the platform may generate reports based on one or more consumption profiles 102, in whole or in part. In embodiments, a consumption profile 102 may be managed through an administrative user interface. In embodiments, a consumption profile 102 may impact the administrative aspects of a mobile media platform 100, including account management, preference management, client and/or server management, profiles, registries, and the like.

Figure 69:
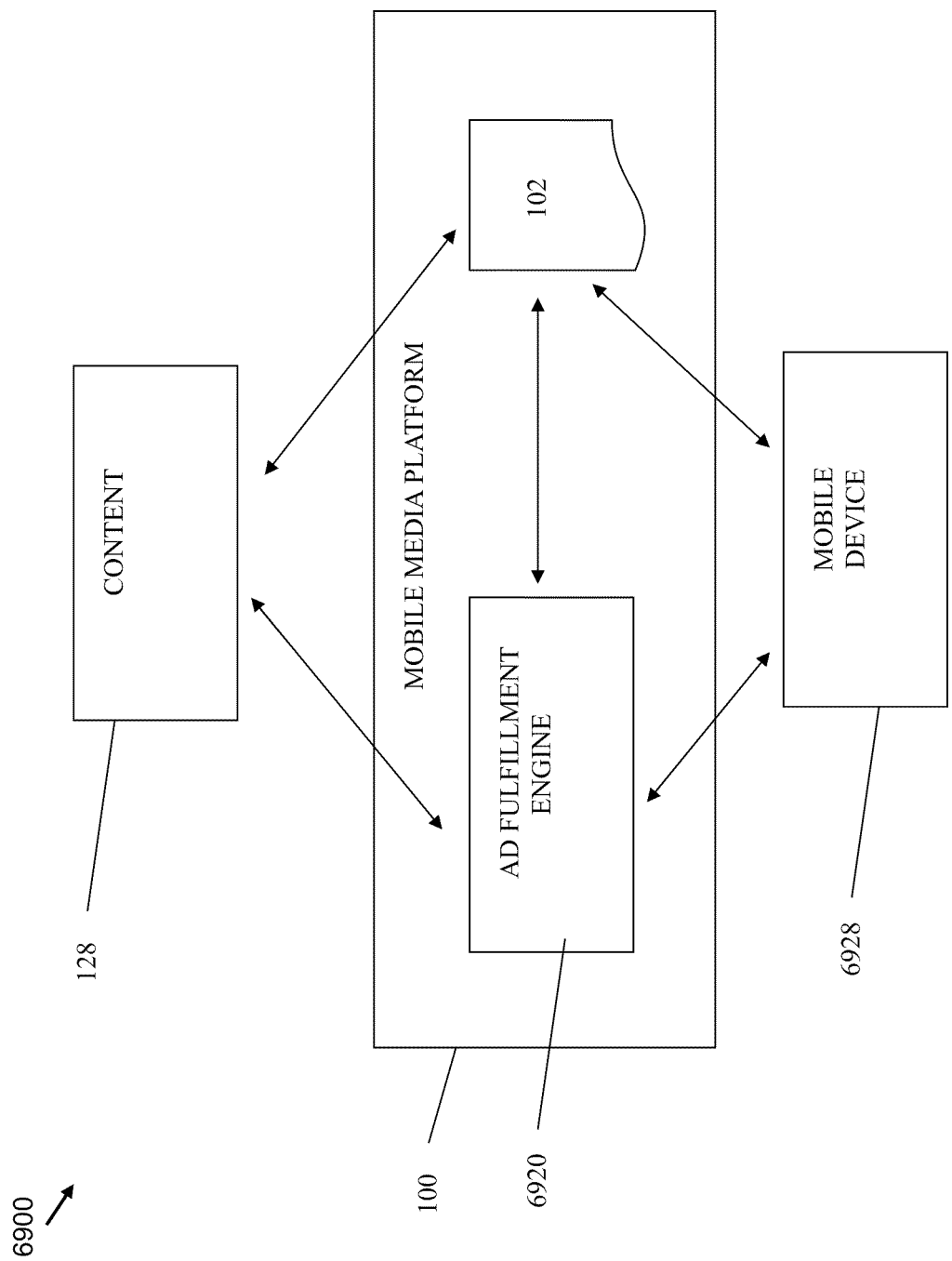
FIG. 69 depicts advertisement fulfillment.

In embodiments, a consumption profile 102 may impact advertising 164. Aspects of a consumption profile 102 may be used to target advertisements. For example, advertisements for device accessories may be targeted based on the device profile. Advertisements for businesses located close to the user's home and place of employment may be targeted based on user biographical information included in the consumption profile 102. Advertisements for particular content 128 may be targeted based on a user's past viewing behavior as captured in the consumption profile 102. Referring to FIG. 69, in embodiments, an ad fulfillment engine 6920 may utilize information provided in the consumption profile 102 to deliver and target content 128, including advertisements 128, to certain mobile devices 6928. For example, an advertising objective of the ad fulfillment engine may be to deliver a certain number of ads, to a certain demographic of users, for a certain advertiser, during a certain time period. The ad fulfillment engine 6920 can use consumption profiles 102 to determine the demographic of certain users and to tailor the delivery of each ad.

In embodiments, a consumption profile 102 may impact the security 168 aspects of the platform, including authentication, authorization, passwords, purchase verification, access control, biometric identification on the mobile device, encryption, access security and the like. In embodiments, a consumption profile 102 may impact the billing aspects of the platform, including collection, pricing, billing, mediation, settlement, reporting and the like.

In embodiments, a consumption profile 102 may enable and/or facilitate integration with other systems 172, including carrier systems, content 128 provider systems, systems of mobile devices, ad servers, Internet-based systems, web-based systems, billing systems, content delivery systems, encoding and transcoding systems, storage systems, social networking systems, hosting systems, ingestion systems, security systems, search engines, mobile search engines and the like. Integration may be accomplished using hard coding, loose coupling, over a network, using application programming interfaces, using interfaces and the like.

In embodiments, aspects of the architecture 174 of a mobile media platform 100 may be captured in a consumption profile 102. In embodiments, the consumption profile 102 may include information relating to one or more of the application layer, business module layer, system layer, thin client, rich client, device registry, component layer and the like. In embodiments the consumption profile 102 may contain detailed information regarding the architecture of the platform. For example, in connection with the peer-to-peer management aspect of the component layer, the consumption profile 102 may contain detailed information regarding buddy list management, browser interface, streaming service, off-portal billing, customer service representatives, self-care management, content 128 filter management, gifting, encoding, transcoding, download service, operator billing, advertisement manager, notification management, forum/blog/rant, content 128 ingestion, device management, pricing, management console, profile management, user content 128 rating, content 128 management, delivery management, usage collection, storefront, user registry, user content 128 referral and the like.

In embodiments, a consumption profile 102 may be associated with purchasing, shopping and store front applications 178. In embodiments, a consumption profile 102 may be associated with various channels of the platform, including distribution channels, wholesale channels, retail channels, mobile operators, web 2.0 sites, device manufacturers, content providers, retailers and the like. In embodiments, a consumption profile 102 may be associated with games.

In embodiments, a consumption profile 102 may be associated with various users of the platform 184, including end users, consumers, advertisers, marketers, content providers, content owners, networks, broadcasters, media companies, mobile carriers, record companies, movie studios, regulators, mobile device designers, mobile device manufacturers, mobile device offerors, mobile service consolidators, affiliates and the like. Types of users may include content providers, content consumers, infrastructure providers, facilitators and the like. In embodiments, each user of the platform may have its own consumption profile 102. In embodiments, a given consumption profile 102 may contain information relating to various users of the platform.

In embodiments, a consumption profile 102 may be associated with various business models 160, including short code and bar code campaigns, white label, private label, subscription, per-use, pre-paid, post-paid, free trial, gifting, begging, distribution initiated on deck, distribution initiated off-deck, distribution initiated via short code, viral distribution, ad-supported models (such as bulk, per view, click-through, search keyword auction, ad media, banner ads, audio/video bumpers, splash screens, interstitials, location based and the like), revenue share management, content provider, mobile operator and the like. In embodiments, each business model may have its own consumption profile 102. In embodiments, a given consumption profile 102 may contain information relating to various business models.

In embodiments, switching between broadcast and unicast/multicast content may be associated with advanced encoding and/or transcoding. In embodiments, encoding and transcoding for broadcast content may different from encoding and transcoding for unicast/multicast content as discussed herein. For example, unicast/multicast content may be pre-encoded, such as based on a schedule, or may be encoded on demand. Broadcast content may be encoded in a live linear manner taking into consideration the network, device, delivery method, available bandwidth and the like. In embodiments, switching between broadcast and unicast/multicast content may be associated with automated content tagging. In embodiments tags may be used to associated broadcast and unicast/multicast content.

In embodiments, switching between broadcast and unicast/multicast content may be associated with pausing and resuming playback. In an embodiment, the playing of broadcast content may be paused while unicast/multicast content is accessed. The broadcast content may be later resumed. In an embodiment, the playing of unicast/multicast content may be paused while broadcast content is accessed. The unicast/multicast content may then be later resumed. In embodiments, switching between broadcast and unicast/multicast content may be associated with mediation and settlement. Mediation and settlement may occur among content providers, dealers, affiliates, distributors, advertisers and other constituents and users of the mobile media platform. Media data records may be generated for broadcast and unicast/multicast content. Media data records generated for broadcast and unicast/multicast content may be aggregated and normalized. In embodiments, the content may be advertisements and mediation and settlement may involve payment by certain advertisers to other constituents and users of the platform. In embodiments, the content may be creative content and mediation and settlement may involve payment to certain content owners and providers.

In an embodiment, at least one of the broadcast and unicast/multicast content may be web content. The content delivered to the mobile device may be sent from the web or be sent to the device based on inputs using the web. For example, a web user may use a website to direct content to the mobile device of a friend. The friend may be viewing a broadcast sports event. The content sent using the web may be a clip of an interview involving a player in the game. The friend may switch from the broadcast content to the clip and then back to the broadcast content.

In an embodiment, content may be ingested in such a manner to facilitate switching between broadcast and unicast/multicast content. Ingestion may be of broadcast content which is provided to a mobile device and/or of unicast/multicast content which is provided to a mobile device. The ingestion process may associate tags with the content to indicate if content is broadcast or unicast/multicast. In embodiments, the tags may assist with switching between content. For example, when a user is watching broadcast content tags associated with the broadcast content may enable the mobile media platform to recommend certain unicast/multicast content based on tags associated with the unicast/multicast content.

In an embodiment, the broadcast and/or unicast/multicast content may be hosted. In an embodiment, providing broadcast and/or unicast/multicast content to a mobile device may be enabled through hosting. For example, unicast/multicast content may be hosted and/or provided to a mobile device using hosting through a mobile media platform. Hosting may improve the quality of a broadcast and/or unicast/multicast by providing redundancy and buffering.

In an embodiment, delivery of content may be impacted depending on whether the content is broadcast content and/or unicast/multicast content. A mobile media platform may choose between broadcast and unicast/multicast as the delivery method for a particular item of content. A feed from a content catalog may affect content delivery. In embodiments, a content catalog feed may determine which content is delivered and in certain embodiments may determine whether to deliver the content using broadcast or unicast/multicast. In an embodiment, delivery of broadcast and/or multicast content may be in the form of a notification, such as an email, text message or instant message, including a link or reference to the content or with the content embedded in the notification itself.

In embodiments, the ingestion, encoding, transcoding, hosting and delivery of content may be optimized in connection with seamlessly switching between broadcast and unicast content on a mobile device. For example, the network bandwidth for broadcast content and unicast content may be compared and the ingestion, encoding, transcoding, hosting and delivery of content of broadcast and unicast content adjusted so that the user is presented with similar quality for each type of content. In another embodiment, device profiles and device playback capabilities may be taken into account. For example, a device may be able to playback only a reduced quality version of broadcast content, so the broadcast quality is reduced allowing for delivery of correspondingly higher quality unicast content.

In embodiments, metadata and data may be combined in a single file. The metadata may include information regarding the content of the file including a description of the content and technical aspects regarding the content. This information may be used in connection with delivery of the content and optimization of ingestion, encoding, transcoding, hosting and delivery. The existence of metadata and data in a single file may facilitate the delivery of and switching between broadcast and unicast/multicast content. In an embodiment, the metadata included in a unicast content file may contain information about broadcast content to be associated with this file and a URL associated with the schedules for such broadcast content. Using this information the mobile media platform may recommend to the user a list of related broadcast content currently being or soon to be broadcast. The mobile media platform may contain storage functionality and facilities for storage of broadcast and/or unicast/multicast content and information related to such content.

In embodiments, the application enabling switching between broadcast and unicast/multicast content may include a user interface. The user interface may contain menus, sliders, icons and items specific to each of broadcast, unicast and multicast content. The user skin or appearance of the user interface may change depending on the broadcast, unicast and multicast nature of the content. While providing broadcast content, the user interface may present links to or recommendations for unicast/multicast content. When providing unicast/multicast content the user interface may present links or recommendations for broadcast content. In embodiments, the links or recommendations may be presented as part of the content itself or in a frame surrounding the content. In an embodiment, the user interface may include an administrative user interface. In an embodiment, the user interface may allow for broadcast and unicast/multicast content to be accessed or displayed simultaneously.

In embodiments, while displaying or providing access to broadcast content the mobile media platform may provide notifications regarding the broadcast content or associated unicast/multicast content. In embodiments, while displaying or providing access to unicast/multicast content the mobile media platform may provide notifications regarding the unicast/multicast content or associated broadcast content. The notifications may include links to related content or may be notifications of charges incurred. The notifications may be advertisements for related goods and services. The mobile media platform may provide a notification to a user of the upcoming broadcast of certain content that is recommended based on the users' consumption profile.

In an embodiment, a mobile media platform may allow searching of both broadcast and unicast/multicast content. Searching may be based on the content, data, metadata, tags and content catalog feed. Search results for associated broadcast and unicast/multicast content may be grouped together. In an embodiment, a search result involving the broadcast of a live concert event may be clustered with search results for unicast music videos and interviews featuring the artists performing at the concert.

In an embodiment, a mobile media platform may present recommendations. In embodiments, while displaying or providing access to broadcast content the mobile media platform may provide recommendations in connection with the broadcast content, which may include associated unicast/multicast content. In embodiments, while displaying or providing access to unicast/multicast content the mobile media platform may provide recommendations in connection with the unicast/multicast content, which may include associated broadcast content. The recommendations may be generated by a recommendation engine. The recommendations may be based on a consumption profile and/or content catalog feed. The recommendations may be based on content ratings.

In an embodiment, location information and location intelligence may be used to select the optimal technology for delivery of broadcast and/or unicast/multicast content. In an embodiment location information and location intelligence may be used in connection with content recommendations. In embodiments, location information and location intelligence may be used to enforce black out rules in connection with broadcast content. In an embodiment, using location information and location intelligence, while a user if viewing broadcast content links to unicast/multicast content relating to the location and context of the user may be presented to the user. For example, as a user is watching a broadcast of a program directed at home improvements the user may be provided with a link to a unicast advertisement for a home improvement store in the vicinity of the user.

In an embodiment, switching between broadcast and unicast/multicast content may be personalized to a particular user. The mobile media platform may include an interactive programming guide. In embodiments, the interactive programming guide may contain both broadcast and unicast/multicast content. The mobile media platform may include a personal entertainment server which may present recommended unicast content and a list of often viewed broadcast channels.

In embodiments, switching between broadcast and unicast/multicast content may be associated with social networking and social networking aspects of the mobile media platform, including content referral, content rating, gifting, forums, gifting, buddy list management, peer-to-peer management, communities of interest, profile page, dMail, points, message boards, newsletter, shop, home, advertising, notifications, sharing content on mobile devices and the like. In an embodiment, a group of users watching a given broadcast may communicate with each other in a forum associated with that broadcast. In an example, the broadcast may be of a particular sporting event and the forum may be a forum for fans of the home team. In another embodiment, while watching a particular broadcast, a group of users may be able to share with each other links to unicast/multicast content relating to the broadcast. The related unicast content may be provided as a gift from one user to another user. In embodiments, the group of users may be viewing multicast content instead of broadcast content.

In embodiments, switching between broadcast and unicast/multicast content may be associated with the e-commerce aspects of the mobile media platform, including Billing, pricing, event tracking, bundling, tiered services, subscriptions, purchasing content, previewing content and the like. In embodiments, switching between broadcast and unicast/multicast content may be associated with the rights management aspects of the mobile media platform, including digital rights management, digital rights administration and computing royalties owes to particular owners of intellectual property.

In embodiments, switching between broadcast and unicast/multicast content may be associated with the reporting aspects of the platform, including transaction logs, event logs, royalty reports, recommendation reports and the like. In embodiments, reports may be accessed from a web interface. In embodiments, switching between broadcast and unicast/multicast content may be associated with the administrative aspects of the mobile media platform, including account management, preference management, client and/or server management, profiles, registries, and the like. In embodiments, switching between broadcast and unicast/multicast content may be associated with an administrative user interface which may vary by users, administrators, carriers, broadcast content provider, unicast/multicast content provider, and the like.

In embodiments, switching between broadcast and unicast/multicast content may be associated with providing advertising content. Advertising content may be provided as broadcast and/or unicast/multicast content. Advertising content may be an interstitial advertisement, banner ad, in stream ad, ad placed in the content itself, ad framing the content, an ad appearing before or after other content, and the like. In an embodiment, an advertisement may be interactive and may contain links to other content. In embodiments, advertising content may be targeted on the basis of a consumption profile, data about the user and user preferences, location information and location intelligence and using an ad fulfillment engine.

In embodiments, switching between broadcast and unicast/multicast content may be associated with the security aspects of the platform, including authentication, authorization, passwords, purchase verification, access control, biometric identification on the mobile device, encryption, access security and the like. In embodiments, switching between broadcast and unicast/multicast content may be associated with the billing aspects of the platform, including collection, pricing, billing, mediation, settlement, reporting and the like. In embodiments, access to broadcast and/or unicast/multicast content may be on a pay per duration and/or subscription model. In embodiments, the billing may be integrated with operator billing systems, carrier billing systems, third party payment processors, broadcasters, unicast/multicast content providers and the like.

In embodiments, switching between broadcast and unicast/multicast content may be integrated with other systems, including carrier systems, content provider systems, systems of mobile devices, ad servers, Internet-based systems, web-based systems, billing systems, content delivery systems, encoding and transcoding systems, storage systems, social networking systems, hosting systems, ingestion systems, security systems, search engines, mobile search engines and the like. Integration may be accomplished using hard coding, loose coupling, over a network, using application programming interfaces, using interfaces and the like.

In embodiments, switching between broadcast and unicast/multicast content may be associated with and supported by the architecture of the platform as described herein. In embodiments, switching between broadcast and unicast/multicast content may be associated with a store front. In an embodiment, the store front may provide access to unicast content while broadcast content is being viewed. In another embodiment, the store front may enable the purchase of broadcast and/or unicast/multicast content.

In embodiments, switching between broadcast and unicast/multicast content may be associated with various channels of the platform, including distribution channels, wholesale channels, retail channels, mobile operators, web 2.0 sites, device manufacturers, content providers, retailers and the like. In embodiments, switching between broadcast and unicast/multicast content may be associated with games. For example, a unicast game may be provided in connection with broadcast content. In embodiments, switching between broadcast and unicast/multicast content may be associated with various users of the platform, including end users, consumers, advertisers, marketers, content providers, content owners, networks, broadcasters, media companies, mobile carriers, record companies, movie studios, regulators, mobile device designers, mobile device manufacturers, mobile device offerors, mobile service consolidators, affiliates and the like. Types of users may include content providers, content consumers, infrastructure providers, facilitators and the like.

In embodiments, switching between broadcast and unicast/multicast content may be associated with various business models, including short code and bar code campaigns, white label, private label, subscription, per-use, pre-paid, post-paid, free trial, gifting, begging, distribution initiated on deck, distribution initiated off-deck, distribution initiated via short code, viral distribution, ad-supported models (such as bulk, per view, click-through, search keyword auction, ad media, banner ads, audio/video bumpers, splash screens, interstitials, location based and the like), revenue share management, content provider, mobile operator and the like.

Figure 70:
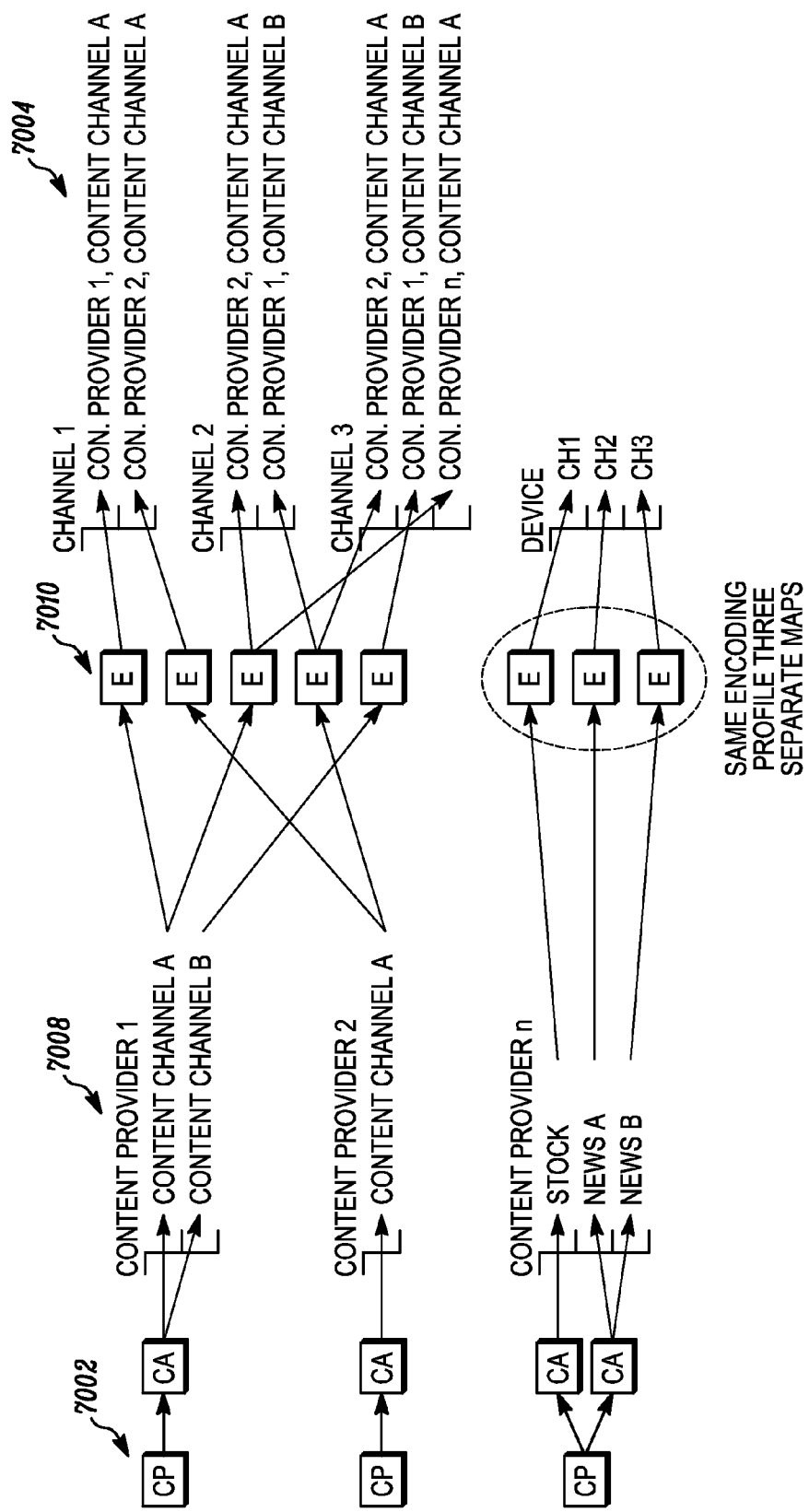
FIG. 70 depicts encoding data flow.

Referring to FIG. 70, an advanced encoding/transcoding 104 system can be grown to form a complex relationship between content providers 7002 and content consumers 7004 through the use of complex internal interactions between content sources 7008 and encoding facilities 7010.

Figure 71:
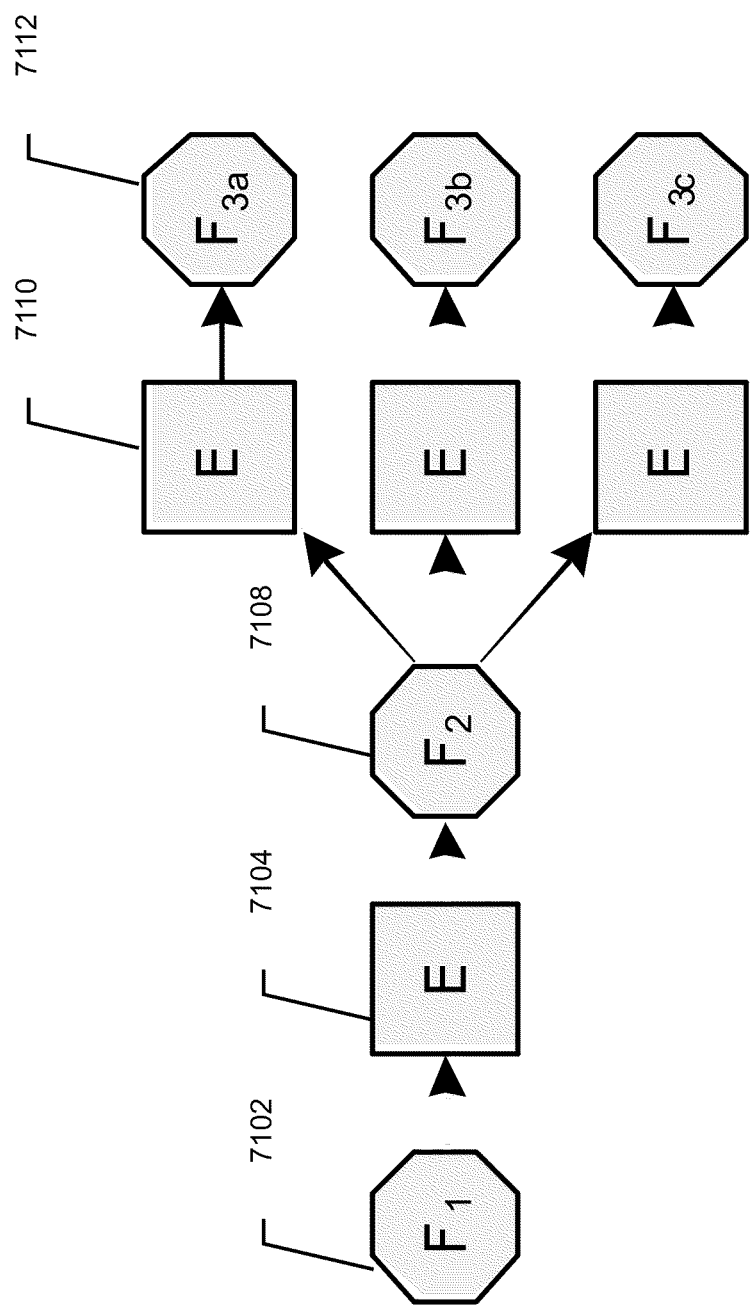
FIG. 71 depicts pre-encoding data flow.

Referring to FIG. 71 an embodiment of pre-encoding is provided. An advanced encoding/transcoding 104 facility may create intermediate encodings 7108 by pre-processing 7108 the source content 7102, for example to de-speckle, de-interlace, and convert to MPEG-2 format, which can then be fed into subsequent encoders 7110 to produce tertiary results such as specific encodings 7112 for carriers. Encoding and normalization can thereby occur independently from the device-specific encodings.

Advanced encoding/transcoding 104 may be associated with automated content tag management 108. A mobile media platform 100 may facilitate an association of advanced encoding/transcoding 104 with automated content tag management 108. A combination of advanced encoding/transcoding 104 with automated content tag management 108 may facilitate content discovery 144, ingestion 118, encoding, hosting 132, delivery 120, mediation/settlement 112, and user acceptance of mobile content 128 facilitated by the mobile media platform 100.

Advanced encoding/transcoding 104 may select an encoding method based on mobile device 3102 acceptance and/or support of a tagging 108 format associated with an encoding method. Tagging 108 related to the content 128 or metadata associated with the content 128 may influence how advanced encoding/transcoding 104 responds to the tagged content 128. In this way, tagging 108 may facilitate using rules associated with an encoding/transcoding 104 phase of ingestion 118 to setup encoding and delivery.

Enhanced encoding/transcoding 104 may support tags 108 provided within content 128, such as a camera model number within an image taken by the camera. A flexible tag model associated with a mobile media platform 100 may allow for such use.

Tags 108 may further support a composite profiling process that may enable transcoding based on information in the tag in addition to other factors related to consumption profile 102 parameters. A content tag may indicate that digital rights restrict the content 128 from being encoded in certain low resolution formats 3108. A content tag may indicate that audio portions of the content 128 may preferably be encoded with an encoding method based on the encoding method selected for the visual portion of the content 128. A tag may indicate a portion of the content 128 is dynamic and another portion is nearly static, resulting in advanced encoding/transcoding 104 selecting appropriate encoders for each portion of content 128. In another example, a tag that identifies content 128 encoding format may allow an automatic encoding/transcoding 104 module to self-determine what is being encoded. Without tagging 108, the encoding process may require the content 128 to be examined or a header of the content 128 to be included to determine an encoding format of the content 128.

Advanced encoding/transcoding 104 may be associated with pause and resume 114 functionality or features. A mobile media platform 100 may facilitate an association of advanced encoding/transcoding 104 with pause and resume 114. A combination of advanced encoding/transcoding 104 with pause and resume 114 may facilitate content discovery 144, ingestion 118, encoding, hosting 132, delivery 120, mediation & settlement 112, and user acceptance of mobile content 128 facilitated by the mobile media platform 100.

Pause and resume 114, when applied to an encoded stream being delivered to a mobile device 3102 may impact advanced encoding/transcoding 104. Pausing delivery may enable encoding output to be redirected to a cache or buffer. Pause and resume 114 functionality that may detect packet by packet mobile content 128 transfers, may be applied to encoding to enable advanced encoding capabilities such as in stream encoding changes.

Advanced encoding/transcoding 104 may be associated with mediation and settlement 112. A mobile media platform 100 may facilitate an association of advanced encoding/transcoding 104 with mediation and settlement 112. A combination of advanced encoding/transcoding 104 with mediation and settlement 112 may facilitate content discovery 144, ingestion 118, encoding, hosting 132, delivery 120, mediation/settlement 112, and user acceptance of mobile content 128 facilitated by the mobile media platform 100.

Advanced encoding/transcoding 104 may be associated with content 128, content type, source, and parameters. A mobile media platform 100 may facilitate an association of advanced encoding/transcoding 104 with content 128. A combination of advanced encoding/transcoding 104 with content 128 may facilitate content discovery 144, ingestion 118, encoding, hosting 132, delivery 120, mediation/settlement 112, and user acceptance of mobile content 128 facilitated by the mobile media platform 100.

Encoding and/or transcoding may be based at least in part on content type. Encoding of audio content 128 may be different than transcoding of video content 128, which may be different than encoding of composite content 128. Live content 128 may require on-demand encoding, whereas stored content 128 may be processed to generate pre-encoded content 128. Sources of content 128 may impact advanced encoding/transcoding 104. User created content 128 may be pre-encoded and available from external hosts in several common formats 3108. Alternatively user created content 128 may be irregularly constructed, causing advanced encoding to determine a best fit encoding method based on, for example, trial and error encoding.

Advanced encoding/transcoding 104 may be associated with web content 130. A mobile media platform 100 may facilitate an association of advanced encoding/transcoding 104 with web content 130. A combination of advanced encoding/transcoding 104 with web content 130 may facilitate content discovery 144, ingestion 118, encoding, hosting 132, delivery 120, mediation/settlement 112, and user acceptance of mobile content 128 facilitated by the mobile media platform 100. Web content 130 may be directly streamable from an Internet server, however web content 130 may have to be transcoded to be accepted by mobile devices 3102. Web content 130 that is readily accessible at high bandwidth, may not be pre-encoded but rather may always be encoded on-demand to allow the content 128 source and the encoding to remain independent, yet allow a wide variety of mobile users to access the web content 130.

Advanced encoding/transcoding 104 may be associated with ingestion 118. A mobile media platform 100 may facilitate an association of advanced encoding/transcoding 104 with ingestion 118. A combination of advanced encoding/transcoding 104 with ingestion 118 may facilitate content discovery 144, ingestion 118, encoding, hosting 132, delivery 120, mediation/settlement 112, and user acceptance of mobile content 128 facilitated by the mobile media platform 100. An advanced encoding/transcoding 104 facility may include ingestion 118 of external content 128. Ingestion and advanced encoding/transcoding 104 may be automatically activated.

A self-aware ingestion 118 module may be part of the advanced encoding/transcoding 104 facility or it may communicate with the advanced encoding/transcoding 104 facility to deliver content 128 to be managed. Self-aware ingestion 118 may facilitate normalizing content 128 so that content 128 from any type and any format may be normalized, such as through recoding and format conversion, into a format useable by the platform and/or the advanced encoding/transcoding 104 facility. Encoding, recoding, and transcoding may be performed by the self-aware ingestion 118 module. Alternatively, the self-aware ingestion 118 capability may be an attachment to an encoding process of the platform so that ingestion and encoding may be operated under separate constraints. Self-aware ingestion 118 may determine what encoding, recoding, transcoding, format conversion, filtering, and the like is needed based on ingestion 118 parameters associated with the advanced encoding/transcoding 104 facility and/or the platform. If newly presented content 128 is in an encoding that is not supported, the self-aware ingestion 118 module may order recoding from an attached encoding facility before directing the content 128 to the advanced encoding/transcoding 104 facility. In an example, a self-aware ingestion 118 module may determine that a transcoding process exists to recode newly presented content 128 from its presented encoding to a preferred encoding. In such a situation, the self-aware ingestion 118 module may perform the transcoding to present the content 128 in the preferred encoding.

Advanced encoding/transcoding 104 may be associated with hosting 132. A mobile media platform 100 may facilitate an association of advanced encoding/transcoding 104 with hosting 132. A combination of advanced encoding/transcoding 104 with hosting may facilitate content discovery 144, ingestion 118, encoding, hosting 132, delivery 120, mediation/settlement 112, and user acceptance of mobile content 128 facilitated by the mobile media platform 100. A mobile media platform 100 may host content 128 that has been encoded or transcoded by an advanced encoding/transcoding 104 facility. The facility may encode raw content 128 into one or more formats 3108 for hosting, thereby enabling a host to have fast access to the hosted encoded content 128 for faster delivery when the content 128 is requested by a mobile device 3102 that supports the one or more hosted formats 3108.

Advanced encoding/transcoding 104 may be associated with content delivery 120. A mobile media platform 100 may facilitate an association of advanced encoding/transcoding 104 with content delivery 120. A combination of advanced encoding/transcoding 104 with content delivery 120 may facilitate content discovery 144, ingestion 118, encoding, hosting 132, delivery 120, mediation/settlement 112, and user acceptance of mobile content 128 facilitated by the mobile media platform 100. Encoding may be performed on-demand to delivery content 128 as a stream for playback of video, audio, and the like on mobile devices 3102. Content 128 may be delivered to a mobile device 3102 or distribution 182 portal from a wide variety of content 128 sources and an encoding/transcoding 104 facility may support converting the sourced content 128 as it is sourced so that it can be continuously presented for delivery 120. Mobile devices 3102 may provide content 128 to the mobile media platform 100 that the encoding/transcoding 104 facility may recode for delivery 120 to another mobile device 3102 or distribution 182 portal. Self-aware encoding/transcoding 104 may be directed toward encoding for a delivery method. Delivery methods such as streaming, download, progressive download, MMS, WAP push, and the like may each impact encoding in different ways. Encoding methods may be combined during a consumption session so that delivery 120 may be separated from encoding method. In an example, live linear content 128 may be encoded on-demand and pre-encoded advertisements may be inserted in the delivery stream.

Advanced encoding/transcoding 104 may be associated with optimization 134. A mobile media platform 100 may facilitate an association of advanced encoding/transcoding 104 with optimization 134. A combination of advanced encoding/transcoding 104 with optimization 134 may facilitate optimization 134 of content discovery 144, ingestion 118, encoding, hosting 132, delivery 120, mediation/settlement 120, and user acceptance of mobile content 128 facilitated by the mobile media platform 100. Encoding/transcoding 104 may be employed to generate encoded content 128 that may optimize response time for a request for the content 128 by encoding content 128 into formats 3108 that are popular or in demand. A carrier may specify preferred delivery formats 3108 during peak network load periods to optimize availability of the network and advanced encoding/transcoding 104 may be used to recode content 128 into the preferred formats 3108 (e.g. lower resolution) during peak periods. An encoding format may be determined based on a consumption profile 102 associated with a device 3102 or distribution 182 portal requesting or providing content 128 and an advanced encoding/transcoding 104 facility may process content 128 associated with the determined format. Encoding/transcoding 104 may be optimized by an advanced encoding/transcoding 104 facility based on characteristics of the content 128, such as if the content 128 is talking head content 128 that does not change rapidly versus sports content 128 that may change continuously.

Advanced encoding/transcoding 104 may be associated with combining metadata with creative content 128 in a single file 138. A mobile media platform 100 may facilitate an association of advanced encoding/transcoding 104 with combining metadata with creative content 128 in a single file 138. A combination of advanced encoding/transcoding 104 with combining metadata with creative content 128 in a single file 138 may facilitate content discovery 144, ingestion 118, encoding, hosting 132, delivery 120, mediation/settlement 112, and user acceptance of mobile content 128 facilitated by the mobile media platform 100. Encoding/transcoding 104 may include inserting metadata into a file with encoded creative content 128 so that a receiving device 3102 or portal may determine from the metadata information about the encoding, such as encoder version, source encoding format, on-demand versus pre-encoded encoding, and the like.

Advanced encoding/transcoding 104 may be associated with content storage 122. A mobile media platform 100 may facilitate an association of advanced encoding/transcoding 104 with content storage 122. A combination of advanced encoding/transcoding 104 with content storage 122 may facilitate content discovery 144, ingestion 118, encoding, hosting 132, delivery 120, mediation/settlement 112, and user acceptance of mobile content 128 facilitated by the mobile media platform 100.

Advanced encoding/transcoding 104 may be associated with a user interface 140. A mobile media platform 100 may facilitate an association of advanced encoding/transcoding 104 with a user interface 140. A combination of advanced encoding/transcoding 104 with a user interface 140 may facilitate content discovery 144, ingestion 118, encoding, hosting 132, delivery 120, mediation/settlement 112, and user acceptance of mobile content 128 facilitated by the mobile media platform 100.

Advanced encoding/transcoding 104 may be associated with notifications, messages, and alerts. A mobile media platform 100 may facilitate an association of advanced encoding/transcoding 104 with notifications, messages, and alerts 142. A combination of advanced encoding/transcoding 104 with notifications, messages, and alerts 142 may facilitate content discovery 144, ingestion 118, encoding, hosting 132, delivery 120, mediation/settlement 112, and user acceptance of mobile content 128 facilitated by the mobile media platform 100.

Advanced encoding/transcoding 104 may be associated with content discovery 144. A mobile media platform 100 may facilitate an association of advanced encoding/transcoding 104 with content discovery 144. A combination of advanced encoding/transcoding 104 with content discovery 144 may facilitate content discovery 144, ingestion 118, encoding, hosting 132, delivery 120, mediation/settlement 112, and user acceptance of mobile content 128 facilitated by the mobile media platform 100. Automatic encoding/transcoding 104 of content 128 may be based on content 128 that is discovered, therefore as new content 128 is discovered it may be presented to an advanced encoding/transcoding facility for automated encoding/transcoding 104. A mobile media platform 100 with self-aware encoding/transcoding 104 capability may acquire or detect content 128 in a wide variety of formats 3108 and types that may be readily transcoded by the self-aware encoding/transcoding 104 module.

Advanced encoding/transcoding 104 may be associated with delivery or device 3102 location 148. A mobile media platform 100 may facilitate an association of advanced encoding/transcoding 104 with delivery or device 3102 location 148. A combination of advanced encoding/transcoding 104 with delivery or device 3102 location 148 may facilitate content discovery 144, ingestion 118, encoding, hosting 132, delivery 120, mediation/settlement 112, and user acceptance of mobile content 128 facilitated by the mobile media platform 100. Because mobile device 3102 location may dynamically change, an advanced encoding/transcoding 104 facility may react to delivery location changes by adjusting encoding. In an example, as a user moves from a Wi-Fi hot spot to a location serviced only by a standard cellular network, encoding of content 128 being delivered to the device 3102 may be switched accordingly. While in the Wi-Fi hot spot, encoding may deliver very high quality encoded content 128 to take advantage of the Wi-Fi bandwidth and may switch to lower resolution encoding to continue to deliver the requested content 128 within the constraints of the network connection that is available to the user device.

Advanced encoding/transcoding 104 may be associated with personalization 152. A mobile media platform 100 may facilitate an association of advanced encoding/transcoding 104 with personalization 152. A combination of advanced encoding/transcoding 104 with personalization 152 may facilitate content discovery 144, ingestion 118, encoding, hosting 132, delivery 120, mediation/settlement 112, and user acceptance of mobile content 128 facilitated by the mobile media platform 100. An advanced encoding/transcoding 104 facility may react to personalization 152 as determined by, for example, a user profile so that when a user logs onto the platform, the users preferences relating to encoding may adjust how content 128 is encoded for delivery to the user. When another user logs onto the platform from the same device, different encoding preferences may be applied by the advanced encoding/transcoding 104 facility.

Advanced encoding/transcoding 104 may be associated with social networking 150. A mobile media platform 100 may facilitate an association of advanced encoding/transcoding 104 with social networking 150. A combination of advanced encoding/transcoding 104 with social networking 150 may facilitate content discovery 144, ingestion 118, encoding, hosting 132, delivery 120, mediation/settlement 112, and user acceptance of mobile content 128 facilitated by the mobile media platform 100. Social networking may facilitate user to user sharing of content 128, such as by placing the content 128 or a link to the content 128 on a user's social networking site. When a user attempts to share content 128 with another user with a device 3102 that does not support the format in which the content 128 being shared is encoded, advanced encoding/transcoding 104 may be employed to recode the content 128 into a format acceptable to the target user device. This encoding/transcoding 104 may be performed automatically as the content 128 is transferred over the network from one user to another without either user being conscious of the transcoding operation.

Advanced encoding/transcoding 104 may be associated with e-commerce billing 154. A mobile media platform 100 may facilitate an association of advanced encoding/transcoding 104 with e-commerce billing 154. A combination of advanced encoding/transcoding 104 with e-commerce billing 154 may facilitate content discovery 144, ingestion 118, encoding, hosting 132, delivery 120, mediation/settlement 112, and user acceptance of mobile content 128 facilitated by the mobile media platform 100.

Advanced encoding/transcoding 104 may be associated with rights management 158. A mobile media platform 100 may facilitate an association of advanced encoding/transcoding 104 with rights management 158. A combination of advanced encoding/transcoding 104 with rights management 158 may facilitate content discovery 144, ingestion 118, encoding, hosting 132, delivery 120, mediation/settlement 112, and user acceptance of mobile content 128 facilitated by the mobile media platform 100.

Advanced encoding/transcoding 104 may be associated with reporting 124. A mobile media platform 100 may facilitate an association of advanced encoding/transcoding 104 with reporting. A combination of advanced encoding/transcoding 104 with reporting may facilitate content discovery 144, ingestion 118, encoding, hosting 132, delivery 120, mediation/settlement 112, and user acceptance of mobile content 128 facilitated by the mobile media platform 100. Reporting may include information about utilization of an encoding/transcoding 104 facility to provide content 128. Encoding/transcoding 104 utilization may be determined based on characteristics of the content 128 delivered, such as live linear streamed content 128 may have utilized on-demand encoding.

Advanced encoding/transcoding 104 may be associated with platform administration 162. A mobile media platform 100 may facilitate an association of advanced encoding/transcoding 104 with platform administration. A combination of advanced encoding/transcoding 104 with platform administration may facilitate content discovery 144, ingestion 118, encoding, hosting 132, delivery 120, mediation/settlement 112, and user acceptance of mobile content 128 facilitated by the mobile media platform 100.

Advanced encoding/transcoding 104 may be associated with advertising 164. A mobile media platform 100 may facilitate an association of advanced encoding/transcoding 104 with advertising 164. A combination of advanced encoding/transcoding 104 with advertising 164 may facilitate content discovery 144, ingestion 118, encoding, hosting 132, delivery 120, mediation/settlement 112, and user acceptance of mobile content 128 facilitated by the mobile media platform 100. An advanced encoding/transcoding 104 facility may interact with an advertising 164 fulfillment engine to encode advertisements into formats 3108 that are compatible with content 128 being provided to users so that the content 128 and the advertisements may be seamlessly stitched together during delivery. On-demand encoding/transcoding 104 facilitates real-time advertisement selection and insertion into content 128 being delivered.

Advanced encoding/transcoding 104 may be associated with security 168. A mobile media platform 100 may facilitate an association of advanced encoding/transcoding 104 with security. A combination of advanced encoding/transcoding 104 with security may facilitate content discovery 144, ingestion 118, encoding, hosting 132, delivery 120, mediation/settlement 112, and user acceptance of mobile content 128 facilitated by the mobile media platform 100.

Advanced encoding/transcoding 104 may be associated with billing 170. A mobile media platform 100 may facilitate an association of advanced encoding/transcoding 104 with billing. A combination of advanced encoding/transcoding 104 with billing may facilitate content discovery 144, ingestion 118, encoding, hosting 132, delivery 120, mediation/settlement 112, and user acceptance of mobile content 128 facilitated by the mobile media platform 100.

Advanced encoding/transcoding 104 may be associated with third party integration 172. A mobile media platform 100 may facilitate an association of advanced encoding/transcoding 104 with third party integration 172. A combination of advanced encoding/transcoding 104 with third party integration 172 may facilitate content discovery 144, ingestion 118, encoding, hosting 132, delivery 120, mediation/settlement 112, and user acceptance of mobile content 128 facilitated by the mobile media platform 100. Advanced encoding and/or transcoding may be offered as a service by the platform to third party content 128 management systems. An advanced encoding/transcoding 104 facility may be integrated with a third party content 128 management system to provide encoding transcoding for content 128 managed by the system. In an example, a corporation may employ encoding to exchange content 128 over a private corporate wireless network. To support a wide variety of devices 3102 seamlessly on the private wireless network, content 128 may be routed through an advanced encoding/transcoding 104 facility to ensure the content 128 meets the requirements of the destination such as a server, database, executive handheld mobile device, sales person's mobile device, and the like. In another example, a third party may deliver content 128 to the mobile media platform 100 for advanced encoding/transcoding 104, and may receive in reply a Uniform Resource Identifier (URI) that may contain a link to the resulting advanced encoded/transcoded content 128 that may be published and content 128 managed by the mobile media platform 100.

Advanced encoding/transcoding 104 may be associated with an embodiment of the platform. An embodiment of advanced encoding/transcoding 104 in an embodiment of the platform may provide an architecture 174 that may facilitate content discovery 144, ingestion 118, encoding, hosting 132, delivery 120, mediation/settlement 112, and user acceptance of mobile content 128 facilitated by the mobile media platform 100. Encoding/transcoding 104 may be hardware based, software based, hardware and software based. A particular encoding format may be generated by hardware based on availability of the hardware or by software if the required hardware encoding embodiment is not available. The architecture of an embodiment, and therefore the cost to construct, license, operate, and maintain encoding and/or transcoding on the architecture may be based on the mix of hardware and software dedicated to encoding.

Figure 72:
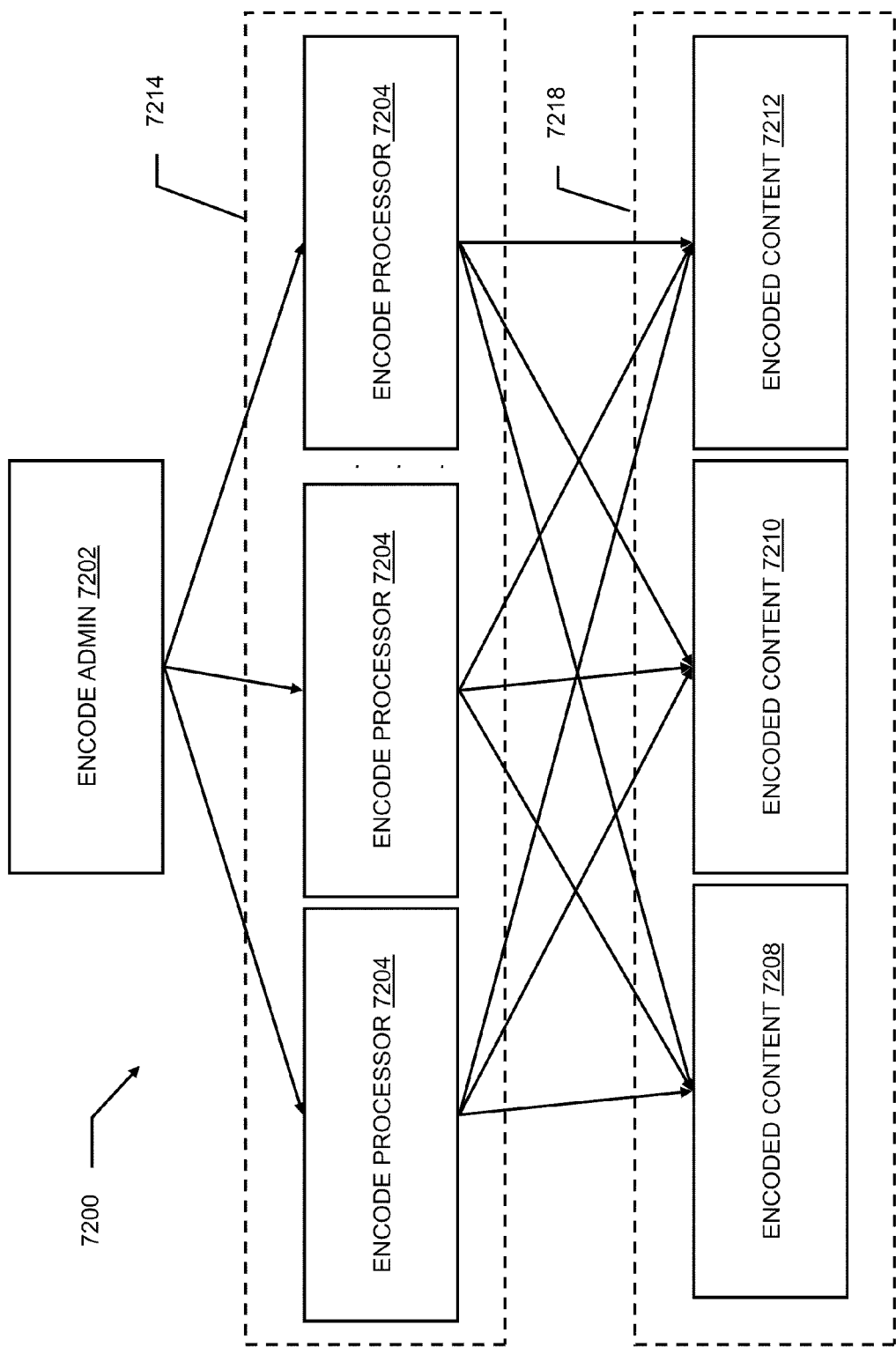
FIG. 72 depicts distributed encoding/transcoding.

Referring to FIG. 72, an advanced encoding/transcoding 104 facility may include distributed computing. The advanced encoding/transcoding 104 facility may divide encoding workload between at least two groups of machines: admin servers 7202 that may perform management of encoding work, and worker machines 7204 that may perform encoding. The servers 7202 may manage incoming encoding job requests and delegate the work required to complete the job. The work itself, which may be computationally intensive tasks, such as collecting, encoding especially, and publishing encoded content 7218 may be delivered to a group of processors 7204 that are specifically optimized to handle such tasks. These delegate processors may collectively be known as the 'encoding farm' 7214. Each processor 7204 may generate any one of the required encoded content outputs 7208, 7210, 7212 based on the encoding work delegated.

The administrative server 7202 workload may be extremely light compared to the workload handled by the encoding farm 7214, which permits relatively few servers 7202 to manage very large numbers of workers 7204. Furthermore, the numbers of servers, workers, and server-worker combinations can be increased arbitrarily, providing practically infinite encoding capacity.

Advanced encoding/transcoding 104 may be associated with purchasing, shopping, and store-front applications 178. A mobile media platform 100 may facilitate an association of advanced encoding/transcoding 104 with purchasing, shopping, and store-front applications. A combination of advanced encoding/transcoding 104 with purchasing, shopping, and store-front applications may facilitate content discovery 144, ingestion 118, encoding, hosting 132, delivery 120, mediation/settlement 112, and user acceptance of mobile content 128 facilitated by the mobile media platform 100.

Advanced encoding/transcoding 104 may be associated with distribution 182 channel applications. A mobile media platform 100 may facilitate an association of advanced encoding/transcoding 104 with distribution 182 channel applications. A combination of advanced encoding/transcoding 104 with distribution 182 channel applications may facilitate content discovery 144, ingestion 118, encoding, hosting 132, delivery 120, mediation/settlement 112, and user acceptance of mobile content 128 facilitated by the mobile media platform 100. From an encoding perspective, a distribution 182 channel or portal may be treated similarly to a mobile device 3102 in that encoding and transcoding may be based on distribution 182 portal characteristics that may be captured in a distribution 182 portal profile. Encoded content 128 that is provided to a distribution 182 channel may be encoded on-demand or may be pre-encoded.

Advanced encoding/transcoding 104 may be associated with games 180 and network gaming. A mobile media platform 100 may facilitate an association of advanced encoding/transcoding 104 with games and network gaming. A combination of advanced encoding/transcoding 104 with games and network gaming may facilitate content discovery 144, ingestion 118, encoding, hosting 132, delivery 120, mediation/settlement 112, and user acceptance of mobile content 128 facilitated by the mobile media platform 100. Multiplayer network gaming may require exchange of content 128 among player devices 3102. An advanced encoding/transcoding 104 capability may allow devices 3102 with incompatible encoding requirements to be used in an on-line gaming session by recoding the content 128 as it is exchanged over a network among the players.

Advanced encoding/transcoding 104 may be associated with users or participants 184. A mobile media platform 100 may facilitate an association of advanced encoding/transcoding 104 with users or participants. A combination of advanced encoding/transcoding 104 with users or participants may facilitate content discovery 144, ingestion 118, encoding, hosting 132, delivery 120, mediation/settlement 112, and user acceptance of mobile content 128 facilitated by the mobile media platform 100. User preferences, user feedback, and the like may be considered when automatically encoding/transcoding 104 content 128 delivered to or received from a user.

Advanced encoding/transcoding 104 may be associated with mobile media business models 160. A mobile media platform 100 may facilitate an association of advanced encoding/transcoding 104 with mobile media business models. A combination of advanced encoding/transcoding 104 with mobile media business models may facilitate content discovery 144, ingestion 118, encoding, hosting 132, delivery 120, mediation/settlement 112, and user acceptance of mobile content 128 facilitated by the mobile media platform 100. A business model that targets low cost distribution 182 of content 128 may favor low resolution encoding over high resolution encoding.

Referring again to FIGS. 32 to 36, automated tagging may be associated with or combined with various other aspects of the mobile media platform.

Automated content tagging 108 may be associated with the content being distributed, such as audio, video, text, images, photos, applications, games, data, ring tones, wall paper, fonts, hyperlinks, tables, tabular formatted text, user generated content, media, radio, content primitives, composite content, marketing type content, and the like. Tagging 108 may be associated with the characteristics of the content, popularity of the content, length of the content, the individuals or organizations involved in the production of the content, the source of the content, the location of the content, the type of the content, management aspects of the content, technical aspects of the content, user device limitations associated with the content, marketing targets associated with the content, and the like. A mobile media platform may facilitate an association of automated content tagging 108 with content. A combination of automated content tagging 108 with content may facilitate content discovery, ingestion 118, encoding 104, hosting, delivery 104, mediation, settlement, and user acceptance of mobile content facilitated by the mobile media platform.

In embodiments, tagging 108 may be associated with the characteristics of the content, such as display resolution, image format, language, audio format, and the like. For instance, with a tag 108 associated with the language users and advertisers may select only those content items that are associated with a particular language. Similarly, a tag 108 associated with an image format may allow the user to select only those content items that will play effectively on their device. Tags 108 may indicate the length of the content item in order to allow the user to select only content that is within the timeframe of interest. Tags 108 may be associated with the popularity of a content item, and as such, may allow users to select from the most popular items, or keep track of how popular an item or show or song is becoming. Advertisers may also use popularity tags 108 to select and cost advertisements to be associated with, or tagged directly into, the content item. Tags 108 may be associated with the individuals associated with the production of the content item, such as the performing artist, the director, the producer, the sponsoring agency, and the like. Tags 108 associated with the performing artist for instance may allow a user to search for work available from the artist, and assemble playlists or collections for that artist. Tags 108 associated with a sponsoring agency may allow the user to select content from say an educational association, a certain publishing house, a government agency, a music label, and the like. Tags 108 may be associated with the source or location of the content, which may allow the user to select local programming, or programming from a specific production group, and the like. Tags 108 may be associated with playback device limitations, such as image resolution, display size, audio quality, speed, and the like. A user may then select only those content items that may allow them to playback content items that run well on their device.

In embodiments, tagging 108 may improve the quality of experience for a user. For example, a user may want to play some recent TV shows that have become available. Tags 108 associated with the content may allow the user to select the most popular items for that week. In addition, tags 108 may make it possible for the user to download only those content items that will play well on their device, selecting items tagged 108 for the proper display, resolution, link speed, and the like. Subject oriented tags 108 may also allow the user to select topics that are appealing, and alternately, parents may place limitations on the downloads of questionable subject matter. In embodiments, the user may be provided a degree of selection control over content to be viewed through the use of tagged 108 content.

Figure 33:
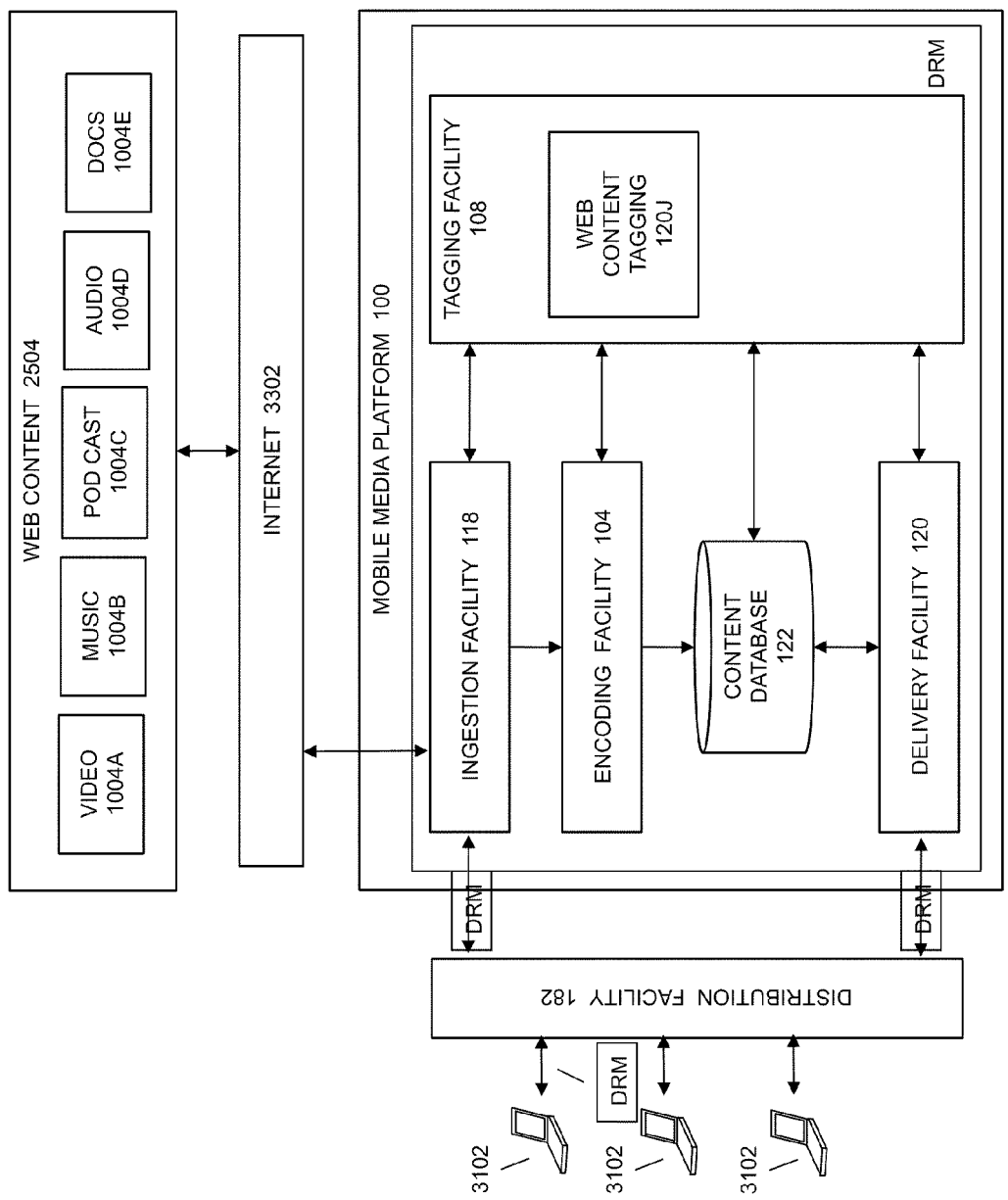
FIG. 33 depicts automated tagging with web content.

Automated content tagging 108 may be associated with web content 3304, such as video 3304A, music 3304B, pod casts 3304C, audio files 3304D, syndicated shows, POWERPOINT slide shows 3304E, word processor documents 3304E, and the like. FIG. 33 depicts one embodiment of a block diagram showing the tagging 108A of web content 3304 in association with the mobile media platform 100. As depicted in FIG. 33, the tagging may affect and be affected by digital rights management, including the systems and methods described herein. In embodiments, digital rights management may be applied to tagging, ingestion, delivery and distribution. Web content 3304 tagging 108 may be associated with the type of media, the date of last revision, the date of collection, the file extension, the URL address of the source, sponsoring agency, display resolution, audio content, trust level of the site, and the like. Web content 3304 tagging 108 may allow the user to search based on the type of media, such as in a user wanting to view pod casts 3304C. In addition, web content 3304 tags 108 may allow the user to select the general category of all available pod casts 3304C, a specific pod cast 3304C, a popular pod cast 3304C, and the like. The user may also be able to take advantage of time stamp tags 108 associated with web content 3304, such as when the file was created and when the file was collected by the mobile media platform 100. Tags 108 may be associated with the file extension for the web content 3304, such as for a user wanting to search for only POWERPOINT 3304E slide shows for a certain topic, a word processing document 3304E, a pdf document 3304E, and the like. A mobile media platform 100 may facilitate an association of automated content tagging 108 with web content 3304. A combination of automated content tagging 108 with web content may facilitate content discovery, ingestion 118, encoding 104, hosting, delivery 104, mediation, settlement, and user acceptance of mobile content facilitated by the mobile media platform 100.

In embodiments, the user may also be able to utilized web content 3304 tags 108 to pull up the URL for the web content 3304 item that they've found, so that they might access it at another time, perhaps from a computer with greater capabilities. Web content 3304 tagging 108 may allow for searching based on the sponsoring agency, production group, domain name, and the like, such as looking for web content 3304 from a certain corporation, a college, a broadcasting group, and the like. Web content 3304 tags 108 may specify technical aspects of the web material, such as display resolution, that may affect the effectiveness of how the user views the web content 3304 on their device. Tags 108 may also be available for the media characteristics of the web content 3304, such as the presence of audio, embedded video, live feeds, and the like. Web content 3304 is also often associated with trustworthiness of the site, that is, is the site trusted for the type of content delivered, the accuracy of the content delivered, as well as whether the site is a trusted source in regard to computer malware.

Another example of how web content 3304 tags 108 may be utilized, is in association with the news. The Internet may generate a continuous, and large volume of news material, from a great variety of sources. A user may have preferences associated with the news they want to receive. It may be assumed that a user will firstly want to have the latest news, and so time stamped tags 108 may allow for the filtering of news based on time. But the user may also have certain personal preferences for news, such as for certain sources of news, certain types of news, news from specific geographical regions, and the like, and these preferences may be stored in a set of personal profile tags 108 that are associated with an ID, their device, their name, or the like. In addition, their mobile communications device may also have performance related preferences, such as associated with display, link speed, processing speed, and the like, and these preferences may be stored in a set of device profile tags 108. Together, these tags 108 may help specify which web content 3304 is to be made available to the user, in this instance, for the latest news. In embodiments, web content tags 108 may be able to improve the user applicability of web content 3304, selected from the vast quantity of available web content 3304.

Automated content tagging 108 may be associated with ingestion of content into the mobile media platform for subsequent ingestion 118 and distribution, such as related to the characteristics of the content, the quality of content being ingested, the source of content, the method of ingestion, the trustworthiness of the content, and the like. In embodiments, the ingested content may be tagged 108 for the plurality of content characteristics, such as video properties, audio properties, length of video, quality of video, size of text, file format, and the like. These content tags 108, assigned at the time of ingestion, may be then stored for subsequent use. In embodiments, these tags 108 may also be used internal to the mobile media platform, such as for ingestion 118 purposes. Quality of content being ingested may be another important attribute to be tagged, such as the quality and reliability of the source, the quality of the data received such as in bit errors, the quality of the data received such as in the resolution level of the images and/or audio, and the like. Quality may be of concern to users, marketing organizations, as well as the content management facility of the mobile media platform, and as such, may be an important attribute to assign tagging 108 to. The source of the content, not only contributes to the initial assessment of quality of the content, but also may be of interest to the end users, especially if the user is interested in collecting content from a given source, whether considered by the tagging 108 facility as quality or not. A mobile media platform may facilitate an association of automated content tagging 108 with ingestion. A combination of automated content tagging 108 with ingestion may facilitate content discovery, ingestion 118, encoding 104, hosting, delivery 104, mediation, settlement, and user acceptance of mobile content facilitated by the mobile media platform.

In embodiments, it may be of interest to tag 108 and store the method by which the ingested content was acquired, such as in it having been submitted by an individual, acquired by polling a third party, collection by a spider, obtained via an interactive web portal, a Web service API, or the like. Knowing how the material was obtained may help evaluate the quality of the content for tagging 108, or provide a sense to a user as to its reliability, such as by combining the fact that it had been submitted by an individual, where the individual was left unidentified. As a result, a trustworthiness merit may also be assigned a tag 108, where trustworthiness may be determined through a specific source of information, such a being from a certified trusted source, or from a combination of acquired information at ingestion that may collectively help determine the trustworthiness rating that may be assigned to content at ingestion.

Automated content tagging 108 may be associated with hosting of content, such as by allowing individuals and organizations to provide their own websites accessible via the Internet Tags 108 associated with hosting may be associated with what servers or clients have access to the hosting, what connectivity is available, what data centers are involved, what processing was associated with the hosting, whether the hosting is a free service or a paid service, whether the hosting is a shared service, whether the host is the primary host, and the like. Tags may be used to publish and un-publish content, date time, or events, catalog listings, and the like. A mobile media platform may facilitate an association of automated content tagging 108 with hosting. A combination of automated content tagging 108 with hosting may facilitate content discovery, ingestion 118, encoding 104, hosting, delivery 104, mediation, settlement, and user acceptance of mobile content facilitated by the mobile media platform.

Automated content tagging 108 may be associated with content delivery 104, such as the type of delivery 104, including a file download, a streaming of video, a streaming of video, progressive downloading, and the like; the size of the delivery 104; combining delivery 104 from multiple sources; availability of refreshes or updates; associated with consumption profiles; source of content; and the like. A mobile media platform may facilitate an association of automated content tagging 108 with content delivery 104. A combination of automated content tagging 108 with content delivery 104 may facilitate content discovery, ingestion 118, encoding 104, hosting, delivery 104, mediation, settlement, and user acceptance of mobile content facilitated by the mobile media platform.

Automated content tagging 108 may be associated with the optimization of ingestion 118, encoding 104, transcoding, hosting, and delivery 104 of content, such as the creation of device profiles, bandwidth adjustments, adjustment of ingestion 118 parameters, associated with device playback capabilities including independent adjustment of video and audio capabilities, adjustments in association with digital rights management, and the like. A mobile media platform may facilitate an association of automated content tagging 108 with optimization of ingestion 118, encoding 104, transcoding, hosting, and delivery 104.

Automated content tagging 108 may be associated with combining data and metadata in a single file, such as repackaging ingested content, providing packaged content in archive files, combining metadata and multiple versions of the content, type of packaged content (batch ingestion 118, single ingestion 118, and real-time ingestion 118), content wrapped in descriptors, and the like. A mobile media platform may facilitate an association of automated content tagging 108 with combining data and metadata in a single file. A combination of automated content tagging 108 with combining data and metadata in a single file may facilitate content discovery, ingestion 118, encoding 104, hosting, delivery 104, mediation, settlement, and user acceptance of mobile content facilitated by the mobile media platform.

Automated content tagging 108 may be associated with storage, such as storage of content data, including metadata, attributes, parameters; online storage; offline storage; provided on the platform or on the mobile device; provided through a network; provided on different media, including magnetic storage, optical storage, semiconductor storage, and the like. A mobile media platform may facilitate an association of automated content tagging 108 with storage. A combination of automated content tagging 108 with storage may facilitate content discovery, ingestion 118, encoding 104, hosting, delivery 104, mediation, settlement, and user acceptance of mobile content facilitated by the mobile media platform.

Automated content tagging 108 may be associated with a user interface, such as for dynamic rendering, enabling interactivity, viewing thumbnails, facilitating game day tracking, enabling reader features, managing end user presentations, adjusting to device capabilities, skinning, content schedules, daily features, flipbooks, sliders, displaying multiple items at once, split screen applications, framing content with links, and the like. A mobile media platform may facilitate an association of automated content tagging 108 with a user interface. A combination of automated content tagging 108 with a user interface may facilitate content discovery, ingestion 118, encoding 104, hosting, delivery 104, mediation, settlement, and user acceptance of mobile content facilitated by the mobile media platform.

Automated content tagging 108 may be associated with notifications, messages, and alerts, such as management of notifications, notifications for content, notifications for new content, reminders regarding broadcast of certain content, delivery of messages to a user, tracking user notification preferences and generating a message when an event occurs that matches the user preferences, delivery of operator messages, and the like. Tags may be used to publish and unpublish content, date time, or events, catalog listings, and the like. A mobile media platform may facilitate an association of automated content tagging 108 with notifications, messages, and alerts. A combination of automated content tagging 108 with notifications, messages, and alerts may facilitate content discovery, ingestion 118, encoding 104, hosting, delivery 104, mediation, settlement, and user acceptance of mobile content facilitated by the mobile media platform.

Figure 34:
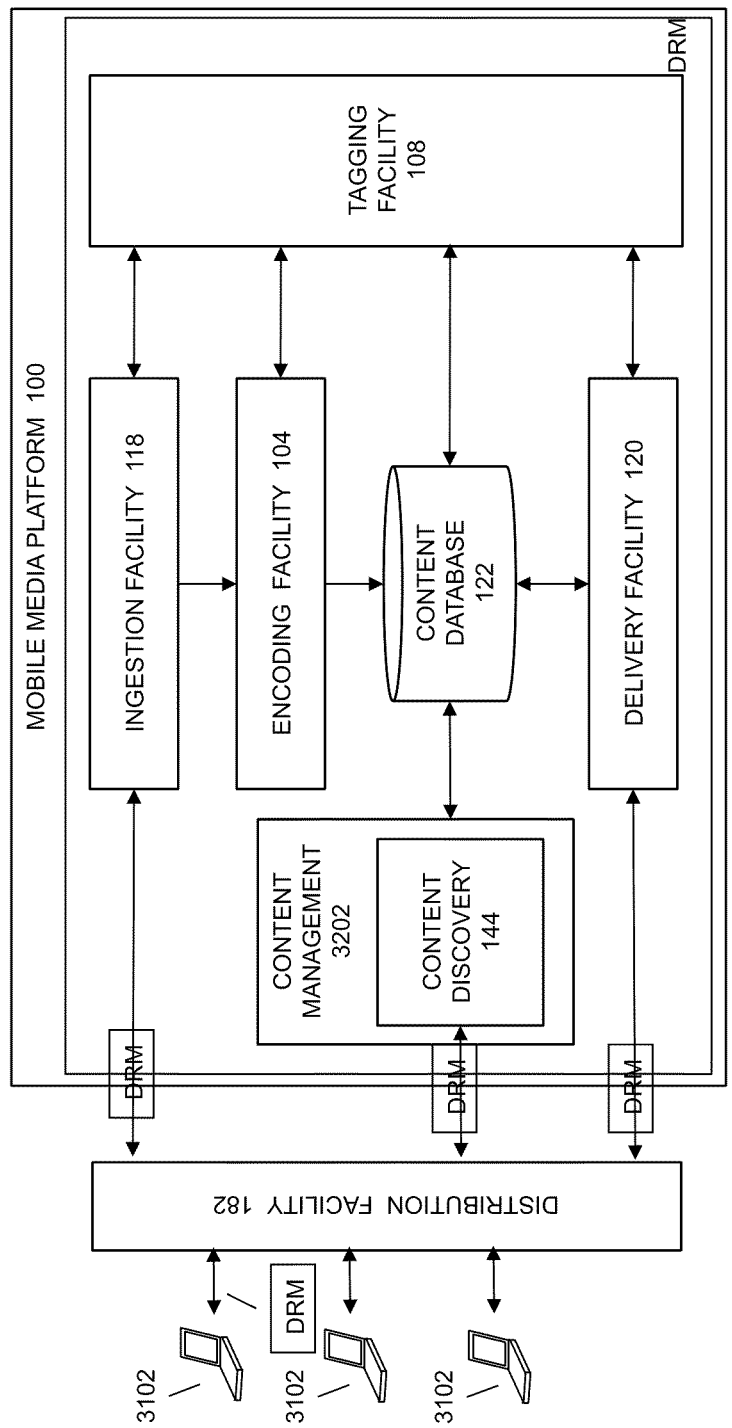
FIG. 34 depicts automated tagging with content discovery.

Automated content tagging 108 may be associated with content discovery 144, such as searching, including content, metadata, allowing users to search for categories of content, integration to third party search engines, multiple content store crawls, and the like; recommendations, including recommendation engines, popular clips algorithms, generating recommendations via inferred preferences, based on direct input, based on sensed context, and the like; content catalog feed, including in connection with search and recommendations, mobile search engines, active push feed, passive pull feed, and the like; content management, including managing digital data; deep linking; popular plays; content filtering, content rating, community polling, personalization of content delivery 104, tagging 108 of content, front processing, hierarchical category organization, clip-based retrieval, generalized data modeling, consumption profiles, and the like. FIG. 34 depicts one embodiment of a block diagram showing the tagging in association with content discovery 144 in the mobile media platform 100, where content discovery 144 is an integral part of the content management of the mobile media platform 100, and relates to the end user mobile communication facilities 3102 through the distribution facility 182. As depicted in FIG. 34, the tagging may affect and be affected by digital rights management, including the systems and methods described herein. In embodiments, digital rights management may be applied to tagging, ingestion, delivery, content discovery, content management and distribution. Tagging 108 may be used to build relationships across content, thereby establishing related content to enhance discovery 144 services. Tags may also be used during discovery 144 to restrict content, by location, based on user preferences such as parental control. A mobile media platform may facilitate an association of automated content tagging 108 with content discovery 144. A combination of automated content tagging 108 with content discovery 144 may facilitate content discovery, ingestion 118, encoding 104, hosting, delivery 104, mediation, settlement, and user acceptance of mobile content facilitated by the mobile media platform 100.

For example, and in embodiments, a user of a mobile device 3102 may have a user profile set up that specifies the content that they want downloaded on a regular basis. In addition, the user profile may specify content that is undesirable, where the user wants to never receive this content. Content discovery 144 may then be governed through this user profile, whereas content is tagged at ingestion, the content, as specified in the user profile, is offered for download to the user. In embodiments, may content discovery filters and algorithms may be utilized in facilitating the delivery of desirable content to the user.

Figure 35:
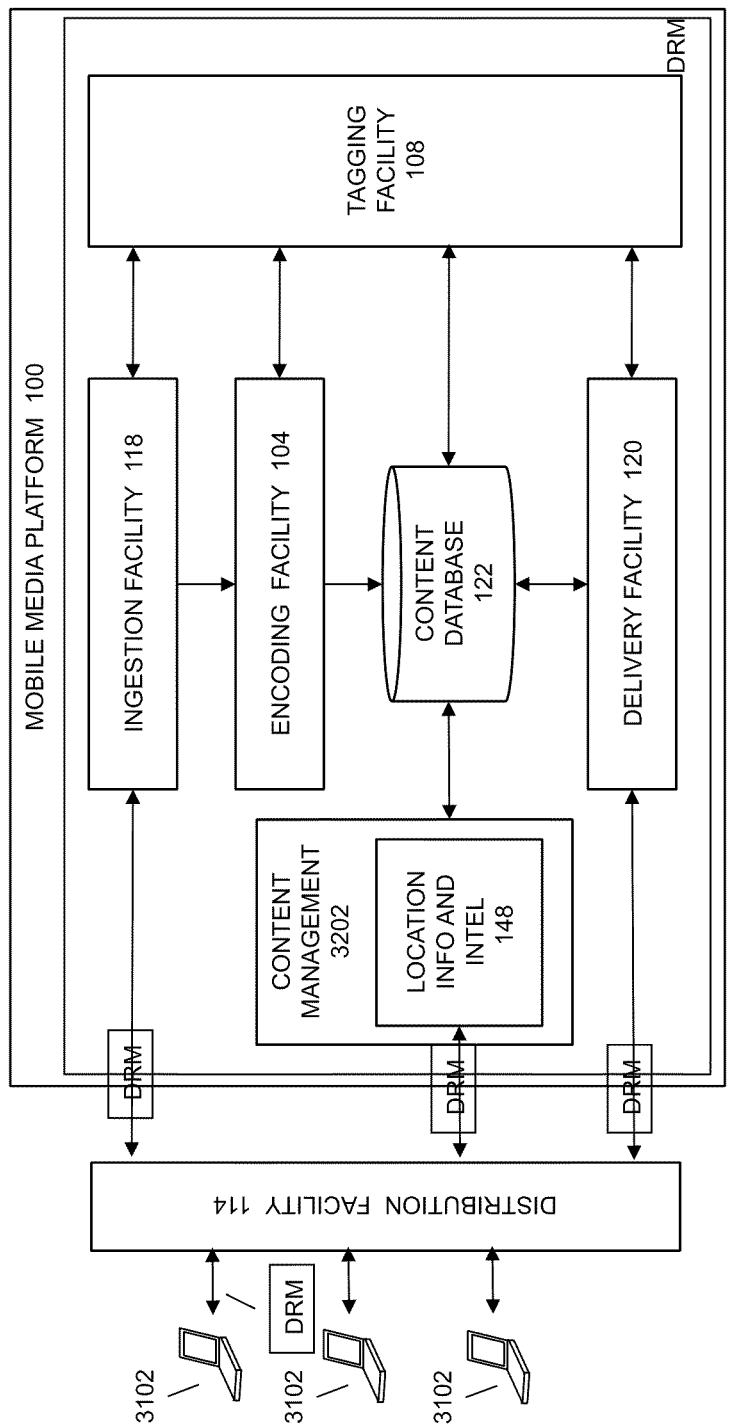
FIG. 35 depicts automated tagging with location information and intelligence.

Automated content tagging 108 may be associated with location information and location intelligence, such as relating to the location of a mobile device 3102, determined or provided by the mobile device, using a GPS, for locating a device on a network, by examining transactions and selections made using the device, updating location information, identifying business locations near the user, in conjunction with user content, combined with time of day, and the like. FIG. 35 depicts one embodiment of a block diagram showing the tagging of location information and location intelligence in association with the mobile media platform 100, where location information and location intelligence 148 is an integral part of the content management of the mobile media platform 100, and relates to the end user mobile communication facilities 3102 through the distribution facility 182. As depicted in FIG. 35, the tagging may affect and be affected by digital rights management, including the systems and methods described herein. In embodiments, digital rights management may be applied to tagging, ingestion, delivery, location information and intel, content management and distribution. A mobile media platform may facilitate an association of automated content tagging 108 with location information and location intelligence. A combination of automated content tagging 108 with location information and location intelligence may facilitate content discovery, ingestion 118, encoding 104, hosting, delivery 104, mediation, settlement, and user acceptance of mobile content facilitated by the mobile media platform.

For example, and in embodiments, a user of a mobile device 3102 may shoot a video with the device 3102, and upload it to the mobile media platform 100 to be made available. The GPS in the mobile device 3102 may then supply location information along with the video, and as such, the video may become tagged 108 with location information. Subsequently, a second user in the same vicinity, who wants to download any recent local videos shot by individuals with their mobile devices 3102 may now be able to find this new video based on the location tag 108, and download it. In embodiments, groups of local individual in the same local could share videos in near real-time, without actually meeting or knowing one another, say while a sporting event.

Automated content tagging 108 may be associated with personalization of user experience, such as personal entertainment, an interactive programming guide, recommendations from communities, serving content regularly watched by the user, and the like. Tags may also be used during discovery to restrict content, by location, based on user preferences such as parental control. A mobile media platform may facilitate an association of automated content tagging 108 with personalization of user experience. A combination of automated content tagging 108 with personalization of user experience may facilitate content discovery, ingestion 118, encoding 104, hosting, delivery 104, mediation, settlement, and user acceptance of mobile content facilitated by the mobile media platform.

Automated content tagging 108 may be associated with social networking, such as user content referring, user content rating, forums, gifting, buddy list management, peer-to-peer management, communities of interest, profile pages, points, message boards, newsletters, shops, homepage changes, advertising, notifications, sharing content on mobile devices, and the like. A mobile media platform may facilitate an association of automated content tagging 108 with social networking. A combination of automated content tagging 108 with social networking may facilitate content discovery, ingestion 118, encoding 104, hosting, delivery 104, mediation, settlement, and user acceptance of mobile content facilitated by the mobile media platform.

Automated content tagging 108 may be associated with e-commerce and e-billing, such as billing, pricing, event tracking, bundling, tiered services, purchasing individual items, previewing, demos, discounts, delivery and monetization of multimedia advertising messages, and the like. A mobile media platform may facilitate an association of automated content tagging 108 with e-commerce and e-billing. A combination of automated content tagging 108 with e-commerce and e-billing may facilitate content discovery, ingestion 118, encoding 104, hosting, delivery 104, mediation, settlement, and user acceptance of mobile content facilitated by the mobile media platform.

Automated content tagging 108 may be associated with rights management, such as digital rights management, providing administration rights in a digital environment, allowing the rights holders to be compensated for the use of their intellectual property, adapting to specific implementation of digital rights management with the carrier, and the like. A mobile media platform may facilitate an association of automated content tagging 108 with rights management. A combination of automated content tagging 108 with rights management may facilitate content discovery, ingestion 118, encoding 104, hosting, delivery 104, mediation, settlement, and user acceptance of mobile content facilitated by the mobile media platform.

Automated content tagging 108 may be associated with reporting, such as with a transaction log, an event log, reports used to compute royalties, reports used for recommendations, generating and access reports from a web interface, and the like. A mobile media platform may facilitate an association of automated content tagging 108 with reporting. A combination of automated content tagging 108 with reporting may facilitate content discovery, ingestion 118, encoding 104, hosting, delivery 104, mediation, settlement, and user acceptance of mobile content facilitated by the mobile media platform.

Automated content tagging 108 may be associated with administration, including an administration user interface, managing users, managing accounts, managing preferences, client side management, storefront, user profiles, user registry, carrier profiles, user interface, administrative interface for content management, and the like. A mobile media platform may facilitate an association of automated content tagging 108 with administration. A combination of automated content tagging 108 with administration may facilitate content discovery, ingestion 118, encoding 104, hosting, delivery 104, mediation, settlement, and user acceptance of mobile content facilitated by the mobile media platform.

Figure 36:
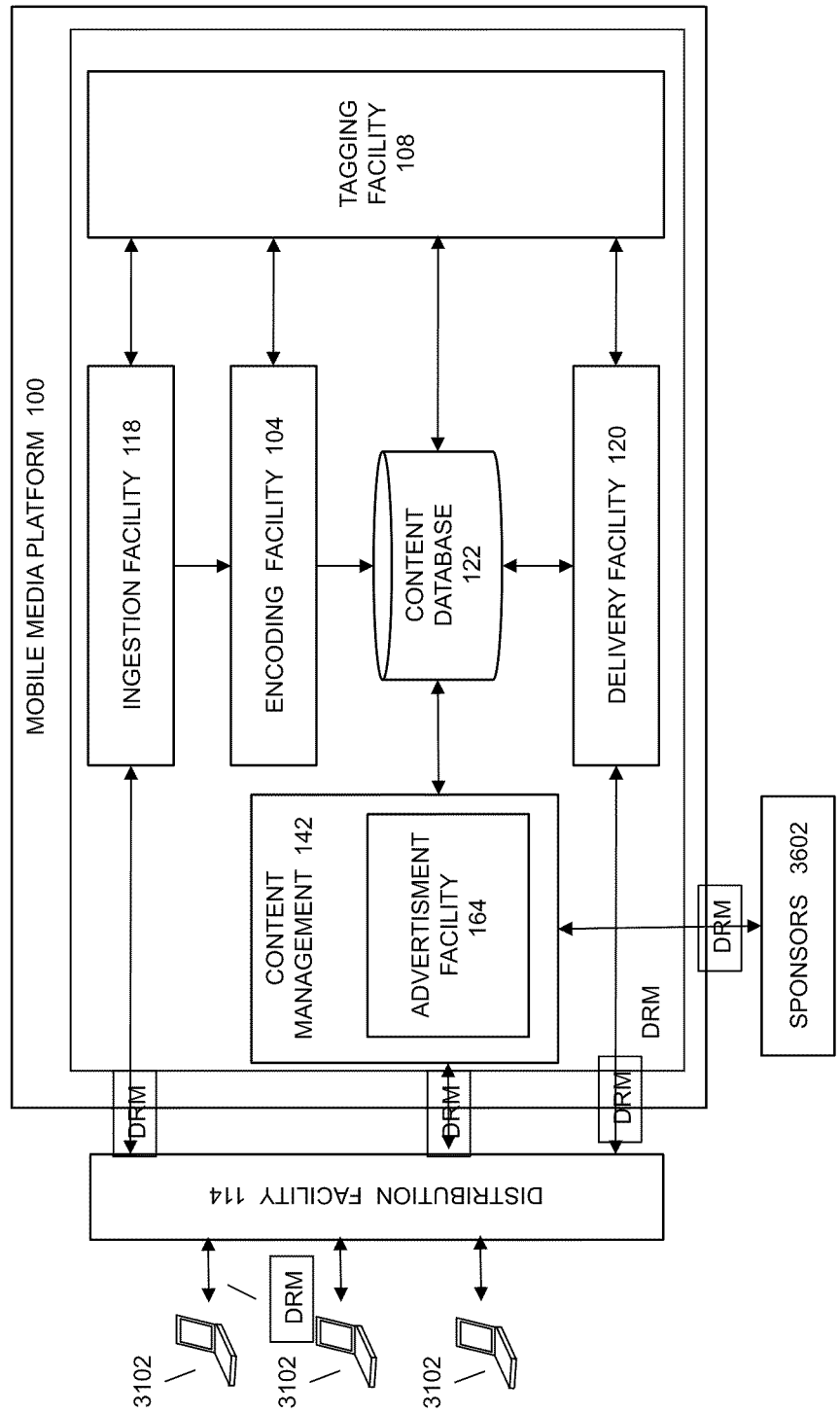
FIG. 36 depicts automated tagging with advertising.

Automated content tagging 108 may be associated with advertising, marketing, advertisement management, and ad fulfillment engine, such as content that may be advertisements/marketing materials, advertisements inserted into other content, advertisements associated with one or more related or companion advertisements, an advertisement associated with one or more prohibited advertisements, advertisements that are automatically triggered, advertisements ingested similar to other content, advertising management, targeted advertising, ad fulfillment of objectives via an ad fulfillment engine, and the like. FIG. 36 depicts one embodiment of a block diagram showing the tagging of advertisement, marketing, advertisement management, and ad fulfillment engine in association with the mobile media platform 100, where the advertisement facility 164 is an integral part of the content management of the mobile media platform 100, and relates to the end user mobile communication facilities 3102 through the distribution facility 182, and to sponsors 3602 external to the mobile media platform 100. As depicted in FIG. 36, the tagging may affect and be affected by digital rights management, including the systems and methods described herein. In embodiments, digital rights management may be applied to tagging, ingestion, delivery, advertisements, content management, sponsors and distribution. A mobile media platform may facilitate an association of automated content tagging 108 with advertisement, marketing, advertisement management, and ad fulfillment engine. A combination of automated content tagging 108 with advertisement, marketing, advertisement management, and ad fulfillment engine may facilitate content discovery, ingestion 118, encoding 104, hosting, delivery 104, mediation, settlement, and user acceptance of mobile content facilitated by the mobile media platform.

For example, and in embodiments, a sponsor 3602 of sports apparel may want to associate the recent popular downloads associated with last weekend's NFL football games. The sponsor 3602 may search for tags 108 associated with football from last weekend, and add their own tag 108 that associates their advertisement with the football content. In addition, the content management facility 3202 may continue to tag 108 football content upon ingestion 118 from last weekend to the sponsor's 3602 advertisement, based on some prearrangement between the sponsors 3602 and the content management facility 3202.

Automated content tagging 108 may be associated with security, such as authentication, authorization, passwords, purchase verification, access control, biometric identification on the mobile device, encryption, access security, security directed at protecting the content, transfers of content, and the like. A mobile media platform may facilitate an association of automated content tagging 108 with security. A combination of automated content tagging 108 with security may facilitate content discovery, ingestion 118, encoding 104, hosting, delivery 104, mediation, settlement, and user acceptance of mobile content facilitated by the mobile media platform.

Automated content tagging 108 may be associated with billing, such as usage collection, pricing, operator billing, off-portal billing, loyalty programs, loyalty programs, integration with operator billing systems, integration with third party payment processors, carrier BSS and/or OSS, use of percentage of billing event methodology, data charge based on the amount of bandwidth consumed by delivery, and the like. A mobile media platform may facilitate an association of automated content tagging 108 with billing. A combination of automated content tagging 108 with billing may facilitate content discovery, ingestion 118, encoding 104, hosting, delivery 104, mediation, settlement, and user acceptance of mobile content facilitated by the mobile media platform.

Automated content tagging 108 may be associated with integration with other systems, such a carrier systems, content provider systems, systems of mobile devices, ad servers, Internet-based systems, web-based systems, billing systems, content delivery systems, ingestion 118 and transcoding systems, storage systems, social networking systems, hosting systems, ingestion 118 systems, security systems, search engines, mobile search engines and the like. Methods of integration may include hard coding, loose coupling, over a network, using application programming interfaces, using interfaces and the like. A mobile media platform may facilitate an association of automated content tagging 108 with integration with other systems. A combination of automated content tagging 108 with integration with other systems may facilitate content discovery, ingestion 118, encoding 104, hosting, delivery 104, mediation, settlement, and user acceptance of mobile content facilitated by the mobile media platform.

Automated content tagging 108 may be associated with architecture of the platform, such as an application layer, a business module layer, a component layer, a system layer, a thin client or rich client layer, a device registry, and the like. A mobile media platform may facilitate an association of automated content tagging 108 with architecture of the platform. A combination of automated content tagging 108 with architecture of the platform may facilitate content discovery, ingestion 118, encoding 104, hosting, delivery 104, mediation, settlement, and user acceptance of mobile content facilitated by the mobile media platform.

Automated content tagging 108 may be associated with purchasing, shopping, and store front applications, such as facility to market content to consumers via a number of channels, including interactive WAP, web, and mobile rich client applications, as well as SMS short code, mobile bar code campaigns, enabling customers to discover content, provide a means for content providers to highlight and display the valuable content the user via product placement in the user interface, most popular feature rotations, grouping of associated content into themes, purchasing platform, home shopping network, and the like. A mobile media platform may facilitate an association of automated content tagging 108 with purchasing, shopping, and store front applications. A combination of automated content tagging 108 with purchasing, shopping, and store front applications may facilitate content discovery, ingestion 118, encoding 104, hosting, delivery 104, mediation, settlement, and user acceptance of mobile content facilitated by the mobile media platform.

Automated content tagging 108 may be associated with distribution and channel applications, such as portals, content portals, distribution channels, digital distribution, retail channels, wholesale channels, and the like. A mobile media platform may facilitate an association of automated content tagging 108 with distribution and channel applications. A combination of automated content tagging 108 with distribution and channel applications may facilitate content discovery, ingestion 118, encoding 104, hosting, delivery 104, mediation, settlement, and user acceptance of mobile content facilitated by the mobile media platform.

Automated content tagging 108 may be associated with games, such as including, enabling games, facilitating games; creation of gaming portals, games over a network, single player games, multiplayer games, virtual world environments, the ability to have tournaments and share scores, and the like A mobile media platform may facilitate an association of automated content tagging 108 with games. A combination of automated content tagging 108 with games may facilitate content discovery, ingestion 118, encoding 104, hosting, delivery 104, mediation, settlement, and user acceptance of mobile content facilitated by the mobile media platform.

Automated content tagging 108 may be associated with users of the platform, such as end users, consumers, advertisers, marketers, content providers, content owners, networks, broadcasters, media companies, mobile carriers, record companies, movie studios, regulators, mobile device designers, mobile device manufacturers, mobile device offerors, mobile service consolidators, affiliates, and the like. A mobile media platform may facilitate an association of automated content tagging 108 with users of the platform. A combination of automated content tagging 108 with users of the platform may facilitate content discovery, ingestion 118, encoding 104, hosting, delivery 104, mediation, settlement, and user acceptance of mobile content facilitated by the mobile media platform. Tags may also be used during discovery to restrict content, by location, based on user preferences such as parental control.

Automated content tagging 108 may be associated with business models on the platform, such as shared risk models, shared reward models, short code and bar code campaigns, white label/private label, payment and pricing models, distribution, ad-supported models, revenue share management, and the like. A mobile media platform may facilitate an association of automated content tagging 108 with business models on the platform. A combination of automated content tagging 108 with business models on the platform may facilitate content discovery, ingestion 118, encoding 104, hosting, delivery 104, mediation, settlement, and user acceptance of mobile content facilitated by the mobile media platform.

Referring to FIG. 37, in an embodiment, a pause and resume 114 functionality may be associated with Web content 130, such as content 130 originating on the World Wide Web or the Internet. Any of the types, sources and examples of content 128 discussed herein may be web content 130. For example and without limitation, a user viewing streaming amateur video on their mobile device 3714 may pause playback with a pause functionality in order to begin live streaming of a television show. When the television show concludes or at any point during its progress, the user may choose to resume playback of the streaming video using a resume functionality. In another example, a user using a mobile device 3714 may set a preference that all content 128 should be automatically paused when a call comes into the mobile device 3714. For example and without limitation, if a user is playing an online game, when a call is received, the online game may automatically pause. Content 128 may be automatically resumed if the user ignores the phone call, such as by depressing an ignore key, or may resume upon user request. In another example, a user may pause video playback from a WAP site by closing the device clamshell or automatically detecting an incoming phone call or other intervention.

In an embodiment, a pause and resume 114 functionality of a mobile media platform 100 may be associated with hosting. For example, hosting may involve making paused content 128 available or receiving paused content 128 over a network. In an embodiment, hosting may involve making paused content 128 available to or receiving paused content 128 from a mobile device 3714. In another example, content that may be paused indefinitely may be hosted by a mobile media platform 100 as opposed to the content source.

In an embodiment, a pause and resume 114 functionality of a mobile media platform 100 may be associated with delivery of content and paused content to a mobile device 3714, as described herein. In an embodiment, the pause and resume 114 functionality may be delivery mechanism agnostic. That is, controlling content via a pause and resume 114 functionality may be similar if content is delivered via download, streaming, or any of the delivery mechanisms described herein. In an embodiment, the pause and resume 114 functionality may enable combining the delivery of content 128 from different sources or via different means. For example, a user watching a mobile broadcast of a sporting event may be provided a link to view a pre-recorded video clip that covers the highlights of the game to that point. Clicking the link may automatically pause the broadcast and result in the application switching video delivery sources from the mobile broadcast network to the cellular network and causing the highlighted video clip to be streamed on-demand to the user via the cellular network. After viewing the clip, the users could be provided other links to allow them to choose from a list of other content 128 that is available on either the broadcast or cellular networks, or they may choose to resume the previous broadcast.

In an embodiment, a pause and resume 114 functionality of a mobile media platform 100 may be associated with optimization of various processes, capabilities, and features of the mobile media platform 100, such as ingestion, encoding, hosting, delivery, and the like. For example, optimization may be enacted for generating ideal pause points for advertising insertions, such as by aggregating most frequently paused points for all users.

In an embodiment, a pause and resume 114 functionality of a mobile media platform 100 may be associated with packaging content 128 including repackaging ingested content 128.

In an embodiment, a pause and resume 114 functionality of a mobile media platform 100 may be associated with storage and at least one storage facility. For example, the pause and resume 114 functionality may be used to control content that is in storage.

Figure 73:
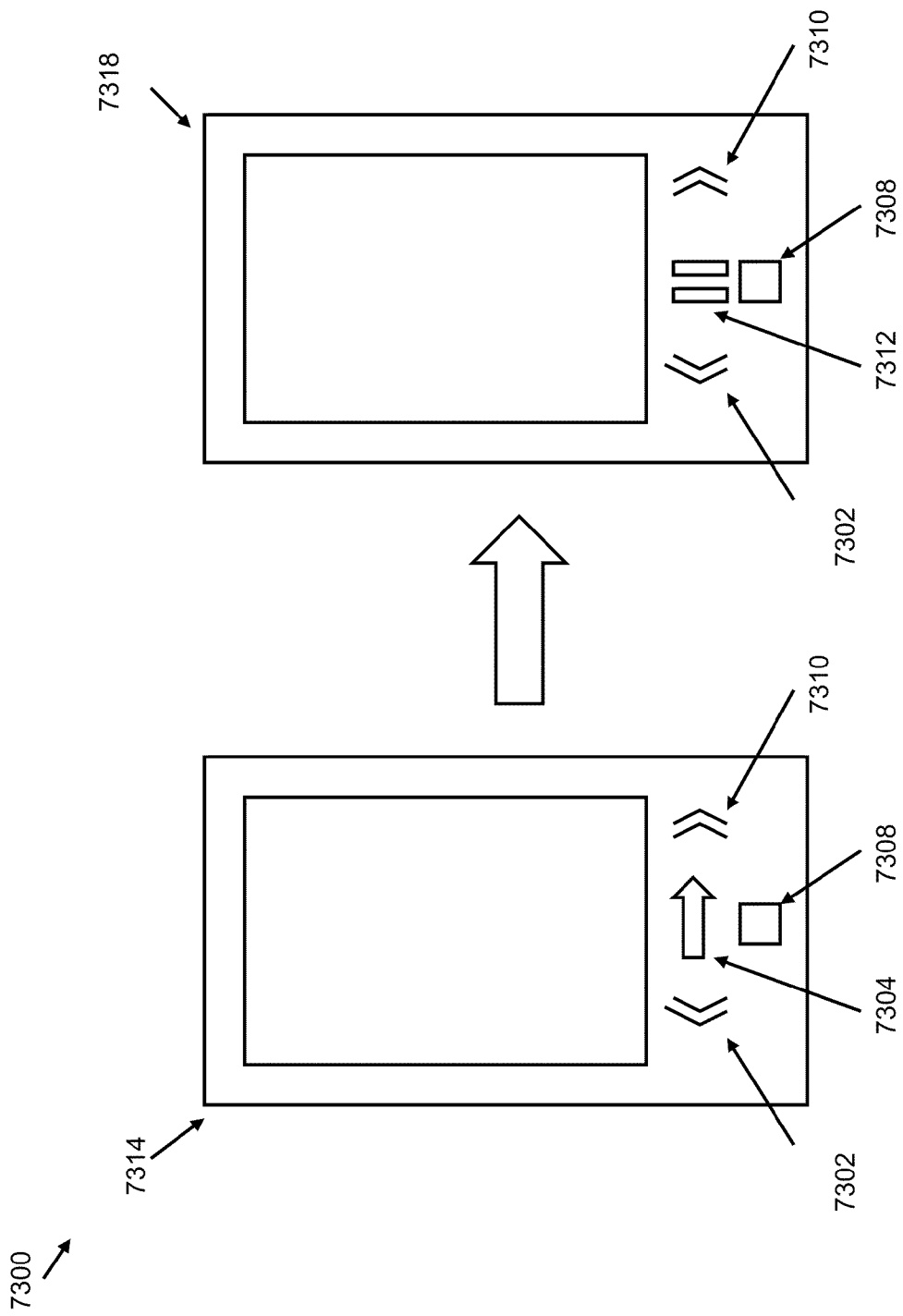
FIG. 73 depicts a user interface for pause and resume.

In an embodiment, a pause and resume 114 functionality of a mobile media platform 100 may be associated with a user interface 140 for enabling interactivity, viewing thumbnails, facilitating game day tracking, enabling rich new reader features, managing end user presentation, and the like. For example, the user interface 140 may be used to access controls associated with the pause and resume 114 functionality. Referring now to FIG. 73, a user interface of a mobile device may be useful for presenting pause and resume controls. For example, device 7314 may have a set of keys that become active when a user requests playback such as on a touchscreen of the device 3714 or where an assigned key becomes activated for a particular function. In the example, playback controls include at least one of play 7304, stop 7308, rewind 7302, fast forward 7310, and the like. In an embodiment, the pause functionality, such as shown in 7312 of device 7318, may not be active until play has been initiated or may always be present. In an embodiment, a pause and resume 114 functionality may be associated with a reporting user interface, a content management user interface, an administration user interface, an ingestion management user interface, and the like.

In an embodiment, a pause and resume 114 functionality of a mobile media platform 100 may be associated with notification and delivery of messages to mobile device 3714 users. For example, if an urgent notification or message is sent to the device, any content being played on the device may automatically pause to view the notification or message. The user may choose to resume playback after having viewed the notification or message. In an embodiment, a user may manually pause content to check for or view notifications and messages.

In an embodiment, a pause and resume 114 functionality of a mobile media platform 100 may be associated with content discovery 144. For example and without limitation, during playback of a foreign movie, a user may wish to find related content or may need to access a source to help in interpreting the movie. The user may pause the movie and access content discovery 144 tools. Once the user is ready to resume the movie, they may use a resume functionality. In another example, a user may pause current playback when a content discovery 144 feed notifies the user of new content. Once the user consults the feed, they may choose to resume the playback or take another action, such as select new content from the feed.

In an embodiment, a pause and resume 114 functionality of a mobile media platform 100 may be associated with a personalized user experience. The pause and resume 114 functionality may enable a mobile device 3714 to navigate a personal entertainment portal to a personal entertainment server or vice-versa.

In an embodiment, a pause and resume 114 functionality of a mobile media platform 100 may be associated with social networking or community aspects. For example, a user may pause content to refer content, rate content, gift content, receive friends' ratings, visit a forum associated with the content, to receive a message from a friend, share the content with a peer, and the like.

In an embodiment, a pause and resume 114 functionality of a mobile media platform 100 may be associated with e-commerce such as billing, pricing, event tracking, bundling, tiered services, content 128 purchase (e.g. individual pieces, collections, subscriptions), discounts, free services and content 128, multimedia advertising delivery and monetization. For example, content may be automatically paused in order to engage a user in e-commerce, such as to pay for the remaining duration of content.

In an embodiment, a pause and resume 114 functionality of a mobile media platform 100 may be associated with digital rights management. For example, certain functionalities may be disabled due to digital rights management, such as pause, resume, or both.

In an embodiment, a pause and resume 114 functionality of a mobile media platform 100 may be associated with reporting facilities, such as transaction logs, event logs, digital rights and virtual property use and consumption royalties and recommendation reporting. For example, an event log may record content played, the number of times it was played, the number of pauses, the actual time the content was accessed based on playback time and paused time, and the like. Reports may be generated and/or accessed through a web interface.

In an embodiment, a pause and resume 114 functionality of a mobile media platform 100 may be associated with mobile media platform 100 related administration. For example, an administration user interface may be used to set preferences for a pause and resume 114 functionality. In a certain embodiment, the pause and resume 114 functionality may be associated with a user interface 140 for ingestion management, including administrative aspects of ingestion management. For example, the user interface 140 may allow a user to pause ingestion.

In an embodiment, a pause and resume 114 functionality of a mobile media platform 100 may be associated with advertising content. Content 128 may be advertisements, marketing materials and the like. The content 128 may be an interstitial advertisement, banner ad, in stream ad, ad placed in the content 128 itself, ad framing the content 128, an ad appearing before or after the content 128 and the like. A pause and resume 114 functionality may facilitate ad insertion at any point during the content without having to make the advertisement part of the content itself.

In an embodiment, a pause and resume 114 functionality of a mobile media platform 100 may be associated with a security facility and security functionality, which may include authentication, authorization, passwords, purchase verification, access control, biometric identification, encryption and the like. For example, to resume playback of content, a user may be required provide authorization.

In an embodiment, a pause and resume 114 functionality of a mobile media platform 100 may be associated with a variety of billing systems. For example, billing may be based on the amount of bandwidth consumed by the delivery of a piece or collection of content 128, which may be less than 100% if content was paused and never resumed.

In an embodiment, a pause and resume 114 functionality of a mobile media platform 100 may be associated or integrated with other systems by various methods of integration. Other systems may include carrier systems, content provider 3724 systems, systems of mobile devices 3714, ad servers, Internet-based systems, web-based systems, billing systems, content 128 delivery systems, encoding and transcoding systems, storage systems, social networking systems, hosting systems, ingestion systems, security systems, search engines, mobile search engines and the like. Methods of integration may include hard coding, loose coupling, over a network, using application programming interfaces, using interfaces and the like.

In an embodiment, a pause and resume 114 functionality may be associated with general architecture aspects of the mobile media platform 100 which are disclosed through this specification and may include, without limitation, any of the following: application layer (J2ME, BREW, WAP, HTML, etc), a business module including a content 128 facility layer for fulfillment and hosting, a commerce facility layer for merchandising and billing, a culture facility layer for communities and personalization, a component layer with modules and/or facilities that include search interface, digital rights management, loyalty programs, partner management, a registry of the parties involved in the creation and delivery of content 128, and the revenue sharing relationship between the parties. For example, the pause and resume functionality may be deployed by any layer or element of the general architecture to enable pause and resume of content in association with any element of the general architecture.

In an embodiment, a pause and resume 114 functionality may be associated with a store front application of the mobile media platform 100 which may include a facility to market content 128 to consumers via a number of channels, including interactive WAP, web, and mobile rich client applications, as well as SMS short code, and mobile bar code campaigns. For example, a user may pause content playback to access the store front application to discover content 128.

In an embodiment, a pause and resume 114 functionality of a mobile media platform 100 may be associated with its role as a portal, content 128 portal or the like.

In an embodiment, a pause and resume 114 functionality of a mobile media platform 100 may be associated with games, such as mobile games. For example, a user playing a game on a mobile device 3714 may be able to pause and the resume game play.

In an embodiment, a pause and resume 114 functionality of a mobile media platform 100 may be associated with a wide variety of users who may interact with, benefit from, or otherwise have a relationship to the mobile media platform 100 or to the pause and resume 114 functionality aspect of the mobile media platform 100. Representative users may include end users; consumers, advertisers, marketers, content provider 3724s, content 128 owners, networks, broadcasters, media companies, mobile carriers, record companies, movie studios, regulators, mobile device 3714 designers, mobile device 3714 manufacturers, mobile device 3714 offerors, mobile service consolidators and affiliates, and the like. In an embodiment, any user may have access to, control, set preferences for, deactivate, or activate pause and resume functionality associated with any content.

In an embodiment, a pause and resume 114 functionality of a mobile media platform 100 may be associated with various business models.

Continuing to refer to FIGS. 40 and 41, in an embodiment, mediation and settlement 112 may be associated with various types of content 128 that may be sourced from a variety of sources. Types of content 128 may include audio, video, text, images, photos, applications, games, data, ring tones, wall paper, fonts, hyperlinks, tables, tabular formatted text, user generated content 128, media, content 128 primitives, composite content 128, marketing type content 128, and the like, and new content 128 types that may continue to be invented and adapted over time that the mobile media platform 100 may extend to cover. The media data record 4092 may normalize data associated with any content type.

In an embodiment, mediation and settlement 112 may be associated with web content 128, such as content 128 originating on the World Wide Web or the Internet. The media data record 4092 may normalize data associated with any web content.

In an embodiment, mediation and settlement 112 may be associated with a content ingestion 118 functionality and capability that may be associated with a consumption profile, content 128 management, and the like. Mediation and settlement 112 may cull data from content ingestion 118 to include in a media data record 4092.

In an embodiment, mediation and settlement 112 may be associated with a hosting 132 capability of a mobile media platform 100. For example, hosting may involve making content 128 available or receiving content 128. The act of making content 128 available may automatically initiate a media data record 4092 capture and tracking of the content to facilitate eventual mediation and settlement 112.

In an embodiment, mediation and settlement 112 may be associated with content delivery 120 to mobile devices 4014. Content 128 that is delivered may be personalized using similar genres, teams, communities of interest, and other content 128 based mechanisms, and such personalization may be tracked as potential revenue allocation items. Monitoring the method of content delivery 120 may also be associated with mediation and settlement 112 as certain methods of delivery may generate more revenue than others. The media data record 4092 may capture information such as whether content delivery 120 includes delivery of content 128 from different sources or via different means.

In an embodiment, mediation and settlement 112 may be associated with optimization 134 associated with various processes, capabilities, and features of the mobile media platform 100. Optimization 134 may be enacted for ingestion 118, encoding, transcoding, hosting, delivery, and the like. Optimization 134 may facilitate the capture of information for the media data record 4092. For example, as an optimization 134 is made to the delivery of content, the media data record 4092 may be triggered to track and record the media data event.

In an embodiment, mediation and settlement 112 may be associated with packaging content 128 including repackaging ingested content 128. The media data record 4092 may keep track of the parameters of the packaged or repackaged content.

In an embodiment, mediation and settlement 112 may be associated with storage 122 and at least one storage facility. In an embodiment, storage 122 may be a media data event that may be tracked on the media data record 4092.

In an embodiment, mediation and settlement 112 may be associated with a user interface 140 for enabling interactivity, viewing thumbnails, facilitating game day tracking, enabling rich new reader features, managing end user presentation, and the like. The user interface 140 may also be used to access and update a media data record 4092 and participate in mediation and settlement 112. For example and without limitation, when a user interface 140 may be used to activate a UI widget, tracking may commence in the media data record 4092. In an embodiment, the user interface 140 may be used to administer mediation and settlement 4092 and the parameters associated with generating the media data record 4092.

In an embodiment, mediation and settlement 112 may be associated with notification and delivery of messages 142 to mobile device 4014 users. The mobile media platform 100 may support user directed management of notifications 142 so that the user may determine how and when notifications, alerts, and messages 142 are delivered. A notification, alert, or message 142 may be related to mediation and settlement 112, such as to inform a user that certain activities may be tracked for the purposes of content distribution revenue allocation.

In an embodiment, mediation and settlement 112 may be associated with content discovery 144. For example, content discovery 144 may be enabled by a paid search or third party content database. Such paid search or database mining activity may be captured by a media data record 4092 for mediation and settlement 112.

In an embodiment, mediation and settlement 112 of a mobile media platform 100 may be associated with information relating to the location 148 of a mobile device 4014 or user and/or intelligence derived in whole or in part from such location information 148. For example, a media data record 4092 may include a record of content 4020 a user may access based on a location.

In an embodiment, mediation and settlement 112 of a mobile media platform 100 may be associated with a personalized user experience 152. In embodiments the platform may leverage recommendations from the communities to which the user belongs and use the information to present relevant content 128. A media data record 4092 may track such recommendations and content 128 views associated with such requests.

In an embodiment, mediation and settlement 112 may be associated with social networking 150 or community aspects. Social networking 150 aspects may include user content 128 referral, user content 128 rating, forums, gifting, buddy list management, peer-to-peer management, communities of interest, profile pages, dMail, points, message boards, newsletters, shopping, dynamic home page construction, advertising, notifications, and the like. For example, a media data record 4092 may track content 128 distributed amongst a group of peers or posted on a social networking homepage for mediation and settlement 112.

In an embodiment, mediation and settlement 112 may be associated with carrier 4082 management. Mediation and settlement 112 may be associated with ecommerce 154 such as billing, pricing, event tracking, bundling, tiered services, content 128 purchase (e.g. individual pieces, collections, subscriptions), discounts, free services and content 128, multimedia advertising delivery and monetization. In an embodiment, a subscription may be to certain content 128 and certain additional content 128 is identified as premium content 128 outside the subscription plan and the user has to pay extra to access this content 128. A media data record 4092 may track such access to content 128 and associate it with a subscription or being outside of a subscription plan.

In an embodiment, mediation and settlement 112 may be associated with digital rights management 158. A media data record 4092 may allow rights holders to track and receive compensation for use of their content 128 and other intellectual property. The mobile media platform 100 may adapt the implementation of digital rights management 158 to different carriers 4082.

In an embodiment, mediation and settlement 112 may also provide reporting 124 facilities, such as transaction logs, event logs, digital rights and virtual property use and consumption royalties and recommendation reporting 124. Reports may be generated and/or accessed through a web interface based on information contained in a media data record 4092.

In an embodiment, mediation and settlement 112 may be associated with mobile media platform 100 related administration 162. An administration user interface 162 may be accessed to set preferences for capture of data in a media data record 4092, to view data captured in a media data record 4092, to reconcile data captured in a media data record 4092, and the like.

In an embodiment, mediation and settlement 112 may be associated with advertisements 164, marketing materials and the like. Advertising content may be tracked in a media data record 4092 to determine an appropriate share of revenue due or payment required from an advertiser. In an embodiment, the media data record 4092 may record click throughs, or whether a user interacted with an advertisement or eventually purchased an item or service advertised. In an embodiment, the media data record 4092 may be associated with an ad fulfillment engine to enable generation of reports regarding the delivery and consumption of advertisements 164 and other content 128. The ad fulfillment engine may interface with, assist or be assisted by the settlement and mediation processes of the mobile media platform 100.

In an embodiment, mediation and settlement 112 may be associated with a security facility 168 and security functionality, which may include authentication, authorization, passwords, purchase verification, access control, biometric identification, encryption and the like. Security 168 may be directed at securing access to the platform and may also be directed at protecting the content 128 and information of the platform, such as during data transfers. Mediation and settlement 112 may account for various security measures, for example, where the platform 100 operator charges a larger fee for more rigorous security measures. A media data record 4092 may contain data on a security aspect of accessed content 128.

In an embodiment, mediation and settlement 112 may be associated with a variety of billing systems 170. Usage collection may provide a mechanism to collect relevant information related to the consumption of content 128 and store it in a central location for billing 170 and reporting purposes. A media data record 4092 may contain such usage information to facilitate billing 170 and reporting.

In an embodiment, mediation and settlement 112 may be integrated with other systems by various methods of integration 172. Other systems may include carrier 4082 systems, content provider systems, systems of mobile devices 4014, ad servers, Internet-based systems, web-based systems, billing systems, content delivery 120 systems, encoding and transcoding systems, storage 122 systems, social networking systems, hosting systems, ingestion systems, security systems, search engines, mobile search engines and the like. Methods of integration 172 may include hard coding, loose coupling, over a network, using application programming interfaces, using interfaces and the like.

In an embodiment, mediation and settlement 112 may be associated with general architecture 174 aspects of the mobile media platform 100 which are disclosed through this specification and may include, without limitation, any of the following: application layer (J2ME, BREW, WAP, HTML, etc), a business module including a content 128 facility layer for fulfillment and hosting, a commerce facility layer for merchandising and billing, a culture facility layer for communities and personalization, a component layer with modules and/or facilities that include search interface, digital rights management, loyalty programs, partner management, a registry of the parties involved in the creation and delivery of content 128, and the revenue sharing relationship between the parties. A media data record 4092 may be useful for determining revenue shares and revenue reconciliation between the various entities, peer-to-peer management, buddy list management, browser interface, streaming service, off-portal billing, customer service representatives, self-care management, content 128 filter management, gifting, encoding, transcoding, download service, operator billing, advertisement manager, notification management, forum/blog/rant, content ingestion 118, device management, pricing, management console, profile management, user content 128 rating, content 128 management, delivery management, usage collection, storefront, user registry, user content 128 referral, and the like.

In an embodiment, mediation and settlement 112 may be associated with a store front application 178 which may include a facility to market content 128 to consumers via a number of channels, including interactive WAP, web, and mobile rich client applications, as well as SMS short code, and mobile bar code campaigns. The store front application 178 may enable consumers to discover content 128, provide a means for content providers to highlight and display the valuable content 128 to the user via product placement in the user interface through 'most popular' feature rotation and content 128 grouping based on themes and providing interactive cues (e.g. "more like this"). Usage of the store front application may be tracked in a media data record 4092.

In an embodiment, mediation and settlement 112 may be associated with the mobile media platform's 100 role as a portal 182, content portal or the like. The platform may include or function as a distribution channel, such as a content 128 distribution channel, digital distribution or the like. Mediation and settlement 112 may facilitate reconciling revenue share and costs associated with this role.

In an embodiment, mediation and settlement 112 may be associated with games 180, such as mobile games. A media data record 4092 may track access to games 180 and gaming activities.

In an embodiment, mediation and settlement 112 may be associated with a wide variety of users 184 who may interact with, benefit from, or otherwise have a relationship to the mobile media platform 100 or to aspects of the mobile media platform 100. Representative users may include end users; consumers, advertisers 4084, marketers, content providers, content owners, networks, broadcasters, media companies, mobile carriers 4082, record companies, movie studios, regulators, mobile device designers, mobile device manufacturers, mobile device offerors, mobile service consolidators and affiliates, and the like.

In an embodiment, mediation and settlement 112 may be associated with various business models 160. Business models 160 may include models for operating the mobile media platform 100, providing services associated with the platform, establishing business relationships with partners, capitalizing on market opportunities, protecting and promoting platform related intellectual property, internationalization, and the like. Mediation and settlement 112 may enable various business models 160 by establishing revenue sharing management and cost sharing management.

Content types, sources and parameters may be combined with social networking that may include content referral, rating, gifting, forums, profiles, and lists and may also be associated with a mobile media platform. This combination may be further combined with a consumption profile which may include a device profile, a user profile, a network profile, an encoding profile, and the like. The combination of content types with social networking as herein described may further be combined with one or more of unicast/multicast/broadcast seamless switching, advanced encoding and/or transcoding, automated content tagging, content pause and resume, and mediation and settlement.

Web content may be combined with optimization of ingestion, encoding, transcoding, hosting, and/or delivery that may be associated with a mobile media platform. This combination may be further combined with a consumption profile which may include a device profile, a user profile, a network profile, an encoding profile, and the like. The combination of web content with optimization as herein described may further be combined with one or more of unicast/multicast/broadcast seamless switching, advanced encoding and/or transcoding, automated content tagging, content pause and resume, and mediation and settlement.

Web content may be combined with location information and intelligence that may be associated with a mobile media platform. This combination may be further combined with a consumption profile which may include a device profile, a user profile, a network profile, an encoding profile, and the like. The combination of Web content with location information and intelligence as herein described may further be combined with one or more of unicast/multicast/broadcast seamless switching, advanced encoding and/or transcoding, automated content tagging, content pause and resume, and mediation and settlement.

Ingestion may be combined with optimization of ingestion, encoding, transcoding, hosting, and/or delivery that may be associated with a mobile media platform. This combination may be further combined with a consumption profile which may include a device profile, a user profile, a network profile, an encoding profile, and the like. The combination of ingestion with optimization as herein described may further be combined with one or more of unicast/multicast/broadcast seamless switching, advanced encoding and/or transcoding, automated content tagging, content pause and resume, and mediation and settlement.

Ingestion may be combined with an architecture of a mobile media platform. This combination may be further combined with a consumption profile which may include a device profile, a user profile, a network profile, an encoding profile, and the like. The combination of ingestion with a mobile media architecture as herein described may further be combined with one or more of unicast/multicast/broadcast seamless switching, advanced encoding and/or transcoding, automated content tagging, content pause and resume, and mediation and settlement.

Ingestion may be combined with business models associated with a mobile media platform. This combination may be further combined with a consumption profile which may include a device profile, a user profile, a network profile, an encoding profile, and the like. The combination of ingestion with business models associated with a mobile media platform as herein described may further be combined with one or more of unicast/multicast/broadcast seamless switching, advanced encoding and/or transcoding, automated content tagging, content pause and resume, and mediation and settlement.

Content delivery may be combined with one or more of advertising, marketing, advertisement management, and an ad fulfillment engine, any of which may be associated with a mobile media platform. This combination may be further combined with a consumption profile which may include a device profile, a user profile, a network profile, an encoding profile, and the like. The combination of content delivery with one or more of advertising, marketing, advertisement management, and an ad fulfillment engine as herein described may further be combined with one or more of unicast/multicast/broadcast seamless switching, advanced encoding and/or transcoding, automated content tagging, content pause and resume, and mediation and settlement.

Optimization of ingestion, encoding, transcoding, hosting and delivery may be combined with social networking that may include content referral, rating, gifting, forums, profiles, and lists, and may also be associated with a mobile media platform. This combination may be further combined with a consumption profile which may include a device profile, a user profile, a network profile, an encoding profile, and the like. The combination of optimization of ingestion, encoding, transcoding, hosting and delivery with social networking, as herein described may further be combined with one or more of unicast/multicast/broadcast seamless switching, advanced encoding and/or transcoding, automated content tagging, content pause and resume, and mediation and settlement.

Optimization of ingestion, encoding, transcoding, hosting and delivery may be combined with one or more of advertising, marketing, advertisement management, and ad fulfillment engine, any of which may be associated with a mobile media platform. This combination may be further combined with a consumption profile which may include a device profile, a user profile, a network profile, an encoding profile, and the like. The combination of optimization of ingestion, encoding, transcoding, hosting and delivery with one or more of advertising; marketing, advertisement management, and ad fulfillment engine, as herein described may further be combined with one or more of unicast/multicast/broadcast seamless switching, advanced encoding and/or transcoding, automated content tagging, content pause and resume, and mediation and settlement.

Optimization of one or more of ingestion, encoding, transcoding, hosting and delivery may be combined with business models on the platform that may be associated with a mobile media platform. This combination may be further combined with a consumption profile which may include a device profile, a user profile, a network profile, an encoding profile, and the like. The combination of optimization of ingestion, encoding, transcoding, hosting and delivery with business models on the platform, as herein described may further be combined with one or more of unicast/multicast/broadcast seamless switching, advanced encoding and/or transcoding, automated content tagging, content pause and resume, and mediation and settlement.

User interface may be combined with one or more of notifications, messages and alerts that may be associated with a mobile media platform. This combination may be further combined with a consumption profile which may include a device profile, a user profile, a network profile, an encoding profile, and the like. The combination of user interface with one or more of notifications, messages, and alerts as herein described may further be combined with one or more of unicast/multicast/broadcast seamless switching, advanced encoding and/or transcoding, automated content tagging, content pause and resume, and mediation and settlement.

User interface may be combined with content discovery that may be associated with a mobile media platform. This combination may be further combined with a consumption profile which may include a device profile, a user profile, a network profile, an encoding profile, and the like. The combination of user interface with content discovery, as herein described may further be combined with one or more of unicast/multicast/broadcast seamless switching, advanced encoding and/or transcoding, automated content tagging, content pause and resume, and mediation and settlement.

User interface may be combined with location information and intelligence that may be associated with a mobile media platform. This combination may be further combined with a consumption profile which may include a device profile, a user profile, a network profile, an encoding profile, and the like. The combination of user interface with location information and intelligence, as herein described may further be combined with one or more of unicast/multicast/broadcast seamless switching, advanced encoding and/or transcoding, automated content tagging, content pause and resume, and mediation and settlement.

User interface may be combined with personalization of user experience, which may include personal entertainment server and interactive programming guide, and may be associated with a mobile media platform. This combination may be further combined with a consumption profile which may include a device profile, a user profile, a network profile, an encoding profile, and the like. The combination of user interface with personalization of user experience, which may include personal entertainment server and interactive programming guide, as herein described may further be combined with one or more of unicast/multicast/broadcast seamless switching, advanced encoding and/or transcoding, automated content tagging, content pause and resume, and mediation and settlement.

User interface may be combined with one or more of advertising, marketing, advertisement management; and ad fulfillment engine, any of which may be associated with a mobile media platform. This combination may be further combined with a consumption profile which may include a device profile, a user profile, a network profile, an encoding profile, and the like. The combination of user interface with one or more of advertising, marketing, advertisement management, and ad fulfillment engine, as herein described may further be combined with one or more of unicast/multicast/broadcast seamless switching, advanced encoding and/or transcoding, automated content tagging, content pause and resume, and mediation and settlement.

User interface may be combined with integration with other systems that may include carrier systems and search engines, and may be associated with a mobile media platform. This combination may be further combined with a consumption profile which may include a device profile, a user profile, a network profile, an encoding profile, and the like. The combination of user interface with integration with other systems that may include carrier systems and search engines, as herein described may further be combined with one or more of unicast/multicast/broadcast seamless switching, advanced encoding and/or transcoding, automated content tagging, content pause and resume, and mediation and settlement.

One or more of notifications, messages, and alerts may be combined with personalization of user experience which may include personal entertainment server and interactive programming guide and may be associated with a mobile media platform. This combination may be further combined with a consumption profile which may include a device profile, a user profile, a network profile, an encoding profile, and the like. The combination of one or more of notifications, messages, and alerts with personalization of user experience, as herein described may further be combined with one or more of unicast/multicast/broadcast seamless switching, advanced encoding and/or transcoding, automated content tagging, content pause and resume, and mediation and settlement.

Content discovery may be combined with rights management that may be associated with a mobile media platform. This combination may be further combined with a consumption profile which may include a device profile, a user profile, a network profile, an encoding profile, and the like. The combination of content discovery with rights management, as herein described may further be combined with one or more of unicast/multicast/broadcast seamless switching, advanced encoding and/or transcoding, automated content tagging, content pause and resume, and mediation and settlement.

One or both of location information and location intelligence may be combined with personalization of user experience which may include personal entertainment server and interactive programming guide, and may be associated with a mobile media platform. This combination may be further combined with a consumption profile which may include a device profile, a user profile, a network profile, an encoding profile, and the like. The combination of one or both of location information and location intelligence with personalization of user experience, as herein described may further be combined with one or more of unicast/multicast/broadcast seamless switching, advanced encoding and/or transcoding, automated content tagging, content pause and resume, and mediation and settlement.

One or both of location information and location intelligence may be combined with social networking that may include content referral, rating, gifting, forums, profiles, and lists and may be associated with a mobile media platform. This combination may be further combined with a consumption profile which may include a device profile, a user profile, a network profile, an encoding profile, and the like. The combination of one or both of location information and location intelligence with social networking, as herein described may further be combined with one or more of unicast/multicast/broadcast seamless switching, advanced encoding and/or transcoding, automated content tagging, content pause and resume, and mediation and settlement.

One or both of location information and location intelligence may be combined with rights management that may be associated with a mobile media platform. This combination may be further combined with a consumption profile which may include a device profile, a user profile, a network profile, an encoding profile, and the like. The combination of one or both of location information and location intelligence with rights management, as herein described may further be combined with one or more of unicast/multicast/broadcast seamless switching, advanced encoding and/or transcoding, automated content tagging, content pause and resume, and mediation and settlement.

One or both of location information and intelligence may be combined with one or more of advertising, marketing, advertisement management, and ad fulfillment engine that may be associated with a mobile media platform. This combination may be further combined with a consumption profile which may include a device profile, a user profile, a network profile, an encoding profile, and the like. The combination of one or both of location information and location intelligence with one or more of advertising, marketing, advertisement management and ad fulfillment engine, as herein described, may further be combined with one or more of unicast/multicast/broadcast seamless switching, advanced encoding and/or transcoding, automated content tagging, content pause and resume, and mediation and settlement.

Personalization of user experience that may include personal entertainment server and interactive programming guide may be combined with one or more of advertising, marketing, advertisement management, ad fulfillment engine and any of which may be associated with a mobile media platform. This combination may be further combined with a consumption profile which may include a device profile, a user profile, a network profile, an encoding profile, and the like. The combination of personalization of user experience with one or more of advertising, marketing, advertisement management, ad fulfillment engine as herein described, may further be combined with one or more of unicast/multicast/broadcast seamless switching, advanced encoding and/or transcoding, automated content tagging, content pause and resume, and mediation and settlement.

Personalization of user experience that may include personal entertainment server and interactive programming guide may be combined with integration with other systems that includes carrier systems and search engines and may be associated with a mobile media platform. This combination may be further combined with a consumption profile which may include a device profile, a user profile, a network profile, an encoding profile, and the like. The combination of personalization of user experience with integration with other systems that may include carrier system and search engines as herein described, may further be combined with one or more of unicast/multicast/broadcast seamless switching, advanced encoding and/or transcoding, automated content tagging, content pause and resume, and mediation and settlement.

Personalization of user experience that may include personal entertainment server and interactive programming guide may be combined with architecture of the platform that may be associated with a mobile media platform. This combination may be further combined with a consumption profile which may include a device profile, a user profile, a network profile, an encoding profile, and the like. The combination of personalization of user experience that may include personal entertainment server and interactive programming guide with architecture of the platform as herein described may further be combined with one or more of unicast/multicast/broadcast seamless switching, advanced encoding and/or transcoding, automated content tagging, content pause and resume, and mediation and settlement.

Personalization of user experience that may include personal entertainment server and interactive programming guide may be combined with distribution or channel applications that may be associated with a mobile media platform. This combination may be further combined with a consumption profile which may include a device profile, a user profile, a network profile, an encoding profile, and the like. The combination of personalization of user experience that may include personal entertainment server and interactive programming guide with distribution or channel applications as herein described, may further be combined with one or more of unicast/multicast/broadcast seamless switching, advanced encoding and/or transcoding, automated content tagging, content pause and resume, and mediation and settlement.

Personalization of user experience that may include personal entertainment server and interactive programming guide may be combined with users of the platform that may be associated with a mobile media platform. This combination may be further combined with a consumption profile which may include a device profile, a user profile, a network profile, an encoding profile, and the like. The combination of personalization of user experience that may include personal entertainment server and interactive programming guide with users of the platform as herein described may further be combined with one or more of unicast/multicast/broadcast seamless switching, advanced encoding and/or transcoding, automated content tagging, content pause and resume, and mediation and settlement.

Personalization of user experience that may include personal entertainment server and interactive programming guide may be combined with business models on the platform that may be associated with a mobile media platform. This combination may be further combined with a consumption profile which may include a device profile, a user profile, a network profile, an encoding profile, and the like. The combination of personalization of user experience that may include personal entertainment server and interactive programming guide with business models on the platform as herein described, may further be combined with one or more of unicast/multicast/broadcast seamless switching, advanced encoding and/or transcoding, automated content tagging, content pause and resume, and mediation and settlement.

Social networking that may include content referral, rating, gifting, forums, profiles, and lists may be combined with one or more of advertising, marketing, advertisement management, and ad fulfillment engine that may be associated with a mobile media platform. This combination may be further combined with a consumption profile which may include a device profile, a user profile, a network profile, an encoding profile, and the like. The combination of social networking with one or more of advertising; marketing; advertisement management; ad fulfillment engine as herein described may further be combined with one or more of unicast/multicast/broadcast seamless switching, advanced encoding and/or transcoding, automated content tagging, content pause and resume, and mediation and settlement.

E-commerce or e-billing may be combined with rights management that may be associated with a mobile media platform. This combination may be further combined with a consumption profile which may include a device profile, a user profile, a network profile, an encoding profile, and the like. The combination of E-commerce or e-billing with rights management as herein described may further be combined with one or more of unicast/multicast/broadcast seamless switching, advanced encoding and/or transcoding, automated content tagging, content pause and resume, and mediation and settlement.

Reporting may be combined with one or more of advertising, marketing, advertisement management, and ad fulfillment engine that may be associated with a mobile media platform. This combination may be further combined with a consumption profile which may include a device profile, a user profile, a network profile, an encoding profile, and the like. The combination of reporting with one or more of advertising, marketing, advertisement management, and ad fulfillment engine, as herein described may further be combined with one or more of unicast/multicast/broadcast seamless switching, advanced encoding and/or transcoding, automated content tagging, content pause and resume, and mediation and settlement.

Administration that may include administration UI, may be combined with integration with other system that may include carrier systems and search engines that may be associated with a mobile media platform. This combination may be further combined with a consumption profile which may include a device profile, a user profile, a network profile, an encoding profile, and the like. The combination of administration, that may include administration UI, with integration with other system as herein described, may further be combined with one or more of unicast/multicast/broadcast seamless switching, advanced encoding and/or transcoding, automated content tagging, content pause and resume, and mediation and settlement.

One or more of advertising, marketing, advertisement management and ad fulfillment engine, may be combined with integration with other system that may include carrier systems and search engines and may be associated with a mobile media platform. This combination may be further combined with a consumption profile which may include a device profile, a user profile, a network profile, an encoding profile, and the like. The combination of one or more of advertising, marketing, advertisement management, and ad fulfillment engine with integration with other system, as herein described may further be combined with one or more of unicast/multicast/broadcast seamless switching, advanced encoding and/or transcoding, automated content tagging, content pause and resume, and mediation and settlement.

One or more of advertising, marketing, advertisement management, and ad fulfillment engine may be combined with architecture of the platform that may be associated with a mobile media platform. This combination may be further combined with a consumption profile which may include a device profile, a user profile, a network profile, an encoding profile, and the like. The combination of one or more of advertising, marketing, advertisement management, and ad fulfillment engine with architecture of the platform, as herein described may further be combined with one or more of unicast/multicast/broadcast seamless switching, advanced encoding and/or transcoding, automated content tagging, content pause and resume, and mediation and settlement.

One or more of advertising, marketing, advertisement management, and ad fulfillment engine may be combined with business models on the platform that may be associated with a mobile media platform. This combination may be further combined with a consumption profile which may include a device profile, a user profile, a network profile, an encoding profile, and the like. The combination of one or more of advertising, marketing, advertisement management, ad fulfillment engine with business models on the platform as herein described may further be combined with one or more of unicast/multicast/broadcast seamless switching, advanced encoding and/or transcoding, automated content tagging, content pause and resume, and mediation and settlement.

Security may be combined with one or more of purchasing, shopping and store front applications that may be associated with a mobile media platform. This combination may be further combined with a consumption profile which may include a device profile, a user profile, a network profile, an encoding profile, and the like. The combination of security with one or more of purchasing, shopping and store front applications, as herein described may further be combined with one or more of unicast/multicast/broadcast seamless switching, advanced encoding and/or transcoding, automated content tagging, content pause and resume, and mediation and settlement.

Billing may be combined with integration with other system that may include carrier systems and search engines and may be associated with a mobile media platform. This combination may be further combined with a consumption profile which may include a device profile, a user profile, a network profile, an encoding profile, and the like. The combination of billing with integration with other system, as herein described may further be combined with one or more of unicast/multicast/broadcast seamless switching, advanced encoding and/or transcoding, automated content tagging, content pause and resume, and mediation and settlement.

Architecture of the platform may be combined with one or more of purchasing, shopping and store front applications that may be associated with a mobile media platform. This combination may be further combined with a consumption profile which may include a device profile, a user profile, a network profile, an encoding profile, and the like. The combination of architecture of the platform with one or more of purchasing, shopping and store front applications, as herein described may further be combined with one or more of unicast/multicast/broadcast seamless switching, advanced encoding and/or transcoding, automated content tagging, content pause and resume, and mediation and settlement.

One or more of purchasing, shopping and store front applications may be combined with distribution or channel applications that may be associated with a mobile media platform. This combination may be further combined with a consumption profile which may include a device profile, a user profile, a network profile, an encoding profile, and the like. The combination of one or more of purchasing, shopping and store front applications with distribution or channel applications, as herein described may further be combined with one or more of unicast/multicast/broadcast seamless switching, advanced encoding and/or transcoding, automated content tagging, content pause and resume, and mediation and settlement.

Users of the platform may be combined with business models on the platform that may be associated with a mobile media platform. This combination may be further combined with a consumption profile which may include a device profile, a user profile, a network profile, an encoding profile, and the like. The combination of users of the platform with business models on the platform as herein described, may further be combined with one or more of unicast/multicast/broadcast seamless switching, advanced encoding and/or transcoding, automated content tagging, content pause and resume, and mediation and settlement.

Figure 74:
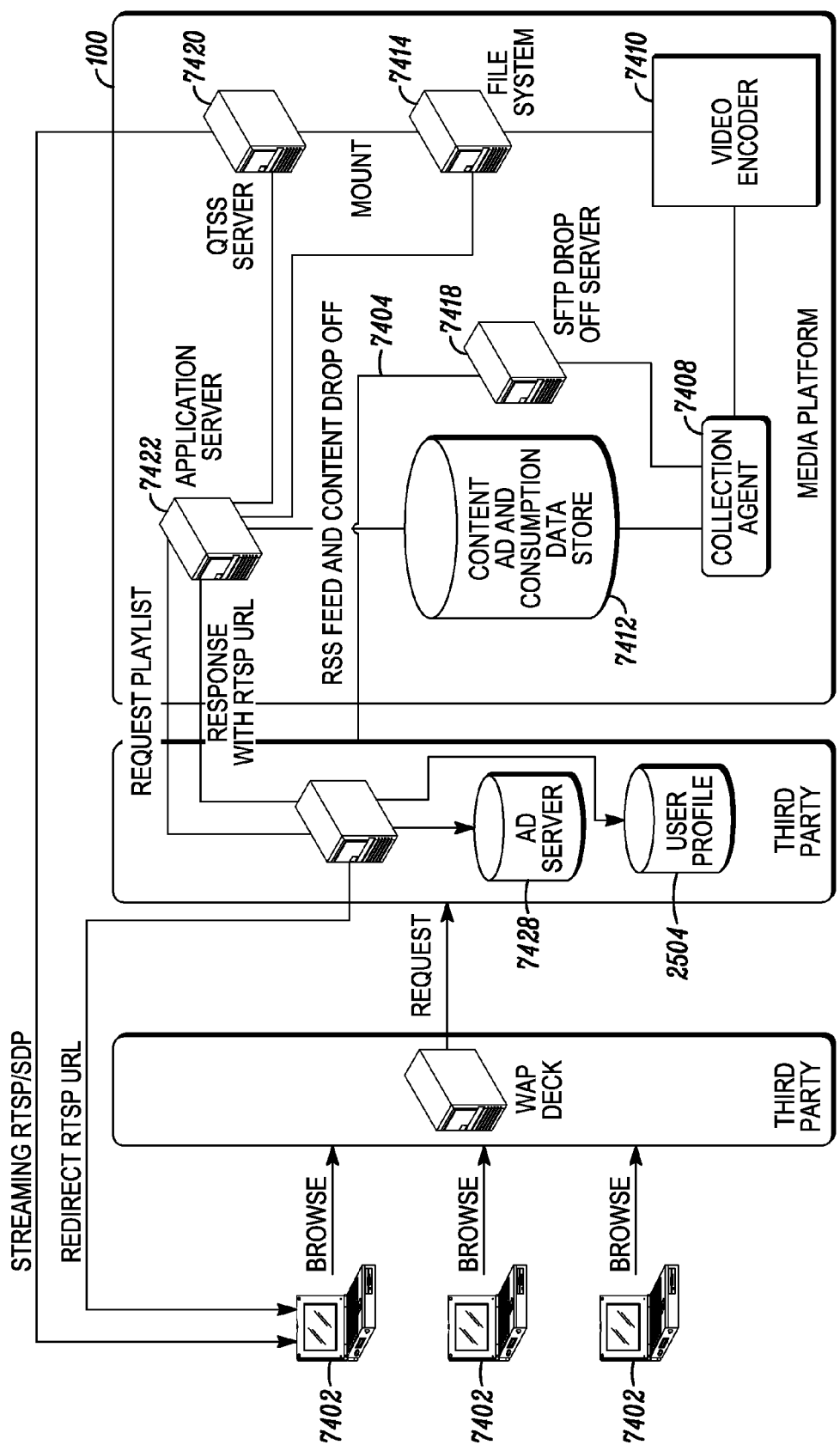
FIG. 74 depicts a deployment of a mobile media platform.

FIG. 74 provides an embodiment of the architecture for the media platform 100. A media platform 100 may include a multimedia system that provides for services associated with the collection, ingestion, encoding, distribution, consumption, mediation and settlement, and usage reporting of video and advertising content in association with users operating on a mobile communication facility 7402. As shown, the media platform 100 may follow a client-server architecture, where third-parties provide the interface between the mobile communication facility 7402, such as user mobile handsets 7402, and the media platform 100.

Media, such as a video, may first be supplied to the media platform 100 through a feed and content drop off 7404. Ingestion of the content into the media platform may include a collection agent 7408 that parses RSS feed and content to collect physical files including content and advertisements. As a result, the collection agent 7408 may be able to provide updates for advertisements and content information to the consumption data store 7412. The reception of new content may then initiate video encoding to start. The video encoder 7410, after completing encoding, may upload encoded advertisements and video to the streaming server 7420.

In embodiments, user consumption of the content may include a web application for looking up content and advertisements by identification number, generating playlists and configuration files for streaming, and initiating streaming execution. In addition, reports may be generated in association with the content consumption. Other components within the media platform 100 may include a content/advertisement and consumption data storage 7412, a file system 7414, an SFTP drop-off server 7418, application server 7422, and the like. In addition, third party components may include an ad server database 7428, a user profile database 2504, a WAP deck 7432 for interfacing with user handsets 7402, and the like. In embodiments, the user interface may be directed from the media platform, or made through third party environments.

In embodiments, ingestion may use a collection agent 7408 and involve the ingesting of advertisements and video. The preconditions for the use of the collection agent 7408 may include the successful placement of content in the drop off folder 7404, where the collection agent 7408 may then pick up the feed, update content and advertisement data, store for mapping, parse the feed, pass video to encoder 7410, and the like. The encoder 7410 may then be initiated for the start of encoding, where raw videos may use specified encoding profiles. When encoding is complete, the encoder 7410 may place new video in a folder for publishing on the streaming server 7420. At this point in the process, the content and advertisements may be available for viewing and streaming to users' handsets 7402.

In embodiments, a user may request a playlist for content consumption through a third party, where an action code, subscriber ID, content list, and the like, may be submitted via HTTP. The process may include a plurality of steps, such as checking the content database to look up a content file name by ID, checking the streaming folder to determine if requested contents are available, generating playlist files from a request, determining which port to use for streaming, generating configuration, executing a command to create streaming, insertion of consumption records including playlist and subscriber ID, returning success or failure response back the third party, and the like.

Figure 75:
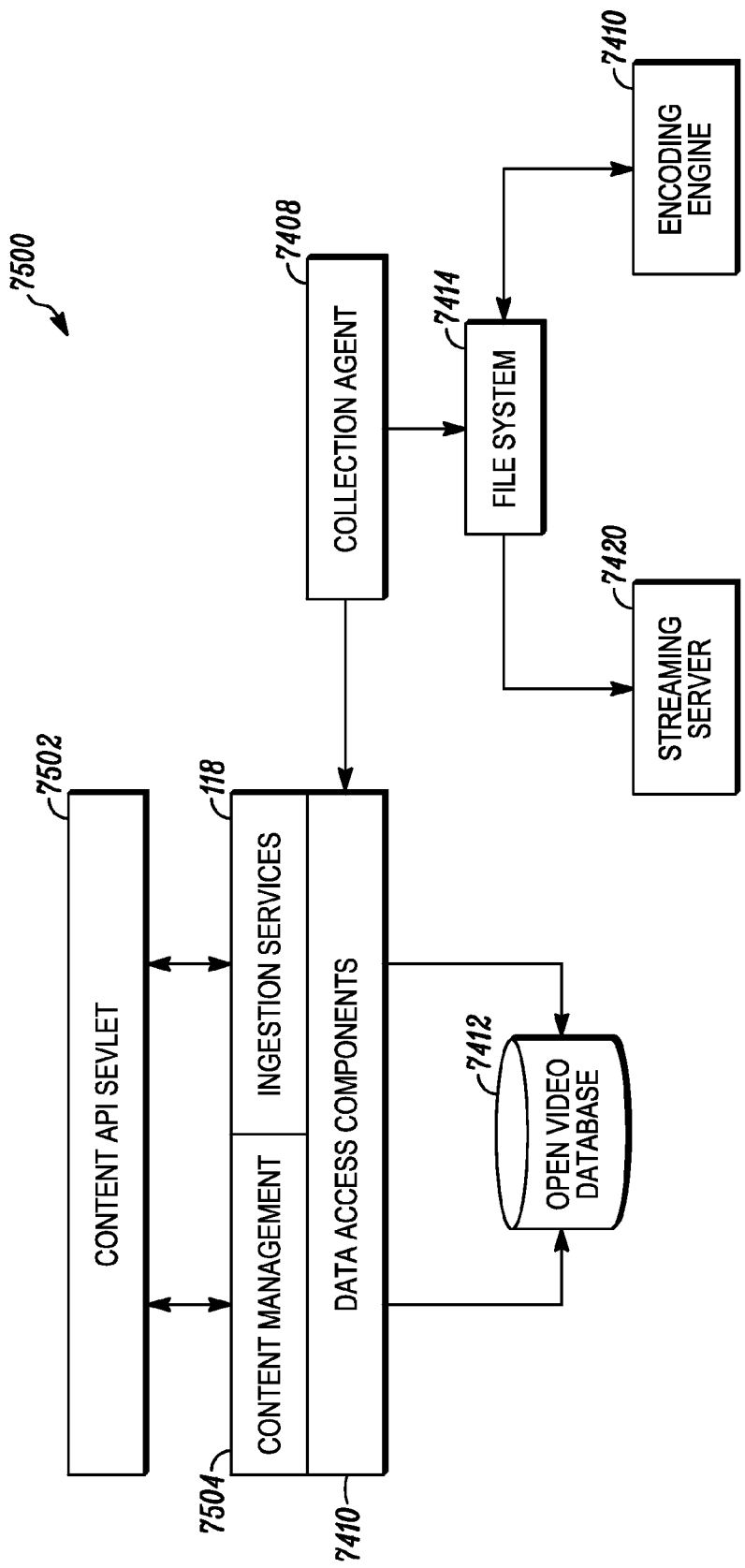
FIG. 75 depicts data flow elements of the embodiment of FIG. 74.

The media platform 100 may be multi-capability, componentized, and provide many essential services for wireless applications, such as for content ingestion from users, content consumption by users, and usage reporting. FIG. 75 provides a high level block diagram for the media platform 100, where a content API servlet 7502 may interface with content management 7504 and ingestion services 118 providing data access components 7510 that may further interface with an open video database 7412. In turn the file system 7414 may interface with the streaming server 7420, the encoder 7410, and the collection agent 7408, and interface back with the data access components 7510. In embodiments, the collection agent 7408 may represent the demarcation point between the media platform 100 and the third party environments, where a specific collection agent 7408 may serve many content categories and advertisements, such as for news, fun, sport, music, USC, advertising contents, and the like.

Figure 76:
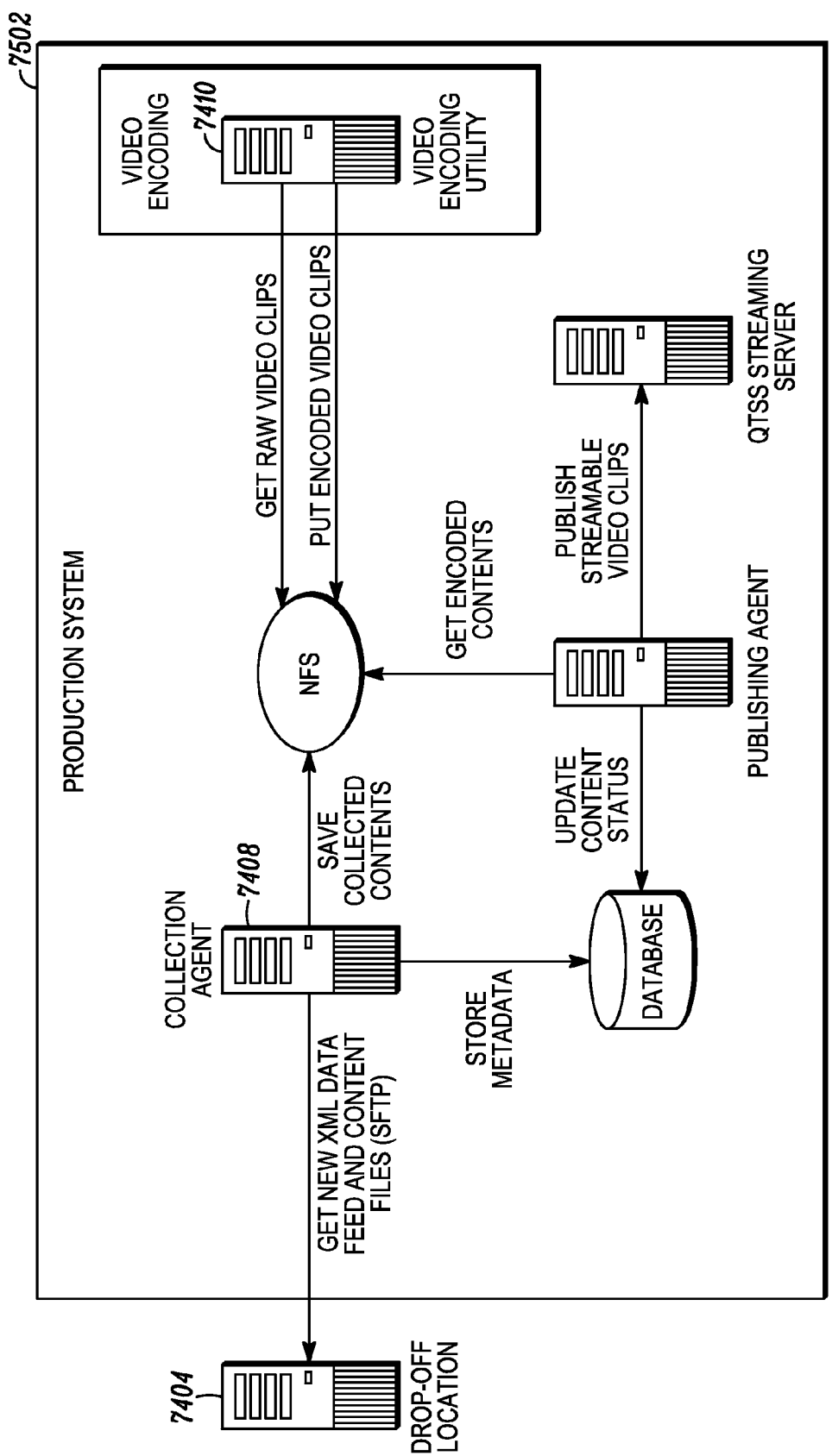
FIG. 76 depicts a production flow of the embodiment of FIG. 74.

FIG. 76 provides a high level block diagram for the media platform's ingestion services. Here the collection agent 7408 may get a new XML data feed and content files from the drop-off location 7404, such as from a content provider. The collection agent may then pass the raw video files to the encoder 7410 which may be responsible for rendering the video into various 3GP profiles. In embodiments, the content agent 7408 may parse the XML feed and generate the appropriate objects, as well as provide information processing, such as inserting ads and content into data store within the media platform 100 environment, deploy the formatted videos within the media platform 100 environment (and may include the streaming server), and the like.

Figure 77:
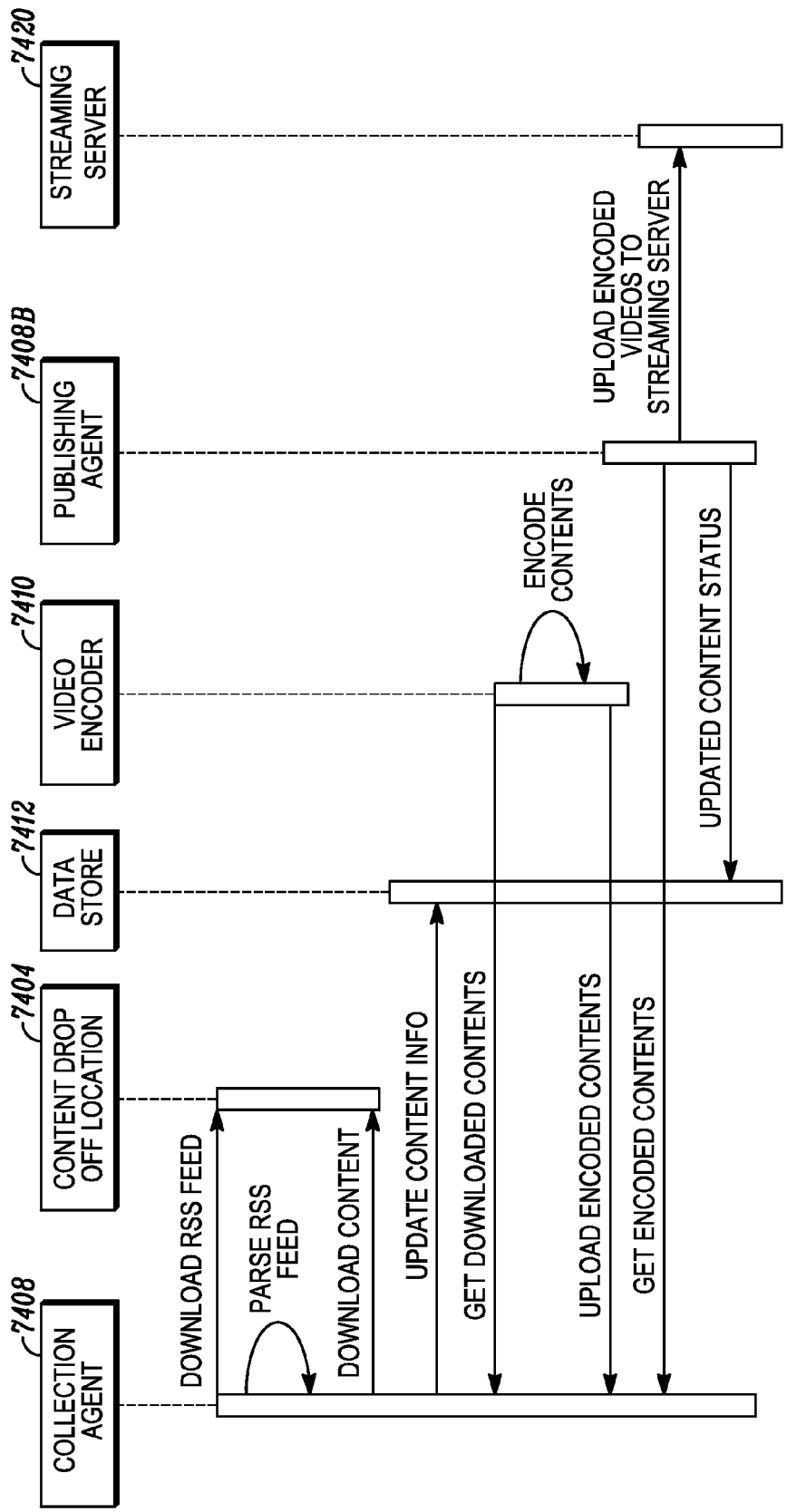
FIG. 77 depicts a content agent sequence diagram.

FIG. 77 provides a content agent sequence diagram. Here, it is shown how the collection agent 7408 receives the download from the content drop off location 7404 where it is parsed and may also provide updates to the content information in data storage 7412. Then the content may be sent to the video encoder 7410, encoded, and sent off to the publishing agent 7408B. The encoded video may then be sent to the streaming server 7420 to be made available to users.

Figure 78:
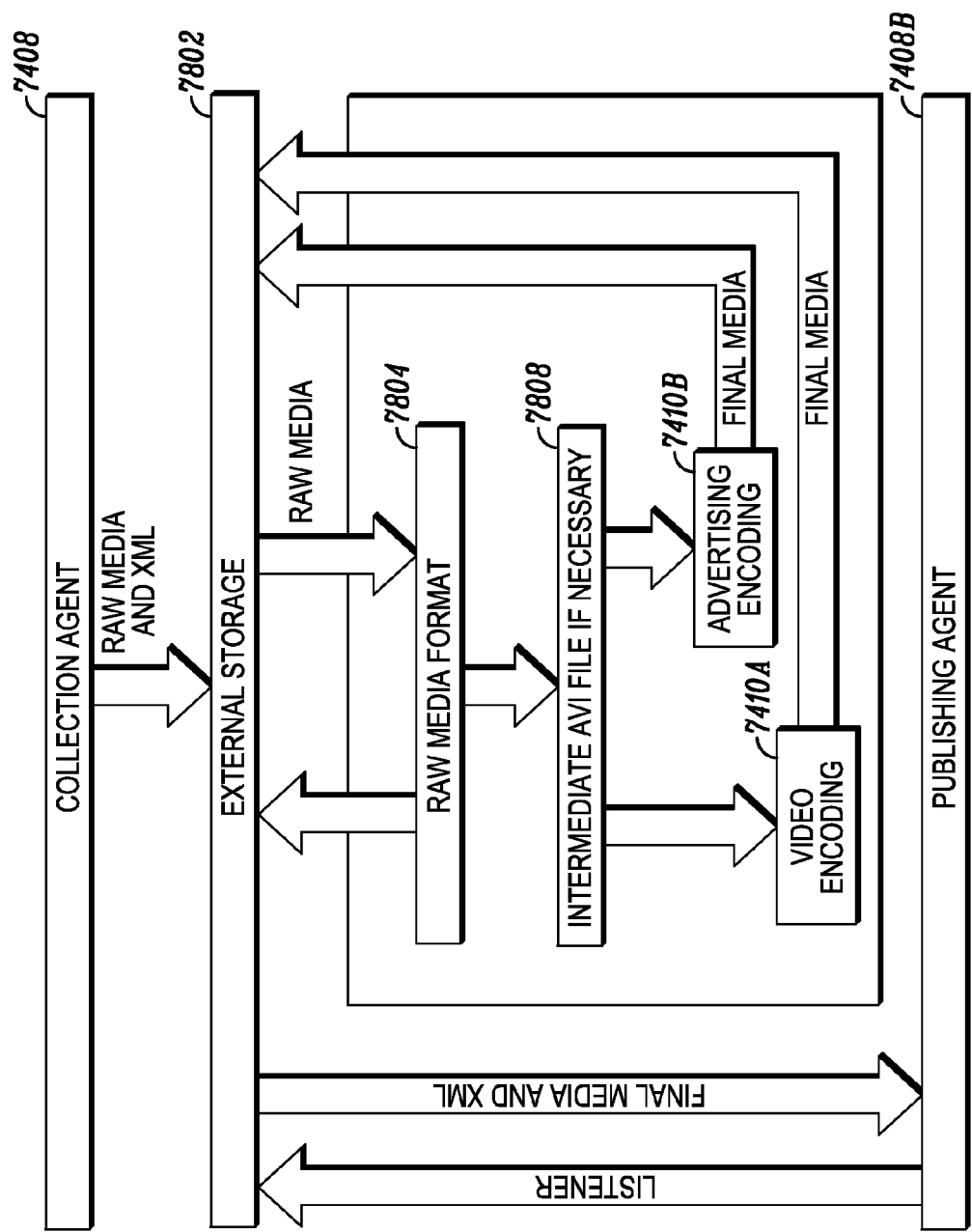
FIG. 78 depicts a block diagram of an encoding process for the embodiment of FIG. 74.

FIG. 78 provides a block diagram of the encoding process. The encoder 7410 may create multiple formats based on profiles defined in the system. Once the videos are encoded, they may be picked by the partner agent and published to production along with metadata descriptors. FIG. 78 shows how the collection agent sends the raw media and XML data on to external storage 7802, and then on to formatting, such as raw media formatting 7804 and, if necessary, to an intermediate AVI file 7808. The files are then video encoded 7410A and advertisement encoded 7410B, and sent back to external storage 7802. The publishing agent 7408B may then take the encoded files from external storage 7802 to be made available to the streaming server 7420. The video encoder listens on an input SFTP location, which may be implemented using a cron job that invokes the video encoder 7410 each minute to check if files that need to be encoded are present. If they are present, the video encoder may encode them. While encoding, it may or may not check for more files. The video encoder may then publish encoded media to a remote SFTP location, from where the collection/publishing agent may pick them up and move them over to the streaming server 7420.

In embodiments, the encoding process may include a content duration extraction. In this case the encoder 7410 may be required to analyze the duration of the sources content. A new set of instructions may need to be executed before the encoding process begins. In addition, a new tag may be added to support the duration extraction. In embodiments, the encoding process may include various encoding profiles, and the encoder may be capable of supporting additional profiles, where new profiles may be added manually to the configuration file video converter when required. An encoding profile may be a set of instructions that may need to be executed in order to encode a raw media file (source) to an encoded media file (destination). An encoding profile may have a tag, where each profile may contain a name, network type, and encoding configuration settings. Tags may contain actual commands that run through the operating system command line. Every parameter tag may contain an ID attribute, which may be a sequence number the command is run in. Commands may be enclosed, since they may contain characters that have corrupt XML syntax. In addition, tokens may be used, and replaced with actual values at runtime.

Figure 79:
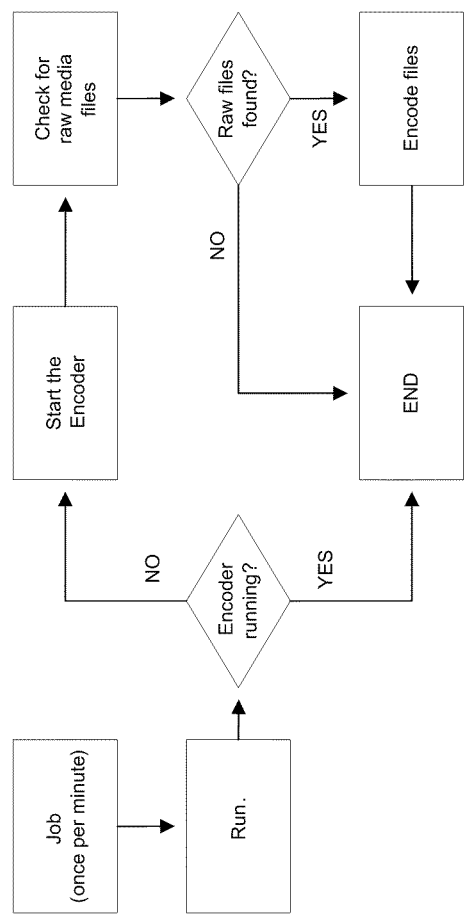
FIG. 79 depicts a video encoding lifecycle for the embodiment of FIG. 74.

FIG. 79 provides a video encoding utility lifecycle 600 diagram, where the encoder 7410 is started by a job that invokes a shell script. In embodiments, the job may run periodically, such as once per minute, and proceed through a routine for running the encoder. For instance, and as depicted in FIG. 79, it may first determine whether the encoder 7410 is running, if it is then the encoder may be left to resume encoding. If it is not running, then the encoder may be started, and a check may be made for new raw media files for encoding. In embodiments, the video encoder 7410 may publish encoded media to a remote location, from where the publishing agent 7408B may pick up and move the encoded media to the streaming server 7420. In embodiments, third party components may have specific requirements for the response to submission and publication, and the media platform 100 may integrate with their APIs to indicate a success or failure. Other codes may include RSS error, content not found, content name error, guidance exist error, encoding error, internal submission error, internal publishing error, lost Guidance error, database error, file error, unsupported format error, and the like. In embodiments, third party components may be notified by email for submission and publication and the stats code and messages may be included in the email.

In embodiments, the media platform may include a servlet 7502. With the servlet 7502 the client may use multiple action codes to request information from the server side. The content consumption servlet 7502 may take in action codes while capturing the transaction method, that is, getting a file or posting a file, and a success or failure response may also be sent back to the client. In embodiments, the servlet may include content management. There may be content managers (interfaces with their corresponding implementation classes) used to manage content in the database (i.e. store, delete, and modify content) and content browsers (again, interfaces with their corresponding implementation classes) used to retrieve content stored in the database. In embodiments, content browsers may mostly be used by the servlet to hand data over to third party components. Client requests may come in URL format with parameters tagged to the base URL of the Servlet as name-value pairs. Data may be sent by the content servlet to the client in a format with the URL, where the action IDs used in the requests may be static values agreed upon between the client and the server, and representative of the application operations.

In embodiments, action types may use and may include playlist requests, content availability checks, and the like. Playlist requests may list the ID for advertisements or content to be played in the requested order, and the subscriber ID and playlist information may be stored in data store for reporting. A content availability check may be an advertisement or content being checked for being ingested in the system. A content Consumption API may respond by using HTTP response status codes with a body message. Standard HTTP response codes may be used with the addition of media platform response codes. Examples of response codes may include, success, content not found, invalid request parameter, service unavailable, internal server error, consumption record cannot be generated, database connection problem, playlist cannot be generated, SDP cannot be generated, and the like.

In embodiments, the media platform may include reporting of customer and content consumptions for streaming. The report may include a customer ID (which may be from the third party), playlist, date time, duration of viewing time, and the like. To fulfill the requirements, data may be captured from steaming log files and consumption records which may have generated when the request came from the third party. An example of a log file may be:

192.168.1.151 2007-08-07 18:53:22 192.168.1.22:554 / mobile/content/provider/1186512465939.sdp 3 121 1 504 192.168.1.151 7.2-QUICKTIME/7.2%20 (qtver=7.2;os=WINDOWS %20NT %205.1Service %20 Pack %202) WINDOWS NT %205.1Service %20 Pack %202-0 0 0 RTP UDP-H263-1998/90000 287528 0 0 374 0 0 1 3 100 192.168.1.22 to-dev-stream-01.quickplay.local 1 0 subscriberId=11223&playlistId=112334_11223-Streaming %20Server
2007-08-07 18:53:22—date time
3—Streaming start time
121—Streaming end time
subscriberId=11223&playlistId=112334_11223, extra parameters for subscriber id and playlist id.

In embodiments, the media platform may also contain consumption records. Consumption records may be database records that may be generated during content consumption. A consumption record may include a playlist ID, subscriber id, a list of guidance Ids, and the like.

Figure 80A:
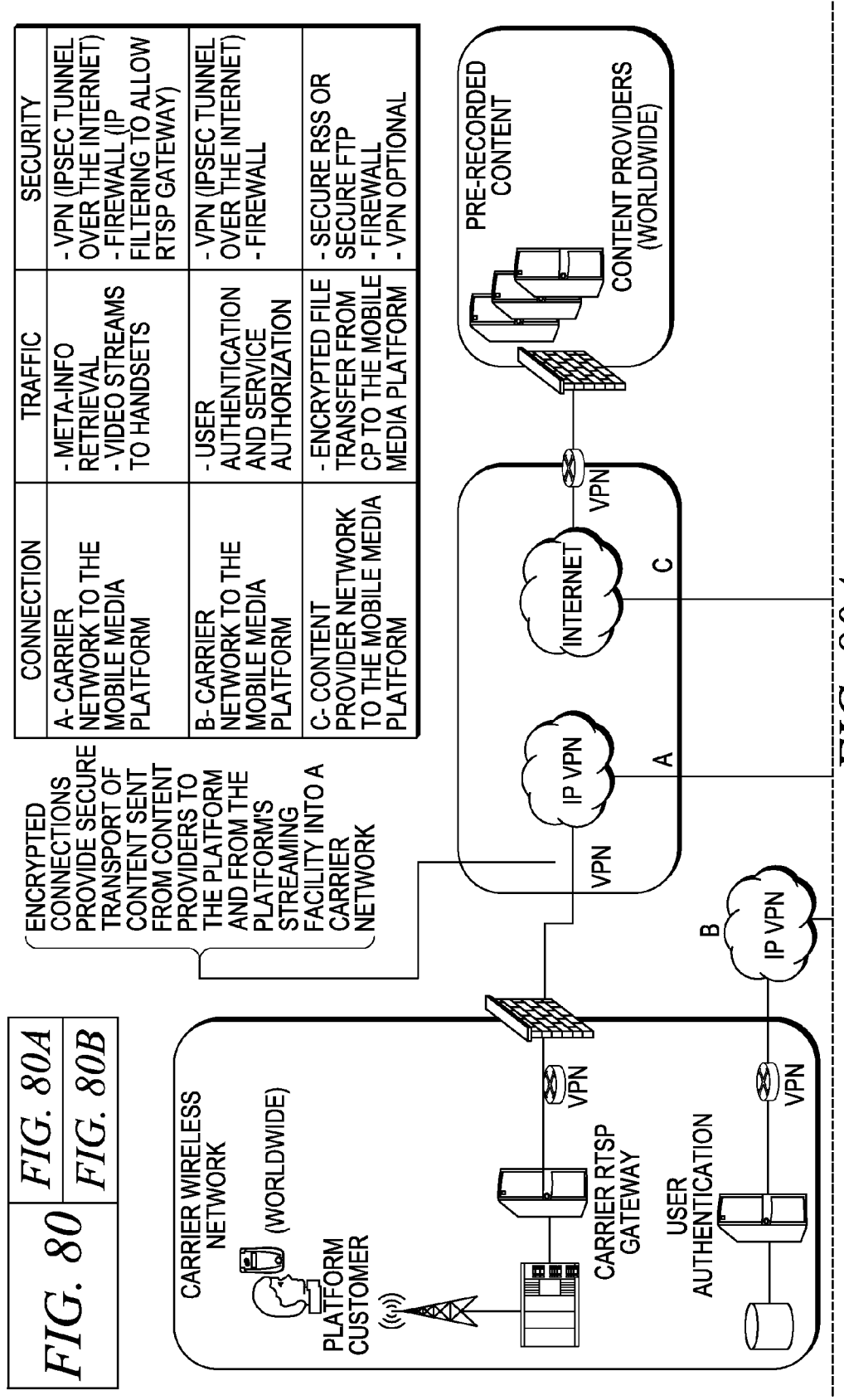
FIG. 80 depicts a deployment of the mobile media platform across geographies.
Figure 80B:
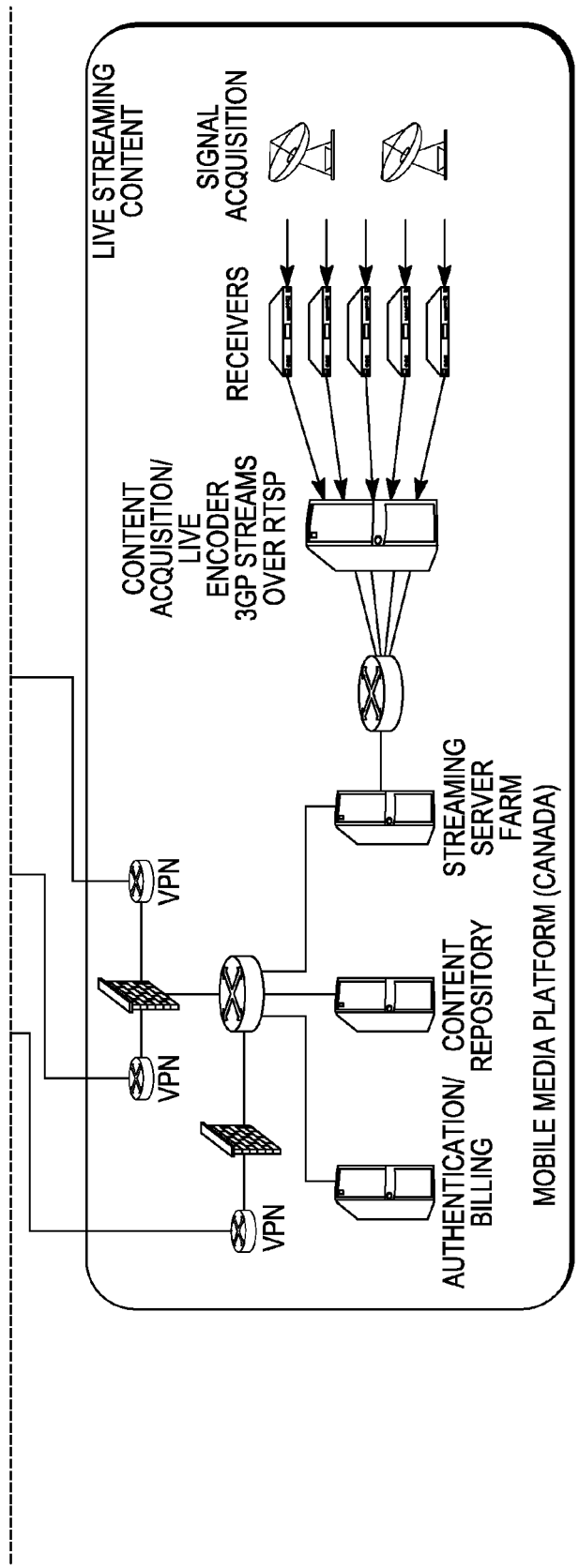
Figure 81:
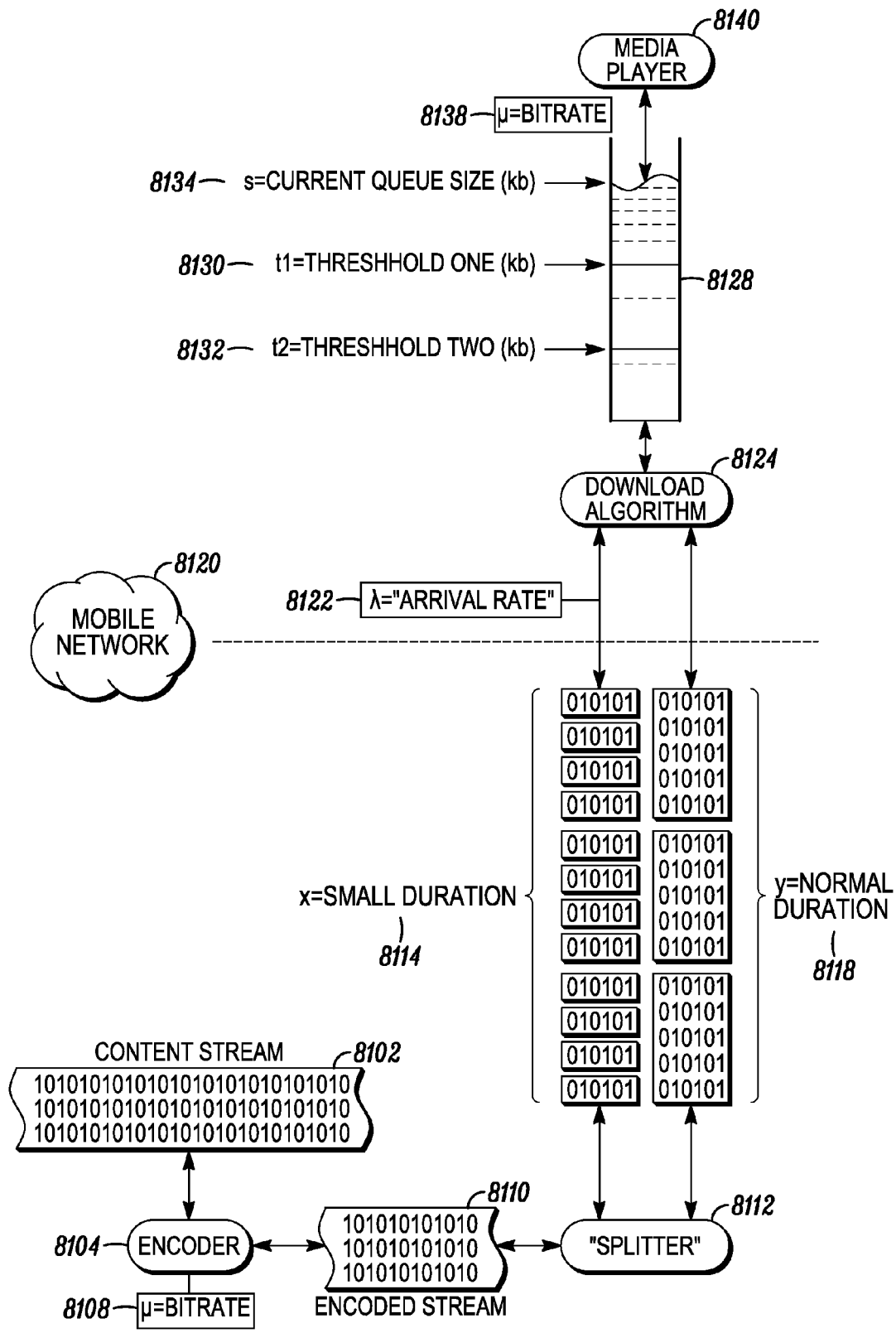
FIG. 81 depicts an exemplary system for enabling streaming of content on mobile devices in accordance with an embodiment of the present invention.

Referring to FIG. 80, the methods and systems of a mobile media platform as herein described may be deployed across geographies and may be adapted to suite requirements associated with the geographies. Security can be established between geographies to further ensure requirements and advantages of the platform in a geography are protected. A deployment of the platform in a particular geography, such as is shown in FIG. 80 may provide advantages to participants in the deployment geography. In an example, a carrier or network provider in Canada may have an advantage over a carrier or provider in another geography because the mobile media is more readily accessible to the Canadian participant. FIG. 81 depicts an exemplary method and system for enabling content streaming on mobile devices in accordance with an embodiment of the present invention, and may be related to, consider, incorporate, affect or be affected by a pseudo-hardware device identifier, protecting different segments of content through different means, blending different methods of protection, such as encryption and scrambling, and location and time zone based logic, all as described herein. The content may be live content. The content may be audio content, video content, data and the like. In an embodiment, the content may be a live radio stream. The content may be in the form of a content stream 8102. In embodiments, the content stream may contain data. In embodiments, the data, whether content or in the form of a content stream, may include metadata. In embodiments, the data may include a parallel metadata stream of compressed descriptors. In embodiments, the compressed descriptors may be synchronized precisely for delivery to an end point, such as a client. The metadata presentation may align accurately with the content stream (which may be an audio stream), including compatibility for distributed delivery models that include content delivery network or CDN integration. In embodiments, the content metadata may include descriptors of the content (such as audio data), URLs for supplemental data, identifiers for integrations to third party storefronts in a case where a user may have an option to purchase the content being streamed and the like. The methods and systems may include, without limitation, a content stream 8102, an encoder 8104, a bitrate 8108, an encoded stream 8110, a splitter 8112, chunks of small duration 8114, chunks of normal duration 8118, a mobile network 8120, an arrival rate 8122, a download algorithm 8124, a playback queue 8128, a first threshold 8130, a second threshold 8132, a current queue size 8134, a bitrate 8138, a media player 8140 and the like.

The methods and systems may include components which may be installed on an application server to serve the content. The system may include components which may be installed on a mobile device for consuming content. The components may combine together to form methods and systems for streaming content, such as live audio, directly to the mobile device, such as to a media player 8140 on the mobile device. In an embodiment, an encoder 8104 may encode the content stream 8102. The encoder 8104 may be an audio encoder, video encoder, data encoder or other encoder. The encoder may encode the content stream at a specific bitrate 8108 or over a range of bitrates 8108. The bitrate 8108 or range of bitrates 8108 may be determined by a user, the encoder 8104 or by other means. The encoder 8104 may produce an encoded stream 8110.

The methods and systems may include a splitter 8112. The splitter 8112 may be software, hardware and/or a mixture of software and hardware. The encoded stream 8110 may be provided to the splitter 8112. The splitter 8112 may accept a stream of data, such as audio or video data, which may be encoded for a mobile network, such as by third-party encoding software. The splitter 8112 may split the encoded stream 8110 into two or more sets or streams of chunks. The chunks may be for separate channels, such as separate radio channels. The chunks may be based on time. The chunks may be based on file size. The chunks may be sliced at particular time intervals. In embodiments, the splitter 8112 may create two repositories of chunks for each radio channel. In embodiments, the splitter 8112 may create two repositories of chunks based on time.

In embodiments, the splitter 8112 may create chunks of small duration 8114 and chunks of normal duration 8118. In a specific embodiment, the chunk of small duration 8114 may be 5 seconds long. In a specific embodiment, the chunk of normal duration 8118 may be 20 seconds long. In embodiments, a first repository may contain small duration chunks 8114 and a second repository may contain normal duration chunks 8118. For example, the small duration chunks 8114 may be said to have duration X seconds and the normal duration chunks 8118 may be said to have duration Y seconds. In certain embodiments, the normal duration chunks may be of longer duration 8118 than the short duration chunks 8114. In certain embodiments, the duration of the normal chunks may be divisible by the duration of short chunks. In the above example, Y may be divisible by X to produce a whole number. In other embodiments, there may be additional categories of duration chunks. For example, there may be 3, 4, 5 or n sizes of chunks. In other embodiments, the chunks within a category may have different durations. In other embodiments, the size of the chunks may be based on file size. In another embodiment, the splitter 8112 may create chunks of only one size. In another embodiment, the splitter 8112 may create chunks of only one size for a certain period of time.

In embodiments, the lengths of each chunk may be configurable. For example, the length of each chunk may be 5 seconds, 20 seconds, 30 seconds, and the like. The methods and systems may include a download algorithm 8124. The download algorithm may download chunks over a mobile network 8120, other network or by other means. The downloads may be affected or characterized by an arrival rate 8122. In embodiments, the arrival rate 8122 may depend on network performance. The mobile device, such as through the download algorithm 8124, may download chunks. The mobile device may switch from downloading chunks of one size to another. In embodiments, the chunks provided for download may be switched from one size to another. For example, the mobile device may download a short duration chunk 8114 of 5 seconds and then may switch to download normal duration 8118 chunk of 10 seconds. In embodiments, each repository of chunks may represent live audio data, so the splitter 8112 may overwrite a chunk that no longer represents current content. In practice, to address latency, a small collection of chunks, say ~5-10 may be kept on the server before overwriting them. In embodiments, it may be necessary for the division between one chunk and another to be the same, so that the playback experience may be seamless to a listener.

The methods and systems may include security options. In embodiments, the splitting and preparation of the chunks, such as audio chunks, may include encryption of files using a private-public key based system or the like. The client player may have authenticated access to the encrypted streams and may hold the private key for decryption and playback of each chunk. Security options may also include one or more tokenized uniform resource identifiers or URI for access to the trusted file system source. In embodiments, this may prevent spidering and other techniques of accessing and learning the delivery protocol. These security measures may prevent tampering with the chunked files in order to effectively reproduce the stream on unauthorized end points The methods and systems may include a playback queue 8128. The playback queue 8128 may be included in the mobile device. The playback queue 8128 may be embodied in memory, such as device memory. The playback queue 8128 may form a buffer. The playback queue 8128 may be connected to the download algorithm 8124 and the media player 8140. The buffer may be formed between the download algorithm 8124 and the media player 8140. In embodiments, if the playback queue 8128 contains data, the media player 8140 may be playing. In a specific embodiment, as long as the playback queue 8128 contains audio data, the mobile device may continue playing from it, such as through the media player 8140. The download algorithm 8124 may control the downloading of new data into the playback queue 8128. The download algorithm 8124 may control which chunk is to be download next.

The download algorithm 8124 may facilitate an adaptive bitrate. The download algorithm 8124 may monitor and/or make use of one or more thresholds associated with the playback queue 8128. In embodiments, the playback queue 8128 may be associated with two thresholds, threshold one 8130 and threshold two 8132. In embodiments, threshold one 8130 may be an upper threshold and threshold two 8132 may be a lower threshold. In embodiments, the playback queue 8128 may also be associated with a current queue size 8134.

The download algorithm 8124 may monitor and/or make use of the thresholds and queue size according to an algorithm. In an embodiment, the algorithm may be:

```
"While (user is playing channel) {
IF (S < t1) {
-download a new chunk from server
-what size chunk?
IF (S < t2) {download a "small" chunk} else
{Download a "normal" chunk}
- Wait until chunk downloads
- add chunk to queue
}
}"
```

Where S = current queue size
t1 = upper threshold (kb)
t2 = lower threshold (kb)
$\mu$ = bitrate
$\lambda$ = "arrival rate": which may depend on network performance. (Kbps)
Y = Normal Duration The suggested threshold values may be:

$$t2=(Y*\mu\char`\^2)/\lambda$$

$$t1=t2+(Y*\mu)$$

In certain embodiments, the systems and methods, such as through the download algorithm 8124 and/or playback queue 8128, may constantly monitor the values of S and $\lambda$ to do computations. In other embodiments, the monitoring may be less frequent than constantly. In embodiments, in a good network situation, t1 may be used to decrease the traffic on the application server. In embodiments, in a bad network situation, or when user has just started listening, t2 may be used to know when to switch from one chunk size to another. This may decrease buffering time.

The lower threshold may detect or be used to detect when the queue is becoming empty and through the download algorithm 8124 may cause a switch in chunk sizes downloaded. In embodiments, this may ensure that, if the queue empties and the media player 8140 needs to be stopped, there may be a shorter wait before content starts again. This technique may address fluctuations in a mobile network's download speed. For example, a user of a mobile device may drive through a tunnel where the mobile network's download speed may fluctuate. Because the chunks have been generated by the splitter 8112 and not by an encoder 8104 the stitching may be seamless. Downloading the chunks into the queue may be effectively adding binary data resulting in seamless stitching.

The upper threshold may detect or be used to detect when the queue is becoming full and through the download algorithm 8124 may cause a switch in chunk sizes downloaded. In this case, the mobile network may be fast, and a user of the mobile device may not need to download new chunks at the same rate. In embodiments, this upper threshold may spare traffic on the application server and hence, may decrease the overall bandwidth cost of the system.

In embodiments, the amount of data present in the queue 8128 at any given point in time may depend on the speed at which content may be downloaded. The mobile network can be unreliable, so the queue 8128 may fluctuate as time passes. The methods and systems described herein may provide a quick startup time. For example, one may not have to wait 30 seconds before playback begins. In certain embodiments, no buffering may be required and one may not have to wait for a download to finish. The methods and systems described herein may provide clean and crisp playback, such as audio or video playback, with no noticeable breakage. The methods and systems described herein may reduce clicks or gaps in playback.

The methods and systems described herein may work well for mobile devices which may have or be associated with multiple network paths and/or which may adapt to network speed. For example, if the mobile device switches from one type of network to another, say, from a cell network to a Wi-Fi hotspot, which causes an increase in network speed, the queue 8128 may rapidly fill and the chunk size downloaded may be adjusted. In embodiments, the mobile device may be a smartphone, cell phone, laptop, computer, netbook, pager, personal digital assistant and the like. In embodiments, the mobile device may include Wi-Fi functionality, in addition to cellular network access. In an embodiment the mobile device may be an iPhone, BlackBerry 8110, NOKIA N95, iPod Touch and the like. In embodiments, the mobile device may include only Wi-Fi functionality.

In embodiments, the methods and systems described herein may be two-way or reversible and may enable the creation of content using the media player 8140 being uploaded to a content stream 8102. The methods and systems described herein may enable a progressive download audio queue for a non-streaming smart phone.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method, comprising:
   interpreting, by a computing device, a plurality of virtual-machine instructions of a virtual machine for detecting data representative of a mobile device's hardware identification information, resulting in a plurality of hardware instruction interpretations, the virtual machine executable on an application server that is separate from the mobile device;
   combining by the computing device each of the plurality of hardware instruction interpretations forming a quasi-hardware mobile unique device identifier (UUID) based on properties of the virtual machine;
   basing an encryption process on the UUID and encrypting media using the encryption process;
   transferring by the computing device the encrypted media to the mobile device; and
   decrypting at the mobile device the media based, at least in part, on the mobile device's internal knowledge of the UUID.

2. A method, comprising:
   interpreting, a plurality of virtual-machine instructions of a virtual machine for detecting data representative of a mobile device's hardware identification information, resulting in a plurality of hardware instruction interpretations, the virtual machine executable on an application server that is separate from the mobile device;
   combining each of the plurality of hardware instruction interpretations forming a quasi-hardware mobile unique device identifier (UUID) based on properties of the virtual machine
   basing a unique encryption process on at least two factors:
   the UUID, and
   an understanding of what prior encryption process was used in a previous media delivery to the mobile device, the unique encryption process being different than the prior encryption process;
   encrypting by the computing device media using the unique encryption process;
   transferring by the computing device the encrypted media to the mobile device; and
   decrypting at the mobile device the media based, at least in part, on the mobile device's internal knowledge of the UUID.

3. The method as recited in claim 1, wherein transferring the encrypted media to the mobile device is performed via a server.

4. The method as recited in claim 1, wherein transferring the encrypted media to the mobile device is performed via a streaming media server.

5. The method as recited in claim 2, wherein transferring the encrypted media to the mobile device is performed via a server.

6. The method as recited in claim 2, wherein transferring the encrypted media to the mobile device is performed via a streaming media server.

* * * * *

UNITED STATES PATENT AND TRADEMARK OFFICE
CERTIFICATE OF CORRECTION

| | | |
|---|---|---|
| PATENT NO. | : 9,124,650 B2 | |
| APPLICATION NO. | : 12/903125 | |
| DATED | : September 1, 2015 | |
| INVENTOR(S) | : Kavi Maharajh et al. | |

It is certified that error appears in the above-identified patent and that said Letters Patent is hereby corrected as shown below:

On the title page, in the illustrative figure, Reference Numeral 164, line 1, delete "ADVERTISMENT" and insert -- ADVERTISEMENT --.

In the Drawings

On sheet 1 of 83, in Figure 1, reference numeral 164, line 1, delete "ADVERTISMENT" and insert -- ADVERTISEMENT --, therefor.

In the Specification

In column 22, line 23, delete "platform" and insert -- platform. --, therefor.

In column 24, line 67, delete "invention" and insert -- invention. --, therefor.

In column 30, line 63, delete "system. o" and insert -- system, to --, therefor.

In column 31, line 21, delete "obfucsated" and insert -- obfuscated --, therefor.

In column 31, line 35, delete "beginning" and insert -- beginning. --, therefor.

In column 31, line 55, delete "sime" and insert -- some --, therefor.

In column 34, line 61, delete "the" and insert -- The --, therefor.

In column 35, line 54, delete "AES" and insert -- AES. --, therefor.

In column 41, line 54, delete "client" and insert -- client. --, therefor.

In column 43, line 67, delete "data" and insert -- date --, therefor.

In column 47, line 58, delete "moview" and insert -- movie. --, therefor.

In column 51, line 61, delete "lacking" and insert -- lacking. --, therefor.

In column 57, line 33, delete "RIFF," and insert -- AIFF, --, therefor.

In column 70, line 25, delete "MIA," and insert -- M1A, --, therefor.

In column 70, line 28, delete "RIFF," and insert -- AIFF, --, therefor.

In column 83, line 22, delete "RSTP" and insert -- RTSP --, therefor.

In column 88, line 66, delete "RSTP" and insert -- RTSP --, therefor.

Signed and Sealed this
Twenty-ninth Day of December, 2015

Michelle K. Lee
*Director of the United States Patent and Trademark Office*

CERTIFICATE OF CORRECTION (continued)
U.S. Pat. No. 9,124,650 B2

In column 90, line 50, delete "itself" and insert -- itself. --, therefor.

In column 93, line 56, delete "linking" and insert -- linking. --, therefor.

In column 96, line 4, delete "on-line" and insert -- online --, therefor.

In column 155, line 39, delete "points" and insert -- points. --, therefor.